(12) United States Patent
Camelio et al.

(10) Patent No.: US 11,066,495 B2
(45) Date of Patent: Jul. 20, 2021

(54) PHOSPHAGUANIDINE GROUP IV METAL OLEFIN POLYMERIZATION CATALYSTS

(71) Applicant: Dow Global Technologies LLC, Midland, MI (US)

(72) Inventors: Andrew M. Camelio, Midland, MI (US); Matthew D. Christianson, Midland, MI (US); Robert D. J. Froese, Midland, MI (US)

(73) Assignee: Dow Global Technology LLC, Midland, MI (US)

( * ) Notice: Subject to any disclaimer, the term of this patent is extended or adjusted under 35 U.S.C. 154(b) by 123 days.

(21) Appl. No.: 16/337,588

(22) PCT Filed: Sep. 29, 2017

(86) PCT No.: PCT/US2017/054328
§ 371 (c)(1),
(2) Date: Mar. 28, 2019

(87) PCT Pub. No.: WO2018/064493
PCT Pub. Date: Apr. 5, 2018

(65) Prior Publication Data
US 2020/0031960 A1  Jan. 30, 2020

Related U.S. Application Data

(60) Provisional application No. 62/402,554, filed on Sep. 30, 2016.

(51) Int. Cl.
| | | |
|---|---|---|
| *C07F 5/00* | (2006.01) | |
| *C08F 10/02* | (2006.01) | |
| *C08F 10/14* | (2006.01) | |

(52) U.S. Cl.
CPC .............. *C08F 10/14* (2013.01); *C07F 5/003* (2013.01); *C08F 10/02* (2013.01); *C08F 2410/01* (2013.01)

(58) Field of Classification Search
CPC ....... C07F 5/003; C08F 10/02; C08F 2410/01
See application file for complete search history.

(56) References Cited

U.S. PATENT DOCUMENTS

| | | |
|---|---|---|
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,543,399 A | 9/1985 | Jenkins, III et al. |
| 4,613,484 A | 9/1986 | Ayres et al. |
| 4,882,400 A | 11/1989 | Dumain et al. |
| 5,064,802 A | 11/1991 | Stevens et al. |
| 5,153,157 A | 10/1992 | Hlatky et al. |
| 5,296,433 A | 3/1994 | Siedle et al. |
| 5,321,106 A | 6/1994 | Lapointe |
| 5,350,723 A | 9/1994 | Neithamer et al. |
| 5,352,749 A | 10/1994 | Dechellis et al. |
| 5,425,872 A | 6/1995 | Devore et al. |
| 5,541,270 A | 7/1996 | Chinh et al. |
| 5,625,087 A | 4/1997 | Neithamer et al. |
| 5,721,185 A | 2/1998 | Lapointe et al. |
| 5,783,512 A | 7/1998 | Jacobsen et al. |
| 5,883,204 A | 3/1999 | Spencer et al. |
| 5,919,983 A | 7/1999 | Rosen et al. |
| 6,103,657 A | 8/2000 | Murray |
| 6,515,155 B1 | 2/2003 | Klosin et al. |
| 6,696,379 B1 | 2/2004 | Carnahan et al. |
| 7,163,907 B1 | 1/2007 | Canich et al. |
| 2003/0225228 A1 | 12/2003 | Moody et al. |
| 2006/0173144 A1 | 8/2006 | Baugh et al. |

FOREIGN PATENT DOCUMENTS

| | | |
|---|---|---|
| EP | 802202 B1 | 10/1999 |
| WO | 0008062 A1 | 2/2000 |
| WO | 2012027448 A1 | 3/2012 |

OTHER PUBLICATIONS

Busacca et al., "Synthesis of Phosphaguanidines by Hydrophosphination of Carbodiimides with Phosphine Boranes." The Journal of Organic Chemistry 2014, 79, 9878-9887.
Coles, M. P. "Applications of neutral amidines and guanidines in coordination chemistry." Dalton Transactions 2006, 985.
Coles et al., "Variable coordination chemistry of the phospha(III)guanidinate anion; application as a metal functionalized phosphine ligand." Chemical Communications 2002, 2794.
Crimmin et al., "Heavier Group 2 Element Catalyzed Hydrophosphination of Carbodiimides." Organometallics 2008, 2, 497.
Fahey, "Application of Metallocene Catalysts to Large-scale Slurry Loop Reactors", Metallocene-Based Polyolefins vol. 2 pp. 322-332 (2000).
Grundy et al., "Synthesis and coordination chemistry of neutralphospha(III)guanidines. Formation of 1-aza-3-phospha-4-metallacyclobut-1-ene rings at group 6 metals." Dalton Transactions 2003, 2573.
Issleib et al., "Phosphaguanidines. I. A new class of compounds with doubly coordinated trivalent, phosphorus." Journal of Organometallic Chemistry 1980, 192, 33.
Jin et al., "Synthesis and characterization of bulky guanidines and phosphaguanidines: precursors for low oxidation state metal-lacycles." New Journal of Chemistry 2009, 33, 64.

(Continued)

*Primary Examiner* — Catherine S Branch
(74) *Attorney, Agent, or Firm* — Dinsmore & Shohl LLP

(57) ABSTRACT

Embodiments are directed to phosphaguanidine metal complexes of formula I and using those complexes in α-olefin polymerization systems.

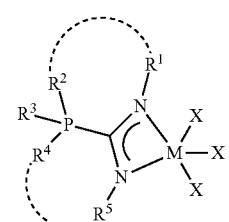

I

7 Claims, No Drawings

(56) References Cited

OTHER PUBLICATIONS

Mansfield et al., "Lithium and aluminum complexes supported by chelating phosphaguanidinates." Dalton Transactions 2005, 2833.
Mansfield et al., "The effect of P-cyclohexyl groups on the coordination chemistry of phosphaguanidinates." Dalton Transactions 2006, 2052.
Mansfield et al., "Coordination chemistry of isomeric mixtures of linked di(phosphaguanidine) compounds: a spectroscopic and crystallographic study." Organometallics 2006, 2470.
Mansfield et al., "A conformational Study of Phospha(III)-and Phospha(V)-guanidine Compounds." Journal of the American Chemical Society 2006, 128, 13879.
Mansfield et al., "Phoshpa(III)guanidinate complexes of titanium(IV) and zirconium(IV) amides", Polyhedron 2010, 2481-2488.
Sheehan et al., "A convenient synthesis of water-soluble carbodiimides." The Journal of Organic Chemistry 1961, 26, 2525-2528.
Thewissen et al., "The chemistry of heteroallene and -allylic derivatives with rhodium and iridium. II. Rhodium(I) and iridium(I) phosphine complexes of heteroallylic ligands of the type [Ph2PC(X)NR]-(X=S, NR, O) and [Ph2P(Q)C(S) NR]-(Q=S, O). Synthesis and phosphorus-31 NMR." Journal of Organometallic Chemistry 1980, 192, 101.
Zhang et al., "Alkali-metal-catalyzed addition of primary and secondary phosphines to carbodiimides. A general and efficient route to substituted phosphaguanidines." Chemical Communications 2006, 3812.
International Search Report and Written Opinion pertaining to PCT/US2017/054328, dated Jan. 18, 2018.
International Preliminary Report on Patentability pertaining to PCT/US2017/054328, dated Apr. 11, 2019.

PHOSPHAGUANIDINE GROUP IV METAL OLEFIN POLYMERIZATION CATALYSTS

CROSS REFERENCE TO RELATED APPLICATION

This application claims priority to U.S. Provisional Application 62/402,554, filed Sep. 30, 2016, which is incorporated herein by reference in its entirety.

TECHNICAL FIELD

Embodiments of the present disclosure generally relate to phosphaguanidine metal olefin polymerization catalyst systems used in olefin polymerization.

BACKGROUND

Olefin based polymers are utilized in the manufacture of a variety of articles and products, and thus, there is a high industrial demand for such polymers. Olefin based polymers, such as polyethylene, and/or polypropylene are produced via various catalyst systems. Selection of such catalyst systems used in the polymerization process is an important factor contributing to the characteristics and properties of such olefin based polymers.

The polyolefin polymerization process can be varied in a number of ways to produce a wide variety of resultant polyolefin resins having different physical properties suitable for use in different applications. It is generally known that polyolefins can be produced in solution phase polymerization process, gas phase polymerization process, and/or slurry phase polymerization process in one or more reactors, for example, connected in series or parallel, in the presence of one or more olefin polymerization catalyst systems.

Despite the research efforts in developing catalyst systems suitable for polyolefin polymerization, such as polyethylene, there is still a need for improved olefin polymerization catalysts to meet industrial demand for olefin based polymers.

SUMMARY

Accordingly, the present embodiments are directed to olefin polymerization catalyst systems, which provide alternative synthetic schemes for meeting industrial demand of olefin based polymers. Embodiments of the present disclosure are directed to new procatalysts or phosphaguanindine complex.

One embodiment of this disclosure is directed a phosphaguanindine complex comprising formula I:

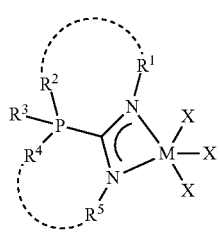

In formula I, $R^1$ and $R^5$ are independently selected from hydride, aliphatic, heteroaliphatic, aromatic, and heteroaromatic moieties. $R^2$ and $R^4$ are independently selected from aliphatic moieties, heteroaliphatic, aromatic moieties, or heteroaromatic moieties; $R^3$ includes a lone pair of electrons or a heteroatom. M is selected from titanium, zirconium, or hafnium. Each X independently is selected from aliphatic moieties, aromatic moieties, $NR^N_2$ moieties or halide moieties, wherein $R^N$ is selected from alkyl, aryl, or heteroaryl moieties; and each dotted line optionally defines a bridging connection.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

The compounds, ligands, complexes, metal-ligand compounds or complexes are called "phosphaguanidine compounds." However, the term "phosphoryl guanidine" is considered interchangeable, and therefore using "phosphoryl guanidine" does not exclude compounds called "phosphaguanidine" and vice versa.

In a specific embodiment, the phosphaguanidine ligand may be obtained in a 4 step sequence beginning with the corresponding isothiocyanate. Condensation with an amine generates a thiourea which is then methylated with iodomethane to provide the methylisothioureas in high yields. Activation with stoichiometric silver nitrate in the presence of triethylamine generates the monocarbodiimides which are competent electrophiles for the insertion of disubstituted phosphines and phosphine-boranes under catalytic basic conditions. The first two reactions require no purification, and the only purification required for the last two reactions is a filtration through a Celite® or a polytetrafluoroethylene (PTFE) filter using hexanes to remove solid byproducts. Further illustration of various synthetic routes is provided below in the Examples section.

Phosphaguanidine Metal-Ligands

Formula I has one guanidine moiety as part of its structural backbone and may be referred to as a metal-ligand complex, a precatalyst, a procatalyst, a polymerization catalyst, or a phosphaguanindine complex. The general structure for the phosphaguanidine moiety can be found in other ligands and other phosphaguanidine metal complexes within this disclosure. Throughout this disclosure, many phosphaguanidine ligands and phosphaguanidine metal complexes are illustrated and described with such general formula I:

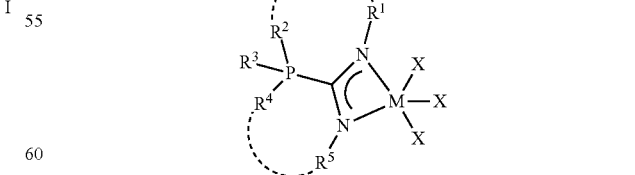

In formula I, $R^1$ and $R^5$ include the same or different moieties selected from hydride, aliphatic, heteroaliphatic, aromatic, and heteroaromatic moieties. $R^2$ and $R^4$ include the same or different moieties selected from aliphatic moieties, heteroaliphatic, aromatic moieties, or heteroaromatic moieties. R³ includes a lone pair of electrons or a heteroatom including, but not limited to, oxygen, nitrogen, sulfur, or boron. M is selected from titanium, zirconium, or hafnium; each X independently is selected from aliphatic moieties, aromatic moieties, $NR^N_2$ moieties or halide moieties, wherein $R^N$ is selected from alkyl, aryl, or heteroaryl moieties; and each dotted line optionally defines a bridging connection.

One embodiment of the phosphaguanidine complex of formula I includes X being selected from alkyl moieties including, but not limited to methyl, trimethylsilylmethylene, benzyl, chloro, or —N(CH₃)₂ moieties. $R^2$ and $R^4$ include the same or different moieties selected from phenyl, substituted phenyl, or alkyl groups; and $R^1$ and $R^5$ include the same or different moieties chosen from hydride and alkyl including, but not limited to methyl, ethyl, iso-propyl (also called 2-propyl), cyclohexyl tert-butyl, adamantyl, neopentyl, phenethyl, benzyl, or substituted and unsubstituted phenyl moieties.

In one or more embodiments of the phosphaguanidine complex of formula I, $R^2$ and $R^4$ is chosen from cyclohexyl or phenyl and X is chosen from benzyl, —N(CH₃)₂, or —CH₂Si(CH₃)₃.

In some embodiments of the phosphaguanidine complex of formula I, $R^1$ is tert-butyl and $R^5$ is chosen from ethyl, benzyl, or napthylmethyl. In some embodiments, $R^5$ is benzyl and $R^1$ is chosen from 2,4-dimethylpentan-3-yl, 2-propyl, 2,6-dimethylphenyl, benzyl, phenethyl, 2,2-dimethylpropyl, 2,6-diisopropylphenyl, 1-napthyl, 2-napthyl, cyclohexyl, 3,5-dimethylphenyl, or adamantyl.

In one or more embodiments, the phosphaguanidine complex of Formula I may include a phenyl based moiety at the $R^5$ position. This is shown in formula II below:

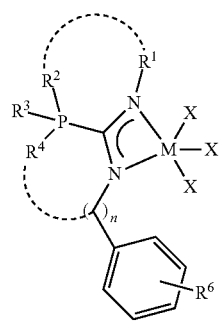

II

In formula II, each substituent and group is defined the same as formula I. In one embodiment of formula II, each X is independently selected from methyl, trimethylsilylmethylene, or benzyl, chloro, or —NMe₂ moieties. $R^2$ and $R^4$ are independently selected from phenyl rings, substituted phenyl rings, heteroaromatic groups, alkyl groups, or heteroalkyl groups. $R^3$ includes a lone pair of electrons or a heteroatom including, but not limited to, oxygen, nitrogen, sulfur, boron or combinations thereof. In a further embodiment, $R^1$ and $R^6$ are independently selected from hydride; alkyl group including, but not limited to, methyl, ethyl, iso-propyl, cyclohexyl tert-butyl, adamantyl, neopentyl, 2,4-dimethylpentan-3-yl, phenethyl, benzyl; alkoxy, alkylsilyloxy, or substituted and unsubstituted phenyl moieties, such as phenoxy; and n is an integer of 0, 1, or 2. When n is 0, the methylene group (—CH₂—) in the parentheses does not exist, and the nitrogen is covalently bonded to -Ph($R^6$).

In one or more embodiments of the phosphaguanidine complex of formula II, subscript n is 0, $R^1$ is benzyl, and $R^6$ trimethylsilyloxy, methoxy, or phenoxy.

In some embodiments, the phosphaguanidine complex of formula I may include the following $R^5$ substitution depicted in formula III as follows:

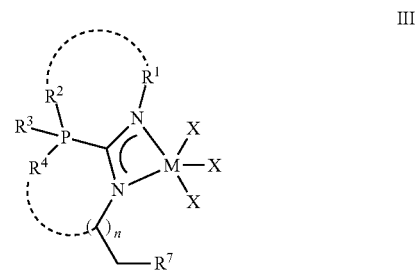

III

In formula II, each substituent and group is defined the same as formula I. In a further embodiment, each X independently is selected from alkyl moieties including, but not limited to methyl, trimethylsilylmethylene, or benzyl; phenyl; chloro; or —NMe₂ moieties. $R^2$ and $R^4$ are independently selected from phenyl rings, substituted phenyl rings, heteroaromatic groups, alkyl groups, or heteroalkyl groups; $R^3$ includes a lone pair of electrons or a heteroatom including, but not limited to, oxygen, nitrogen, sulfur, or boron; $R^1$ and $R^7$ are independently selected from hydride, alkyl, methyl, ethyl, iso-propyl, cyclohexyl tert-butyl, adamantyl, neopentyl, phenethyl, benzyl, substituted and unsubstituted phenyl moieties, or heteroalkyl and heteroaryl groups, and n is an integer of 0, 1, or 2. When n is 0, the methylene group (—CH₂—) in the parentheses does not exist, and the nitrogen is covalently bonded to —CH₂$R^7$.

In one or more embodiments of the phosphaguanidine complex of formula III, subscript n is 1, and $R^7$ is chosen from phenyl or —N(CH₃)₂. In other embodiments, subscript n is 2, and $R^7$ is chosen from phenyl or —N(CH₃)₂.

The term "independently selected" is used herein to indicate that the R groups, such as, $R^1$, $R^2$, $R^3$, $R^4$, and $R^5$ can be identical or different (e.g. $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The terms "moiety," "functional group," "group," or "substituent" may be used interchangeably in this specification, but those of skill in the art may recognize certain parts of a complex or compound as being a moiety rather than a functional group and vice versa. Additionally, the term "moiety" includes functional groups and/or discrete bonded residues that are present in the phosphaguanidine compounds or metal-ligand complexes of this disclosure. The term "moiety" as used in the present application is inclusive of individual units in the copolymers.

The term "complex" means a metal and ligand coordinated together to form a single molecular compound. The coordination may be formed through dative or covalent bonds. For the purposes of illustration, certain representative groups are defined within this disclosure. These definitions are intended to supplement and illustrate, not preclude, the definitions known to those of skill in the art.

The term "aliphatic" encompasses the terms "alkyl," "branching alkyl," "($C_1$-$C_{40}$)hydrocarbyls," "substituted ($C_1$-$C_{40}$)hydrocarbyls," "($C_3$-$C_{40}$)hydrocarbylene," and "substituted ($C_3$-$C_{40}$)hydrocarbylene."

The term "heteroaliphatic" includes "($C_1$-$C_{40}$)heterohydrocarbyls," and "substituted ($C_1$-$C_{40}$)heterohydrocarbyls," "[(C+Si)$_3$-(C+Si)$_{40}$] organosilylene," "substituted [(C+Si)$_3$-(C+Si)$_{40}$] organosilylene," "[(C+Ge)$_3$-(C+Ge)$_{40}$] organogermylene," and substituted [(C+Ge)$_3$-(C+Ge)$_{40}$] organogermylene."

The term "aromatic" or "aryl" encompasses the terms: "($C_6$-$C_{40}$)aryl" and "substituted ($C_6$-$C_{40}$)aryl group." The term "heteroaromatic" includes "($C_1$-$C_{40}$)heteroaryl," and "($C_2$-$C_{40}$)heteroaryl."

In an alternative embodiment, each of the ($C_1$-$C_{40}$)hydrocarbyl and ($C_1$-$C_{40}$)heterohydrocarbyl of any one or more of $R^1$, $R^2$, $R^4$ and $R^5$ independently is unsubstituted or substituted with one or more $R^S$ substituents, and wherein each $R^S$ independently is a halogen atom, polyfluoro substitution, perfluoro substitution, unsubstituted ($C_1$-$C_{18}$)alkyl, ($C_6$-$C_{18}$) aryl, ($C_3$-$C_{18}$)heteroaryl, $F_3C$, $FCH_2O$, $F_2HCO$, $F_3CO$, $(R^C)_3$Si, $(R^C)_3$Ge, $(R^C)O$, $(R^C)S$, $(R^C)S(O)$, $(R^C)S(O)_2$, $(R^C)_2P$, $(R^C)_2N$, $(R^C)_2C$=N, NC, $NO_2$, $(R^C)C(O)O$, $(R^C)OC(O)$, $(R^C)C(O)N(R^C)$, or $(R^C)_2NC(O)$, or two of the $R^S$ are taken together to form an unsubstituted ($C_1$-$C_{18}$)alkylene, wherein each $R^S$ independently is an unsubstituted ($C_1$-$C_{18}$)alkyl.

When used to describe certain carbon atom-containing chemical groups (e.g., ($C_1$-$C_{40}$)alkyl), the parenthetical expression ($C_1$-$C_{40}$) can be represented by the form "($C_x$-$C_y$)," which means that the unsubstituted version of the chemical group comprises from a number x carbon atoms to a number y carbon atoms, wherein each x and y independently is an integer as described for the chemical group. The $R^S$ substituted version of the chemical group can contain more than y carbon atoms depending on nature of $R^S$. Thus, for example, an unsubstituted ($C_1$-$C_{40}$)alkyl contains from 1 to 40 carbon atoms (x=1 and y=40). When the chemical group is substituted by one or more carbon atom-containing $R^S$ substituents, the substituted ($C_x$-$C_y$) chemical group may comprise more than y total carbon atoms; i.e., the total number of carbon atoms of the carbon atom-containing substituent(s)-substituted ($C_x$-$C_y$) chemical group is equal to y plus the sum of the number of carbon atoms of each of the carbon atom-containing substituent(s). Any atom of a chemical group that is not specified herein is understood to be a hydrogen atom.

In some embodiments, each of the chemical groups (e.g. $R^1$, $R^2$, $R^3$, $R^4$, $R^5$, $R^6$, and $R^7$) of the phosphaguanidine metal complexes of formulas I, II, and III, may be unsubstituted, that is, can be defined without use of a substituent $R^S$, provided the above-mentioned conditions are satisfied. In other embodiments, at least one of the chemical groups of the phosphaguanidine compounds metal complexes of formulas I, II, and III independently contain one or more of the substituents $R^S$. When the phosphaguanidine metal complex contains two or more substituents $R^S$, each $R^S$ independently is bonded to a same or different substituted chemical group. When two or more $R^S$ are bonded to a same chemical group, they independently are bonded to a same or different carbon atom or heteroatom, as the case may be, in the same chemical group up to and including persubstitution of the chemical group.

The term "persubstitution" means each hydrogen atom (H) bonded to a carbon atom or heteroatom of a corresponding unsubstituted compound or functional group, as the case may be, is replaced by a substituent (e.g., $R^S$). The term "polysubstitution" means each of at least two, but not all, hydrogen atoms (H) bonded to carbon atoms or heteroatoms of a corresponding unsubstituted compound or functional group, as the case may be, is replaced by a substituent (e.g., $R^S$). The term "monosubstitution" means that only one hydrogen atom (H) bonded to a carbon atom or heteroatom of a corresponding unsubstituted compound or functional group, as the case may be, is replaced by a substituent (e.g., $R^S$). The ($C_1$-$C_{18}$)alkylene and ($C_1$-$C_8$)alkylene substituents are especially useful for forming substituted chemical groups that are bicyclic or tricyclic analogs, as the case may be, of corresponding monocyclic or bicyclic unsubstituted chemical groups.

As used herein, the definitions of the terms hydrocarbyl, heterohydrocarbyl, hydrocarbylene, heterohydrocarbylene, alkyl, alkylene, heteroalkyl, heteroalkylene, aryl, arylene, heteroaryl, heteroarylene, cycloalkyl, cycloalkylene, heterocycloalkyl, heterocycloalkylene, organosilylene, organogermylene are intended to include every possible stereoisomer.

Heteroalkyl and heteroalkylene groups are saturated straight or branched chain radicals or diradicals, respectively, containing ($C_1$-$C_{40}$)carbon atoms, and one or more of the heteroatoms or heteroatomic groups O; S; N; S(O); $S(O)_2$; $S(O)_2N$; $Si(R^C)_2$; $Ge(R^C)_2$; $P(R^C)$; $P(O)(R^C)$; and $N(R^C)$, as defined above, wherein each of the heteroalkyl and heteroalkylene groups independently are unsubstituted or substituted by one or more $R^S$. Examples of substituted and unsubstituted heteroalkyl groups are methoxyl; ethoxyl; trimethylsilyl; dimethylphenylsilyl; tert-butyldimethylsilyl; and dimethylamino.

As used herein, the term "($C_1$-$C_{40}$)hydrocarbyl" means a hydrocarbon radical of from 1 to 40 carbon atoms and the term "($C_1$-$C_{40}$)hydrocarbylene" means a hydrocarbon diradical of from 1 to 40 carbon atoms, wherein each hydrocarbon radical and diradical independently is aromatic (6 carbon atoms or more) or non-aromatic, saturated or unsaturated, straight chain or branched chain, cyclic (including mono- and polycyclic, fused and non-fused polycyclic, including bicyclic; 3 carbon atoms or more) or acyclic, or a combination of two or more thereof; and each hydrocarbon radical and diradical independently is the same as or different from another hydrocarbon radical and diradical, respectively, and independently is unsubstituted or substituted by one or more $R^S$.

In some embodiments, ($C_1$-$C_{40}$)hydrocarbyl independently is an unsubstituted or substituted ($C_1$-$C_{40}$)alkyl, ($C_3$-$C_{40}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene. In further embodiments, each of the aforementioned ($C_1$-$C_{40}$)hydrocarbyl groups independently has a maximum of 20 carbon atoms (i.e., ($C_1$-$C_{20}$)hydrocarbyl), and in other embodiments, a maximum of 15 carbon atoms.

The term "($C_1$-$C_{40}$)alkyl" means a saturated straight or branched hydrocarbon radical of from 1 to 40 carbon atoms that is unsubstituted or substituted by one or more $R^S$. Examples of unsubstituted ($C_1$-$C_{40}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 2,2-dimethylpropyl, 1-butyl; 2-butyl; 2-methylpropyl; 1,1-dimethylethyl; 1-pentyl; 1-hexyl; 2-ethylhexyl, 1-heptyl; 1-nonyl; 1-decyl; 2,2,4-trimethylpentyl; Examples of substituted ($C_1$-$C_{40}$)alkyl are substituted ($C_1$-$C_{20}$)alkyl; substituted ($C_1$-$C_{10}$) alkyl; trifluoromethyl; trimethylsilylmethyl; methoxymethyl; dimethylaminomethyl; trimethylgermylmethyl; phenylmethyl (benzyl); 2-phenyl-2,2-methylethyl; 2-(dimethylphenylsilyl)ethyl; and dimethyl(t-butyl) silylmethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2 or 3 rings, respectively; wherein one ring is aromatic and the optional second and third rings independently are fused or non-fused and the second and third rings are each independently optionally aromatic. Examples of unsubstituted $(C_6-C_{40})$aryl are unsubstituted $(C_6-C_{20})$aryl; unsubstituted $(C_6-C_{18})$aryl; phenyl; biphenyl; ortho-terphenyl; meta-terphenyl; fluorenyl; tetrahydrofluorenyl; indacenyl; hexahydroindacenyl; indenyl; dihydroindenyl; naphthyl; tetrahydronaphthyl; phenanthrenyl and triptycenyl. Examples of substituted $(C_6-C_{40})$aryl are substituted $(C_6-C_{20})$aryl; substituted $(C_6-C_{18})$aryl; 2,6-bis[$(C_1-C_{20})$alkyl]-phenyl; 2-$(C_1-C_5)$alkyl-phenyl; 2,6-bis$(C_1-C_5)$alkyl-phenyl; 2,4,6-tris$(C_1-C_5)$alkyl-phenyl; polyfluorophenyl; pentafluorophenyl; 2,6-dimethylphenyl, 2,6-diisopropylphenyl; 2,4,6-triisopropylphenyl; 2,4,6-trimethylphenyl; 2-methyl-6-trimethylsilylphenyl; 2-methyl-4,6-diisopropylphenyl; 4-methoxyphenyl; and 4-methoxy-2,6-dimethylphenyl.

The term "$(C_3-C_{40})$cycloalkyl" means a saturated cyclic or polycyclic (i.e. fused or unfused) hydrocarbon radical of from 3 to 40 carbon atoms that is unsubstituted or substituted by one or more $R^S$. Other cycloalkyl groups (e.g., $(C_3-C_{12})$alkyl)) are defined in an analogous manner. Examples of unsubstituted $(C_3-C_{40})$cycloalkyl are unsubstituted $(C_3-C_{20})$cycloalkyl, unsubstituted $(C_3-C_{10})$cycloalkyl; cyclopropyl; cyclobutyl; cyclopentyl; cyclohexyl; cycloheptyl; cyclooctyl; cyclononyl; cyclodecyl; octahydroindenyl; bicyclo[4.4.0]decyl; bicyclo[2.2.1]heptyl; and tricyclo[3.3.1.1]decyl. Examples of substituted $(C_3-C_{40})$cycloalkyl are substituted $(C_3-C_{20})$cycloalkyl; substituted $(C_3-C_{10})$cycloalkyl; 2-methylcyclohexyl; and perfluorocyclohexyl.

Examples of $(C_1-C_{40})$hydrocarbylene are unsubstituted or substituted $(C_3-C_{40})$hydrocarbylene; $(C_6-C_{40})$arylene, $(C_3-C_{40})$cycloalkylene, and $(C_3-C_{40})$alkylene (e.g., $(C_3-C_{20})$alkylene). In some embodiments, the diradicals are on the terminal atoms of the hydrocarbylene as in a 1,3-alpha, omega diradical (e.g., —$CH_2CH_2CH_2$—) or a 1,5-alpha, omega diradical with internal substitution (e.g., —$CH_2CH_2CH(CH_3)CH_2CH_2$—). In other embodiments, the diradicals are on the non-terminal atoms of the hydrocarbylene as in a $C_7$ 2,6-diradical

(e.g., $CH_3CHCH_2CH_2CH_2CHCH_3$)

or a $C_7$ 2,6-diradical with internal substitution

(e.g., $CH_3CHCH_2CH(CH_3)CH_2CHCH_3$).

The terms [$(C+Si)_3-(C+Si)_{40}$] organosilylene and [$(C+Ge)_3-(C+Ge)_{40}$] organogermylene are defined as diradicals in which the two radical bearing atoms of the diradical unit are spaced apart by one or more intervening carbon, silicon and/or germanium. Such [$(C+Si)_3-(C+Si)_{40}$] organosilylene and [$(C+Ge)_3-(C+Ge)_{40}$] organogermylene groups can be substituted or unsubstituted. In some embodiments the diradicals are on the terminal atoms of the organosilylene or organogermylene as in a 1,5 alpha, omega diradical (e.g. —$CH_2CH_2Si(C_2H_5)_2CH_2CH_2$— and —$CH_2CH_2Ge(C_2H_5)_2CH_2CH_2$—). In other embodiments, the diradicals are on the non-terminal atoms of the organosilylene or organogermylene as in a substituted $(C+Si)_7$ 2,6-diradical

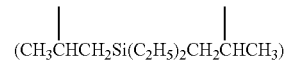
($CH_3CHCH_2Si(C_2H_5)_2CH_2CHCH_3$)

and a substituted $(C+Ge)_7$ 2,6-diradical

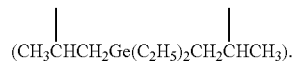
($CH_3CHCH_2Ge(C_2H_5)_2CH_2CHCH_3$).

The term "$(C_1-C_{40})$alkylene" means a saturated or unsaturated straight chain or branched chain diradical of from 1 to 40 carbon atoms that is unsubstituted or substituted by one or more $R^S$. Examples of unsubstituted $(C_1-C_{40})$alkylene are unsubstituted $(C_3-C_{20})$alkylene, including unsubstituted 1,3-$(C_3-C_{10})$alkylene; 1,4-$(C_4-C_{10})$alkylene; —$(CH_2)_3$—; —$(CH_2)_4$—; —$(CH_2)_5$—; —$(CH_2)_6$—; —$(CH_2)_7$—; —$(CH_2)_8$—; and —$(CH_2)_4CH(CH_3)$—. Examples of substituted $(C_1-C_{40})$alkylene are substituted $(C_3-C_{20})$alkylene; —$CF_2CF_2CF_2$—; and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{40})$alkylene, examples of substituted $(C_1-C_{40})$alkylene also include 1,2-bis(methylene)cyclopentane; 1,2-bis(methylene)cyclohexane; 2,3-bis(methylene)-7,7-dimethyl-bicyclo[2.2.1]heptane; and 2,3-bis(methylene)bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$. Examples of unsubstituted $(C_3-C_{40})$cycloalkylene are 1,3-cyclobutylene, 1,3-cyclopentylene, and 1,4-cyclohexylene. Examples of substituted $(C_3-C_{40})$cycloalkylene are 2-trimethylsilyl-1,4-cyclohexylene and 1,2-dimethyl-1,3-cyclohexylene.

The terms "$(C_1-C_{40})$heterohydrocarbyl" and "$(C_1-C_{40})$heterohydrocarbylene" mean a heterohydrocarbon radical or diradical, respectively, of from 1 to 40 carbon atoms, and each heterohydrocarbon independently has one or more heteroatoms or heteroatomic groups O; S; N; S(O); S(O)$_2$; S(O)$_2$N; Si(R$^C$)$_2$; Ge(R$^C$)$_2$; P(R$^C$); P(O)(R$^C$); and N(R$^C$), wherein independently each $R^C$ is hydrogen, unsubstituted $(C_1-C_{18})$hydrocarbyl or an unsubstituted $(C_1-C_{18})$heterohydrocarbyl, or absent (e.g., absent when N comprises —N=). Each $(C_1-C_{40})$heterohydrocarbyl and $(C_1-C_{40})$heterohydrocarbylene independently is unsubstituted or substituted (by one or more $R^S$), aromatic or non-aromatic, saturated or unsaturated, straight chain or branched chain, cyclic (including mono- and poly-cyclic, fused and non-fused polycyclic) or acyclic, or a combination of two or more thereof; and each is respectively the same as or different from another.

The $(C_1-C_{40})$heterohydrocarbyl independently is unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si(R$^C$)$_2$—, $(C_1-C_{40})$hydrocarbyl-Ge(R$^C$)$_2$—, $(C_1-C_{40})$hydrocarbyl-N(R$^C$)—, $(C_1-C_{40})$hydrocarbyl-P (R$^C$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, ($C_1$-$C_{40}$)heteroaryl, (C1-$C_{19}$)heteroaryl-($C_1$-$C_{20}$)alkylene, ($C_6$-$C_{20}$)aryl-($C_1$-$C_{19}$)heteroalkylene, or ($C_1$-$C_{19}$)heteroaryl-($C_1$-$C_{20}$)heteroalkylene. The term "($C_1$-$C_{40}$)heteroaryl" means an unsubstituted or substituted (by one or more $R^S$) mono-, bi- or tricyclic heteroaromatic hydrocarbon radical of from 1 to 40 total carbon atoms and from 1 to 6 heteroatoms, and the mono-, bi- or tricyclic radical comprises 1, 2 or 3 rings, respectively, wherein one ring is heteroaromatic and the optional second and third rings independently are fused or non-fused; and the second or third rings are each independently optionally heteroaromatic. Other heteroaryl groups (e.g., ($C_1$-$C_{12}$)heteroaryl)) are defined in an analogous manner. The monocyclic heteroaromatic hydrocarbon radical is a 5-membered or 6-membered ring. The 5-membered ring has from 1 to 4 carbon atoms and from 4 to 1 heteroatoms, respectively, each heteroatom being O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 3 to 5 carbon atoms and 1 to 3 heteroatoms, the heteroatoms being N or P. Examples of 6-membered ring heteroaromatic hydrocarbon radical are pyridine-2-yl; pyrimidin-2-yl; and pyrazin-2-yl. The bicyclic heteroaromatic hydrocarbon radical is a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical is a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

In some embodiments the ($C_2$-$C_{40}$)heteroaryl is 2,7-disubstituted carbazolyl or 3,6-disubstituted carbazolyl, wherein each $R^S$ independently is phenyl, methyl, ethyl, isopropyl, or tertiary-butyl, 2,7-di(tertiary-butyl)-carbazolyl, 3,6-di(tertiary-butyl)-carbazolyl, 2,7-di(tertiary-octyl)-carbazolyl, 3,6-di(tertiary-octyl)-carbazolyl, 2,7-diphenylcarbazolyl, 3,6-diphenylcarbazolyl, 2,7-bis(2,4,6-trimethylphenyl)-carbazolyl or 3,6-bis(2,4,6-trimethylphenyl)-carbazolyl.

Examples of unsubstituted ($C_2$-$C_{40}$)heterocycloalkyl are unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" means fluorine atom (F), chlorine atom (Cl), bromine atom (Br), or iodine atom (I) radical. Each halogen atom independently is the Br radical, F radical, or Cl radical. The term "halide" means fluoride ($F^-$), chloride ($Cl^-$), bromide ($Br^-$), or iodide ($I^-$) anion.

There is not a O—O, S—S, or O—S bonds, other than O—S bonds in an S(O) or S(O)$_2$ diradical functional group, in the polymerization catalyst of formulas I, II, or III. More preferably, there are no O—O, P—P, S—S, or O—S bonds, other than O—S bonds in an S(O) or S(O)$_2$ diradical functional group, in the polymerization catalysts of formulas I, II, and III.

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, carbon-silicon double bonds, and carbon-nitrogen triple bonds, not including any such double bonds that may be present in substituents $R^S$, if any, or in (hetero)aromatic rings, if any.

M is titanium, zirconium, or hafnium. In one embodiment, M is titanium. In another embodiment, M is zirconium. In another embodiment, M is hafnium. In some embodiments, M is in a formal oxidation state of +2, +3, or +4. Each X independently is a monodentate or polydentate ligand that is neutral, monoanionic, or dianionic. X is chosen in such a way that the polymerization catalysts of formulas I, II, and III are, overall, neutral. In some embodiments, each X independently is the monodentate ligand. In one embodiment when there are two or more X monodentate ligands, each X is the same. In some embodiments the monodentate ligand is the monoanionic ligand. The monoanionic ligand has a net formal oxidation state of −1. Each monoanionic ligand may independently be hydride, ($C_1$-$C_{40}$)hydrocarbyl carbanion, ($C_1$-$C_{40}$)heterohydrocarbyl carbanion, halide, nitrate, carbonate, phosphate, borate, borohydride, sulfate, HC(O)O$^-$, alkoxide or aryloxide (RO$^-$), ($C_1$-$C_{40}$)hydrocarbylC(O)O$^-$, HC(O)N(H)$^-$, ($C_1$-$C_{40}$)hydrocarbylC(O)N(H)$^-$, ($C_1$-$C_{40}$)hydrocarbylC(O)N(($C_1$-$C_{20}$)hydrocarbyl)$^-$, $R^K R^L B^-$, $R^K R^L N^-$, $R^K O^-$, $R^K S^-$, $R^K R^L P^-$, or $R^M R^K R^L Si^-$, wherein each $R^K$, $R^L$, and $R^M$ independently is hydrogen, ($C_1$-$C_{40}$)hydrocarbyl, or ($C_1$-$C_{40}$)heterohydrocarbyl, or $R^K$ and $R^L$ are taken together to form a ($C_2$-$C_{40}$)hydrocarbylene or ($C_1$-$C_{40}$)heterohydrocarbylene and $R^M$ is as defined previously.

In some embodiments at least one monodentate ligand of X independently is the neutral ligand. In one embodiment, the neutral ligand is a neutral Lewis base group that is $R^X NR^K R^L$, $R^K OR^L$, $R^K SR^L$, or $R^X PR^K R^L$, wherein each $R^X$ independently is hydrogen, ($C_1$-$C_{40}$)hydrocarbyl, [($C_1$-$C_{10}$)hydrocarbyl]$_3$Si, [($C_1$-$C_{10}$)hydrocarbyl]$_3$Si($C_1$-$C_{10}$)hydrocarbyl, or ($C_1$-$C_{40}$)heterohydrocarbyl and each $R^K$ and $R^L$ independently is as defined previously.

In some embodiments, each X is a monodentate ligand that independently is a halogen atom, unsubstituted ($C_1$-$C_{20}$)hydrocarbyl, unsubstituted ($C_1$-$C_{20}$)hydrocarbylC(O)O—, or $R^K R^L N$— wherein each of $R^K$ and $R^L$ independently is an unsubstituted ($C_1$-$C_{20}$)hydrocarbyl. In some embodiments each monodentate ligand X is a chlorine atom, ($C_1$-$C_{10}$) hydrocarbyl (e.g., ($C_1$-$C_6$)alkyl or benzyl), unsubstituted ($C_1$-$C_{10}$)hydrocarbylC(O)O—, or $R^K R^L N$— wherein each of $R^K$ and $R^L$ independently is an unsubstituted ($C_1$-$C_{10}$) hydrocarbyl.

In some embodiments each X is the same, wherein each X is methyl, isobutyl, neopentyl, neophyl, trimethylsilylmethyl, phenyl, benzyl, or chloro. In another embodiment, at least two X groups are different; and in further embodiments, each X is a different one of methyl, isobutyl, neopentyl, neophyl, trimethylsilylmethyl, phenyl, benzyl and chloro.

The "bridging connection," which is optional in formulas I, II, and III, connects one R group to a different R group. For example, in formula I, $R^2$ can optionally be connected to $R^1$ via a bridging connection that is separate from the formula I, as depicted. The bridging connection can be an aliphatic moiety, a heteroaliphatic moiety, an aryl moiety or a heteroaryl moiety. The optional bridging connections are at least three atoms. In formulas I, II, and III, the R groups that could form a bridging connection are bonded to heteroatoms, therefore the atoms in the "bridging connection" are the fewest number of atoms from one heteroatom to the other heteroatom.

In one embodiment, the polymerization catalyst of formulas I, II, and III are a mononuclear metal complex. The polymerization catalyst of formulas I, II, and III polymerize olefins and produce high molecular weight ($M_w$) polyolefins with narrow polydispersity and low 1-octene incorporation.

The polymerization catalysts result from formulas I, II, and III. The structures with the name, MCI-#, are embodiments of formula I, and the structures with the name, L #, are the ligand precuroses, however the number does not necessarily match the metal-ligand complex to the ligand. While the complexes are categorized as "polymerization catalysts," which include a phosphaguanidine moiety, it should be noted that these polymerization catalysts are "phosphaguanidine metal complexes" or "metal-ligand complexes" and are referred to as such.

Embodiments of Metal-Ligand Complexes of Formula I

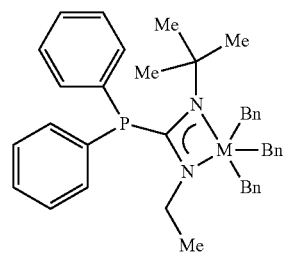

M = Zr, MCI-1
M = Hf, MCI-2

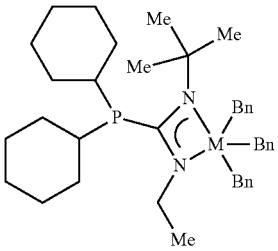

MCI-3

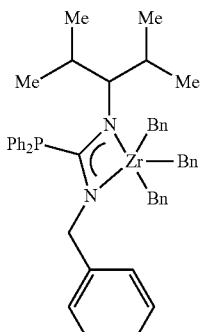

M = Hf, MCI-4
M = Zr, MCI-5

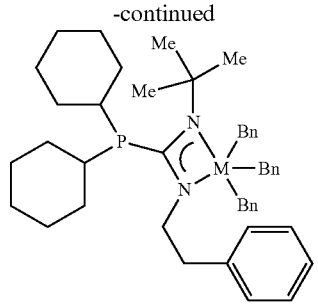

M = Zr, MCI-6
M = Hf, MCI-7

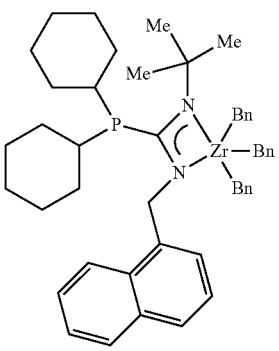

M = Zr, MCI-8
M = Hf, MCI-9

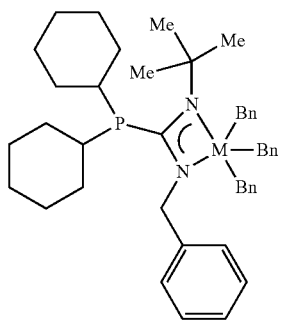

MCI-10

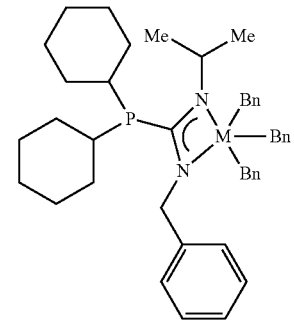

M = Hf, MCI-11
M = Zr, MCI-12

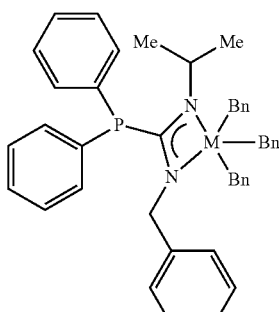

M = Hf, MCI-13
M = Zr, MCI-14

-continued
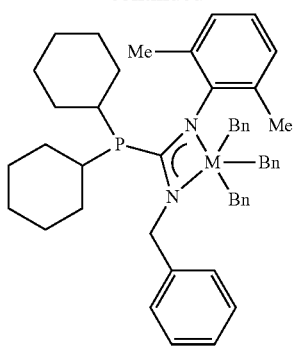
M = Hf, MCI-15
M = Zr, MCI-16
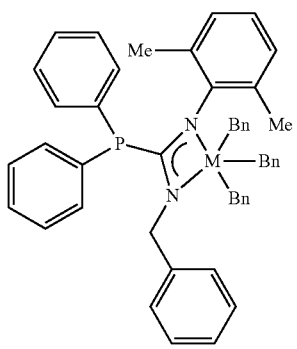
M = Hf, MCI-17
M = Zr, MCI-18
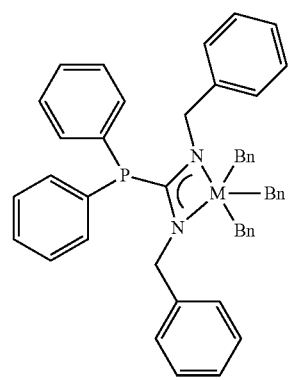
M = Zr, MCI-19
M = Hf, MCI-20
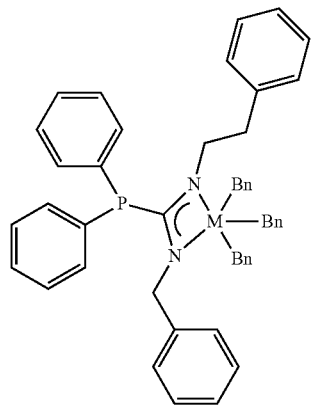
M = Hf, MCI-21
M = Zr, MCI-22
-continued
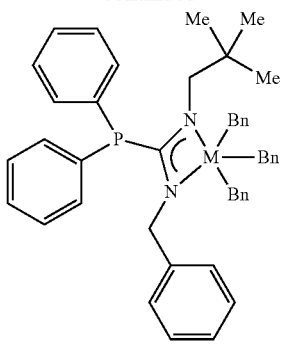
M = Zr, MCI-23
M = Hf, MCI-24
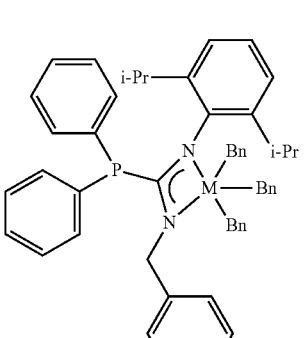
M = Hf, MCI-25
M = Zr, MCI-26
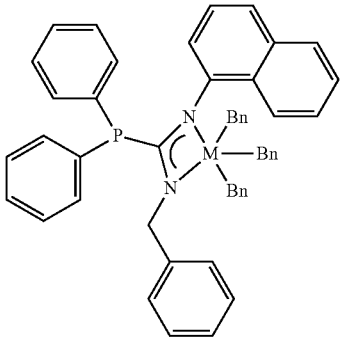
M = Hf, MCI-27
M = Zr, MCI-28
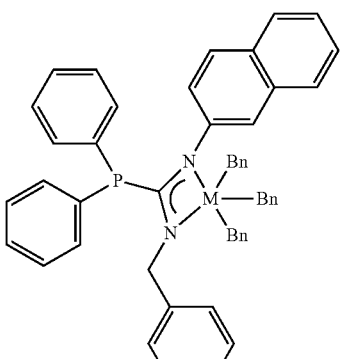
M = Hf, MCI-29
M = Zr, MCI-30

-continued
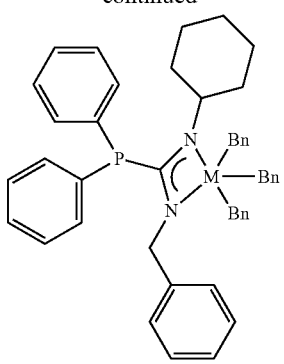
M = Zr, MCI-31
M = Hf, MCI-32
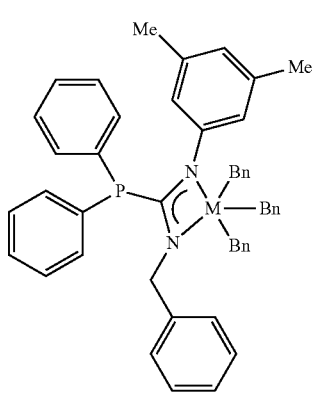
M = Zr, MCI-31
M = Hf, MCI-32
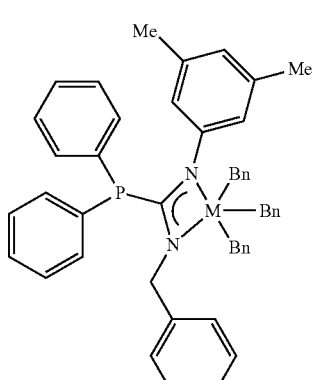
M = Hf, MCI-33
M = Zr, MCI-34
-continued
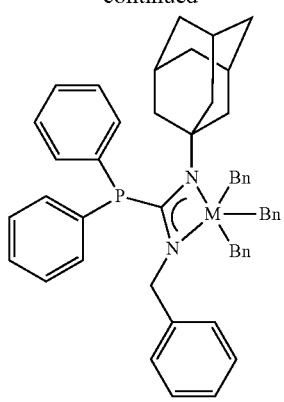
M = Hf, MCI-35
M = Zr, MCI-36
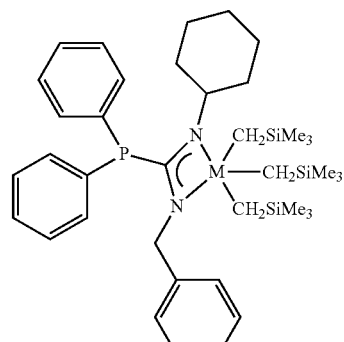
M = Zr, MCI-37
M = Hf, MCI-38
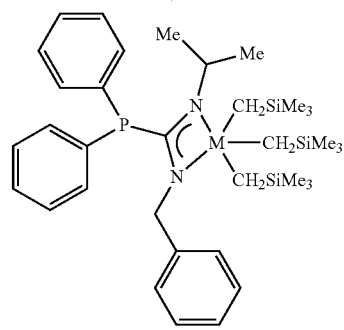
M = Zr, MCI-39
M = Hf, MCI-40
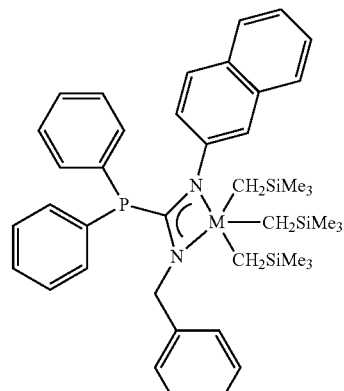
M = Zr, MCI-41
M = Hf, MCI-42

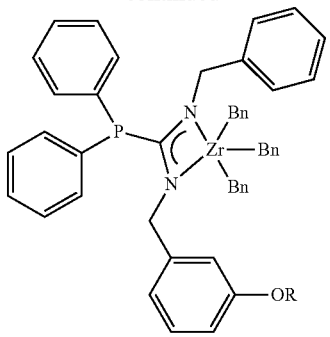
R = SiMe₃, MCI-43
R = Me, MCI-44
R = Ph, MCI-45
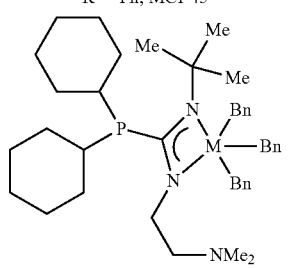
M = Zr, MCI-46
M = Hf, MCI-47
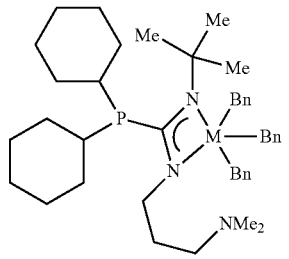
M = Zr, MCI-48
M = Hf, MCI-49
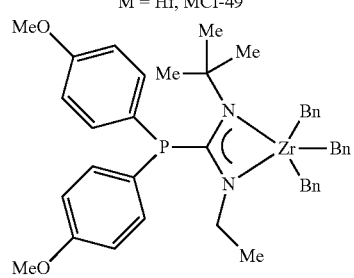
MCI-50
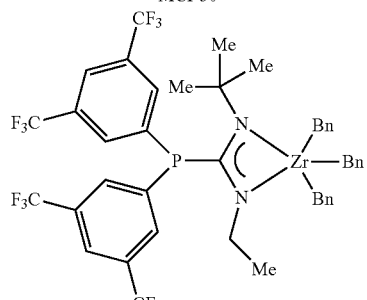
MCI-51
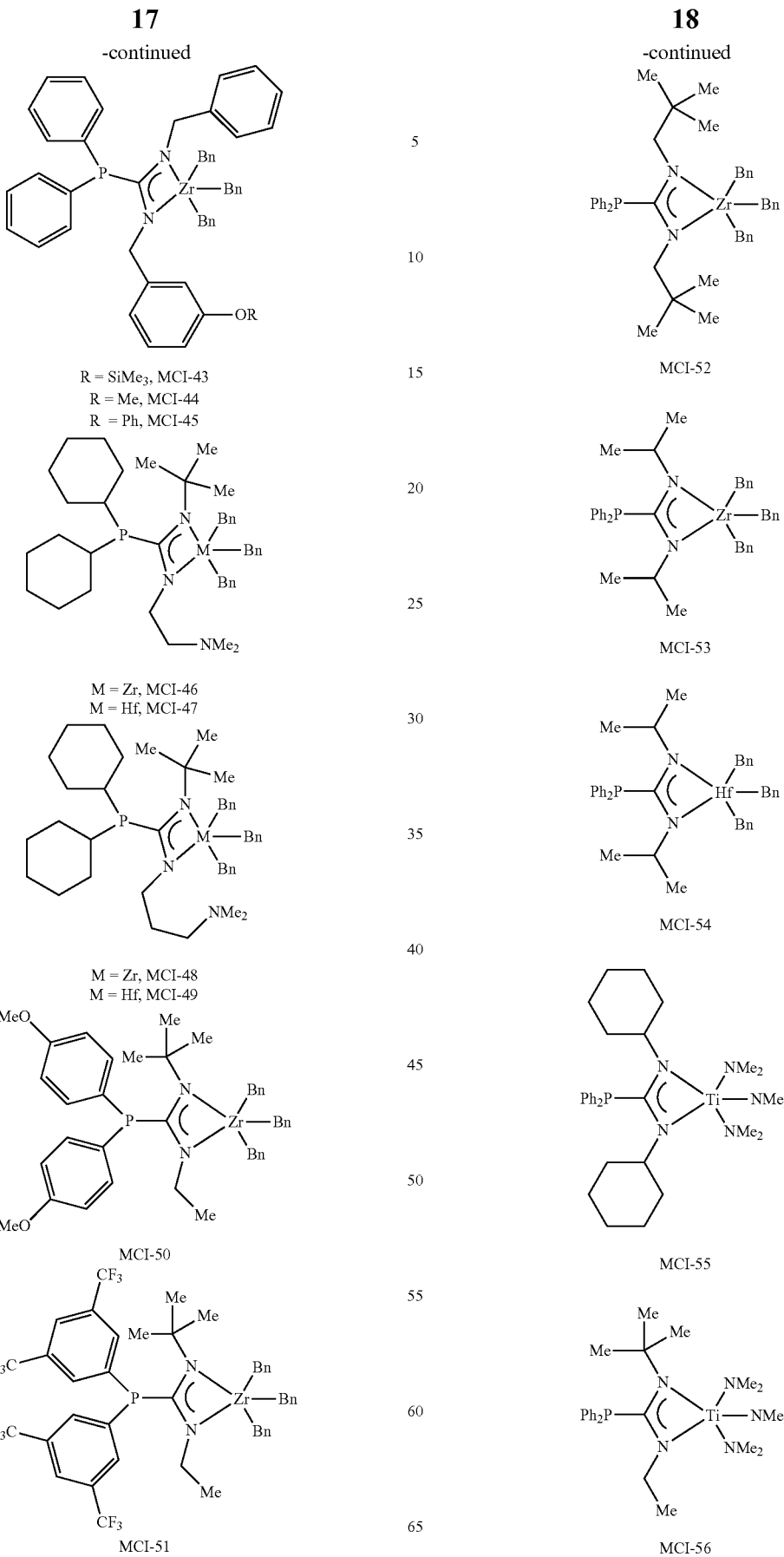

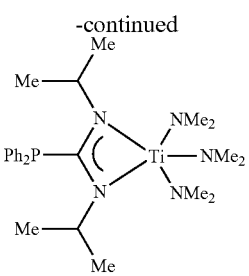
MCI-57
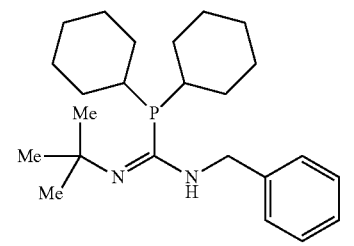
L1
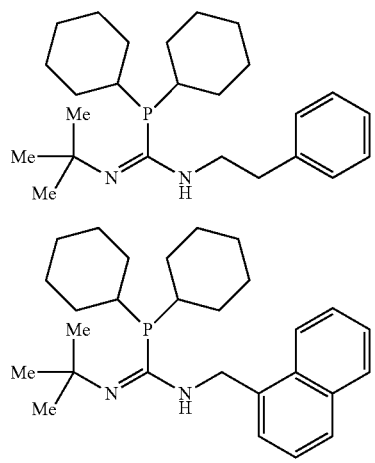
L2
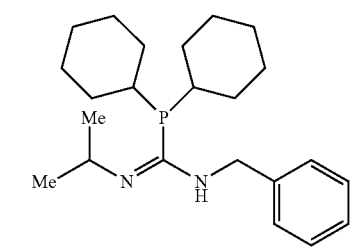
L3
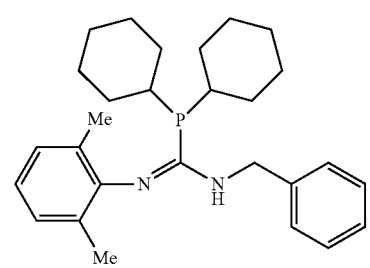
L4
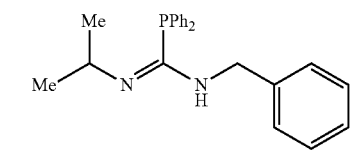
L5
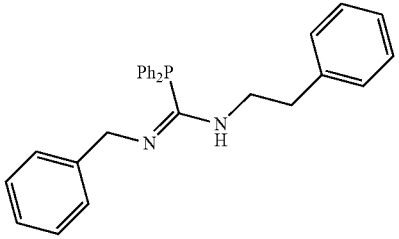
L6
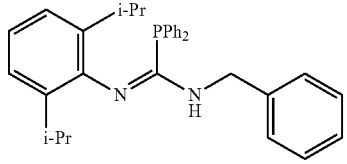
L7
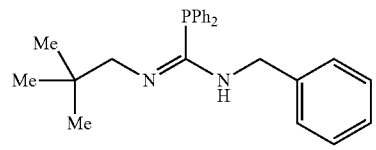
L8
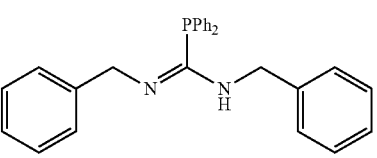
L9
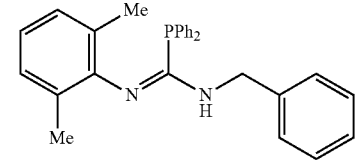
L10
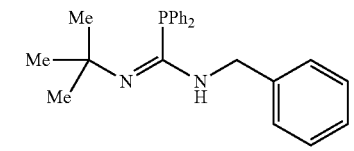
L11
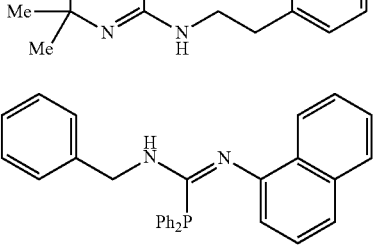
L12
L13
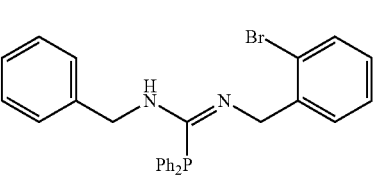
L14
L15

-continued

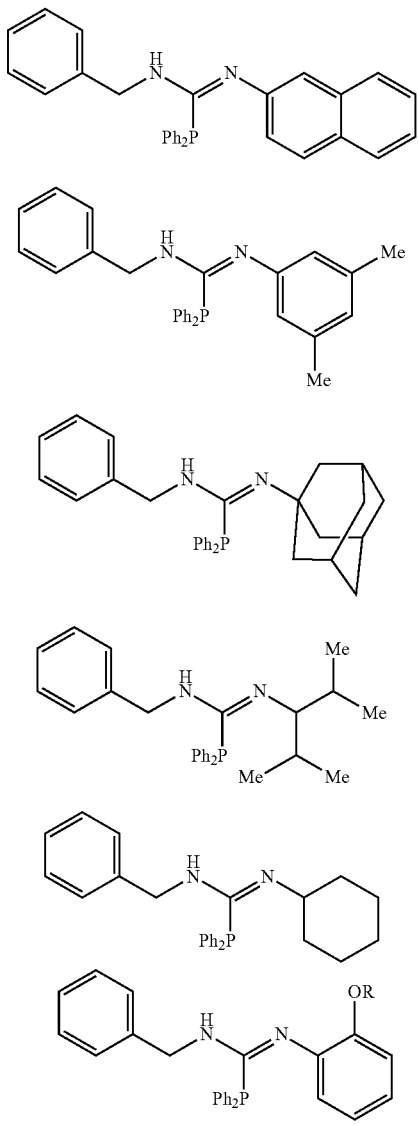

L16

L17

L18

L19

R = SiMe₃, 21
R = Me, 22
R = Ph, 23

L20

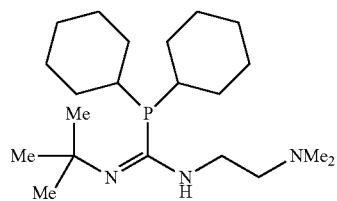

L24

The metal-ligand complexes can be formed from any of ligands L1 to L24. The metal-ligand complexes formed from the ligands may be catalysts or procatalysts. The terms "metal-ligand complex(es)," "catalyst(s), "procatalysts" or "polymerization catalyst" may be used interchangeably. The metal-ligand complexes disclosed herein can have multiple reaction sites, while some have single site reaction.

Cocatalysts

The procatalyst comprising the metal-ligand complexes of formulas I, II or III is rendered catalytically active by contacting it to, or combining it with, the activating co-catalyst or by using an activating technique such as those that are known in the art for use with metal-based olefin polymerization reactions. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a mono-alkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri(($C_1$-$C_{10}$)alkyl)aluminum or tri(($C_6$-$C_{18}$)aryl)boron compounds and halogenated (including perhalogenated) derivatives thereof. In some other embodiments, exemplary Group 13 metal compounds are tris(fluoro-substituted phenyl)boranes, in other embodiments, tris(pentafluorophenyl)borane. In some embodiments, the activating co-catalyst is a tris(($C_1$-$C_{20}$)hydrocarbyl) borate (e.g., trityl tetrafluoroborate) or a tri (($C_1$-$C_{20}$)hydrocarbyl)ammonium tetra(($C_1$-$C_{20}$)hydrocarbyl)borane (e.g., bis(octadecyl)methylammonium tetrakis(pentafluorophenyl)borane). As used herein, the term "ammonium" means a nitrogen cation that is a (($C_1$-$C_{20}$)hydrocarbyl)$_4$N$^+$, a (($C_1$-$C_{20}$)hydrocarbyl)$_3$N(H)$^+$, a (($C_1$-$C_{20}$)hydrocarbyl)$_2$N(H)$_2$$^+$, ($C_1$-$C_{20}$)hydrocarbylN(H)$_3$$^+$, or N(H)$_4$$^+$, wherein each ($C_1$-$C_{20}$)hydrocarbyl may be the same or different.

Exemplary combinations of neutral Lewis acid activating co-catalysts include mixtures comprising a combination of a tri(($C_1$-$C_4$)alkyl)aluminum and a halogenated tri(($C_6$-$C_{18}$)aryl)boron compound, especially a tris(pentafluorophenyl)borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex):(tris(pentafluoro-phenylborane):(alumoxane) [e.g., (Group 4 metal-ligand complex):(tris(pentafluoro-phenylborane):(alumoxane)] are from 1:1:1 to 1:10:30, other exemplary embodiments are from 1:1:1.5 to 1:5:10.

Many activating co-catalysts and activating techniques have been previously taught with respect to different metal-ligand complexes in the following USPNs: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion as activating co-catalysts for addition polymerization catalysts are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts as activating co-catalysts for addition polymerization catalysts are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1 beginning at column 50, at line 39, and going through column 56, at line 55, only the portion of which is incorporated by reference herein.

In some embodiments, the procatalyst comprising the metal-ligand complexes of formulas I, II and III may be activated to form an active catalyst composition by combination with one or more cocatalyst. A non-limiting list of possible cocatalysts include: strong Lewis acids; compatible, noncoordinating, ion forming compounds, such as bis(hydrogenated tallow alkyl)methyl ammonium and tetrakis(pentafluorophenyl)borate(1-) amine; a cation forming cocatalyst; polymeric or oligomeric aluminoxanes, especially methyl aluminoxane and modified methyl aluminoxane (MMAO); orgoaluminum compounds, such as triethyl aluminum (TEA); and any combinations thereof.

In some embodiments, one or more of the foregoing activating co-catalysts are used in combination with each other. An especially preferred combination is a mixture of a tri(($C_1$-$C_4$)hydrocarbyl)aluminum, tri(($C_1$-$C_4$)hydrocarbyl) borane, or an ammonium borate with an oligomeric or polymeric alumoxane compound.

The ratio of total number of moles of one or more metal-ligand complexes of general metal complex 1 to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex general metal complex 1. When tris(pentafluorophenyl)borane alone is used as the activating co-catalyst, in some other embodiments, the number of moles of the tris(pentafluorophenyl) borane that are employed to the total number of moles of one or more metal-ligand complexes of general metal complex 1 form 0.5:1 to 10:1, in some other embodiments, from 1:1 to 6:1, in some other embodiments, from 1:1 to 5:1. The remaining activating co-catalysts are generally employed in approximately mole quantities equal to the total mole quantities of one or more metal-ligand complexes of formulas I, II, and III.

Polyolefin Compositions

The polyolefin composition produced from the present catalysts comprises the reaction product of one or more olefinic monomers with the olefin polymerization catalyst system according to the present disclosure under polymerization conditions and in the presence of one or more co-catalysts and/or scavengers.

The polyolefin composition according to the present invention can, for example, be an ethylene-based polymer, for example homopolymers and/or interpolymers (including copolymers) of ethylene and optionally one or more comonomers such as α-olefins. Such ethylene-based polymers can have a density in the range of 0.860 to 0.973 g/cm³. All individual values and subranges from 0.860 to 0.973 g/cm³ are included herein and disclosed herein; for example, the density can be from a lower limit of 0.860, 0.880, 0.885, 0.900, 0.905, 0.910, 0.915, or 0.920 g/cm³ to an upper limit of 0.973, 0.963, 0.960, 0.955, 0.950, 0.925, 0.920, 0.915, 0.910, or 0.905 g/cm³.

As used herein, the term "ethylene-based polymer" means a polymer having greater than 50 mol % units derived from ethylene monomer.

In one embodiment, the ethylene-based polymers can have a long chain branching frequency in the range of from 0.0 to 3 long chain branches (LCB) per 1000 carbon atoms. In one embodiment, the ethylene-based polymers can have a molecular weight distribution ($M_w/M_n$) (measured according to the conventional GPC method) in the range of from greater than or equal to 2.0. All individual values and subranges from greater than or equal to 2 are included herein and disclosed herein; for example, the ethylene/α-olefin copolymer may have a molecular weight distribution ($M_w/M_n$) in the range of from 2 to 20; or in the alternative, the ethylene/α-olefin interpolymer may have a molecular weight distribution ($M_w/M_n$) in the range of from 2 to 5.

In one embodiment, the ethylene-based polymers can have a molecular weight ($M_w$) in the range of from equal to or greater than 20,000 g/mole, for example, in the range of from 20,000 to 2,000,000 g/mole, or in the alternative, from 20,000 to 350,000 g/mole, or in the alternative, from 100,000 to 750,000 g/mole.

In one embodiment, the ethylene-based polymers can have a melt index ($I_2$) in the range of 0.02 to 200 g/10 minutes. All individual values and subranges from 0.02 to 200 g/10 minutes are included herein and disclosed herein; for example, the melt index ($I_2$) can be from a lower limit of 0.1, 0.2, 0.5, 0.6, 0.8, 1, 1.5, 2.0, 2.5, 3.0, 3.5, 4.0, 4.5, 5.0, 10, 15, 20, 30, 40, 50, 60, 80, 90, 100, or 150 g/10 minutes, to an upper limit of 0.9, 1, 1.5, 2.0, 2.5, 3.0, 3.5, 4.0, 4.5, 5.0, 10, 15, 20, 30, 40, 50, 60, 80, 90, 100, 150, or 200 g/10 minutes.

In one embodiment, the ethylene-based polymers can have a melt flow ratio ($I_{10}/I_2$) in the range of from 5 to 30. All individual values and subranges from 5 to 30 are included herein and disclosed herein; for example, the melt flow ratio ($I_{10}/I_2$) can be from a lower limit of 5, 5.5, 6, 6.5, 8, 10, 12, 15, 20, or 25 to an upper limit of 5.5, 6, 6.5, 8, 10, 12, 15, 20, 25, or 30.

The ethylene-based polymers may comprise less than 50 mole percent of units derived from one or more α-olefin comonomers. All individual values and subranges from less than 50 mole percent are included herein and disclosed herein; for example, the ethylene-based polymers may comprise from less than 30 mole percent of units derived from one or more α-olefin comonomers; or in the alternative, less than 20 mole percent of units derived from one or more α-olefin comonomers; or in the alternative, from 1 to 20 mole percent of units derived from one or more α-olefin comonomers; or in the alternative, from 1 to 10 mole percent of units derived from one or more α-olefin comonomers.

The α-olefin comonomers comprise a $C_3$-$C_{20}$ moiety, having no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, 4-methyl-1-pentene, and styrene. The one or more α-olefin comonomers may, for example, be selected from the group consisting of propylene, 1-butene, 1-hexene, and 1-octene; or in the alternative, from the group consisting of 1-hexene and 1-octene.

While the polymerization catalyst described herein typically produce copolymer, they can be used to produce homopolymers. The homopolymer may comprise an ethylene as the base monomer or in a separate polymer chain, or the homopolymer may comrpise an α-olefin, such as the α-olefins described in the preceding paragraph.

The ethylene-based polymers may comprise greater than 50 mole percent of units derived from ethylene. All individual values and subranges from greater than 50 mole percent are included herein and disclosed herein; for example, the ethylene-based polymers may comprise at least 52 mole percent of units derived from ethylene; or in the alternative, at least 65 percent by weight of units derived from ethylene; or in the alternative, at least 85 mole percent of units derived from ethylene; or in the alternative, from 50 to 100 mole percent of units derived from ethylene; or in the alternative, from 80 to 100 mole percent of units derived from ethylene.

Polymerization Process

Any conventional polymerization processes may be employed to produce the polyolefin composition according to the present invention. Such conventional polymerization processes include, but are not limited to, solution polymerization process, particle forming polymerization process, and combinations thereof using one or more conventional reactors e.g. loop reactors, isothermal reactors, fluidized bed reactors, stirred tank reactors, batch reactors in parallel, series, and/or any combinations thereof.

In one embodiment, the polyolefin composition according to the present invention may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 120 to 300° C.; for example, from 160 to 215° C., and at pressures in the range of from 300 to 1500 psi; for example, from 400 to 750 psi. The residence time in solution phase polymerization process is typically in the range of from 2 to 30 minutes; for example, from 5 to 15 minutes. Ethylene, one or more solvents, one or more high temperature olefin polymerization catalyst systems, one or more co-catalysts and/or scavengers, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Tex. The resultant mixture of the ethylene-based polymer and solvent is then removed from the reactor and the ethylene-based polymer is isolated. Solvent is typically recovered via a solvent recovery unit, i.e. heat exchangers and vapor liquid separator drum, and is then recycled back into the polymerization system.

In one embodiment, the ethylene-based polymer may be produced via solution polymerization in a single reactor system, for example a single loop reactor system, wherein ethylene and optionally one or more α-olefins are polymerized in the presence of one or more high temperature olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more an olefin polymerization catalyst systems, optionally one or more other catalysts, and optionally one or more co-catalysts. In one embodiment, the ethylene-based polymer may be produced via solution polymerization in a dual reactor system, for example a dual loop reactor system, wherein ethylene and optionally one or more α-olefins are polymerized in the presence of one or more high temperature olefin polymerization catalyst systems, as described herein, in both reactors.

In one embodiment, the ethylene-based polymer may be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

A polymerization process may be affected as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing though the reactor is adjusted to maintain an essentially steady state gaseous composition within the reaction zone. The gas leaving the reaction zone is passed to the velocity reduction zone where entrained particles are removed. Finer entrained particles and dust may optionally be removed in a cyclone and/or fine filter. The gas is passed through a heat exchanger wherein the heat of polymerization is removed, compressed in a compressor and then returned to the reaction zone.

The reactor temperature of the fluid bed process herein preferably ranges from 30° C. or 40° C. or 50° C. to 90° C. or 100° C. or 110° C. or 120° C. In general, the reactor temperature is operated at the highest temperature that is feasible taking into account the sintering temperature of the polymer product within the reactor. In this fluid bed process, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and Metallocene-Based Polyolefins Vol. 2 pp. 322-332 (2000), the disclosure of which are incorporated herein to the extent permitted.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The inventive ethylene-based polymers may contain any amounts of additives. The ethylene-based polymers may compromise from about 0 to about 10 percent by the combined weight of such additives, based on the weight of the ethylene-based polymers and the one or more additives. The ethylene-based polymers may further compromise fillers, which may include, but are not limited to, organic or inorganic fillers. Such fillers, e.g. calcium carbonate, talc, $Mg(OH)_2$, can be present in levels from about 0 to about 20 percent, based on the weight of the inventive ethylene-based polymers and the one or more additives and/or fillers. The ethylene-based polymers may further be blended with one or more polymers to form a blend.

One or more features of the present disclosure are illustrated in view of the examples as follows:

EXAMPLES

Throughout the examples section, the following abbreviations are used. Me: methyl; Ph: phenyl; i-Pr: iso-propyl; t-Bu: tert-butyl; Ts: toluene sulfonate; THF: tetrahydrofuran; $Et_2O$: diethyl ether; $CH_2Cl_2$: dichloromethane or methylene chloride; $CHCl_3$: chloroform; $CCl_4$: carbon tetrachloride; EtOH: ethanol; $CH_3CN$: acetonitrile; MeCN: acetonitrile; EtOAc: ethyl acetate; $C_6D_6$: deuterated benzene; Benzene-$d_6$: deuterated benzene; $CDCl_3$: deuterated chloroform; DMSO-$d_6$: deuterated dimethylsulfoxide; $PPh_3$: triphenylphosphine; $NEt_3$: triethylamine; MeI: methyl iodide or iodomethane; NaOH: sodium hydroxide; NaOCl: sodium hypochlorite; $NaHCO_3$: sodium bicarbonate; brine: saturated aqueous sodium chloride; $Na_2SO_4$: sodium sulfate; $MgSO_4$: magnesium sulfate; $PCl_5$: phosphorous pentachloride; $Ph_3PBr_2$: triphenylphosphine dibromide; $Ph_3PCl_2$: triphenylphosphine chloride; $SOCl_2$: thionylchloride; $PPh_2$: diphenylphosphine; KHMDS: potassium hexamethyldisilazide; n-BuLi: n-butyllithium; $AgNO_3$: silver nitrate; $N_2$: nitrogen gas; PhMe: toluene; polytetrafluoroethylene (PTFE) NMR: nuclear magnetic resonance; HRMS: high resolution mass spectrometry; LRMS: low resolution mass spectrometry; mmol: millimoles; mL: milliliters; M: molar; min: minutes; h: hours; d: days. NMR spectra were recorded on Varian 400-MR and VNMRS-500 spectrometers. $^1H$ NMR (proton NMR) data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1H$ NMR data are reported in ppm downfield from internal tetramethylsilane (TMS, δ scale) using residual protons in the deuterated solvent as references. $^{13}C$ NMR (carbon NMR) data were determined with $^1H$ decoupling, and the chemical shifts are reported in ppm versus tetramethylsilane.

Synthesis of MCI-1

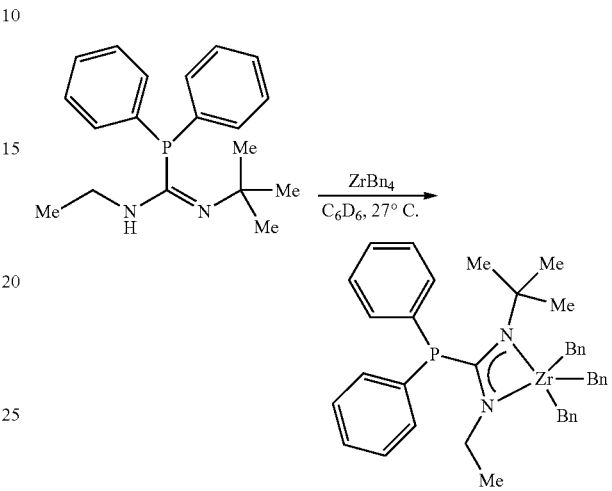

To a solution of the monophosphoryl guanidine (27.0 mg, 0.0864 mmol, 1.00 eq) in $C_6D_6$ (0.5 mL) was added a solution of $ZrBn_4$ (39.4 mg, 0.0864 mmol, 1.00 eq) in $C_6D_6$ (0.5 mL) in a nitrogen filled glovebox at 27° C. After stirring (300 rpm) for 6 hours an aliquot was removed and NMR indicated full conversion. The solution was concentrated to afford the zirconium phosphaguanidine complex MCI-1 as a golden brown viscous oil (58.4 mg, 0.0864 mmol, 100%).

$^1H$ NMR (500 MHz, Benzene-$d_6$) δ 7.34 (tq, J=6.8, 0.8 Hz, 4H), 7.18-7.14 (m, 7H), 7.11-7.06 (m, 11H), 7.05-7.00 (m, 3H), 6.91 (ddt, J=8.6, 7.3, 1.2 Hz, 4H), 3.10 (q, J=6.9 Hz, 2H), 2.58 (s, 6H), 1.27 (d, J=1.0 Hz, 9H), 0.10 (t, J=7.0 Hz, 3H). $^{31}P$ NMR (202 MHz, Benzene-$d_6$) δ −12.08. $^{13}C$ NMR (126 MHz, Benzene-$d_6$) δ 178.70 (d, J=70.9 Hz), 143.67, 132.53 (d, J=19.2 Hz), 131.35 (d, J=17.3 Hz), 129.10, 128.81 (d, J=5.3 Hz), 128.36, 128.15, 122.36, 77.27, 54.95, 44.85, 31.91 (d, J=13.3 Hz), 14.67.

Synthesis of MCI-2

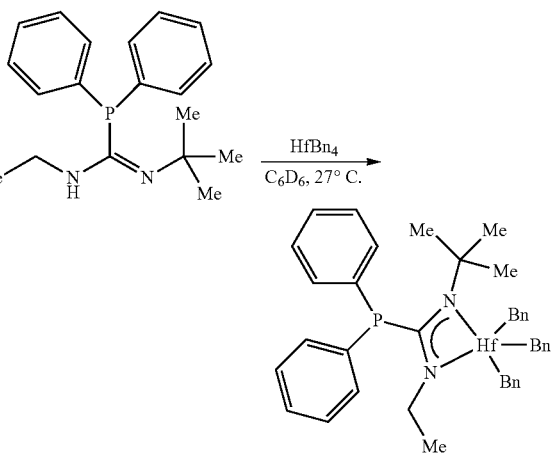

To a stirring (300 rpm) solution of the monophosphoryl guanidine (20.0 mg, 0.0640 mmol, 1.00 eq) in $C_6D_6$ (0.5 mL) in a nitrogen filled glovebox was added a solution of $HfBn_4$ (34.8 mg, 0.0640 mmol, 1.00 eq) in $C_6D_6$ (0.5 mL). After 6 hours, the NMR spectra of an aliquot had shown full conversion to the product. The golden canary yellow solution was filtered through a 0.45 μm PTFE submicron filter and concentrated to afford the hafnium phosphaguanidine complex MCI-2 as a golden yellow viscous foam (48.2 mg, 0.0633 mmol, 99%).

$^1$H NMR (500 MHz, Benzene-$d_6$) δ 7.23-7.17 (m, 10H), 7.17-7.13 (m, 6H), 7.07 (dddt, J=8.0, 6.6, 2.0, 1.0 Hz, 4H), 7.04-6.99 (m, 2H), 6.90 (tt, J=7.2, 1.4 Hz, 3H), 3.09 (q, J=7.0 Hz, 2H), 2.36 (s, 6H), 1.27 (d, J=1.0 Hz, 9H), −0.01 (t, J=6.9 Hz, 3H). $^{13}$C NMR (126 MHz, Benzene-$d_6$) δ 179.49 (d, J=72.5 Hz), 143.91, 132.05 (d, J=19.1 Hz), 131.44 (d, J=18.1 Hz), 128.83 (d, J=5.5 Hz), 128.64, 128.40, 127.93, 122.26, 87.12, 54.67 (d, J=3.8 Hz), 44.25, 31.79, 14.26. $^{31}$P NMR (202 MHz, Benzene-$d_6$) δ −11.52.

Synthesis of MCI-3

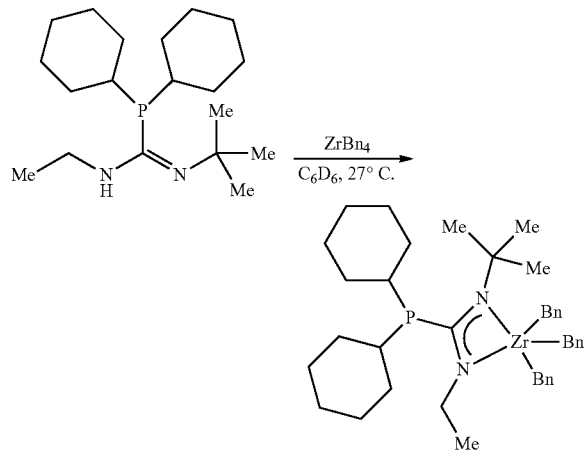

To a solution of the phosphoryl guanidine (54.9 mg, 0.1692 mmol, 1.00 eq) in $C_6D_6$ (0.5 mL) in a nitrogen filled glovebox at 27° C. was added a solution of $ZrBn_4$ (77.1 mg, 0.1692 mmol, 1.00 eq) in $C_6D_6$ (0.5 mL). After stirring (200 rpm) for 6 hours, an aliquot was removed and NMR indicated full conversion of SM and $ZrBn_4$ to the product. The golden brown solution was filtered through a 0.45 μm submicron filter, rinsed with toluene (3×1.0 mL), and fully concentrated to afford the zirconium phosphaguanidine catalyst precursor MCI-3 as a golden yellow powder (105.1 mg, 0.1525 mmol, 90%).

$^1$H NMR (500 MHz, Benzene-$d_6$) δ 7.18-7.13 (m, 4H), 7.11-7.05 (m, 6H), 6.92-6.86 (m, 5H), 3.31 (q, J=7.0 Hz, 2H), 2.58 (s, 6H), 1.95-1.50 (m, 12H), 1.27 (s, 9H), 1.22-0.99 (m, 10H), 0.81 (t, J=7.0 Hz, 3H). $^{31}$P NMR (202 MHz, Benzene-$d_6$) δ 4.56. $^{13}$C NMR (126 MHz, Benzene-$d_6$) δ 181.70 (d, J=74.4 Hz), 143.94, 128.91, 128.14, 122.12, 76.87, 54.79, 43.36, 36.37 (d, J=19.0 Hz), 33.32 (d, J=26.7 Hz), 32.38 (d, J=13.3 Hz), 30.92 (d, J=7.3 Hz), 27.10 (d, J=7.0 Hz), 26.80 (d, J=14.4 Hz), 25.92, 16.36.

Synthesis of MCI-4

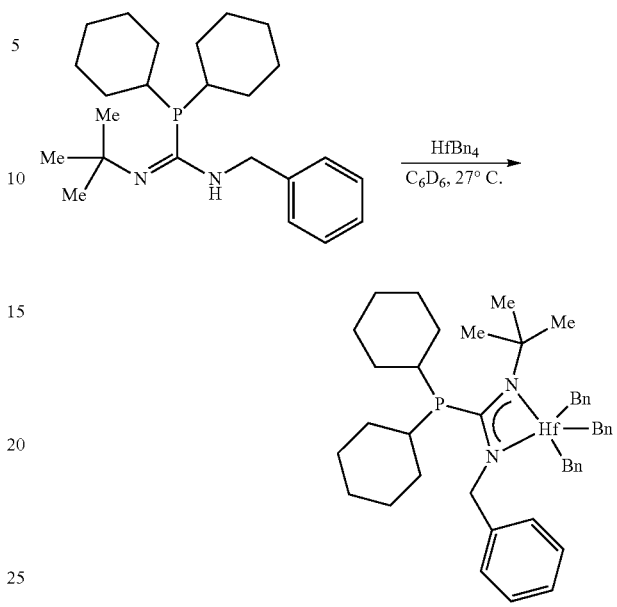

To a stirring (300 rpm) solution of the phosphaguanidine (15.7 mg, 0.0406 mmol, 1.00 eq) in $C_6D_6$ (0.5 mL) in a nitrogen filled glovebox at 27° C. was added a solution of $HfBn_4$ (22.1 mg, 0.0406 mmol, 1.00 eq) in $C_6D_6$ (0.5 mL). After 4 hours, an aliquot was removed and NMR indicated the mono-[2,1] product with trace impurities and toluene. The pale golden yellow solution was concentrated to afford the hafnium phosphaguanidine complex MCI-4 as a pale golden yellow viscous foam (38.5 mg, 0.0405 mmol, 100%).

$^1$H NMR (500 MHz, Benzene-$d_6$) δ 7.22-7.17 (m, 6H), 7.15 (t, J=7.6 Hz, 2H), 7.07 (dt, J=7.5, 1.2 Hz, 6H), 6.90-6.87 (m, 3H), 6.86-6.84 (m, 2H), 6.53-6.46 (m, 1H), 4.79 (s, 2H), 2.29 (s, 6H), 1.84 (dtd, J=15.3, 7.8, 6.5, 3.3 Hz, 2H), 1.71-1.39 (m, 12H), 1.36 (s, 9H), 1.15-0.93 (m, 4H), 0.87 (dtd, J=17.3, 9.0, 3.5 Hz, 4H). $^{31}$P NMR (202 MHz, Benzene-$d_6$) δ 3.82. $^{13}$C NMR (126 MHz, Benzene-$d_6$) δ 186.80 (d, J=77.2 Hz), 144.48, 140.37, 138.50, 128.91, 128.56, 128.52, 128.47, 128.15, 126.36, 125.97, 125.28, 124.34, 122.09, 88.45, 82.99, 54.81 (d, J=3.5 Hz), 52.28, 35.59 (d, J=18.9 Hz), 32.95 (d, J=25.8 Hz), 32.51 (d, J=13.3 Hz), 31.15 (d, J=8.3 Hz), 26.75 (d, J=7.7 Hz), 26.60 (d, J=14.3 Hz), 25.78.

Synthesis of MCI-6

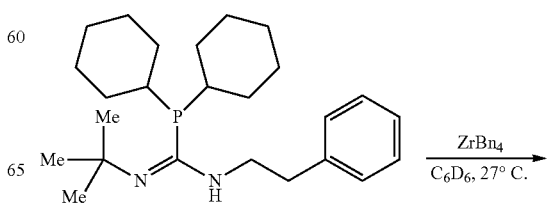

-continued

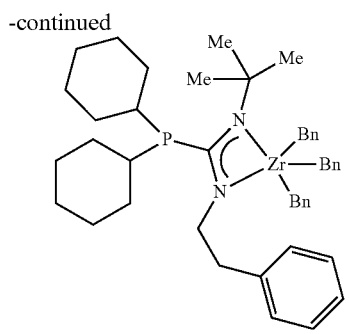

To a stirring (300 rpm) solution of the phosphaguanidine (28.8 mg, 0.0719 mmol, 1.00 eq) in $C_6D_6$ (0.5 mL) in a nitrogen filled glovebox at 27° C. was added a solution of $ZrBn_4$ (32.8 mg, 0.0719 mmol, 1.00 eq) in $C_6D_6$ (0.5 mL). After 4 hours, an aliquot was removed and NMR indicated the mono-[2,1] product with residual $ZrBn_4$ and toluene. The golden brown-orange solution was concentrated to afford the zirconium phosphaguanidine complex MCI-6 as a golden brown viscous foam (54.9 mg, 0.0718 mmol, 100%).

$^1$H NMR (500 MHz, Benzene-$d_6$) δ 7.30-7.25 (m, 2H), 7.18-7.10 (m, 14H), 7.04-6.95 (m, 2H), 6.90 (tt, J=7.1, 1.5 Hz, 2H), 3.93-3.68 (m, 2H), 2.67 (s, 6H), 2.65-2.58 (m, 2H), 2.17-2.08 (m, 2H), 1.85-1.63 (m, 4H), 1.54 (d, J=9.1 Hz, 4H), 1.30 (d, J=1.1 Hz, 9H), 1.27-0.99 (m, 12H). $^{31}$P NMR (202 MHz, Benzene-$d_6$) δ 4.28. $^{13}$C NMR (126 MHz, Benzene-$d_6$) δ 182.04 (d, J=74.6 Hz), 143.78, 139.63, 139.04, 137.48, 130.55, 129.04, 128.69, 128.45, 128.32, 128.15, 126.42, 125.28, 124.10, 122.30, 76.97, 54.92 (d, J=2.8 Hz), 51.53, 37.85, 36.45 (d, J=19.1 Hz), 33.33 (d, J=26.7 Hz), 32.44, 31.05 (d, J=7.2 Hz), 27.09 (d, J=7.3 Hz), 26.62 (d, J=14.4 Hz), 25.88.

Synthesis of MCI-7

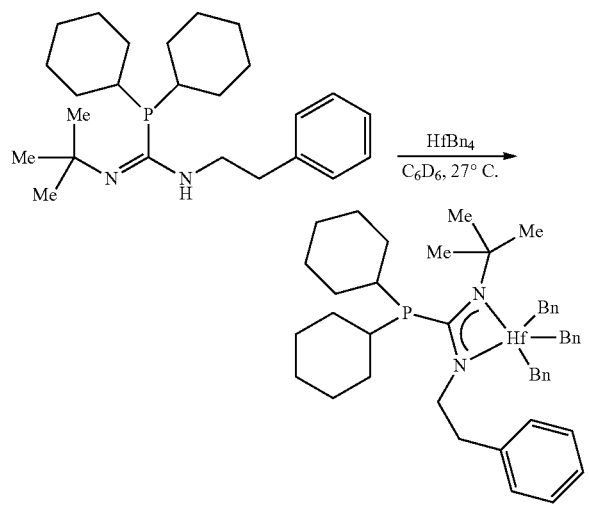

To a stirring (300 rpm) solution of the phosphaguanidine (29.0 mg, 0.0724 mmol, 1.00 eq) in $C_6D_6$ (0.5 mL) in a nitrogen filled glovebox was added a solution of $HfBn_4$ (33.0 mg, 0.0724 mmol, 1.00 eq) in $C_6D_6$ (0.5 mL). After 6 hours, an aliquot was removed and the NMR spectrum indicated the mono-[2,1] product and toluene. The pale golden yellow solution was concentrated to afford the hafnium phosphaguanidine complex MCI-7 as a pale golden yellow viscous foam (61.6 mg, 0.0723 mmol, 100%).

$^1$H NMR (500 MHz, Benzene-$d_6$) δ 7.25 (dt, J=8.1, 1.3 Hz, 2H), 7.20-7.15 (m, 12H), 7.12 (dd, J=2.8, 1.7 Hz, 4H), 6.87 (dddd, J=6.5, 5.8, 3.1, 1.9 Hz, 2H), 3.85-3.71 (m, 2H), 2.64-2.55 (m, 2H), 2.44 (d, J=1.3 Hz, 6H), 2.06-1.98 (m, 2H), 1.73-1.45 (m, 10H), 1.31 (s, 9H), 1.19-0.98 (m, 10H). $^{31}$P NMR (202 MHz, Benzene-$d_6$) δ 4.54. $^{13}$C NMR (126 MHz, Benzene-$d_6$) δ 182.95 (d, J=76.2 Hz), 144.03, 139.43, 128.92, 128.70, 128.58, 128.41, 128.15, 126.46, 125.28, 122.21, 86.96, 54.63 (d, J=3.0 Hz), 50.93, 37.63, 36.26 (d, J=19.1 Hz), 33.28 (d, J=26.9 Hz), 32.36 (d, J=13.0 Hz), 30.90 (d, J=7.2 Hz), 27.08 (d, J=7.2 Hz), 26.62 (d, J=14.8 Hz), 25.82.

Synthesis of MCI-8

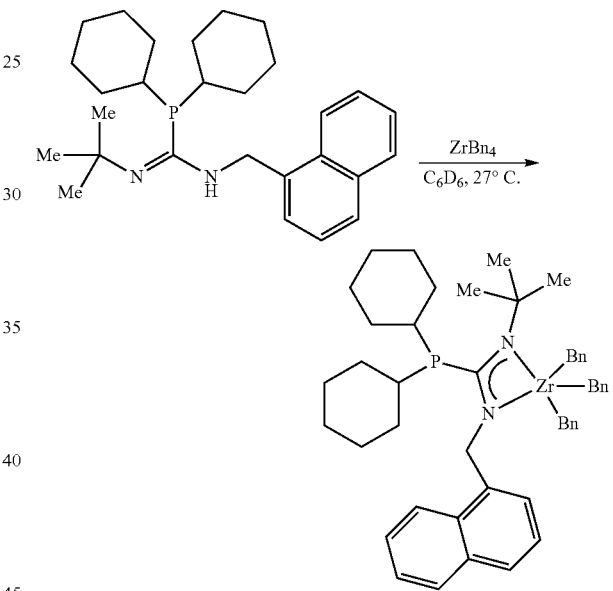

To a solution of the phosphaguanidine (50.0 mg, 0.1145 mmol, 1.00 eq) in $C_6D_6$ (0.5 mL) in a nitrogen filled glovebox at 27° C. was added a solution of $ZrBn_4$ (52.0 mg, 0.1145 mmol, 1.00 eq) in $C_6D_6$ (0.5 mL). After stirring (300 rpm) for 6 hours an aliquot was removed and NMR indicated complete consumption of the starting phosphaguanidine ligand. The golden brown solution was concentrated to afford MCI-8, the zirconium phosphaguanidine metal-ligand complex, as a golden brown viscous foam (91.0 mg, 0.1140 mmol, 100%).

$^1$H NMR (400 MHz, Benzene-$d_6$) δ 7.93-7.86 (m, 1H), 7.68-7.62 (m, 1H), 7.58 (d, J=8.2 Hz, 1H), 7.36 (dd, J=8.3, 7.1 Hz, 1H), 7.29 (ddd, J=8.4, 6.9, 1.5 Hz, 1H), 7.22 (ddd, J=8.0, 6.9, 1.2 Hz, 1H), 7.19-7.10 (m, 7H), 7.08-7.02 (m, 6H), 6.91 (td, J=7.3, 1.4 Hz, 3H), 5.35 (s, 2H), 2.61 (s, 6H), 2.01-1.78 (m, 4H), 1.68-1.58 (m, 2H), 1.54-1.46 (m, 2H), 1.40 (s, 9H), 1.40-1.36 (m, 2H), 1.36 (m, 4H), 1.28-0.91 (m, 4H), 0.70 (d, J=65.6 Hz, 4H). $^{31}$P NMR (162 MHz, Benzene-$d_6$) δ 3.17.

Synthesis of MCI-9

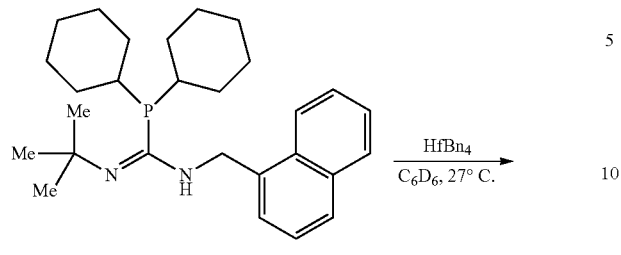

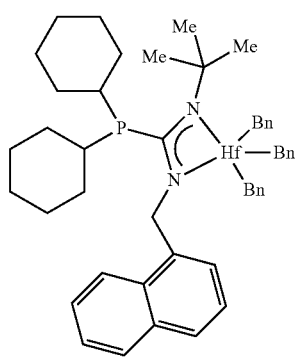

To a solution of the phosphaguanidine (50.0 mg, 0.1145 mmol, 1.00 eq) in $C_6D_6$ (0.5 mL) in a nitrogen filled glovebox at 27° C. was added a solution of $HfBn_4$ (62.3 mg, 0.1145 mmol, 1.00 eq) in $C_6D_6$ (0.5 mL). After stirring for 6 hours, an aliquot was removed and NMR indicated complete consumption of starting ligand to the metal-ligand complex. The pale golden yellow solution was concentrated to afford the hafnium phosphaguandine catalyst precursor MCI-9 as a pale yellow viscous foam (101.0 mg, 0.1140 mmol, 100%).

$^1$H NMR (400 MHz, Benzene-$d_6$) δ 7.84 (d, J=8.4 Hz, 1H), 7.66-7.61 (m, 1H), 7.57 (d, J=8.2 Hz, 1H), 7.36-7.32 (m, 1H), 7.32-7.26 (m, 1H), 7.24-7.21 (m, 1H), 7.21-7.15 (m, 5H), 7.14-7.07 (m, 4H), 7.06-7.02 (m, 2H), 6.90 (qt, J=7.3, 1.3 Hz, 4H), 6.52-6.47 (m, 1H), 5.32 (s, 2H), 2.37 (s, 6H), 1.91-1.77 (m, 2H), 1.75-1.56 (m, 4H), 1.42 (s, 9H), 1.40-1.24 (m, 8H), 1.19-0.43 (m, 8H). $^{31}$P NMR (162 MHz, Benzene-$d_6$) δ 3.60.

Synthesis of MCI-11

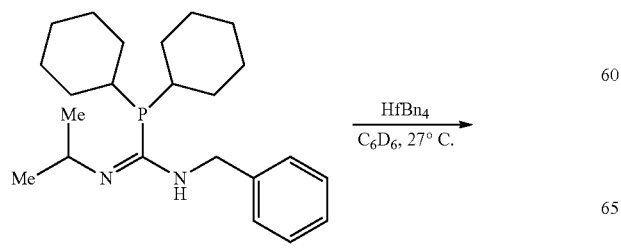

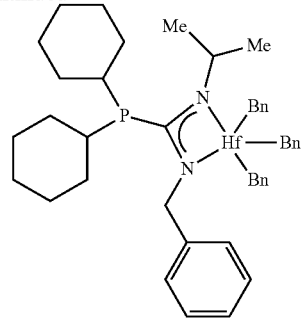

To a clear colorless solution of the phosphaguanidine (60.4 mg, 0.1621 mmol, 1.00 eq) in $C_6D_6$ (1.0 mL) in a nitrogen filled glovebox at 27° C. was added a solution of $HfBn_4$ (88.0 mg, 0.1621 mmol, 1.00 eq) in $C_6D_6$ (0.51 mL) in a quick dropwise manner. After stirring (300 rpm) for 6 hours an aliquot was removed and NMR had indicated complete conversion. The clear golden canary yellow solution was concentrated, suspended in hexanes (3 mL), concentrated, this process was repeated three times more to remove residual $C_6D_6$ and toluene, the resultant golden yellow foam was suspended in hexanes (5 mL), stirred for 2 minutes, filtered through a 0.20 μm submicron PTFE filter, and concentrated to afford the hafnium metal-ligand complex MCI-11 as a golden yellow solid (123.0 mg, 0.1492 mmol, 92%). NMR indicated pure product which exists as a mixture of rotomers and has variable speciation due to the different binding modes of the benzyl groups.

$^1$H NMR (500 MHz, Benzene-$d_6$) δ 7.14 (dt, J=8.0, 6.6 Hz, 11H), 7.10-7.00 (m, 1H), 6.95-6.87 (m, 8H), 4.83 (s, 2H), 2.11 (s, 6H), 2.03-1.44 (m, 12H), 1.14 (d, J=6.6 Hz, 5H), 1.11-0.88 (m, 19H). $^{13}$C NMR (126 MHz, Benzene-$d_6$) δ 186.20 (d, J=65.0 Hz), 143.82, 128.69, 128.48, 128.40, 128.00, 126.53, 122.45, 86.23, 52.40 (d, J=13.4 Hz), 50.02 (d, J=20.3 Hz), 34.95 (d, J=7.3 Hz), 32.67 (d, J=24.4 Hz), 30.99 (d, J=10.4 Hz), 26.61 (d, J=8.6 Hz), 26.43 (d, J=13.9 Hz), 25.93, 25.83, 24.62. $^{31}$P NMR (202 MHz, Benzene-$d_6$) δ (-3.08*), (-3.50*), (-4.04*), (-4.37*), (-5.70*), (-5.92*), -6.63.

Synthesis of MCI-12

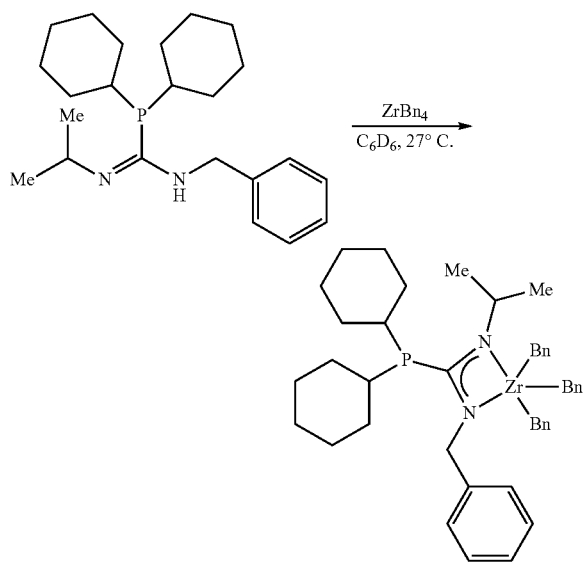

To a clear colorless solution of the phosphaguanidine (49.0 mg, 0.1315 mmol, 1.00 eq) in $C_6D_6$ (1.0 mL) in a nitrogen filled glovebox at 27° C. was added a solution of $ZrBn_4$ (60.0 mg, 0.1315 mmol, 1.00 eq) in $C_6D_6$ (0.60 mL) in a quick dropwise manner. After stirring (300 rpm) for 6 hours an aliquot was removed and NMR had indicated complete conversion. The golden brown solution was concentrated, suspended in hexanes (3 mL), concentrated, this process was repeated three times more to remove residual $C_6D_6$ and toluene, the resultant golden yellow foam was suspended in hexanes (5 mL), stirred for 2 minutes, filtered through a 0.20 μm submicron PTFE filter, and concentrated to afford the zirconium metal-ligand complex MCI-12 as a dark golden brown amorphous solid (95.0 mg, 0.1289 mmol, 98%). NMR indicated the product exists as a mixture of rotomers and contains different speciation due to benzyl groups.

$^1$H NMR (500 MHz, Benzene-$d_6$) δ 7.15 (t, J=7.5 Hz, 3H), 7.13-7.07 (m, 7H), 7.07-7.01 (m, 1H), 6.92 (ddt, J=8.6, 7.2, 1.3 Hz, 3H), 6.80-6.76 (m, 6H), 4.84 (s, 2H), 2.23 (s, 6H), 2.05-1.97 (m, 2H), 1.92-1.83 (m, 2H), 1.71-1.58 (m, 5H), 1.58-1.47 (m, 4H), 1.17 (d, J=6.6 Hz, 6H), 1.14-0.94 (m, 8H). $^{31}$P NMR (202 MHz, Benzene-$d_6$) δ −2.71, −6.81. $^{13}$C NMR (126 MHz, Benzene-$d_6$) δ 186.57 (d, J=64.6 Hz), 143.26, 129.35, 128.31, 127.93, 127.73, 127.54, 126.44, 122.66, 75.92, 52.82 (d, J=10.4 Hz), 50.40 (d, J=20.4 Hz), 35.14, 32.74 (d, J=24.0 Hz), 31.14 (d, J=10.5 Hz), 26.68 (d, J=8.9 Hz), 26.49 (d, J=13.5 Hz), 25.88, 24.57.

Synthesis of MCI-13

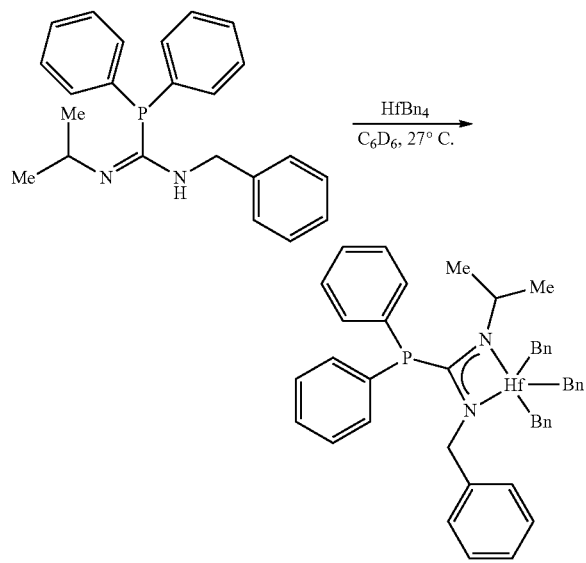

To a clear colorless solution of the phosphaguanidine (115.0 mg, 0.3190 mmol, 1.00 eq) in $C_6D_6$ (1.40 mL) in a nitrogen filled glovebox at 27° C. was added a solution of $HfBn_4$ (173.2 mg, 0.3190 mmol, 1.00 eq) in $C_6D_6$ (1.74 mL) in a quick dropwise manner. After stirring (300 rpm) for 6 hours an aliquot was removed and NMR indicated complete conversion. The black solution was concentrated, suspended in hexanes (3 mL), concentrated, this process was repeated three times more to remove residual $C_6D_6$ and toluene, the resultant golden brown foam was suspended in hexanes (5 mL), stirred vigorously (1000 rpm) for 2 minutes, filtered through a 0.45 μm submicron PTFE filter, and concentrated to afford the hafnium metal-ligand complex MCI-13 as a golden yellow foam (245.0 mg, 0.3016 mmol, 95%). NMR indicated product with minor impurities including $HfBn_4$ and the metal-ligand complex possesses different speciation due to the benzyl groups.

$^1$H NMR (500 MHz, Benzene-$d_6$) δ 7.24-7.20 (m, 4H), 7.18-7.13 (m, 6H), 7.00-6.92 (m, 9H), 6.92-6.86 (m, 11H), 4.71 (d, J=2.3 Hz, 2H), 4.23-4.13 (m, 1H), 2.11 (s, 6H), 0.82 (dd, J=6.5, 0.7 Hz, 6H). $^{31}$P NMR (202 MHz, Benzene-$d_6$) δ −17.28. $^{13}$C NMR (126 MHz, Benzene-$d_6$) δ 182.45 (d, J=62.9 Hz), 143.30, 140.66, 132.80 (d, J=19.8 Hz), 131.82 (d, J=13.8 Hz), 128.88, 128.85, 128.75 (d, J=6.7 Hz), 128.12, 128.04, 126.83, 126.35, 122.65, 85.32, 52.51 (d, J=17.3 Hz), 50.26 (d, J=12.2 Hz), 23.85.

Synthesis of MCI-14

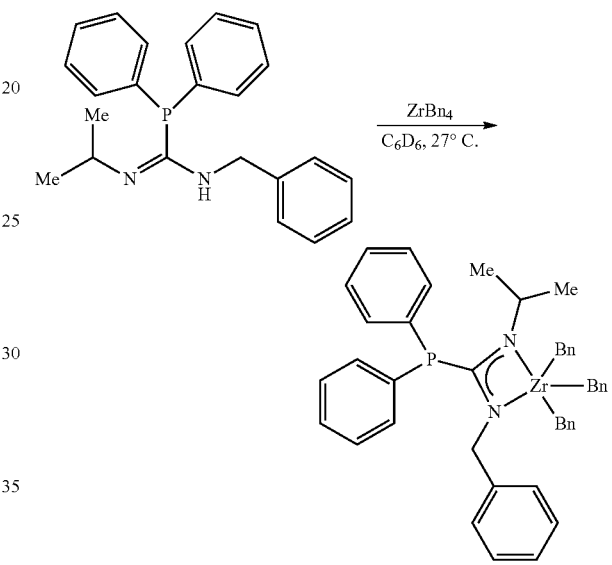

To a clear colorless solution of the phosphaguanidine (92.0 mg, 0.2552 mmol, 1.00 eq) in $C_6D_6$ (1.1 mL) in a nitrogen filled glovebox at 27° C. was added a solution of $ZrBn_4$ (116.3 mg, 0.2552 mmol, 1.00 eq) in $C_6D_6$ (1.2 mL) in a quick dropwise manner. After stirring (300 rpm) for 6 hours an aliquot was removed and NMR indicated complete conversion. The black solution was concentrated, suspended in hexanes (3 mL), concentrated, this process was repeated three times more to remove residual $C_6D_6$ and toluene, the resultant golden yellow foam was suspended in hexanes (5 mL), stirred vigorously (1000 rpm) for 2 minutes, filtered through a 0.45 μm submicron PTFE filter, and concentrated to afford the zirconium metal-ligand complex MCI-14 as a golden brown foam (142.0 mg, 0.1958 mmol, 77%). NMR indicated product which contains residual $ZrBn_4$.

$^1$H NMR (500 MHz, Benzene-$d_6$) δ 7.34-7.28 (m, 4H), 7.13-7.08 (m, 8H), 7.04-6.89 (m, 12H), 6.79-6.75 (m, 6H), 4.73 (s, 1H), 4.73 (s, 1H), 4.08 (pd, J=6.5, 3.8 Hz, 1H), 2.27 (s, 6H), 0.85 (d, J=6.5 Hz, 6H). $^{31}$P NMR (202 MHz, Benzene-$d_6$) δ −17.65. $^{13}$C NMR (126 MHz, Benzene-$d_6$) δ 182.92 (d, J=62.7 Hz), 142.91, 141.17, 132.75 (d, J=19.2 Hz), 132.39 (d, J=14.3 Hz), 129.47, 128.71, 128.13, 127.97, 126.72, 126.23, 122.82, 75.62, 52.86 (d, J=19.5 Hz), 50.85 (d, J=11.2 Hz), 23.83.

Synthesis of MCI-15

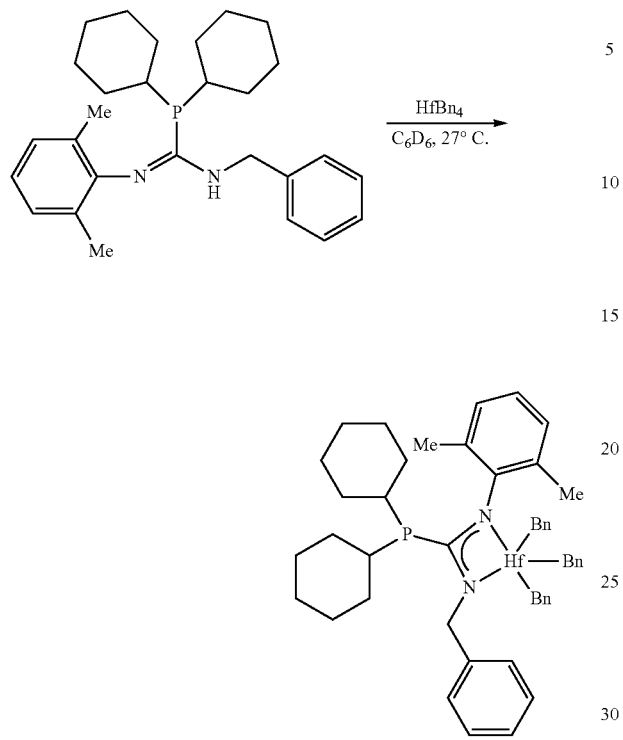

To a clear colorless solution of the phosphaguanidine (60.8 mg, 0.1399 mmol, 1.00 eq) in C₆D₆ (0.7 mL) in a nitrogen filled glovebox at 27° C. was added a solution of HfBn₄ (76.0 mg, 0.1399 mmol, 1.00 eq) in C₆D₆ (0.76 mL) in a quick dropwise manner. After stirring (300 rpm) for 6 hours, an aliquot was removed and the NMR spectrum indicated complete conversion. The pale yellow solution was concentrated, suspended in hexanes (3 mL), concentrated, this process was repeated three times more to remove residual C₆D₆ and toluene, the resultant golden yellow foam was suspended in hexanes (5 mL), stirred vigorously (1000 rpm) for 2 minutes, filtered through a 0.45 μm submicron PTFE filter, and concentrated to afford the hafnium metal-ligand complex MCI-15 as a pale yellow foam (122.0 mg, 0.1376 mmol, 98%). NMR indicated pure product.

$^1$H NMR (400 MHz, Benzene-$d_6$) δ 7.25 (dd, J=8.1, 1.4 Hz, 2H), 7.17 (t, J=7.7 Hz, 2H), 7.13-7.02 (m, 8H), 6.97 (d, J=7.5 Hz, 2H), 6.91-6.84 (m, 3H), 6.61-6.56 (m, 6H), 4.53 (s, 2H), 2.28 (s, 6H), 1.95-1.89 (m, 2H), 1.90 (s, 6H), 1.78 (s, 2H), 1.66 (d, J=12.2 Hz, 2H), 1.54-1.33 (m, 6H), 1.17 (dq, J=23.8, 12.1 Hz, 3H), 1.04-0.87 (m, 7H). $^{31}$P NMR (162 MHz, Benzene-$d_6$) δ 8.59. $^{13}$C NMR (101 MHz, Benzene-$d_6$) δ 188.38 (d, J=72.5 Hz), 144.69 (d, J=5.0 Hz), 143.10, 140.07, 134.19-133.01 (m), 128.75, 128.55, 128.12, 128.04, 127.82, 127.53, 125.37, 122.55, 85.84, 52.31-52.26 (m), 34.15 (d, J=19.2 Hz), 32.62 (d, J=17.9 Hz), 31.66 (d, J=16.7 Hz), 27.16 (d, J=12.0 Hz), 26.82 (d, J=10.6 Hz), 25.84, 19.81, 19.78.

Synthesis of MCI-16

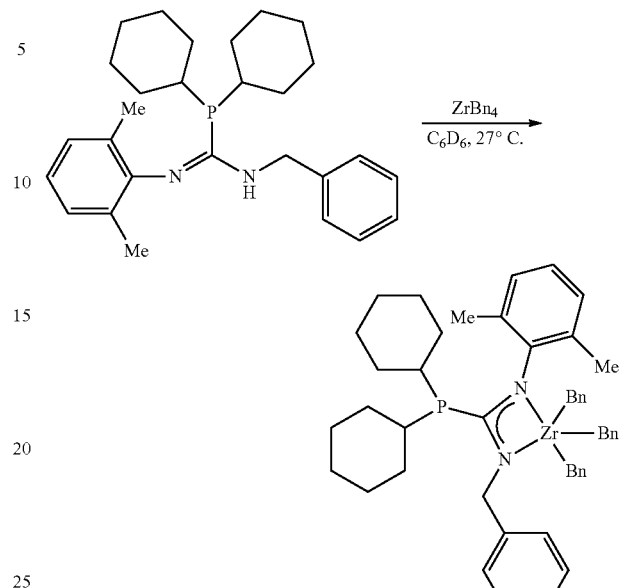

To a clear colorless solution of the phosphaguanidine (51.0 mg, 0.1174 mmol, 1.00 eq) in C₆D₆ (0.7 mL) in a nitrogen filled glovebox at 27° C. was added a solution of ZrBn₄ (53.5 mg, 0.1174 mmol, 1.00 eq) in C₆D₆ (0.54 mL) in a quick dropwise manner. After stirring (300 rpm) for 6 hours, an aliquot was removed and NMR indicated complete conversion. The dark brown solution was concentrated, suspended in hexanes (3 mL), concentrated, this process was repeated three times more to remove residual C₆D₆ and toluene, the resultant golden brown foam was suspended in hexanes (5 mL), stirred for 2 minutes, filtered through a 0.45 μm submicron PTFE filter, and concentrated to afford the zirconium metal-ligand complex MCI-16 as a dark brown viscous foam (90.0 mg, 0.1126 mmol, 96%). NMR indicated product with minor impurities including residual ZrBn₄ and hexanes. The catalyst also exists with different speciation due to the different binding modes of the benzyl groups.

$^1$H NMR (400 MHz, Benzene-$d_6$) δ 7.25 (d, J=7.6 Hz, 2H), 7.15 (t, J=7.6 Hz, 2H), 7.04 (t, J=7.7 Hz, 5H), 7.00 (d, J=7.3 Hz, 2H), 6.97-6.86 (m, 6H), 6.53-6.47 (m, 6H), 4.51 (s, 2H), 2.36 (s, 6H), 2.08 (s, 6H), 2.00-1.81 (m, 5H), 1.72-1.33 (m, 9H), 1.31-0.93 (m, 8H). $^{31}$P NMR (162 MHz, Benzene-$d_6$) δ 8.81. $^{13}$C NMR (101 MHz, Benzene-$d_6$) δ 188.76 (d, J=72.2 Hz), 145.44 (d, J=5.6 Hz), 142.70, 140.62, 133.15 (d, J=1.2 Hz), 130.54, 129.36, 128.46, 128.24, 128.00, 127.51, 127.30, 125.06, 122.73, 76.68, 52.45 (d, J=6.1 Hz), 34.05 (d, J=19.7 Hz), 32.81 (d, J=18.8 Hz), 31.60 (d, J=16.1 Hz), 27.21 (d, J=12.2 Hz), 26.88 (d, J=9.3 Hz), 25.89, 20.04, 20.00.

Synthesis of MCI-17

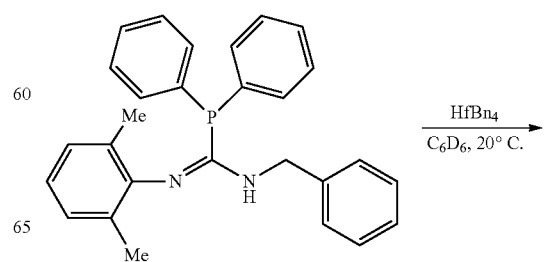

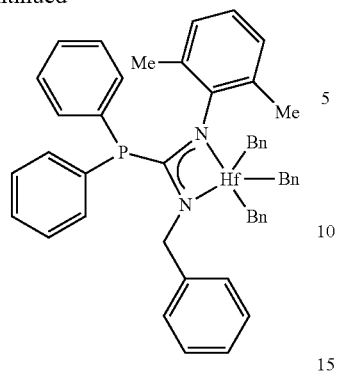

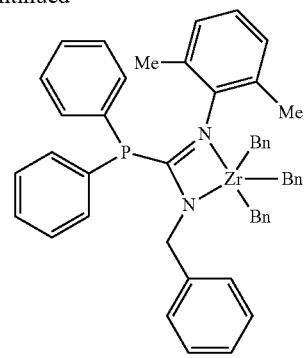

To a clear colorless solution of the phosphaguanidine (59.0 mg, 0.1396 mmol, 1.00 eq) in C$_6$D$_6$ (0.7 mL) in a nitrogen filled glovebox at 27° C. was added a solution of HfBn$_4$ (75.8 mg, 0.1396 mmol, 1.00 eq) in C$_6$D$_6$ (0.76 mL) in a quick dropwise manner. After stirring (300 rpm) for 6 hours an aliquot was removed and NMR indicated complete conversion. The golden yellow solution was concentrated, suspended in hexanes (3 mL), concentrated, this process was repeated three times more to remove residual C$_6$D$_6$ and toluene, the resultant golden yellow foam was suspended in hexanes-toluene (6 mL, 1:1), stirred vigorously (1000 rpm) for 2 minutes, filtered through a 0.45 μm submicron PTFE filter, and concentrated to afford the hafnium metal-ligand complex MCI-17 as a golden yellow viscous foam (108.0 mg, 0.1235 mmol, 88%). NMR indicated pure product with trace hexanes.

$^1$H NMR (400 MHz, Benzene-d$_6$) δ 7.22-7.16 (m, 4H), 7.12-7.03 (m, 10H), 6.99 (ddt, J=7.4, 2.2, 1.4 Hz, 3H), 6.91-6.86 (m, 3H), 6.86-6.82 (m, 5H), 6.71 (t, J=1.7 Hz, 3H), 6.64-6.58 (m, 6H), 4.37 (s, 2H), 2.17 (d, J=0.7 Hz, 6H), 1.90 (s, 6H). $^{31}$P NMR (162 MHz, Benzene-d$_6$) δ −6.26. $^{13}$C NMR (101 MHz, Benzene-d$_6$) δ 184.84 (d, J=64.6 Hz), 143.66 (d, J=4.4 Hz), 142.84, 139.54, 134.31 (d, J=21.5 Hz), 133.62, 131.40 (d, J=10.8 Hz), 129.28, 128.92, 128.43 (d, J=8.2 Hz), 128.21, 128.08, 127.98, 127.02, 125.63, 122.73, 84.87, 51.99 (d, J=4.7 Hz), 19.62, 19.59.

Synthesis of MCI-18

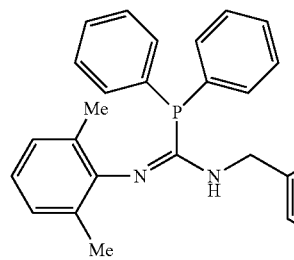

To a clear colorless solution of the phosphaguanidine (58.6 mg, 0.1387 mmol, 1.00 eq) in C$_6$D$_6$ (0.7 mL) in a nitrogen filled glovebox at 23° C. was added a solution of ZrBn$_4$ (63.2 mg, 0.1387 mmol, 1.00 eq) in C$_6$D$_6$ (0.63 mL) in a quick dropwise manner. After stirring (300 rpm) for 6 hours an aliquot was removed and NMR had indicated complete conversion. The golden yellow solution was concentrated, suspended in hexanes (3 mL), concentrated, this process was repeated three times more to remove residual C$_6$D$_6$ and toluene, the resultant golden yellow foam was suspended in hexanes-toluene (6 mL, 3:1), stirred for 2 minutes, filtered through a 0.45 μm submicron PTFE filter, and concentrated to afford the zirconium metal-ligand complex MCI-18 as a dark golden yellow powder (82.0 mg, 0.1043 mmol, 75%). NMR indicated pure product with trace hexanes and toluene.

$^1$H NMR (500 MHz, Benzene-d$_6$) δ 7.27-7.20 (m, 4H), 7.09-7.01 (m, 6H), 7.01-6.94 (m, 6H), 6.90 (ddt, J=8.6, 7.1, 1.2 Hz, 3H), 6.88-6.83 (m, 5H), 6.75 (t, J=1.7 Hz, 3H), 6.54-6.51 (m, 6H), 4.31 (s, 2H), 2.24 (d, J=0.7 Hz, 6H), 2.11 (s, 6H). $^{31}$P NMR (162 MHz, Benzene-d$_6$) δ −6.70. $^{13}$C NMR (126 MHz, Benzene-d$_6$) δ 185.11 (d, J=63.9 Hz), 144.44 (d, J=4.7 Hz), 142.52, 139.97, 134.36 (d, J=21.9 Hz), 133.39, 131.86 (d, J=10.7 Hz), 129.51, 129.16, 128.39 (d, J=7.7 Hz), 128.16, 128.12, 128.03, 127.99, 127.95, 127.10, 126.84, 125.34, 122.85, 76.48, 52.09 (d, J=4.7 Hz), 19.85, 19.82.

Synthesis of MCI-19

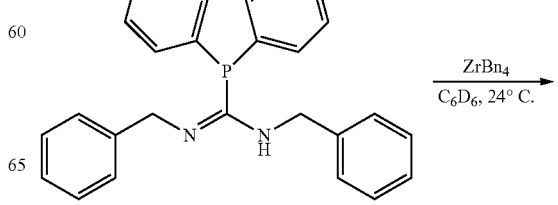

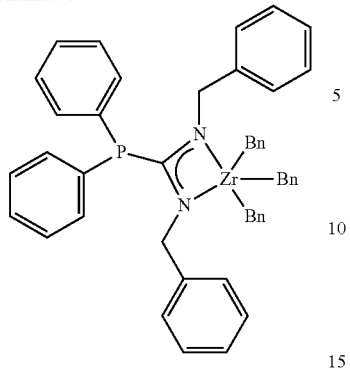

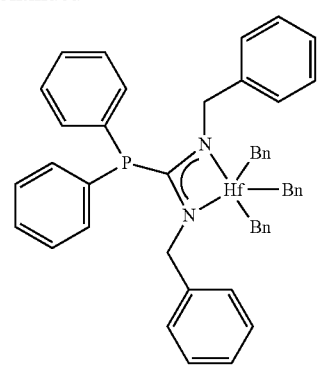

To a clear colorless solution of the phosphaguanidine (58.0 mg, 0.1371 mmol, 1.00 eq) in $C_6D_6$ (0.7 mL) in a nitrogen filled glovebox at 24° C. was added a solution of $ZrBn_4$ (62.5 mg, 0.1387 mmol, 1.00 eq) in $C_6D_6$ (0.63 mL) in a quick dropwise manner. After stirring (300 rpm) for 6 hours an aliquot was removed and NMR had indicated complete conversion. The black solution was concentrated, suspended in hexanes (3 mL), concentrated, this process was repeated three times more to remove residual $C_6D_6$ and toluene, the resultant black mixture was suspended in hexanes (8 mL), stirred vigorously (1000 rpm) for 2 minutes, filtered through a 0.45 μm submicron PTFE filter, concentrated, and this process was repeated once more with a filtration through a 0.20 μm submicron PTFE filter, and concentrated to afford the zirconium metal-ligand complex MCI-19 as a dark brown viscous foam (92.0 mg, 0.1193 mmol, 87%, 89% pure by $^1$H-NMR and $^{31}$P-NMR). NMR indicated product is approximately 89% pure by $^1$H- and $^{31}$P-NMR which contains residual $ZrBn_4$.

$^1$H NMR (500 MHz, Benzene-$d_6$) δ 7.25-7.21 (m, 3H), 7.08-7.00 (m, 15H), 6.96-6.88 (m, 11H), 6.60-6.55 (m, 6H), 4.65 (d, J=2.0 Hz, 4H), 2.12 (s, 6H). $^{13}$C NMR (126 MHz, Benzene-$d_6$) δ 185.15 (d, J=61.2 Hz), 142.32, 141.14, 134.47 (d, J=12.6 Hz), 133.34 (d, J=20.0 Hz), 131.90 (d, J=11.7 Hz), 130.57, 129.58, 128.87, 128.74 (d, J=6.9 Hz), 128.26, 128.11, 126.62, 126.42, 122.91, 74.31, 53.10 (d, J=14.2 Hz). $^{31}$P NMR (162 MHz, Benzene-$d_6$) δ −18.47.

Synthesis of MCI-20

To a clear colorless solution of the phosphaguanidine (46.3 mg, 0.1134 mmol, 1.00 eq) in $C_6D_6$ (0.5 mL) in a nitrogen filled glovebox at 24° C. was added a solution of $HfBn_4$ (61.5 mg, 0.1134 mmol, 1.00 eq) in $C_6D_6$ (0.63 mL) in a quick dropwise manner. After stirring (300 rpm) for 6 hours an aliquot was removed and NMR had indicated complete conversion. The black solution was concentrated, suspended in hexanes (3 mL), concentrated, this process was repeated three times more to remove residual $C_6D_6$ and toluene, the resultant black mixture was suspended in hexanes (8 mL), stirred vigorously (1000 rpm) for 2 minutes, filtered through a 0.45 μm submicron PTFE filter, concentrated, and this process was repeated once more with a filtration through a 0.20 μm submicron PTFE filter, and concentrated to afford the hafnium metal-ligand complex MCI-20 as a dark brown viscous foam (79.2 mg, 0.0866 mmol, 76%, 94% pure by $^1$H- and $^{31}$P-NMR). NMR indicated product which is approximately 94% pure by $^1$H- and $^{31}$P-NMR.

$^1$H NMR (500 MHz, Benzene-$d_6$) δ 7.19-7.13 (m, 4H), 7.10 (dd, J=8.2, 7.3 Hz, 6H), 7.05-7.00 (m, 4H), 6.98-6.94 (m, 6H), 6.92-6.87 (m, 9H), 6.71-6.67 (m, 6H), 4.67 (d, J=1.9 Hz, 4H), 1.91 (s, 6H). $^{13}$C NMR (126 MHz, Benzene-$d_6$) δ 185.33 (d, J=61.9 Hz), 142.71, 140.72, 134.48 (d, J=13.0 Hz), 133.52, 133.36, 131.37 (d, J=11.3 Hz), 129.90, 129.07, 129.04, 128.81, 128.75, 128.54 (d, J=9.9 Hz), 128.32, 128.16, 128.05, 127.95, 126.67, 126.53, 122.83, 82.65, 52.60 (d, J=13.3 Hz). $^{31}$P NMR (162 MHz, Benzene-$d_6$) δ −17.59.

Synthesis of MCI-21

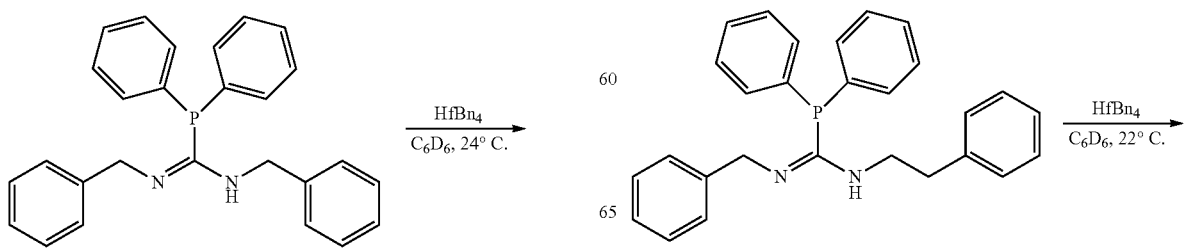

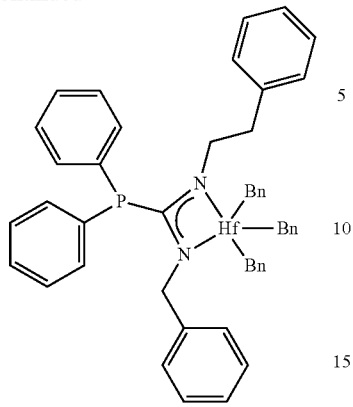

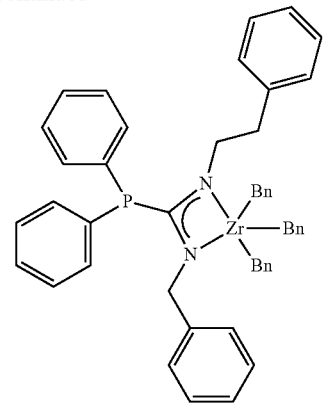

To a clear pale yellow solution of the phosphaguanidine (55.0 mg, 0.1302 mmol, 1.00 eq) in $C_6D_6$ (0.6 mL) in a nitrogen filled glovebox at 22° C. was added a solution of $HfBn_4$ (70.7 mg, 0.1302 mmol, 1.00 eq) in $C_6D_6$ (0.71 mL) in a quick dropwise manner. After stirring (300 rpm) for 5 hours an aliquot was removed and NMR indicated complete conversion. The black solution was concentrated, suspended in hexanes (3 mL), concentrated, this process was repeated three times more to remove residual $C_6D_6$ and toluene, the resultant black mixture was suspended in hexanes (8 mL), stirred vigorously (1000 rpm) for 2 minutes, filtered through a 0.45 μm submicron PTFE filter, concentrated, and this process was repeated once more with a filtration through a 0.20 μm submicron PTFE filter, and concentrated to afford the hafnium metal-ligand complex MCI-21 as a golden yellow viscous foam (98.4 mg, 0.1035 mmol, 79%, 92% pure). NMR had indicated product is approximately 92% pure by $^1$H- and $^{31}$P-NMR and fluctionality due to the tribenzyl motif is also evident.

$^1$H NMR (500 MHz, Benzene-$d_6$) δ 7.25 (dddd, J=7.9, 5.4, 3.0, 1.7 Hz, 4H), 7.15-7.11 (m, 8H), 7.08-7.04 (m, 3H), 7.03-6.99 (m, 3H), 6.96-6.86 (m, 11H), 6.82-6.78 (m, 6H), 4.60-4.57 (m, 2H), 3.74-3.68 (m, 2H), 2.52-2.44 (m, 2H), 1.99 (s, 6H). $^{31}$P NMR (162 MHz, Benzene-$d_6$) δ −18.34. $^{13}$C NMR (126 MHz, Benzene-$d_6$) δ 183.41 (d, J=61.0 Hz), 142.74, 140.56, 139.17, 133.08 (d, J=20.0 Hz), 131.68 (d, J=12.4 Hz), 129.89, 129.09, 128.93 (d, J=6.8 Hz), 128.66, 128.32, 128.25, 128.06, 126.71, 126.46, 126.15, 122.86, 82.86, 52.39 (d, J=13.5 Hz), 51.07 (d, J=12.7 Hz), 38.36.

Synthesis of MCI-22

To a clear pale yellow solution of the phosphaguanidine (41.4 mg, 0.0980 mmol, 1.00 eq) in $C_6D_6$ (0.6 mL) in a nitrogen filled glovebox at 22° C. was added a solution of $ZrBn_4$ (44.5 mg, 0.0980 mmol, 1.00 eq) in $C_6D_6$ (0.45 mL) in a quick dropwise manner. After stirring (300 rpm) for 5 hours an aliquot was removed and NMR had indicated complete conversion. The black solution was diluted with anhydrous de-oxygenated hexanes (15 mL), concentrated to approximately 1 mL, suspended in hexanes (10 mL), concentrated, this process was repeated once more to remove residual $C_6D_6$ and toluene, the resultant black mixture was then filtered through a 0.45 μm submicron PTFE filter, concentrated, suspended in hexanes (5 mL), stirred vigorously (1000 rpm) for 2 minutes, filtered through a 0.20 μm submicron PTFE filter, rinsed with hexanes (3×2 mL), and concentrated to afford the zirconium metal-ligand complex MCI-22 as a dark brown viscous foam (56.0 mg, 0.0636 mmol, 65%, 88% pure). NMR indicated product which is approximately 88% pure by $^1$H- and $^{31}$P-NMR.

$^1$H NMR (400 MHz, Benzene-$d_6$) δ 7.39-7.26 (m, 5H), 7.07 (q, J=7.3 Hz, 8H), 7.02-6.88 (m, 16H), 6.71-6.65 (m, 6H), 4.56 (d, J=1.9 Hz, 2H), 3.73 (ddd, J=10.7, 5.3, 1.9 Hz, 2H), 2.57-2.49 (m, 2H), 2.17 (s, 6H). $^{31}$P NMR (162 MHz, Benzene-$d_6$) δ −19.50. $^{13}$C NMR (101 MHz, Benzene-$d_6$) δ 183.05 (d, J=59.7 Hz), 142.41, 140.87, 139.35, 132.94 (d, J=19.2 Hz), 132.20 (d, J=13.7 Hz), 130.55, 129.61, 128.95-128.88 (m), 128.85, 128.66, 128.32, 128.16, 127.97, 126.66, 126.32, 122.91, 74.37, 52.93 (d, J=14.5 Hz), 51.68 (d, J=13.7 Hz), 38.64.

Synthesis of MCI-23

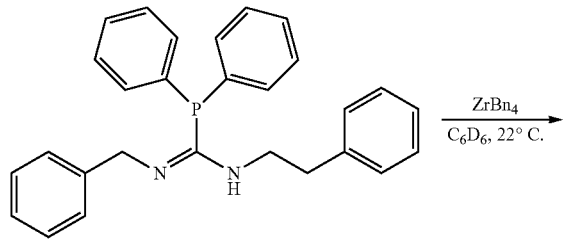

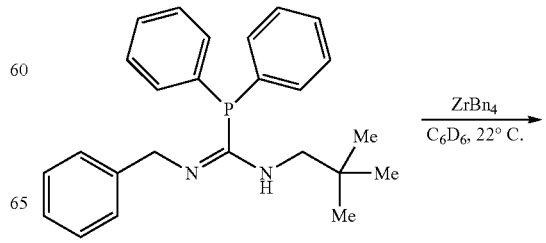

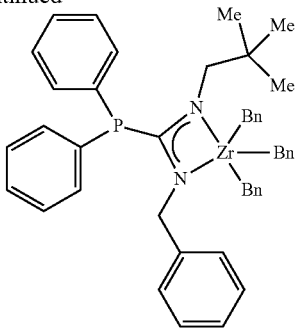

To a clear pale yellow solution of the phosphaguanidine (43.2 mg, 0.1113 mmol, 1.00 eq) in $C_6D_6$ (0.6 mL) in a nitrogen filled glovebox at 22° C. was added a solution of $ZrBn_4$ (50.5 mg, 0.1113 mmol, 1.00 eq) in $C_6D_6$ (0.50 mL) in a quick dropwise manner. After stirring (300 rpm) for 2 hours an aliquot was removed and NMR had indicated complete conversion. The golden yellow mixture was diluted with anhydrous de-oxygenated hexanes (10 mL), concentrated, suspended in hexanes (5 mL), concentrated, this process was repeated once more to remove residual $C_6D_6$ and toluene, suspended in hexanes (5 mL), the resultant golden brown mixture was then filtered through a 0.45 μm submicron PTFE filter, rinsed with hexanes (3×2 mL), and concentrated to afford the zirconium metal-ligand complex MCI-23 as a pale golden yellow viscous foam (82.9 mg, 0.1050 mmol, 94%, 95% pure). NMR indicated product which is approximately 95% pure by $^1$H- and $^{31}$P-NMR.

$^1$H NMR (500 MHz, Benzene-$d_6$) δ 7.34-7.30 (m, 4H), 7.09-7.03 (m, 8H), 7.01-6.93 (m, 2H), 6.93-6.87 (m, 10H), 6.73 (dt, J=7.7, 1.2 Hz, 6H), 4.23 (s, 2H), 3.54 (d, J=3.6 Hz, 2H). $^{31}$P NMR (162 MHz, Benzene-$d_6$) δ −16.63. $^{13}$C NMR (126 MHz, Benzene-$d_6$) δ 181.37 (d, J=63.9 Hz), 142.80, 141.56, 133.84 (d, J=20.8 Hz), 132.47 (d, J=11.4 Hz), 129.50, 129.04, 128.72 (d, J=7.6 Hz), 128.26, 128.14, 126.37, 126.31, 122.96, 74.52, 61.17 (d, J=16.4 Hz), 52.60 (d, J=6.6 Hz), 34.12, 28.07, 28.04.

Synthesis of MCI-24

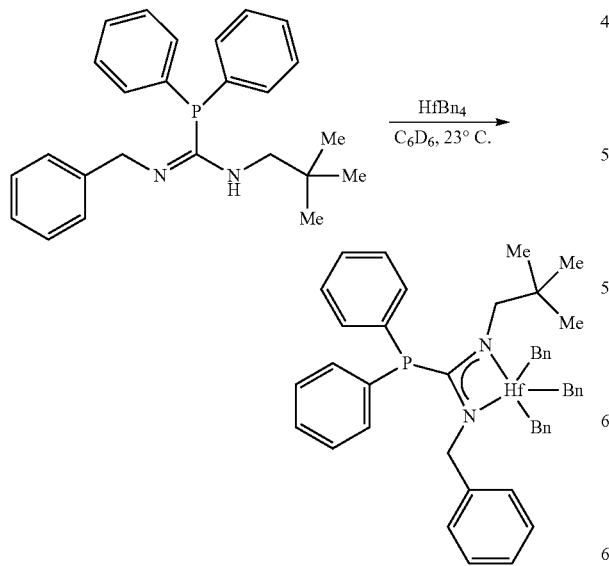

To a clear pale yellow solution of the phosphaguanidine (81.7 mg, 0.2105 mmol, 1.00 eq) in $C_6D_6$ (1.5 mL) in a nitrogen filled glovebox at 23° C. was added a solution of $HfBn_4$ (114.4 mg, 0.2105 mmol, 1.00 eq) in $C_6D_6$ (1.14 mL) in a quick dropwise manner. After stirring (300 rpm) for 2 hours an aliquot was removed and NMR had indicated complete conversion. The golden yellow mixture was diluted with anhydrous de-oxygenated hexanes (10 mL), concentrated, suspended in hexanes (5 mL), concentrated, this process was repeated once more to remove residual $C_6D_6$ and toluene, suspended in hexanes (5 mL), the resultant golden brown mixture was then filtered through a 0.45 μm submicron PTFE filter, rinsed with hexanes (3×2 mL), and concentrated to afford the hafnium metal-ligand complex MCI-24 as a pale golden yellow viscous foam (170.5 mg, 0.1928 mmol, 92%, 95% pure). NMR indicated product which is approximately 95% pure by $^1$H- and $^{31}$P-NMR.

$^1$H NMR (400 MHz, Benzene-$d_6$) δ 7.29-7.24 (m, 4H), 7.13-7.09 (m, 6H), 7.08-6.93 (m, 4H), 6.91 (dddd, J=5.3, 3.8, 2.5, 1.2 Hz, 7H), 6.89-6.85 (m, 3H), 6.84-6.81 (m, 6H), 4.27 (s, 2H), 3.52 (d, J=3.6 Hz, 2H), 2.05 (s, 6H), 0.90 (s, 9H). $^{31}$P NMR (162 MHz, Benzene-$d_6$) δ −15.53. $^{13}$C NMR (126 MHz, Benzene-$d_6$) δ 182.66 (d, J=63.9 Hz), 143.43, 141.06, 133.83 (d, J=20.9 Hz), 132.02 (d, J=11.4 Hz), 129.22, 128.90, 128.79 (d, J=7.6 Hz), 128.23, 128.15, 126.48, 126.37, 122.77, 84.41, 60.61 (d, J=16.5 Hz), 52.08 (d, J=4.8 Hz), 33.87, 28.01, 27.99.

Synthesis of MCI-25

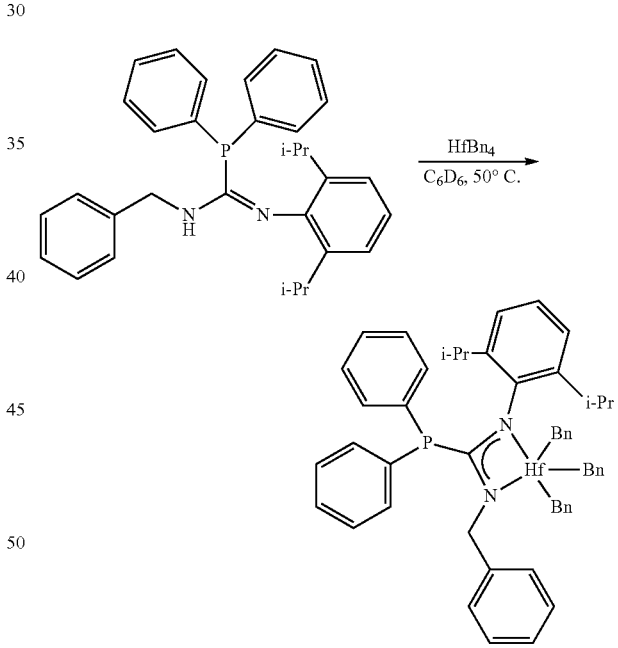

To a clear pale yellow solution of the phosphaguanidine (47.5 mg, 0.0992 mmol, 1.00 eq) in $C_6D_6$ (1.0 mL) in a nitrogen filled glovebox at 23° C. was added a solution of $HfBn_4$ (53.9 mg, 0.0992 mmol, 1.00 eq) in $C_6D_6$ (0.53 mL) in a quick dropwise manner. After stirring (300 rpm) for 24 hours at 50° C. an aliquot was removed and NMR had indicated greater than 95% conversion. The golden yellow mixture was diluted with anhydrous de-oxygenated hexanes (10 mL), concentrated, suspended in hexanes (5 mL), concentrated, this process was repeated once more to remove residual $C_6D_6$ and toluene, suspended in hexanes (5 mL), the resultant golden brown mixture was then filtered through a 0.45 μm submicron PTFE filter, rinsed with hexanes (3×2 mL), and concentrated to afford the hafnium metal-ligand complex MCI-25 as a pale golden yellow viscous foam (54.6 mg, 0.0505 mmol, 51%, 86% pure). NMR indicated product which is approximately 86% pure by $^1$H- and $^{31}$P-NMR.

$^1$H NMR (500 MHz, Benzene-d$_6$) δ 7.21 (td, J=8.0, 1.4 Hz, 4H), 7.14-7.05 (m, 10H), 6.97-6.86 (m, 12H), 6.81-6.73 (m, 2H), 6.67-6.61 (m, 6H), 4.33 (s, 2H), 3.42 (hept, J=6.7 Hz, 2H), 2.02 (s, 6H), 1.34 (d, J=6.7 Hz, 6H), 1.05 (d, J=6.8 Hz, 6H). $^{31}$P NMR (202 MHz, Benzene-d$_6$) δ -12.07. $^{13}$C NMR (126 MHz, Benzene-d$_6$) δ 184.76 (d, J=64.0 Hz), 144.13, 143.16, 141.36 (d, J=8.5 Hz), 139.01, 133.44 (d, J=20.0 Hz), 132.34 (d, J=16.1 Hz), 129.01, 128.89, 128.84, 128.12, 127.96, 127.73, 127.16, 126.77, 123.71, 122.75, 86.93, 52.65, 28.63, 25.44, 23.79, 23.77.

Synthesis of MCI-26

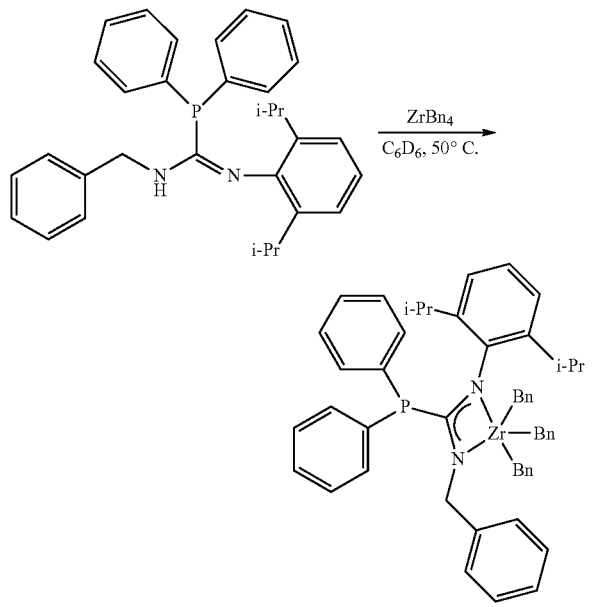

To a clear pale yellow solution of the phosphaguanidine (47.5 mg, 0.1075 mmol, 1.00 eq) in C$_6$D$_6$ (1.0 mL) in a nitrogen filled glovebox at 23° C. was added a solution of ZrBn$_4$ (53.7 mg, 0.1182 mmol, 1.10 eq) in C$_6$D$_6$ (0.53 mL) in a quick dropwise manner. After stirring (300 rpm) for 48 hours at 50° C. an aliquot was removed and NMR had indicated complete conversion. The golden yellow mixture was diluted with anhydrous de-oxygenated hexanes (10 mL), concentrated, suspended in hexanes (5 mL), concentrated, this process was repeated once more to remove residual C$_6$D$_6$ and toluene, suspended in hexanes (5 mL), the resultant golden brown mixture was then filtered through a 0.45 μm submicron PTFE filter, rinsed with hexanes (3×2 mL), and concentrated to afford the zirconium metal-ligand complex MCI-26 as a dark brown solid (41.7 mg, 0.0436 mmol, 41%, 88% pure). NMR indicated product is approximately 88% pure by $^1$H- and $^{31}$P-NMR.

$^1$H NMR (500 MHz, Benzene-d$_6$) δ 7.24-7.20 (m, 4H), 7.13-7.10 (m, 5H), 7.08-7.03 (m, 6H), 6.94-6.84 (m, 12H), 6.73-6.70 (m, 2H), 6.56-6.52 (m, 6H), 4.22 (s, 2H), 3.61 (hept, J=6.7 Hz, 2H), 2.22 (s, 6H), 1.41 (d, J=6.7 Hz, 6H), 1.11 (d, J=6.8 Hz, 6H). $^{31}$P NMR (202 MHz, Benzene-d$_6$) δ -12.44. $^{13}$C NMR (126 MHz, Benzene-d$_6$) δ 185.49 (d, J=63.9 Hz), 143.90, 142.72, 142.15 (d, J=8.6 Hz), 139.46, 133.59 (d, J=20.0 Hz), 132.80 (d, J=16.3 Hz), 129.41, 128.85, 128.81, 128.76, 128.07, 127.79, 127.35, 123.82, 122.88, 78.06, 52.64, 28.56, 25.43, 23.94 (d, J=2.7 Hz).

Synthesis of MCI-27

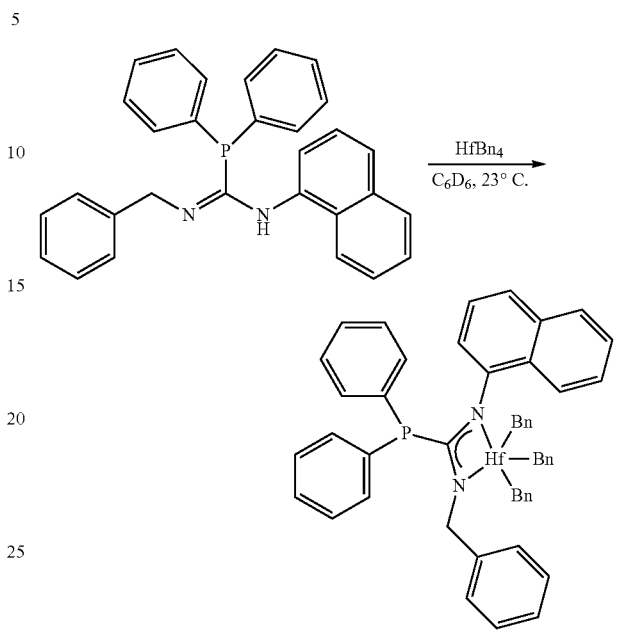

To a clear pale yellow solution of the phosphaguanidine (76.8 mg, 0.1488 mmol, 1.00 eq) in C$_6$D$_6$ (1.0 mL) in a nitrogen filled glovebox at 23° C. was added a solution of HfBn$_4$ (80.8 mg, 0.1488 mmol, 1.10 eq) in C$_6$D$_6$ (0.80 mL) in a quick dropwise manner. After stirring (300 rpm) for 2 hours an aliquot was removed and NMR had indicated complete conversion. The golden yellow mixture was diluted with anhydrous de-oxygenated hexanes (10 mL), concentrated, suspended in hexanes (5 mL), concentrated, this process was repeated once more to remove residual C$_6$D$_6$ and toluene, suspended in hexanes-toluene (10.5 mL, 20:1), stirred vigorously (1000 rpm), the resultant dark golden yellow mixture was then filtered through a 0.45 μm submicron PTFE filter, rinsed with hexanes-toluene (3×3 mL, 20:1), and concentrated to afford the hafnium metal-ligand complex MCI-27 as a golden yellow foam (103.5 mg, 0.1133 mmol, 77%, 98% pure). NMR indicated product is approximately 98% pure by $^1$H- and $^{31}$P-NMR.

$^1$H NMR (500 MHz, Benzene-d$_6$) δ 7.92-7.89 (m, 1H), 7.35-7.32 (m, 1H), 7.22 (ddd, J=8.3, 6.8, 1.3 Hz, 1H), 7.19-7.12 (m, 5H), 7.12-7.08 (m, 12H), 7.04 (ddt, J=8.7, 6.7, 1.7 Hz, 2H), 6.93-6.89 (m, 3H), 6.88-6.83 (m, 2H), 6.72 (d, J=6.4 Hz, 2H), 6.67-6.63 (m, 6H), 6.61 (q, J=7.6, 6.3 Hz, 2H), 4.79-4.69 (d, J=16.0 Hz, 1H), 4.55 (d, J=16.0 Hz, 1H), 1.94 (s, 6H). $^{31}$P NMR (202 MHz, Benzene-d$_6$) δ -6.18. $^{13}$C NMR (126 MHz, Benzene-d$_6$) δ 186.19 (d, J=62.0 Hz), 142.72, 139.67, 134.26 (d, J=22.5 Hz), 134.03 (d, J=21.6 Hz), 133.99, 130.24, 129.06, 128.34, 128.31, 127.33, 127.32, 127.00, 125.70, 125.64, 125.44, 124.93, 124.43, 123.17 (d, J=2.3 Hz), 122.82, 84.00, 52.47 (d, J=11.0 Hz).

Synthesis of MCI-28

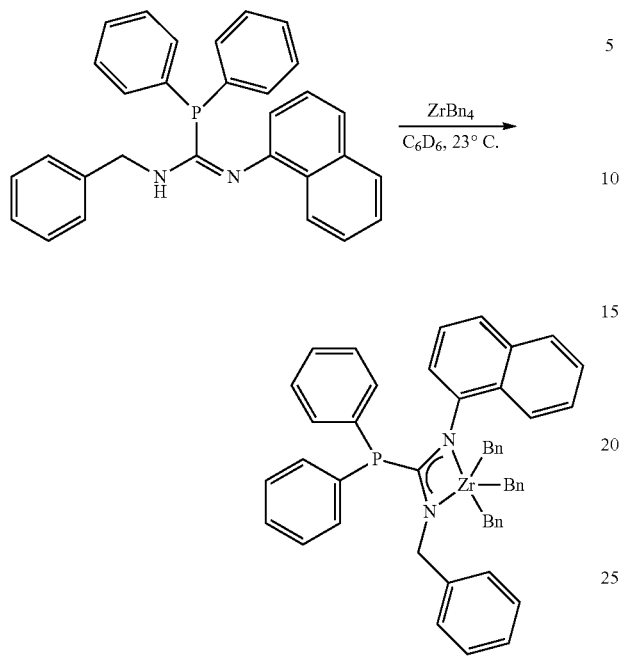

To a clear pale yellow solution of the phosphaguanidine (76.8 mg, 0.1728 mmol, 1.00 eq) in C$_6$D$_6$ (1.0 mL) in a nitrogen filled glovebox at 23° C. was added a solution of ZrBn$_4$ (78.5 mg, 0.1728 mmol, 1.10 eq) in C$_6$D$_6$ (0.78 mL) in a quick dropwise manner. After stirring (300 rpm) for 2 hours an aliquot was removed and NMR had indicated complete conversion. The golden yellow mixture was diluted with anhydrous de-oxygenated hexanes (10 mL), concentrated, suspended in hexanes (5 mL), concentrated, this process was repeated once more to remove residual C$_6$D$_6$ and toluene, suspended in hexanes (5 mL), the resultant golden brown mixture was then filtered through a 0.45 μm submicron PTFE filter, rinsed with hexanes (3×2 mL), and concentrated to afford the zirconium metal-ligand complex MCI-28 as a dark brown solid (125.7 mg, 0.1524 mmol, 88%, approximately 98% pure). NMR indicated product is approximately 98% pure by $^1$H- and $^{31}$P-NMR.

$^1$H NMR (500 MHz, Benzene-d$_6$) δ 8.03 (dd, J=8.6, 1.2 Hz, 1H), 7.38-7.33 (m, 1H), 7.26-7.20 (m, 5H), 7.16-7.10 (m, 6H), 7.05 (t, J=7.7 Hz, 7H), 6.95 (dt, J=7.3, 1.1 Hz, 1H), 6.93-6.87 (m, 5H), 6.71 (qd, J=7.6, 7.2, 3.9 Hz, 3H), 6.68-6.60 (m, 3H), 6.56-6.52 (m, 6H), 4.75 (dd, J=16.3, 1.9 Hz, 1H), 4.54 (d, J=16.4 Hz, 1H), 2.18 (d, J=10.5 Hz, 3H), 2.14 (d, J=10.5 Hz, 3H). $^{31}$P NMR (202 MHz, Benzene-d$_6$) δ −6.37. $^{13}$C NMR (126 MHz, Benzene-d$_6$) δ 186.51 (d, J=61.8 Hz), 143.45 (d, J=2.4 Hz), 142.41, 140.15, 134.30 (d, J=22.4 Hz), 134.09, 134.03 (d, J=21.3 Hz), 129.59, 128.66, 128.45, 128.22, 128.16, 128.09, 127.01, 126.77, 125.66, 125.36, 125.19, 125.11, 124.60, 122.90, 122.84 (d, J=2.5 Hz), 75.97, 52.62 (d, J=11.1 Hz).

Synthesis of MCI-29

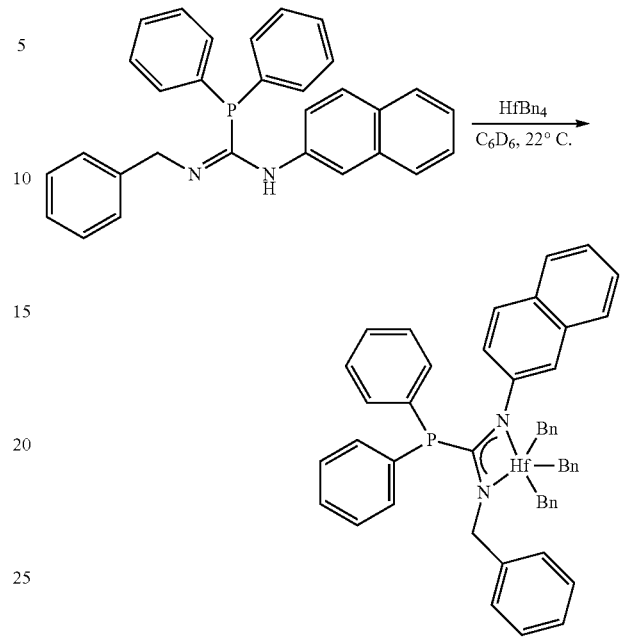

To a clear red solution of the phosphaguanidine (91.0 mg, 0.2049 mmol, 1.00 eq) in C$_6$D$_6$ (1.0 mL) in a nitrogen filled glovebox at 22° C. was added a solution of HfBn$_4$ (111.3 mg, 0.2049 mmol, 1.00 eq) in C$_6$D$_6$ (1.11 mL) in a quick dropwise manner. After stirring (300 rpm) for 2 hours an aliquot was removed and NMR had indicated complete conversion. The golden yellow mixture was diluted with anhydrous de-oxygenated hexanes (10 mL), concentrated, suspended in hexanes (5 mL), concentrated, this process was repeated once more to remove residual C$_6$D$_6$ and toluene, suspended in hexanes (5 mL), the resultant golden brown mixture was then filtered through a 0.45 μm submicron PTFE filter, rinsed with hexanes (3×2 mL), and concentrated to afford the hafnium metal-ligand complex MCI-29 as a golden yellow foam (135.5 mg, 0.1483 mmol, 72%, 98% pure). NMR indicated product is approximately 98% pure by $^1$H- and $^{31}$P-NMR.

$^1$H NMR (500 MHz, Benzene-d$_6$) δ 7.41 (d, J=7.9 Hz, 2H), 7.35 (t, J=8.2 Hz, 2H), 7.26-7.07 (m, 17H), 7.06-6.90 (m, 6H), 6.70 (t, J=7.1 Hz, 8H), 6.62 (t, J=7.4 Hz, 1H), 6.51 (t, J=7.6 Hz, 1H), 4.68 (s, 2H), 1.99 (s, 6H). $^{31}$P NMR (202 MHz, Benzene-d$_6$) δ −7.16. $^{13}$C NMR (126 MHz, Benzene-d$_6$) δ 185.26 (d, J=61.5 Hz), 143.15 (d, J=2.0 Hz), 142.46, 139.90, 134.22 (d, J=21.9 Hz), 133.37, 131.72 (d, J=8.6 Hz), 130.89, 129.14, 128.90, 128.53, 128.24 (d, J=6.6 Hz), 127.30, 127.28, 126.85, 126.74, 125.85, 125.76, 124.82, 123.38, 123.37, 122.97, 83.37, 52.36 (d, J=10.9 Hz).

Synthesis of MCI-30

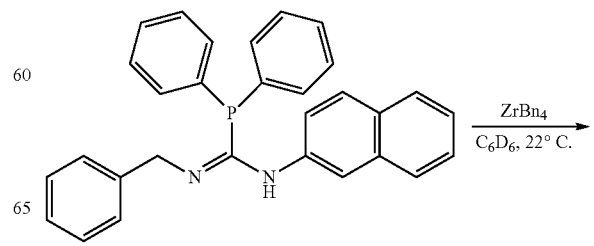

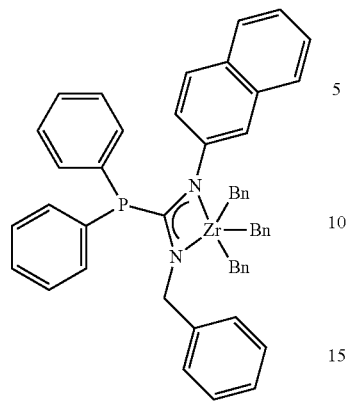

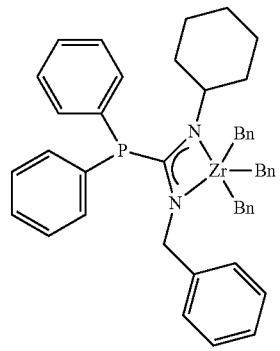

To a clear red solution of the phosphaguanidine (146.5 mg, 0.3298 mmol, 1.00 eq) in $C_6D_6$ (2.0 mL) in a nitrogen filled glovebox at 22° C. was added a solution of $ZrBn_4$ (149.8 mg, 0.3298 mmol, 1.00 eq) in $C_6D_6$ (1.50 mL) in a quick dropwise manner. After stirring (300 rpm) for 2 hours an aliquot was removed and NMR had indicated complete conversion. The golden brown mixture was diluted with anhydrous de-oxygenated hexanes (10 mL), concentrated, suspended in hexanes (5 mL), concentrated, this process was repeated once more to remove residual $C_6D_6$ and toluene, suspended in hexanes-toluene (10.5 mL, 20:1), stirred vigorously (1000 rpm), the resultant dark golden yellow mixture was then filtered through a 0.45 μm submicron PTFE filter, rinsed with hexanes-toluene (3×3 mL, 20:1), and concentrated to afford the zirconium metal-ligand complex MCI-30 as a dark brown solid (238.5 mg, 0.2653 mmol, 80%, 90% pure). NMR indicated product is approximately 90% pure by $^1$H- and $^{31}$P-NMR.

$^1$H NMR (500 MHz, Benzene-$d_6$) δ 7.43-7.38 (m, 2H), 7.35 (d, J=8.0 Hz, 1H), 7.26-7.21 (m, 4H), 7.17-7.10 (m, 6H), 7.07 (t, J=7.3 Hz, 6H), 7.04-6.99 (m, 2H), 6.93 (t, J=7.4 Hz, 2H), 6.77-6.69 (m, 7H), 6.59 (d, J=7.7 Hz, 6H), 6.52 (t, J=7.6 Hz, 1H), 4.69 (s, 2H), 2.20 (s, 6H). $^{31}$P NMR (202 MHz, Benzene-$d_6$) δ −7.50. $^{13}$C NMR (126 MHz, Benzene-$d_6$) δ 185.18 (d, J=61.0 Hz), 143.94 (d, J=2.8 Hz), 142.12, 140.25, 134.16 (d, J=21.8 Hz), 133.53, 132.25 (d, J=9.5 Hz), 130.76, 129.64, 128.78, 128.45, 128.19 (d, J=3.4 Hz), 128.11, 127.32, 127.22, 126.86, 126.63, 125.96, 125.80, 124.71, 123.09 (d, J=2.3 Hz), 123.04, 75.59, 52.78 (d, J=11.6 Hz).

Synthesis of MCI-31

To the neat clear golden yellow phosphaguanidine (30.2 mg, 0.0754 mmol, 1.00 eq) in a nitrogen filled glovebox at 24° C. was added a solution of $ZrBn_4$ (34.3 mg, 0.0754 mmol, 1.00 eq) in $C_6D_6$ (0.65 mL) in a quick dropwise manner. After stirring (300 rpm) for 1 hour an aliquot was removed and NMR had indicated complete conversion to the metal-ligand complex. The golden yellow solution was diluted with anhydrous de-oxygenated hexanes (10 mL), concentrated, suspended in hexanes (5 mL), concentrated, this process was repeated once more to remove residual $C_6D_6$ and toluene, the golden yellow solid was suspended in hexanes (5 mL), the resultant mixture was then filtered through a 0.45 μm submicron PTFE filter, rinsed with hexanes (3×2 mL), and concentrated to afford the zirconium metal-ligand complex MCI-31 as a golden yellow foam (51.8 mg, 0.0643 mmol, 85%, 95% pure). NMR indicated product is approximately 95% pure by $^1$H- and $^{31}$P-NMR.

$^1$H NMR (500 MHz, Benzene-$d_6$) δ 7.34 (td, J=8.0, 1.5 Hz, 4H), 7.14-7.10 (m, 8H), 7.03-6.90 (m, 12H), 6.83-6.79 (m, 6H), 4.78 (d, J=2.6 Hz, 2H), 3.63 (tt, J=10.9, 3.9 Hz, 1H), 2.32 (s, 6H), 1.70-1.11 (m, 6H), 0.96-0.76 (m, 2H), 0.76-0.59 (m, 2H). $^{31}$P NMR (202 MHz, Benzene-$d_6$) δ −17.81. $^{13}$C NMR (126 MHz, Benzene-$d_6$) δ 183.13 (d, J=62.9 Hz), 143.08, 141.19, 132.79 (d, J=19.5 Hz), 132.55 (d, J=13.9 Hz), 129.41, 128.72, 128.67, 128.12, 127.97, 127.93, 126.70, 126.19, 122.79, 76.09, 58.85 (d, J=9.5 Hz), 52.83 (d, J=20.2 Hz), 34.41, 25.56, 25.25.

Synthesis of MCI-32

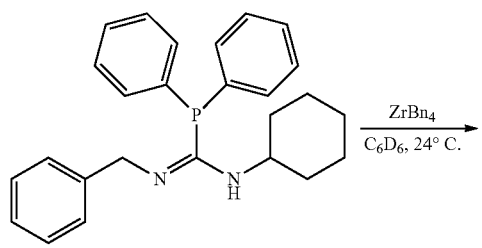

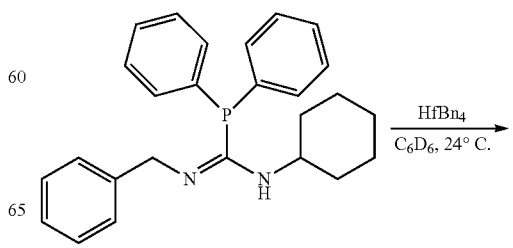

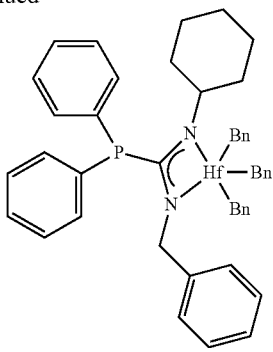

To a clear golden yellow solution of the phosphaguanidine (32.7 mg, 0.0817 mmol, 1.00 eq) in $C_6D_6$ (0.40 mL) in a nitrogen filled glovebox at 24° C. was added a solution of HfBn$_4$ (44.3 mg, 0.0817 mmol, 1.00 eq) in $C_6D_6$ (0.44 mL) in a quick dropwise manner. After stirring (300 rpm) for 1 hour an aliquot was removed and NMR had indicated complete conversion. The golden yellow solution was diluted with anhydrous de-oxygenated hexanes (10 mL), concentrated, suspended in hexanes (5 mL), concentrated, this process was repeated once more to remove residual $C_6D_6$ and toluene, the golden yellow solid was suspended in hexanes (5 mL), stirred vigorously (1000 rpm) for 2 minutes, the resultant golden yellow mixture was then filtered through a 0.45 µm submicron PTFE filter, rinsed with hexanes (3×2 mL), and concentrated to afford the hafnium metal-ligand complex MCI-32 as a golden yellow foam (69.0 mg, 0.0768 mmol, 94%, approximately 95% pure). NMR indicated product is approximately 95% pure by $^1$H- and $^{31}$P-NMR.

$^1$H NMR (500 MHz, Benzene-d$_6$) δ 7.28-7.24 (m, 4H), 7.19-7.15 (m, 6H), 7.01-6.88 (m, 20H), 4.76 (m, 2H), 3.71 (td, J=11.7, 10.5, 5.2 Hz, 1H), 2.16 (s, 6H), 1.44-1.25 (m, 6H), 0.93-0.79 (m, 2H), 0.71-0.58 (m, 2H). $^{31}$P NMR (202 MHz, Benzene-d$_6$) δ −17.16. $^{13}$C NMR (126 MHz, Benzene-d$_6$) δ 182.67 (d, J=63.0 Hz), 143.53, 140.70, 132.87 (d, J=19.8 Hz), 132.01 (d, J=13.3 Hz), 128.81 (d, J=21.5 Hz), 128.79, 128.17, 128.09, 128.04, 126.79, 126.30, 122.60, 85.95, 58.13 (d, J=9.8 Hz), 52.47 (d, J=18.8 Hz), 34.48, 25.46, 25.10.

Synthesis of MCI-34

To a clear golden yellow solution of the phosphaguanidine (39.4 mg, 0.0933 mmol, 1.00 eq) in $C_6D_6$ (0.50 mL) in a nitrogen filled glovebox at 12° C. was added a solution of ZrBn$_4$ (42.3 mg, 0.0933 mmol, 1.00 eq) in $C_6D_6$ (0.42 mL) in a quick dropwise manner. After stirring (300 rpm) for 1 hour an aliquot was removed and NMR had indicated complete conversion. The golden yellow solution was diluted with anhydrous de-oxygenated hexanes (10 mL), concentrated, suspended in hexanes (5 mL), concentrated, this process was repeated once more to remove residual $C_6D_6$ and toluene, suspended in hexanes (5 mL), the resultant golden yellow mixture was then filtered through a 0.45 µm submicron PTFE filter, rinsed with hexanes (3×2 mL), and concentrated to afford the zirconium metal-ligand complex MCI-34 as a dark golden brown viscous foam (50.0 mg, 0.0553 mmol, 59%, 87% pure). NMR indicated product is approximately 87% pure by $^1$H- and $^{31}$P-NMR.

$^1$H NMR (500 MHz, Benzene-d$_6$) δ 7.30 (dddd, J=9.6, 5.3, 2.6, 1.5 Hz, 4H), 7.10 (dt, J=13.5, 7.4 Hz, 8H), 7.04-6.98 (m, 2H), 6.95-6.90 (m, 4H), 6.83 (ddq, J=5.2, 3.5, 1.9 Hz, 6H), 6.63-6.60 (m, 6H), 6.27 (s, 1H), 6.26 (s, 2H), 4.68 (s, 2H), 2.19 (s, 6H), 1.89 (s, 6H). $^{31}$P NMR (202 MHz, Benzene-d$_6$) δ −7.99. $^{13}$C NMR (126 MHz, Benzene-d$_6$) δ 184.74 (d, J=61.0 Hz), 145.86 (d, J=2.9 Hz), 142.29, 140.41, 137.32, 134.47 (d, J=12.5 Hz), 134.23 (d, J=21.1 Hz), 132.61 (d, J=9.6 Hz), 130.52, 129.52, 128.65, 128.41, 128.30, 128.13, 128.08, 128.01, 124.06, 124.04, 122.90, 75.38, 52.71 (d, J=11.5 Hz), 20.68.

Synthesis of MCI-33

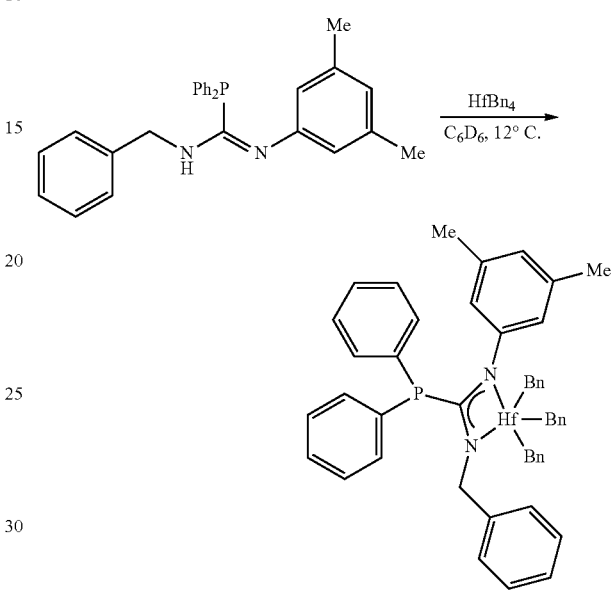

To a clear golden yellow solution of the phosphaguanidine (67.0 mg, 0.1586 mmol, 1.00 eq) in $C_6D_6$ (0.70 mL) in a nitrogen filled glovebox at 12° C. was added a solution of HfBn$_4$ (86.1 mg, 0.1586 mmol, 1.00 eq) in $C_6D_6$ (0.86 mL) in a quick dropwise manner. After stirring (300 rpm) for 1 hour an aliquot was removed and NMR had indicated complete conversion. The golden yellow solution was diluted with anhydrous de-oxygenated hexanes (10 mL), concentrated, suspended in hexanes (5 mL), concentrated, this process was repeated once more to remove residual $C_6D_6$ and toluene, the golden yellow solid was suspended in hexanes (5 mL), the resultant golden yellow mixture was then filtered through a 0.45 µm submicron PTFE filter, rinsed with hexanes (3×2 mL), and concentrated to afford the hafnium metal-ligand complex MCI-33 as a golden yellow viscous foam (87.0 mg, 0.0856 mmol, 54%, 86% pure). NMR indicated product is approximately 86% pure by $^1$H- and $^{31}$P-NMR.

$^1$H NMR (500 MHz, Benzene-d$_6$) δ 7.24-7.20 (m, 4H), 7.15-7.11 (m, 6H), 7.08 (d, J=2.1 Hz, 2H), 6.94-6.90 (m, 4H), 6.83-6.78 (m, 5H), 6.74-6.71 (m, 6H), 6.26-6.25 (m, 1H), 6.22 (d, J=1.6 Hz, 2H), 4.66 (d, J=1.7 Hz, 2H), 1.97 (s, 7H), 1.88 (s, 6H). $^{31}$P NMR (202 MHz, Benzene-d$_6$) δ −7.63. $^{13}$C NMR (126 MHz, Benzene-d$_6$) δ 184.78 (d, J=61.6 Hz), 145.10, 142.64, 140.04, 137.29, 134.29 (d, J=21.9 Hz), 132.09 (d, J=9.2 Hz), 129.02, 128.80, 128.50, 128.16 (d, J=9.5 Hz), 128.09 (d, J=8.5 Hz), 126.83, 126.64, 126.15, 124.13, 124.12, 122.83, 83.30, 52.29 (d, J=11.3 Hz), 20.69.

Synthesis of MCI-35

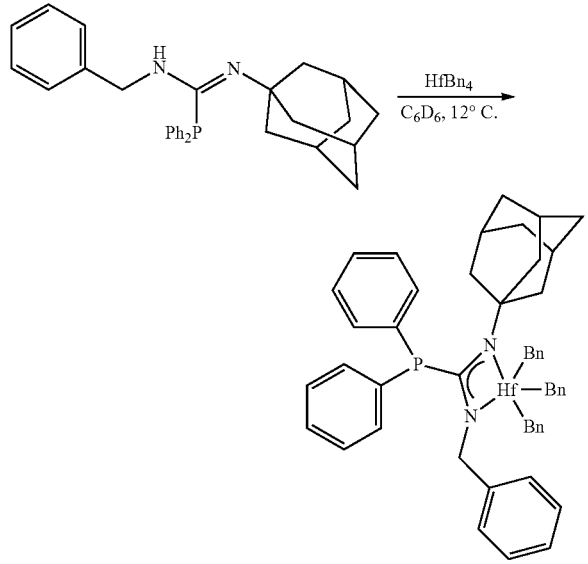

To a clear golden yellow solution of the phosphaguanidine (28.4 mg, 0.0628 mmol, 1.00 eq) in $C_6D_6$ (0.50 mL) in a nitrogen filled glovebox at 12° C. was added a solution of $HfBn_4$ (34.1 mg, 0.0628 mmol, 1.00 eq) in $C_6D_6$ (0.34 mL) in a quick dropwise manner. After stirring (300 rpm) for 1 hour an aliquot was removed and NMR had indicated complete conversion. The golden yellow solution was diluted with anhydrous de-oxygenated hexanes (10 mL), concentrated, suspended in hexanes (5 mL), concentrated, this process was repeated once more to remove residual $C_6D_6$ and toluene, suspended in hexanes (5 mL), the resultant golden yellow mixture was then filtered through a 0.45 µm submicron PTFE filter, rinsed with hexanes (3×2 mL), and concentrated to afford the hafnium metal-ligand complex MCI-35 as a golden yellow foam (37.8 mg, 0.0376 mmol, 60%, 90% pure). NMR indicated product is approximately 90% pure by $^1$H- and $^{31}$P-NMR.

$^1$H NMR (500 MHz, Benzene-$d_6$) δ 7.30 (ddd, J=8.1, 7.0, 1.3 Hz, 4H), 7.24-7.20 (m, 6H), 7.10-7.07 (m, 6H), 6.95 (td, J=7.6, 1.9 Hz, 4H), 6.93-6.88 (m, 4H), 6.88-6.81 (m, 4H), 6.35-6.30 (m, 2H), 4.59 (s, 2H), 2.31 (s, 6H), 2.17 (d, J=2.9 Hz, 6H), 1.87 (s, 3H), 1.58 (d, J=11.7 Hz, 3H), 1.45 (t, J=12.0 Hz, 3H). $^{13}$C NMR (126 MHz, Benzene-$d_6$) δ 181.93 (d, J=74.5 Hz), 144.47, 139.29, 131.51, 131.41 (d, J=17.2 Hz), 128.85 (d, J=5.7 Hz), 128.52 (d, J=8.5 Hz), 127.93, 127.74, 125.61, 125.58, 122.22, 88.62, 56.11, 52.86, 43.74, 43.64, 35.82, 29.93. $^{31}$P NMR (202 MHz, Benzene-$d_6$) δ −10.20.

Synthesis of MCI-36

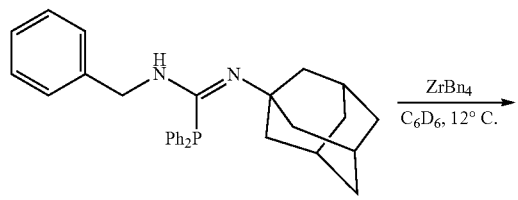

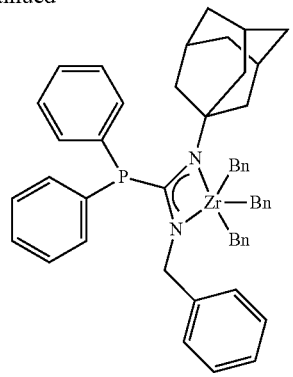

To a clear golden yellow solution of the phosphaguanidine (40.0 mg, 0.0884 mmol, 1.00 eq) in $C_6D_6$ (0.50 mL) in a nitrogen filled glovebox at 12° C. was added a solution of $ZrBn_4$ (40.1 mg, 0.0884 mmol, 1.00 eq) in $C_6D_6$ (0.40 mL) in a quick dropwise manner. After stirring (300 rpm) for 1 hour, an aliquot was removed and NMR had indicated complete conversion. The golden yellow solution was diluted with anhydrous de-oxygenated hexanes (10 mL), concentrated, suspended in hexanes (5 mL), concentrated, this process was repeated once more to remove residual $C_6D_6$ and toluene, suspended in hexanes (5 mL), the resultant golden yellow mixture was then filtered through a 0.45 µm submicron PTFE filter, rinsed with hexanes (3×2 mL), and concentrated to afford the zirconium metal-ligand complex MCI-36 as a golden orange foam (52.8 mg, 0.0582 mmol, 66% yield, approximately 90% pure). NMR indicated product is approximately 90% pure by $^1$H- and $^{31}$P-NMR with residual starting free ligand and there is also fluctionality most likely due to different binding modes of the tribenzyl moiety causing broadness of peaks as well as the presence of minor peaks.

$^1$H NMR (500 MHz, Benzene-$d_6$) δ 7.41 (ddd, J=8.0, 6.9, 1.2 Hz, 4H), 7.20-7.16 (m, 6H), 6.99 (ddd, J=19.9, 8.1, 1.7 Hz, 10H), 6.94-6.86 (m, 8H), 6.46-6.41 (m, 2H), 4.58 (s, 2H), 2.55 (s, 6H), 2.12 (d, J=2.8 Hz, 6H), 1.85 (s, 3H), 1.60-1.41 (m, 6H). $^{31}$P NMR (202 MHz, Benzene-$d_6$) δ −10.90. $^{13}$C NMR (126 MHz, Benzene-$d_6$) δ 181.28 (d, J=74.4 Hz), 144.04, 139.80, 134.04 (d, J=19.6 Hz), 131.92 (d, J=20.0 Hz), 131.36 (d, J=17.4 Hz), 129.01, 128.86, 128.82, 128.43, 125.76, 125.57, 122.38, 78.49, 56.45 (d, J=2.8 Hz), 53.36, 43.74, 43.64, 41.64, 36.54, 35.86, 29.97, 29.66.

Synthesis of MCI-37

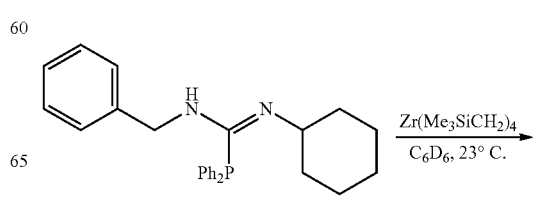

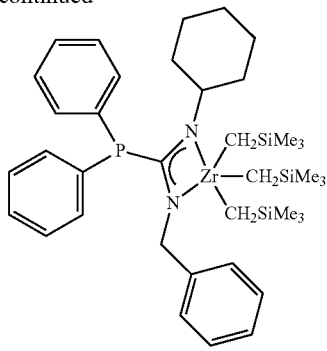

To a clear colorless solution of the phosphaguanidine (15.5 mg, 0.0387 mmol, 1.00 eq) in $C_6D_6$ (0.5 mL) was added a solution of the $(Me_3SiCH_2)_4Zr$ (17.0 mg, 0.0387 mmol, 1.00 eq) in anhydrous de-oxgyenated $C_6D_6$ (0.17 mL) in a dropwise manner. After stirring for 1 hour, an aliquot was removed and NMR had indicated complete conversion to the mono-[2,1] metal-ligand complex. The now clear slightly pale yellow solution was concentrated, diluted with pentane (3 mL), concentrated, this process was repeated 2× more, diluted with pentane (5 mL), the resultant opaque heterogeneous mixture was stirred vigorously (1000 rpm) for 1 min, filtered through a 0.45 μm submicron PTFE filter, rinsed with pentane (3×3 mL), and concentrated to afford the zirconium metal-ligand complex MCI-37 as a white amorphous foam (25.4 mg, 0.0338 mmol, 87%). NMR had indicated pure product which contains trace residual pentane.

$^1$H NMR (500 MHz, Benzene-$d_6$) δ 7.55-7.42 (m, 4H), 7.08 (d, J=6.6 Hz, 2H), 7.06-7.02 (m, 2H), 7.00-6.96 (m, 4H), 6.96-6.90 (m, 3H), 4.85 (s, 1H), 4.84 (s, 1H), 3.71-3.57 (m, 1H), 1.61 (d, J=11.2 Hz, 2H), 1.53-1.43 (m, 5H), 1.32 (d, J=12.4 Hz, 1H), 1.11 (s, 6H), 1.01-0.87 (m, 1H), 0.77 (d, J=13.3 Hz, 1H), 0.28 (s, 27H). $^{31}$P NMR (202 MHz, Benzene-$d_6$) δ -18.46. $^{13}$C NMR (126 MHz, Benzene-$d_6$) δ 181.34 (d, J=61.0 Hz), 141.03, 132.79 (d, J=19.1 Hz), 132.47, 132.36, 128.91, 128.76 (d, J=6.7 Hz), 127.10, 126.40, 69.75, 57.22 (d, J=12.4 Hz), 53.31 (d, J=17.1 Hz), 35.91, 25.37, 25.31, 2.97.

Synthesis of MCI-38

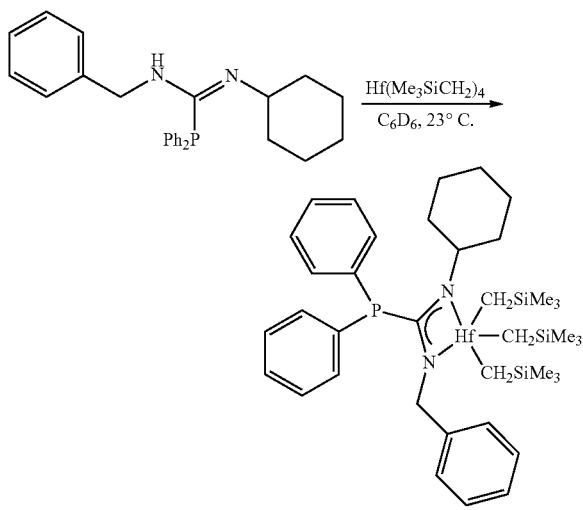

To a clear colorless solution of the phosphaguanidine (17.0 mg, 0.0425 mmol, 1.00 eq) in $C_6D_6$ (0.5 mL) a solution of the $(Me_3SiCH_2)_4Hf$ (22.4 mg, 0.0425 mmol, 1.00 eq) in anhydrous de-oxygenated $C_6D_6$ (0.22 mL) was added in a dropwise manner. After stirring (300 rpm) for 1 hour an aliquot was removed and NMR had indicated complete conversion to the mono-[2,1] metal-ligand complex. The now clear slightly pale yellow solution was concentrated, diluted with pentane (3 mL), concentrated, this process was repeated 2× more, diluted with pentane (5 mL), the resultant opaque heterogeneous mixture was stirred vigorously (1000 rpm) for 1 min, filtered through a 0.45 μm submicron PTFE filter, rinsed with pentane (3×3 mL), and concentrated to afford the hafnium metal-ligand complex MCI-38 as a clear pale yellow amorphous foam (29.5 mg, 0.0351 mmol, 83%). NMR had indicated product which contains trace residual pentane, tetramethylsilane, and trace impurities.

$^1$H NMR (500 MHz, Benzene-$d_6$) δ 7.46 (td, J=8.1, 1.3 Hz, 4H), 7.09-7.00 (m, 4H), 6.98 (td, J=7.7, 7.3, 1.6 Hz, 4H), 6.95-6.89 (m, 3H), 4.91 (d, J=2.5 Hz, 2H), 3.87-3.72 (m, 1H), 1.61-1.39 (m, 5H), 1.36-1.08 (m, 2H), 0.99-0.86 (m, 1H), 0.80-0.68 (m, 2H), 0.52 (s, 6H), 0.29 (s, 27H). $^{31}$P NMR (202 MHz, Benzene-$d_6$) δ -17.45. $^{13}$C NMR (126 MHz, Benzene-$d_6$) δ 181.38 (d, J=61.9 Hz), 140.81, 133.95, 132.93 (d, J=19.9 Hz), 132.20 (d, J=13.3 Hz), 128.90 (d, J=27.1 Hz), 128.74, 127.96, 127.19, 126.45, 76.29, 57.10 (d, J=12.2 Hz), 52.92 (d, J=17.2 Hz), 35.68, 25.37, 25.30, 3.34.

Synthesis of MCI-39

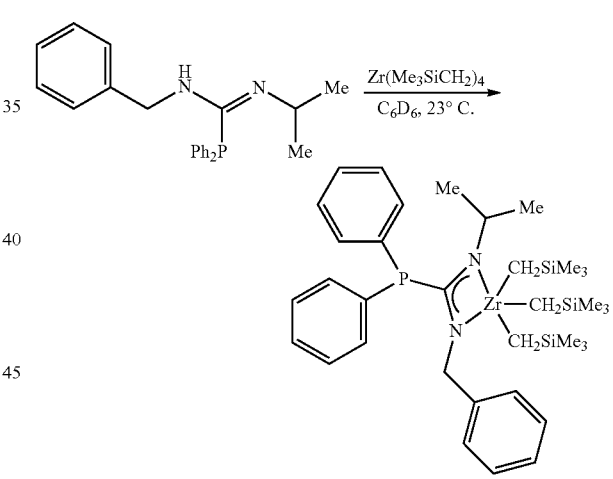

To a clear pale yellow solution of the phosphaguanidine (49.6 mg, 0.1376 mmol, 1.00 eq) in $C_6D_6$ (1.0 mL) was added a solution of the $(Me_3SiCH_2)_4Zr$ (62.4 mg, 0.1376 mmol, 1.00 eq) in anhydrous de-oxgyenated $C_6D_6$ (0.62 mL) in a dropwise manner. After stirring (300 rpm) for 1 hour, an aliquot was removed and NMR indicated complete conversion to the mono-[2,1] complex. The now pale golden yellow opaque mixture was concentrated, diluted with hexanes (3 mL), concentrated, this process was repeated 2× more, diluted with hexanes (5 mL), stirred vigorously (1000 rpm) for 1 min, filtered through a 0.45 μm submicron PTFE filter, rinsed with hexanes (3×3 mL), and concentrated to afford the zirconium metal-ligand complex MCI-39 as a clear pale yellow amorphous foam (89.5 mg, 0.1255 mmol, 91%). NMR indicated pure product.

$^1$H NMR (500 MHz, Benzene-$d_6$) δ 7.46 (tt, J=8.0, 1.1 Hz, 4H), 7.03-7.02 (m, 4H), 7.01-6.95 (m, 4H), 6.95-6.89

(m, 3H), 4.83-4.74 (m, 2H), 4.21-4.07 (m, 1H), 1.07 (d, J=1.0 Hz, 6H), 0.98 (dd, J=6.4, 0.8 Hz, 6H), 0.27 (d, J=0.9 Hz, 27H). ³¹P NMR (202 MHz, Benzene-d₆) δ −18.91. ¹³C NMR (126 MHz, Benzene-d₆) δ 181.22 (d, J=60.1 Hz), 140.94, 132.72 (d, J=19.1 Hz), 132.20 (d, J=13.8 Hz), 128.81 (d, J=22.9 Hz), 128.77, 127.94, 127.06, 126.38, 69.70, 53.30 (d, J=14.5 Hz), 49.41 (d, J=16.2 Hz), 24.93, 2.95.

Synthesis of MCI-40

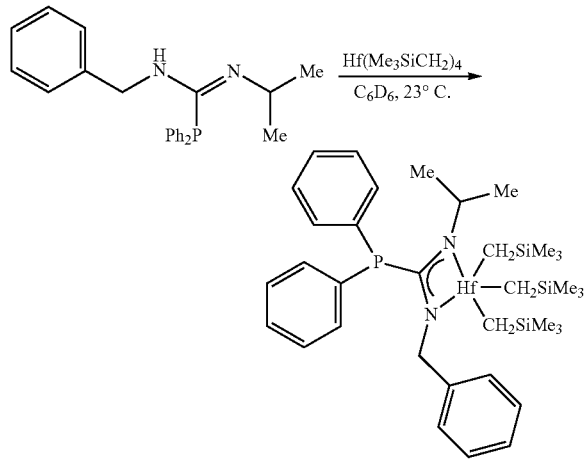

To a clear colorless solution of the phosphaguanidine (52.8 mg, 0.1465 mmol, 1.00 eq) in anhydrous de-oxygenated C₆D₆ (1.0 mL) in a nitrogen filled glovebox at 23° C. was added a solution of the (Me₃SiCH₂)₄Hf (79.2 mg, 0.1465 mmol, 1.00 eq) in C₆D₆ (0.80 mL) in a dropwise manner. After stirring (300 rpm) for 1 hour, an aliquot was removed and NMR had indicated complete conversion to the mono-[2,1] metal-ligand complex. The now clear slightly pale yellow solution was concentrated, diluted with anhydrous de-oxygenated pentane (3 mL), concentrated, this process was repeated 2× more, diluted with pentane (5 mL), the resultant opaque heterogeneous mixture was stirred vigorously (1000 rpm) for 1 min, filtered through a 0.45 μm submicron PTFE filter, rinsed with pentane (3×3 mL), and concentrated to afford the hafnium metal-ligand complex MCI-40 as a clear pale yellow amorphous foam (105.9 mg, 0.1323 mmol, 90%). NMR had indicated pure product which contains trace residual pentane.

¹H NMR (500 MHz, Benzene-d₆) δ 7.47-7.42 (m, 4H), 7.03-7.00 (m, 4H), 7.00-6.96 (m, 4H), 6.95-6.90 (m, 3H), 4.85 (s, 1H), 4.84 (s, 1H), 4.35-4.23 (m, 1H), 0.96 (d, J=6.4 Hz, 6H), 0.48 (s, 6H), 0.27 (s, 27H). ³¹P NMR (202 MHz, Benzene-d₆) δ −17.97. ¹³C NMR (126 MHz, Benzene-d₆) δ 181.25 (d, J=61.3 Hz), 140.72, 132.85 (d, J=19.1 Hz), 131.90, 128.89 (d, J=29.5 Hz), 128.72, 127.93, 127.16, 126.43, 76.22, 52.90 (d, J=14.5 Hz), 49.29 (d, J=15.3 Hz), 24.73, 3.31.

Synthesis of MCI-41

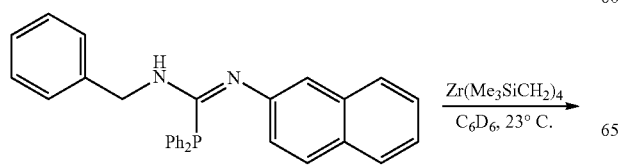

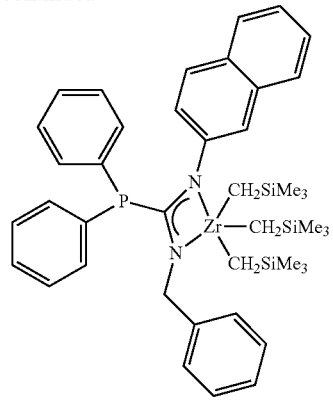

To a clear pale red solution of the phosphaguanidine (70.2 mg, 0.1579 mmol, 1.00 eq) in C₆D₆ (1.0 mL) was added a solution of the (Me₃SiCH₂)₄Zr (71.6 mg, 0.1376 mmol, 1.00 eq) in anhydrous de-oxygenated C₆D₆ (0.71 mL) in a dropwise manner. After stirring (300 rpm) for 1 hour, an aliquot was removed and NMR had indicated complete metallation of the ligand. The now clear red-orange solution was concentrated, diluted with hexanes (3 mL), concentrated, this process was repeated 2× more, diluted with hexanes (5 mL), stirred vigorously (1000 rpm) for 1 min, filtered through a 0.45 μm submicron PTFE filter, rinsed with hexanes (3×3 mL), and concentrated to afford the zirconium metal-ligand complex MCI-41 as a clear pale yellow amorphous foam (108.8 mg, 0.1365 mmol, 86%). NMR had indicated pure product.

¹H NMR (400 MHz, Benzene-d₆) δ 7.42-7.36 (m, 4H), 7.36-7.30 (m, 3H), 7.21-7.15 (m, 3H), 7.14-6.97 (m, 6H), 6.81-6.71 (m, 6H), 4.67 (d, J=2.3 Hz, 2H), 1.08 (s, 6H), 0.19 (s, 27H). ³¹P NMR (162 MHz, Benzene-d₆) δ −8.75. ¹³C NMR (101 MHz, Benzene-d₆) δ 182.61 (d, J=60.7 Hz), 143.91 (d, J=3.0 Hz), 139.75, 133.62, 133.58 (d, J=20.8 Hz), 132.06 (d, J=10.7 Hz), 130.75, 128.83, 128.34 (d, J=3.2 Hz), 128.29, 128.25, 127.30, 127.07, 126.94, 125.85, 125.54, 124.50, 122.63, 122.61, 71.50, 53.33 (d, J=13.5 Hz), 2.76.

Synthesis of MCI-42

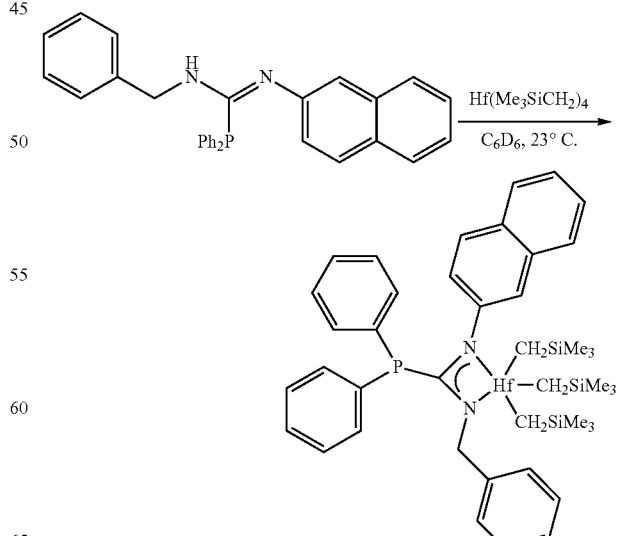

To a clear pale red solution of the phosphaguanidine (41.7 mg, 0.0938 mmol, 1.00 eq) in C$_6$D$_6$ (0.41 mL) was added a solution of the (Me$_3$SiCH$_2$)$_4$Hf (50.8 mg, 0.0938 mmol, 1.00 eq) in anhydrous de-oxygenated C$_6$D$_6$ (0.51 mL) in a dropwise manner. After stirring for 1 hour, an aliquot was removed and NMR had indicated complete metallation of the ligand. The now clear red-orange solution was concentrated, diluted with hexanes (3 mL), concentrated, this process was repeated 2× more, diluted with hexanes (5 mL), stirred vigorously (1000 rpm) for 1 min, filtered through a 0.45 μm submicron PTFE filter, rinsed with hexanes (3×3 mL), and concentrated to afford the hafnium metal-ligand complex MCI-42 as a clear pale red-orange amorphous foam (76.7 mg, 0.0868 mmol, 93%). NMR had indicated pure product.

$^1$H NMR (500 MHz, Benzene-d$_6$) δ 7.38 (td, J=8.1, 1.5 Hz, 4H), 7.35-7.30 (m, 2H), 7.24-7.17 (m, 3H), 7.15-7.05 (m, 7H), 7.05-6.99 (m, 1H), 6.81-6.72 (m, 5H), 4.77 (d, J=2.3 Hz, 2H), 0.51 (s, 6H), 0.22 (s, 27H). $^{31}$P NMR (162 MHz, Benzene-d$_6$) δ −7.94. $^{13}$C NMR (126 MHz, Benzene-d$_6$) δ 182.76 (d, J=61.1 Hz), 143.31, 139.58, 133.71 (d, J=21.0 Hz), 133.48, 131.79 (d, J=9.6 Hz), 130.86, 128.92, 128.34 (d, J=8.1 Hz), 128.19, 127.93, 127.28, 127.09, 127.01, 125.83, 125.56, 124.61, 122.94, 122.93, 77.71, 52.96 (d, J=13.3 Hz), 3.13.

Synthesis of MCI-10

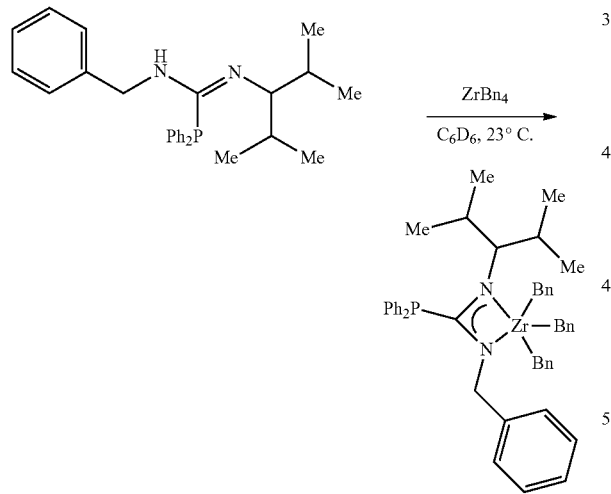

To a clear golden yellow solution of the phosphaguanidine (19.9 mg, 0.0478 mmol, 1.00 eq) in C$_6$D$_6$ (0.50 mL) in a nitrogen filled glovebox at 23° C. was added a solution of ZrBn$_4$ (21.7 mg, 0.0478 mmol, 1.00 eq) in C$_6$D$_6$ (0.22 mL) in a quick dropwise manner. After stirring (300 rpm) for 1 hour an aliquot was removed and NMR had indicated approximately 44% conversion to product. After 2.5 hours approximately 73% conversion was observed. After stirring for 5 hours >95% conversion of starting ligand to metal-ligand complex was observed. The now dark brown solution was diluted with anhydrous de-oxygenated hexanes (10 mL), concentrated, suspended in hexanes (5 mL), concentrated, this process was repeated once more to remove residual C$_6$D$_6$ and toluene, suspended in hexanes (5 mL), the resultant golden yellow mixture was then filtered through a 0.45 μm submicron PTFE filter, rinsed with hexanes (3×2 mL), and concentrated to afford the zirconium metal-ligand complex MCI-10 as a dark brown viscous foam (25.0 mg, 0.0320 mmol, 67%, approximately 83% pure). NMR indicated product is approximately 83% pure by $^1$H- and $^{31}$P-NMR containing approximately 17% residual starting ligand.

$^1$H NMR (500 MHz, Benzene-d$_6$) δ 7.38 (td, J=8.0, 1.4 Hz, 4H), 7.07 (t, J=7.7 Hz, 6H), 7.03-6.96 (m, 2H), 6.95-6.86 (m, 10H), 6.75-6.71 (m, 6H), 6.65 (dd, J=6.8, 2.6 Hz, 2H), 4.56 (dt, J=14.4, 7.1 Hz, 1H), 4.34 (s, 2H), 2.37 (s, 6H), 2.14 (ddd, J=13.7, 7.2, 2.3 Hz, 2H), 1.01 (d, J=6.8 Hz, 7H), 0.97 (d, J=6.6 Hz, 7H). $^{31}$P NMR (202 MHz, Benzene-d$_6$) δ −21.45. $^{13}$C NMR (126 MHz, Benzene-d$_6$) δ 185.08 (d, J=59.9 Hz), 143.42, 140.23, 134.11, 133.54 (d, J=20.5 Hz), 132.23 (d, J=14.4 Hz), 129.20, 128.85, 128.73, 128.68, 128.21, 127.93, 126.74, 126.31, 122.86, 78.19, 71.53 (d, J=30.4 Hz), 52.59, 31.40, 21.17, 20.77.

Synthesis of MCI-46

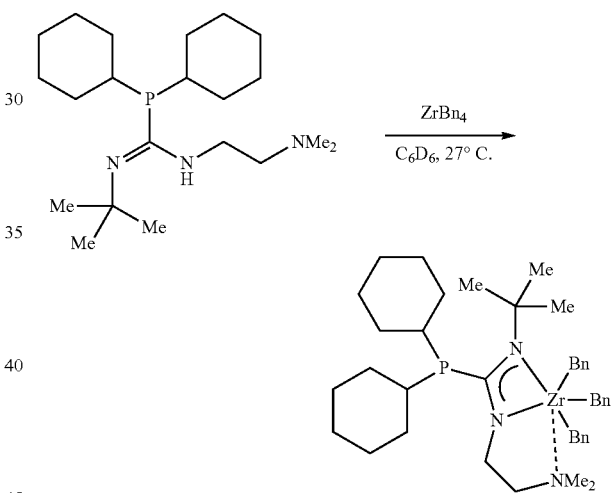

To a stirring (300 rpm) solution of the aminophosphaguanidine (34.7 mg, 0.0944 mmol, 1.00 eq) in C$_6$D$_6$ (0.5 mL) in a nitrogen filled glovebox at 27° C. was added a solution of ZrBn$_4$ (43.0 mg, 0.0944 mmol, 1.00 eq) in C$_6$D$_6$ (0.5 mL). After 6 hours, an aliquot was removed and NMR indicated complete consumption of SM to the metallated complex along with minor impurities indicated in the $^1$H-, $^{13}$C-, and $^{31}$P-NMR. The pale golden brown solution was concentrated to afford the zirconium phosphaguanidine complex MCI-46 as a golden brown solid (68.8 mg, 0.0943 mmol, 100%).

$^1$H NMR (500 MHz, Benzene-d$_6$) δ 7.31 (d, J=6.9 Hz, 7H), 7.19 (t, J=7.5 Hz, 5H), 6.87-6.80 (m, 3H), 3.11 (t, J=5.7 Hz, 2H), 2.58 (s, 6H), 2.04 (t, J=5.7 Hz, 2H), 2.02-1.87 (m, 8H), 1.78 (m, 2H), 1.68 (s, 9H), 1.66-1.61 (m, 2H), 1.58 (m, 2H), 1.54 (s, 6H), 1.45-1.34 (m, 2H), 1.26-1.01 (m, 6H). $^{31}$P NMR (202 MHz, Benzene-d$_6$) δ 2.09. $^{13}$C NMR (126 MHz, Benzene-d$_6$) δ 174.48 (d, J=68.7 Hz), 150.95, 128.92, 127.01, 125.28, 120.54, 74.01, 65.91, 54.90 (d, J=3.6 Hz), 46.23, 44.88, 35.33 (d, J=18.1 Hz), 33.33 (d, J=11.6 Hz), 32.60 (d, J=23.1 Hz), 31.84 (d, J=10.3 Hz), 27.14 (d, J=7.9 Hz), 26.95 (d, J=13.0 Hz), 25.90.

Synthesis of MCI-47

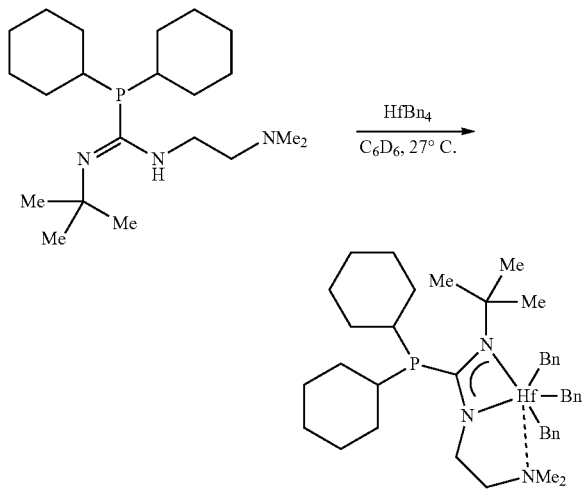

To a stirring (300 rpm) solution of the aminophosphaguanidine (20.9 mg, 0.0569 mmol, 1.00 eq) in C$_6$D$_6$ (0.5 mL) in a nitrogen filled glovebox at 27° C. was added a solution of HfBn$_4$ (30.9 mg, 0.0569 mmol, 1.00 eq) in C$_6$D$_6$ (0.5 mL). After 6 hours, an aliquot was removed and NMR indicated the product with no SM or HfBn$_4$ remaining. The pale golden yellow solution was concentrated to afford the hafnium phosphaguanidine complex MCI-27 as golden yellow solid (46.5 mg, 0.0568 mmol, 100%).

$^1$H NMR (500 MHz, Benzene-d$_6$) δ 7.31 (d, J=7.6 Hz, 6H), 7.22 (t, J=7.6 Hz, 6H), 6.81 (t, J=7.3 Hz, 3H), 3.18 (t, J=5.7 Hz, 2H), 2.15 (s, 6H), 2.18-2.10 (m, 4H), 2.02-1.90 (m, 4H), 1.81-1.75 (m, 4H), 1.70-1.62 (m, 4H), 1.63 (s, 9H), 1.61-1.53 (m, 2H), 1.52 (s, 6H), 1.43-1.33 (m, 2H), 1.28-1.01 (m, 4H). $^{31}$P NMR (202 MHz, Benzene-d$_6$) δ 1.94. $^{13}$C NMR (101 MHz, Benzene-d$_6$) δ 173.31 (d, J=67.8 Hz), 151.58, 128.91, 125.27, 120.59, 78.84, 66.33, 54.66 (d, J=3.1 Hz), 45.88, 44.67, 35.29 (d, J=17.6 Hz), 33.11 (d, J=11.5 Hz), 32.57 (d, J=23.4 Hz), 31.78 (d, J=9.6 Hz), 27.09 (d, J=7.8 Hz), 26.92 (d, J=12.9 Hz), 25.88.

Synthesis of MCI-48

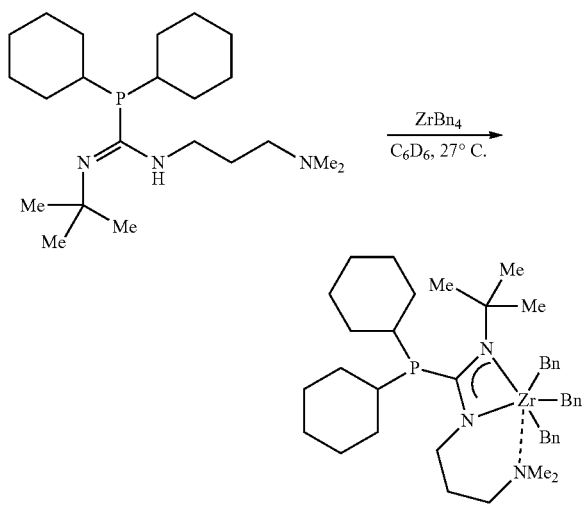

To a stirring (300 rpm) solution of the aminophosphaguanidine (22.7 mg, 0.0595 mmol, 1.00 eq) in C$_6$D$_6$ (0.5 mL) in a nitrogen filled glovebox at 27° C. was added a solution of ZrBn$_4$ (27.1 mg, 0.0595 mmol, 1.00 eq) in C$_6$D$_6$ (0.5 mL). After 6 hours, an aliquot was removed and NMR indicated the product with no SM or ZrBn$_4$ remaining. The pale golden yellow solution was concentrated to afford the zirconium aminophosphaguanidine complex MCI-48 (44.2 mg, 0.0595 mmol, 100%).

$^1$H NMR (400 MHz, Benzene-d$_6$) δ 7.25-7.13 (m, 5H), 7.10-7.05 (m, 6H), 6.99-6.95 (m, 2H), 6.87-6.81 (m, 2H), 3.05 (dt, J=12.9, 3.8 Hz, 1H), 2.88 (d, J=9.5 Hz, 1H), 2.71 (d, J=9.5 Hz, 1H), 2.49 (d, J=10.0 Hz, 2H), 2.54-2.43 (m, 2H), 2.33 (d, J=9.9 Hz, 2H), 2.30-2.20 (m, 2H), 2.07 (s, 3H), 1.94 (s, 3H), 1.87-1.63 (m, 4H), 1.68 (s, 9H), 1.60-1.54 (m, 6H), 1.17-0.98 (m, 8H), 0.83 (m, 2H). $^{13}$C NMR (101 MHz, Benzene-d$_6$) δ 178.43 (d, J=69.0 Hz), 150.37, 143.20, 137.48, 128.91, 128.46, 128.14, 126.92, 126.64, 125.27, 121.27, 119.17, 68.94 (d, J=8.9 Hz), 66.05, 59.10, 55.00 (d, J=3.7 Hz), 48.33, 45.00, 36.90 (d, J=17.7 Hz), 36.44 (d, J=20.2 Hz), 35.20 (d, J=31.3 Hz), 33.78, 33.64, 31.35 (d, J=4.8 Hz), 31.18 (d, J=3.8 Hz), 30.81 (d, J=2.9 Hz), 27.55 (d, J=5.1 Hz), 27.03 (d, J=9.0 Hz), 26.92, 26.88 (d, J=9.6 Hz), 25.98 (d, J=4.6 Hz). $^{31}$P NMR (162 MHz, Benzene-d$_6$) δ 3.96.

Synthesis of MCI-43

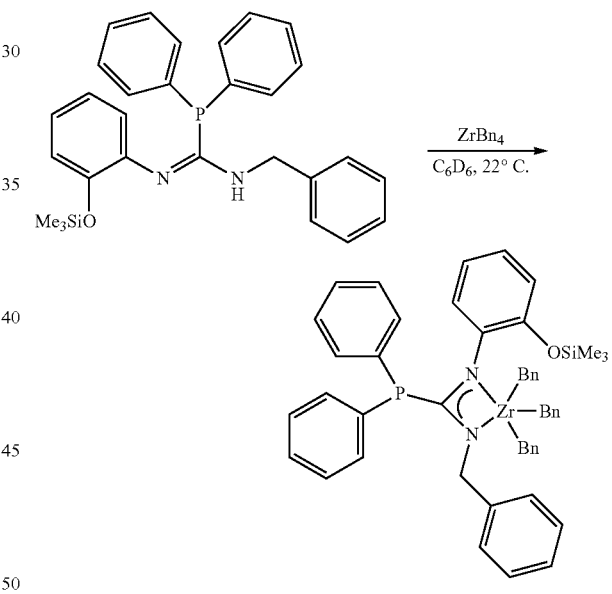

To a clear pale yellow solution of the phosphaguanidine (24.6 mg, 0.0510 mmol, 1.00 eq) in C$_6$D$_6$ (0.5 mL) in a nitrogen filled glovebox at 22° C. was added a solution of ZrBn$_4$ (23.1 mg, 0.0510 mmol, 1.00 eq) in C$_6$D$_6$ (0.23 mL) in a quick dropwise manner. After stirring (300 rpm) for 2 hours, an aliquot was removed and NMR had indicated complete consumption of starting ligand to the mono-[2,1] complex. The dark mixture was diluted with anhydrous de-oxygenated hexanes (10 mL), concentrated, suspended in hexanes (3 mL), concentrated, this process was repeated 2× more, the resultant dark brown solid was suspended in hexanes (5 mL), stirred vigorously (1000 rpm) for 1 min, filtered through a 0.45 μm submicron PTFE filter, rinsed with hexanes (3×2 mL), and concentrated to afford the metal-ligand complex MCI-43 as a dark brown amorphous foam (37.9 mg, 0.0447 mmol, 88%). NMR indicated that the metal-ligand complex exists as a mixture of isomers/rotomers. The product existed as a mixture of rotomers and only the major isomer/rotomer signals are listed.

$^1$H NMR (500 MHz, Benzene-d$_6$) δ 7.42-7.37 (m, 4H), 7.11-7.06 (m, 8H), 7.04-6.81 (m, 12H), 6.62-6.59 (m, 7H), 6.59-6.54 (m, 1H), 6.49-6.47 (m, 1H), 6.47-6.43 (m, 1H), 4.59 (s, 2H), 2.14 (s, 6H), 0.37 (s, 9H). $^{31}$P NMR (202 MHz, Benzene-d$_6$) δ −8.52. $^{13}$C NMR (126 MHz, Benzene-d$_6$) δ 185.49 (d, J=60.1 Hz), 149.02, 142.51, 140.33, 136.85 (d, J=3.7 Hz), 134.43 (d, J=21.8 Hz), 132.94 (d, J=10.6 Hz), 130.55, 129.50, 128.88, 128.25, 128.21, 128.18, 126.37, 125.37, 122.78, 120.62, 117.13, 75.72, 52.60 (d, J=9.0 Hz), 0.61.

Synthesis of MCI-44

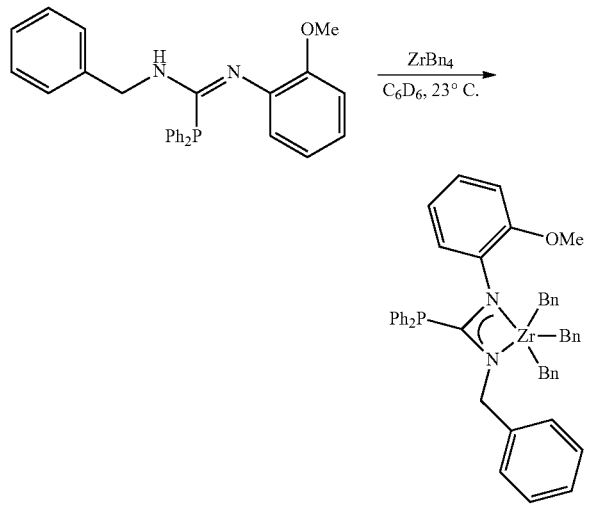

To a clear golden yellow solution of the phosphaguanidine (24.7 mg, 0.0582 mmol, 1.00 eq) in C$_6$D$_6$ (0.50 mL) in a nitrogen filled glovebox at 23° C. was added a solution of ZrBn$_4$ (26.4 mg, 0.0582 mmol, 1.00 eq) in C$_6$D$_6$ (0.26 mL) in a quick dropwise manner. After stirring for 1 hour, an aliquot was removed and NMR had indicated complete conversion to the metal-ligand complex. The now light brown solution was diluted with anhydrous de-oxygenated hexanes (10 mL), concentrated, suspended in hexanes (3 mL), concentrated, this process was repeated once more, the resultant golden yellow mixture was then filtered through a 0.45 μm submicron PTFE filter, rinsed with benzene (3×1 mL), and concentrated to afford the zirconium metal-ligand complex MCI-44 as a golden yellow viscous foam (37.8 mg, 0.0479 mmol, 82%). NMR indicated pure product.

$^1$H NMR (500 MHz, Benzene-d$_6$) δ 7.18 (ddd, J=7.7, 6.4, 3.0 Hz, 4H), 7.08 (t, J=7.6 Hz, 7H), 7.06-6.95 (m, 5H), 6.90-6.83 (m, 8H), 6.83-6.80 (m, 6H), 6.63-6.56 (m, 1H), 6.49 (ddd, J=8.8, 7.3, 1.4 Hz, 1H), 6.33 (td, J=7.5, 7.0, 1.2 Hz, 1H), 6.11-6.06 (m, 1H), 4.76 (s, 2H), 3.21 (s, 3H), 2.53 (s, 6H). $^{31}$P NMR (202 MHz, Benzene-d$_6$) δ −8.57. $^{13}$C NMR (126 MHz, Benzene-d$_6$) δ 180.69 (d, J=62.0 Hz), 150.30, 144.24, 140.31, 133.87 (d, J=1.5 Hz), 133.72 (d, J=20.3 Hz), 132.36 (d, J=10.7 Hz), 128.85, 128.82, 128.35 (d, J=7.6 Hz), 128.17, 127.11, 126.27, 122.59, 122.31 (d, J=5.8 Hz), 121.96, 120.79, 109.31, 75.54, 55.68, 52.37 (d, J=13.2 Hz).

Synthesis of MCI-45

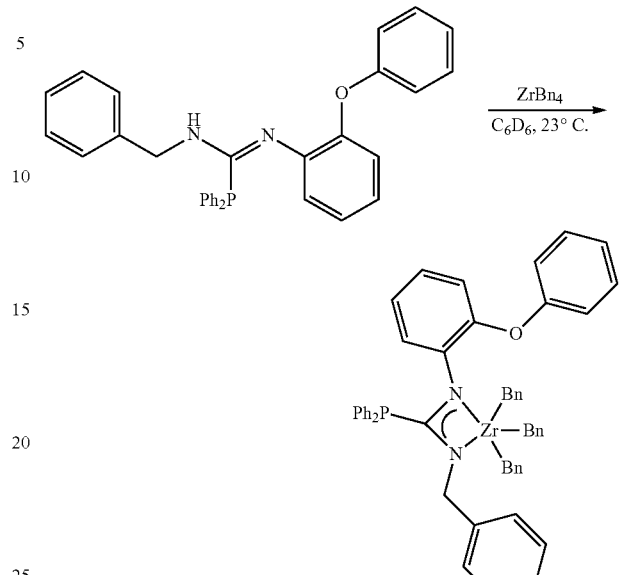

To a clear golden yellow solution of the phosphaguanidine (18.7 mg, 0.0385 mmol, 1.00 eq) in C$_6$D$_6$ (0.50 mL) in a nitrogen filled glovebox at 23° C. was added a solution of ZrBn$_4$ (17.5 mg, 0.0385 mmol, 1.00 eq) in C$_6$D$_6$ (0.17 mL) in a quick dropwise manner. After stirring (300 rpm) for 1 hour, an aliquot was removed and NMR had indicated complete conversion to the metal-ligand complex. The now dark brown solution was diluted with anhydrous de-oxygenated hexanes (10 mL), concentrated, suspended in benzene (3 mL), concentrated, this process was repeated once more to remove residual toluene, suspended in benzene (3 mL), the resultant golden yellow mixture was then filtered through a 0.45 μm submicron PTFE filter, rinsed with benzene (3×1 mL), and concentrated to afford the zirconium metal-ligand complex MCI-45 as a golden yellow viscous foam (24.5 mg, 0.0288 mmol, 75%). NMR indicated pure product which contains hexanes.

$^1$H NMR (500 MHz, Benzene-d$_6$) δ 7.43-7.36 (m, 4H), 7.26-7.21 (m, 2H), 7.11-7.06 (m, 8H), 6.97-6.85 (m, 15H), 6.60 (dd, J=8.1, 1.3 Hz, 6H), 6.59-6.46 (m, 4H), 4.46 (s, 2H), 2.12 (s, 6H). $^{31}$P NMR (202 MHz, Benzene-d$_6$) δ −7.53. $^{13}$C NMR (126 MHz, Benzene-d$_6$) δ 187.08 (d, J=60.1 Hz), 156.25, 150.78, 142.49, 140.09, 137.29, 134.55 (d, J=21.1 Hz), 132.93 (d, J=10.5 Hz), 129.82, 129.46, 128.93, 128.34, 128.27, 128.16, 128.00, 126.73, 126.38, 125.01, 123.59, 122.78, 122.63, 119.50, 116.92, 76.22, 52.59 (d, J=6.8 Hz).

Synthesis of Metal Complex Precursors

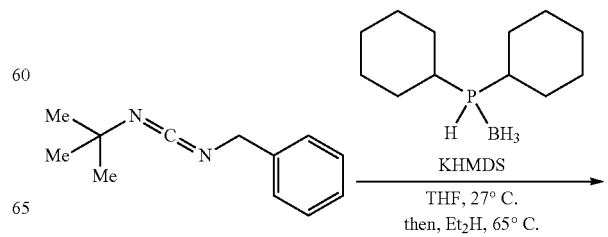

-continued

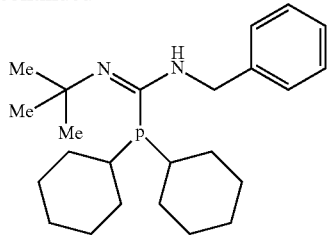

To a solution of the dicyclohexylphosphine-borane complex (130.3 mg, 0.6114 mmol, 1.00 eq) in THF (3.0 mL) in a nitrogen filled glovebox at 27° C. was added a solution of KHMDS (0.12 mL, 0.0612 mmol, 0.10 eq, 0.5 M in toluene). After stirring for 2 minutes, a solution of the carbodiimide (115.1 mg, 0.6114 mmol, 1.00 eq) in THF (1.5 mL, rinse 3×0.5 mL) was added. After stirring (300 rpm) for 36 hours, the pale yellow solution was concentrated, suspended in hexanes (3 mL), concentrated, this was repeated three times more to remove residual THF, suspended in hexanes (10 mL), stirred vigorously (1000 rpm) for 2 minutes, filtered through a 0.45 μm submicron filter, rinsed with hexanes (3×3 mL), and concentrated to afford the phosphaguanidine borane complex as a white solid. The crude solid was dissolved in anhydrous de-oxygenated $Et_2NH$ (8 mL), placed in a mantle heated to 65° C. for 72 hours, removed from the heating mantle, allowed to cool to 27° C., concentrated, suspended in hexanes (3 mL), concentrated, this was repeated three times more to remove residual $Et_2NH$ and $Et_2NH$—$BH_3$, suspended in hexanes (10 mL), stirred vigorously (1000 rpm) for 2 minutes, filtered through a 0.45 μm submicron filter, rinsed with hexanes (3×3 mL), and concentrated to afford the phosphaguanidine compound as a white solid (187.5 mg, 0.3953 mmol, 65%). NMR indicated pure product as a mixture of isomers and tautomers. The asterisk (*) denotes the minor isomers and/or tautomer.

$^1$H NMR (500 MHz, Benzene-$d_6$) δ 7.54 (dtd, J=7.8, 1.4, 0.8 Hz, 2H), 7.27-7.20 (m, 2H), 7.07 (ddtd, J=7.8, 7.1, 1.4, 0.8 Hz, 1H), 5.24 (d, J=5.5 Hz, 2H), 3.96 (br s, 1H), 1.88-1.69 (m, 6H), 1.66-1.56 (m, 4H), 1.54-1.48 (m, 2H), 1.43 (d, J=0.7 Hz, 9H), 1.32-1.19 (m, 4H), 1.18-1.02 (m, 6H). $^{31}$P NMR (202 MHz, Benzene-$d_6$) δ 2.19*, −9.93*, −20.02, −28.12*. $^{13}$C NMR (126 MHz, Benzene-$d_6$) δ 156.64 (d, J=40.1 Hz), 143.55, 128.00, 127.93, 125.78, (79.75*), 56.22 (d, J=40.0 Hz), 51.53, 34.39 (d, J=17.9 Hz), 31.03 (d, J=18.1 Hz), 29.82 (d, J=8.7 Hz), 28.81, 26.97 (d, J=7.7 Hz), 26.81 (d, J=11.6 Hz), 26.25.

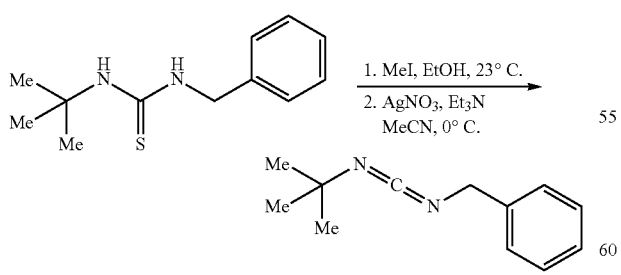

1. MeI, EtOH, 23° C.
2. $AgNO_3$, $Et_3N$ MeCN, 0° C.

To a vigorously stirring (700 rpm) solution of the thiourea (3.704 g, 16.66 mmol, 1.00 eq) in EtOH (100 mL) under nitrogen at 23° C. was added iodomethane (9.45 g, 4.10 mL, 66.63 mmol, 4.00 eq) was added neat via syringe. After 12 hours, the solution was concentrated in vacuo to afford the isothiourea as a white solid. NMR indicated product with minor impurities and the crude material was pushed forward into the carbodiimide synthesis without further purification.

A solution of the crude isothiourea (3.938 g, 16.658 mmol, 1.00 eq) and $Et_3N$ (2.023 g, 2.80 mL, 19.990 mmol, 1.20 eq) in acetonitrile (100 mL) was placed in an ice bath for 30 minutes upon which solid $AgNO_3$ (2.971 g, 17.491 mmol, 1.05 eq) all at once. After stirring (500 rpm) for 2 hours hexanes (100 mL) was added, the biphasic yellow heterogeneous mixture was stirred vigorously (1000 rpm) for 5 minutes, suction filtered over a pad of celite, concentrated to approximately 10 mL, diluted with hexanes (50 mL), concentrated to approximately 10 mL, this was repeated three times more, the resultant yellow mixture was suction filtered over a pad of celite using hexanes as the eluent, and concentrated to afford the carbodiimide as a clear colorless oil (2.528 g, 13.43 mmol, 81% over two steps). NMR indicated that the product was pure.

Chemical Shifts for the Carbodiimide:

$^1$H NMR (500 MHz, Chloroform-d) δ 7.38-7.26 (m, 5H), 4.33 (s, 2H), 1.14 (s, 9H). $^{13}$C NMR (126 MHz, Chloroform-d) δ 140.73, 138.79, 128.53, 127.86, 127.48, 55.29, 50.86, 31.16.

Chemical Shifts for the Crude Isothiourea (*Exists as Isomers and Tautomers):

$^1$H NMR (500 MHz, Chloroform-d) δ 7.43-7.27 (m, 4H), 7.20 (t, J=7.3 Hz, 1H), 4.62 (s, 2H), 3.97 (br s, 1H), 2.35 (s, 3H), 1.41 (s, 9H). $^{13}$C NMR (126 MHz, Chloroform-d) δ 148.34, 142.28, 128.03, 127.12, 125.91, 54.90, 52.55, 28.92 (22.53*), 15.43.

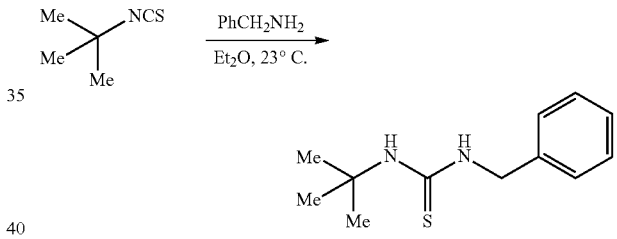

$PhCH_2NH_2$
$Et_2O$, 23° C.

To a vigorously stirring (700 rpm) solution of t-butylisothiocyanate (2.000 g, 2.20 mL, 17.36 mmol, 1.00 eq) in ethyl ether (100 mL) under nitrogen at 23° C. was added benzylamine (1.860 g, 1.90 mL, 17.36 mmol, 1.00 eq) neat via syringe. After 12 hours the clear colorless solution was concentrated in vacuo to afford the thiourea as a white solid (3.704 g, 16.66 mmol, 96%). NMR indicated pure product, and the material was used in the next reaction without further purification.

$^1$H NMR (500 MHz, Chloroform-d) δ 7.37-7.27 (m, 6H), 5.95 (br s, 1H), 4.75 (s, 2H), 1.38 (s, 9H). $^{13}$C NMR (126 MHz, Chloroform-d) δ 181.19, 137.26, 128.89, 127.83, 127.59, 52.99, 49.64, 29.53. HRMS (ESI) calc'd for $C_{12}H_{18}N_2S$ [M+H]$^+$ 223.1269, found 223.1267.

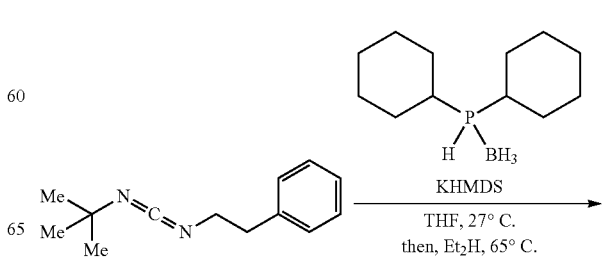

KHMDS
THF, 27° C.
then, $Et_2H$, 65° C.

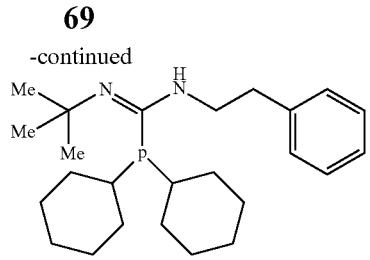

To a solution of the dicyclohexylphosphine-borane complex (117.0 mg, 0.5492 mmol, 1.00 eq) in THF (3.0 mL) in a nitrogen filled glovebox at 27° C. was added a solution of KHMDS (0.11 mL, 0.0549 mmol, 0.10 eq, 0.5 M in toluene). After stirring (300 rpm) for 2 minutes a solution of the carbodiimide (111.1 mg, 0.5492 mmol, 1.00 eq) in THF (1.5 mL, rinse 3×0.5 mL) was added. After stirring (300 rpm) for 36 hours the pale yellow solution was concentrated, suspended in hexanes (3 mL), concentrated, this was repeated three times more to remove residual THF, suspended in hexanes (10 mL), stirred vigorously (1000 rpm) for 2 minutes, filtered through a 0.45 μm submicron filter, rinsed with hexanes (3×3 mL), and concentrated to afford the phosphaguanidine borane complex as a white solid. The crude solid was dissolved in anhydrous de-oxygenated Et$_2$NH (8 mL), placed in a mantle heated to 65° C. for 72 hrs, removed from the heating mantle, allowed to cool to 27° C., concentrated, suspended in hexanes (3 mL), concentrated, this was repeated three times more to remove residual Et$_2$NH and Et$_2$NH—BH$_3$, suspended in hexanes (10 mL), stirred vigorously (1000 rpm) for 2 minutes, filtered through a 0.45 μm submicron filter, rinsed with hexanes (3×3 mL), and concentrated to afford the phosphaguanidine compound as a white solid (180.8 mg, 0.3702 mmol, 67%). NMR indicated pure product as a mixture of isomers and tautomers. The asterisk (*) denotes the minor isomers and/or tautomer.

$^1$H NMR (500 MHz, Benzene-d$_6$) δ 7.31-7.28 (m, 2H), 7.17-7.12 (m, 2H), 7.05-7.01 (m, 1H), 4.21 (ddd, J=7.5, 7.0, 4.8 Hz, 2H), 3.81 (br s, 1H), 3.02 (t, J=7.4 Hz, 2H), 1.81-1.70 (m, 5H), 1.62 (ddt, J=11.2, 5.6, 3.0 Hz, 4H), 1.59-1.50 (m, 4H), 1.39 (s, 9H), 1.30-1.06 (m, 7H). $^{31}$P NMR (202 MHz, Benzene-d$_6$) δ 1.34*, −5.54*, −9.26*, −20.20, −21.70*, −28.11*. $^{13}$C NMR (126 MHz, Benzene-d$_6$) δ 155.57 (d, J=40.8 Hz), 141.56, 129.14, 128.02, 125.50, (79.76*), 54.28 (d, J=39.0 Hz), 51.39, 39.47, 34.35 (d, J=17.6 Hz), 31.55, 31.05 (d, J=18.1 Hz), 29.78 (d, J=9.5 Hz), 28.74, 27.02 (d, J=7.7 Hz), 26.84 (d, J=12.2 Hz), 26.29.

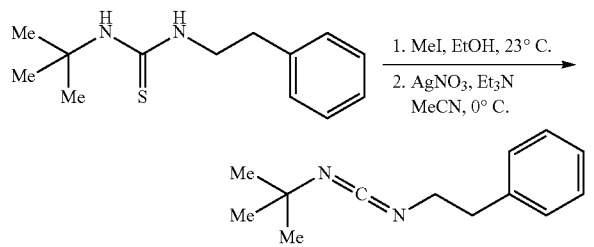

To a vigorously stirring (700 rpm) solution of the thiourea (3.860 g, 16.33 mmol, 1.00 eq) in EtOH (100 mL) under nitrogen at 23° C. was added iodomethane (9.27 g, 4.10 mL, 65.32 mmol, 4.00 eq) was added neat via syringe. After 12 hours the solution was concentrated in vacuo to afford the crude isothiourea as a white solid. NMR indicated product with minor impurities which was pushed forward without further purification.

A solution of the isothiourea (4.089 g, 16.33 mmol, 1.00 eq) and Et$_3$N (1.983 g, 2.70 mL, 19.60 mmol, 1.20 eq) in acetonitrile (100 mL) was placed in an ice bath for 30 minutes upon which solid AgNO$_3$ (2.913 g, 17.15 mmol, 1.05 eq) all at once. After stirring (500 rpm) for 2 hours hexanes (100 mL) was added to the now canary yellow heterogeneous mixture. The biphasic heterogeneous mixture was stirred vigorously (1000 rpm) for 5 minutes, suction filtered over a pad of celite, concentrated to approximately 10 mL, diluted with hexanes (50 mL), concentrated to approximately 10 mL, this process was repeated three times more, the resultant yellow heterogeneous mixture was suction filtered over a pad of celite, and concentrated to afford the carbodiimide as a clear pale yellow oil (2.785 g, 13.77 mmol, 84% over two steps). NMR indicated pure product.

Chemical Shifts for the Carbodiimide:

The carbodiimide exists as a mixture of isomers. The asterisk (*) denotes the minor isomers and/or tautomer.

$^1$H NMR (500 MHz, Chloroform-d) δ 7.32-7.28 (m, 2H), 7.24-7.20 (m, 3H), 3.54-3.39 (m, 2H), 2.88 (t, J=7.4 Hz, 2H), 1.20 (s, 9H). $^{13}$C NMR (126 MHz, Chloroform-d) δ 139.78, 138.88, 128.77, 128.47, 126.43, 55.07, 48.19, 37.82, 31.19.

$^1$H NMR (500 MHz, Chloroform-d) δ 7.30-7.24 (m, 4H), 7.20-7.15 (m, 1H), 3.81 (br s, 1H), 3.60 (t, J=7.4 Hz, 2H), 2.87 (t, J=7.4 Hz, 2H), 2.26 (s, 3H), 1.33 (s, 9H). $^{13}$C NMR (126 MHz, Chloroform-d) δ 147.43, 141.27, 129.03, 128.03, 125.62, 53.40, (53.16, 52.79, 52.36*), 38.37, 30.34, 28.81, 24.62, 22.52, 15.35.

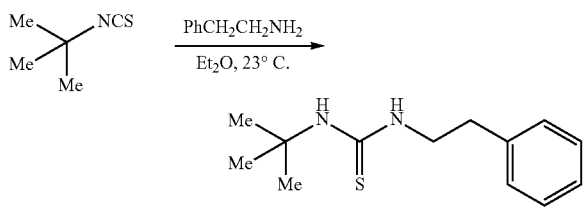

To a vigorously stirring (700 rpm) solution of t-Buisothiocyanate (2.000 g, 2.20 mL, 17.362 mmol, 1.00 eq) in ethyl ether (100 mL) under nitrogen at 23° C. was added benzylamine (2.104 g, 2.19 mL, 17.362 mmol, 1.00 eq) was added neat via syringe. After 12 hours the solution was concentrated in vacuo to afford the thiourea as a white solid (3.860 g, 16.347 mmol, 94%). NMR indicated pure product.

$^1$H NMR (500 MHz, Chloroform-d) δ 7.36-7.29 (m, 2H), 7.26-7.21 (m, 3H), 5.49 (s, 1H), 3.90 (t, J=6.7 Hz, 2H), 2.97 (t, J=6.7 Hz, 2H), 1.21 (s, 9H). $^{13}$C NMR (126 MHz, Chloroform-d) δ 180.77, 138.40, 128.87, 128.80, 126.84, 52.54, 46.58, 34.87, 29.29.

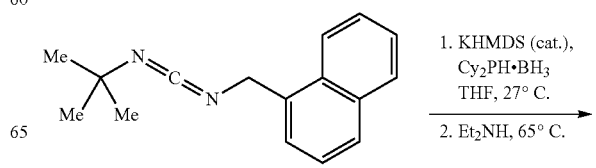

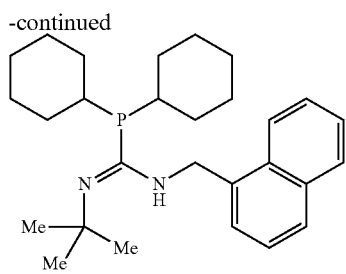

To a solution of dicyclohexylphosphine borane (154.0 mg, 0.7226 mmol, 1.00 eq) in anhydrous de-oxygenated THF (5 mL) in a nitrogen filled glovebox at 27° C. was added a solution of KHMDS (0.15 mL, 0.0723 mmol, 0.10 eq, non-titrated 0.5 M in toluene). After stirring (300 rpm) for 2 minutes a solution of the monocarbodiimide (172.2 mg, 0.7226 mmol, 1.00 eq) in THF (2.5 mL) was added. After 36 hours the now clear pale yellow solution was concentrated, suspended in hexanes (5 mL), concentrated, this process was repeated three times to remove residual THF, the resultant off-white mixture was suspended in hexanes (10 mL), stirred vigorously (1000 rpm) for 5 minutes, filtered through a 0.45 μm PTFE submicron filter (rinsed 3×3 mL), concentrated, de-oxygenated anhydrous $Et_2NH$ (10 mL) was added, the vial was sealed with a PTFE cap, and placed in a mantle heated to 65° C. After stirring vigorously (1000 rpm) for 5 days the white heterogeneous mixture was removed from the mantle, allowed to cool gradually to 27° C., concentrated, the resultant off-white mixture was suspended in hexanes (10 mL), stirred vigorously (1000 rpm) for 5 minutes, filtered through a 0.45 μm PTFE submicron filter (rinsed 3×3 mL), and concentrated to afford the phosphaguanidine compound as a clear pale yellow oil (302.5 mg, 0.6928 mmol, 96%). NMR indicated product as an isomeric and tautomeric mixture with trace impurities. The asterisk (*) denotes the minor isomers and/or tautomer.

$^1$H NMR (500 MHz, Benzene-$d_6$) δ 8.49-8.34 (m, 1H), 7.90 (dq, J=7.1, 1.2 Hz, 1H), 7.76-7.62 (m, 1H), 7.58 (d, J=8.2 Hz, 1H), 7.45-7.32 (m, 2H), 7.26 (ddd, J=8.0, 6.7, 1.2 Hz, 1H), 5.66 (d, J=5.5 Hz, 2H), 3.98 (s, 1H), 1.81 (dd, J=40.0, 12.8 Hz, 6H), 1.69-1.58 (m, 6H), 1.55-1.47 (m, 2H), 1.41 (s, 9H), 1.37-1.23 (m, 4H), 1.21-1.00 (m, 4H). $^{31}$P NMR (202 MHz, Benzene-$d_6$) δ (3.10*), (−9.06*), −20.63. $^{13}$C NMR (126 MHz, Benzene-$d_6$) δ 156.81 (d, J=40.8 Hz), 139.20, 134.01, 132.17, 128.51, 126.68, 125.51, 125.32, 125.14, 124.98, 124.43, 54.24 (d, J=40.9 Hz), 51.53, 34.45 (d, J=18.0 Hz), 31.02 (d, J=18.1 Hz), 29.86 (d, J=9.4 Hz), 28.81, 27.00 (d, J=7.8 Hz), 26.83 (d, J=11.6 Hz), 26.26.

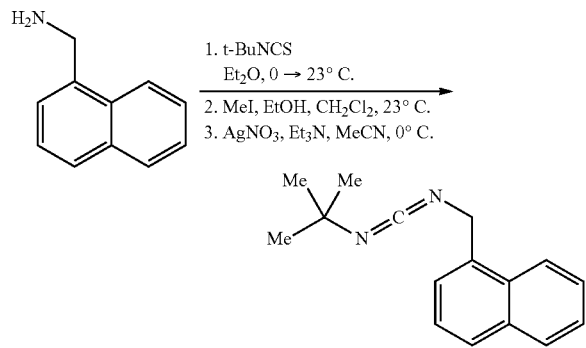

A solution of t-Buisothiocyanate (0.733 g, 0.81 mL, 6.361 mmol, 1.00 eq) in $Et_2O$ (50 mL) was placed in an ice water bath upon which the 1-aminomethylnaphthalene (1.000 g, 0.94 mL, 6.361 mmol, 1.00 eq) was added neat in a dropwise fashion. The clear colorless solution was stirred (500 rpm) for 12 hours warming gradually to 23° C. in the process. The solution was concentrated to afford the thiourea as a white solid (1.741 g, 6.361 mmol, 100%). NMR indicated pure product. The thiourea was used in the subsequent reaction without further purification.

To a solution of the thiourea (1.741 g, 6.361 mmol, 1.00 eq) in $EtOH$—$CH_2Cl_2$ (100 mL, 1:1) at 23° C. was added iodomethane (3.620 g, 1.60 mL, 25.564 mmol, 4.00 eq). After 12 hours the clear pale yellow solution was neutralized with a saturated aqueous mixture of $NaHCO_3$ (50 mL), aqueous NaOH (15 mL, 1 N) was then added slowly, the biphasic mixture was further diluted with $CH_2Cl_2$ (50 mL), stirred vigorously (1000 rpm) for 2 minutes, poured into a separatory funnel, partitioned, organics were washed with a saturated aqueous mixture of $NaHCO_3$ (3×25 mL), residual organics were extracted from the aqueous using $CH_2Cl_2$ (2×25 mL), combined, washed with brine (1×25 mL), dried over solid $Na_2SO_4$, decanted, and concentrated to afford the methylisothiourea as a pale yellow viscous foam (1.822 g, 6.361 mmol, 100%).

A solution of the methylisothiourea (1.822 g, 6.361 mmol, 1.00 eq) and $Et_3N$ (0.708 g, 1.00 mL, 6.997 mmol, 1.10 eq) in non-anhydrous acetonitrile (65 mL) in a brown jar protected from light was placed in an ice water bath for 20 minutes upon which solid $AgNO_3$ (1.134 g, 6.679 mmol, 1.05 eq) was added all at once. After stirring vigorously (1000 rpm) for 90 minutes hexanes (100 mL) was added, the yellow heterogeneous mixture was suction filtered through a pad of celite, concentrated to approximately 10 mL, hexanes (50 mL) was added, the mixture was concentrated to approximately 10 mL, this process was repeated three times more, hexanes (50 mL) was added to the resultant pale yellow heterogeneous mixture, the suspension was suction filtered through a pad of celite, and concentrated to afford the monocarbodiimide as a clear golden yellow oil (1.311 g, 5.501 mmol, 87%).

Characterization of the Monocarbodiimide:

$^1$H NMR (500 MHz, Chloroform-d) δ 8.08 (dq, J=8.4, 0.9 Hz, 1H), 7.88 (ddt, J=8.1, 1.3, 0.6 Hz, 1H), 7.81 (dd, J=8.1, 1.2 Hz, 1H), 7.57 (ddd, J=8.4, 6.8, 1.4 Hz, 1H), 7.53-7.48 (m, 2H), 7.45 (dd, J=8.1, 7.0 Hz, 1H), 4.77 (s, 2H), 0.93 (s, 9H). $^{13}$C NMR (126 MHz, Chloroform-d) δ 140.89, 134.89, 133.82, 131.17, 128.64, 128.41, 126.37, 126.26, 125.86, 125.34, 123.85, 55.24, 48.79, 30.95. HRMS (ESI): calc'd $C_{16}H_{18}N_2$ [M+H]$^+$ as 239.1504; found 239.1558.

Characterization of the Crude Methylisothiourea After Workup:

$^1$H NMR (500 MHz, Chloroform-d) δ 8.15 (dd, J=8.4, 1.4 Hz, 1H), 7.88-7.84 (m, 1H), 7.74 (d, J=8.2 Hz, 1H), 7.62 (dd, J=7.0, 1.3 Hz, 1H), 7.54-7.47 (m, 2H), 7.47-7.43 (m, 1H), 5.06 (s, 2H), 4.03 (s, 1H), 2.38 (s, 3H), 1.42 (s, 9H). $^{13}$C NMR (126 MHz, Chloroform-d) δ 148.57, 137.76, 133.58, 131.55, 128.45, 126.66, 125.57, 125.47, 125.27, 124.44, 123.96, 52.97, 52.58, 28.94, 15.48. HRMS (ESI): calc'd $C_{17}H_{22}N_2S$ [M+H]$^+$ as 287.2; found 287.2.

Characterization of the Crude Thiourea After Concentration:

$^1$H NMR (500 MHz, Chloroform-d) δ 7.98 (d, J=8.3 Hz, 1H), 7.87-7.83 (m, 1H), 7.79 (d, J=8.1 Hz, 1H), 7.55-7.46 (m, 2H), 7.46-7.37 (m, 2H), 6.17 (s, 1H), 5.90 (s, 1H), 5.12 (s, 2H), 1.27 (s, 9H). $^{13}$C NMR (126 MHz, Chloroform-d) δ 180.81, 133.89, 132.64, 131.30, 128.90, 128.81, 126.80, 126.74, 126.10, 125.42, 123.47, 52.89, 48.07, 29.48. HRMS (ESI): calc'd $C_{16}H_{20}N_2S$ [M+H]$^+$ as 273.1381; found 273.1811.

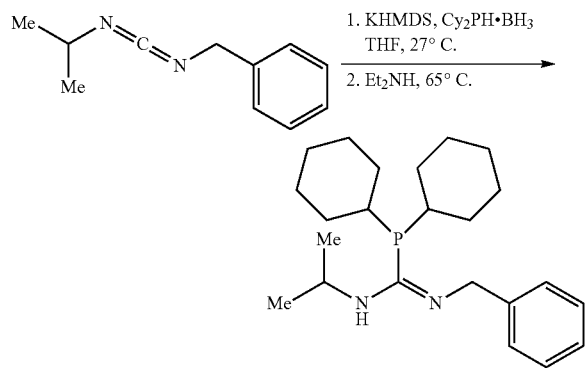

To a stirring (300 rpm) solution of the dicyclohexylphosphine-borane complex (245.6 mg, 1.152 mmol, 1.00 eq) in anhydrous de-oxygenated THF (8 mL) in a nitrogen filled glovebox at 27° C. was added a solution of KHMDS (0.46 mL, 0.2305 mmol, 0.20 eq, non-titrated 0.5 M in toluene). After 2 minutes a solution of the monocarbodiimide (200.8 mg, 1.152 mmol, 1.00 eq) in anhydrous de-oxygenated THF (3.5 mL) was added in a quick dropwise fashion. After 36 hours the pale yellow heterogeneous mixture was concentrated, suspended in anhydrous de-oxygenated hexanes (5 mL), concentrated, this process was repeated three times more to remove residual THF, the mixture was then re-suspended in hexanes (10 mL), stirred vigorously (1000 rpm) for 5 minutes, filtered through a 0.45 μm submicron PTFE filter, rinsed with hexanes (3×3 mL), and concentrated to afford the phosphaguanidine-borane complex as a white solid.

The crude white solid was suspended in anhydrous de-oxygenated $Et_2NH$ (15 mL) and placed in a mantle heated to 65° C. After stirring (500 rpm) for 5 days the white heterogeneous mixture was removed from the mantle, allowed to cool to 27° C., concentrated, suspended in anhydrous de-oxygenated hexanes (5 mL), concentrated, this process was repeated three times more to remove residual $Et_2H$, the mixture was then re-suspended in hexanes (10 mL), stirred vigorously (1000 rpm) for 5 minutes, filtered through a 0.45 μm submicron PTFE filter, rinsed with hexanes (3×3 mL), and concentrated to afford the phosphaguanidine as a white solid (379.7 mg, 1.019 mmol, 88%). NMR results indicated that the product exists as a mixture of isomers and tautomers and contains trace impurities. The isomers and tautomers are indicated by an asterisk (*).

$^1$H NMR (500 MHz, Benzene-d$_6$) δ 7.56 (dddt, J=7.0, 4.0, 1.5, 0.8 Hz, 1H), 7.29-7.21 (m, 2H), 7.15-7.00 (m, 2H), 5.25 (d, J=5.3 Hz, 2H) (4.54 (d, J=5.2 Hz, 2H)*), (4.75-4.63 (m, 1H)*) 4.49-4.39 (m, 1H), (3.99-3.92 (m, 1H)*) 3.91-3.80 (m, 1H), 1.82-1.38 (m, 16H), 1.35 (dd, J=6.2, 0.7 Hz, 6H) (1.08 (d, J=6.5 Hz, 6H)*), 1.31-1.09 (m, 6H). $^{13}$C NMR (126 MHz, Benzene-d$_6$) δ (159.85 (d, J=8.6 Hz)*) 157.09 (d, J=39.1 Hz) (154.93 (d, J=38.7 Hz)*) (154.82 (d, J=25.0 Hz)*), (143.58*) (142.28*) 140.94, (128.31*) 128.19, (128.09*) 127.98 (127.93*), 126.76 (125.83*), 55.72 (d, J=38.1 Hz) 55.14 (d, J=24.8 Hz)*), (51.27 (d, J=38.2 Hz)*) (45.25 (d, J=22.1 Hz)*), (45.81*) 42.03, 34.01 (d, J=16.8 Hz), 31.16 (d, J=18.6 Hz) (30.99 (d, J=18.1 Hz)*), (30.02 (d, J=9.7 Hz)*) 29.85 (d, J=9.0 Hz), (26.91 (d, J=7.7 Hz)*) 26.87 (d, J=7.7 Hz), 26.75 (26.65*), 26.22 (26.84*), (25.51*), 22.60. $^{31}$P NMR (202 MHz, Benzene-d$_6$) δ (−3.71*), (−8.94*), −21.53, (−28.14*).

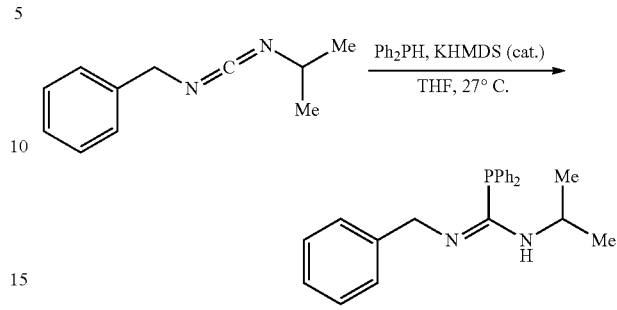

To a clear colorless solution of diphenylphosphine (500.0 mg, 0.46 mL, 2.689 mmol, 1.00 eq) in anhydrous de-oxygenated THF (6 mL) at 27° C. in a nitrogen filled glovebox was added a solution of KHMDS (1.10 mL, 0.5378 mmol, 0.20 eq, non-titrated 0.5 M in toluene). After stirring for 2 minutes a solution of the carbodiimide (468.6 mg, 2.689 mmol, 1.00 eq) in THF (6 mL, rinse 3×2 mL) was added in a quick dropwise fashion. The now clear red-orange solution was allowed to stir (300 rpm) for 48 hours upon which it was diluted with anhydrous de-oxygenated hexanes (10 mL), concentrated, suspended in hexanes (5 mL), concentrated, this process was repeated three times more to remove residual THF, the orange mixture was re-suspended in hexanes (10 mL), stirred vigorously (1000 rpm) for 5 minutes, filtered through a 0.45 μm submicron PTFE filter, washed with hexanes (3×3 mL), and concentrated. The resultant opaque viscous pale yellow oil was suspended in hexanes (5 mL), filtered through a 0.20 μm submicron PTFE filter, rinsed three times with 3 mL of hexanes, and then concentrated to afford the monophosphaguanidine as a clear pale yellow oil (909.9 mg, 2.524 mmol, 94%). NMR results indicated that the product exists as a complex mixture of isomers and tautomers and contains trace impurities. The isomers and tautomers are denoted by an asterisk (*).

$^1$H NMR (400 MHz, Benzene-d$_6$) δ 7.50 ((dq, J=7.7, 2.7 Hz, 1H)*) 7.48-7.43 (m, 2H), 7.42-7.35 (m, 3H), 7.17 (t, J=7.6 Hz, 2H), 7.08-6.88 (m, 8H), 5.02 (d, J=4.6 Hz, 2H) (4.47 (d, J=5.3 Hz, 2H)*), (4.42 (ddd, J=12.1, 6.1, 2.3 Hz, 1H)*) 4.35 (dt, J=13.0, 6.5 Hz, 1H), (4.14 (t, J=5.4 Hz, 1H)*) 3.82 (d, J=6.8 Hz, 1H), (1.23 (d, J=6.1 Hz, 6H)*) 0.92 (d, J=6.4 Hz, 6H). $^{31}$P NMR (162 MHz, Benzene-d$_6$) δ (−14.96*), −17.16 (−18.48*). $^{13}$C NMR (101 MHz, Benzene-d$_6$) δ 155.61 (d, J=32.0 Hz) (152.95 (d, J=32.5 Hz)*), 142.74 (140.23*), 134.83 (134.69*), (134.23*) 134.10, 133.99 (d, J=19.8 Hz) (133.96 (d, J=19.8 Hz)*), 129.10 (129.03*), 128.79 (d, J=6.9 Hz) (128.70 (d, J=6.9 Hz)*), 127.57 (127.52*), (126.57*) 125.91, 55.22 (d, J=34.5 Hz) (51.86 (d, J=34.3 Hz)*), (45.87*) 42.79, (24.99*) 22.22.

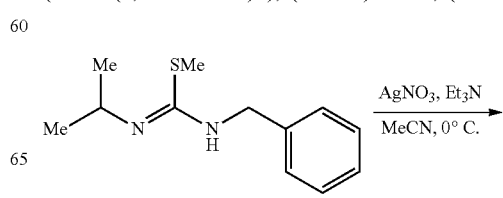

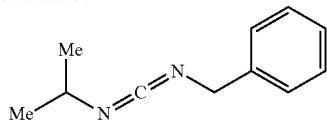

A solution of the isothiourea (4.168 g, 18.746 mmol, 1.00 eq) and Et₃N (2.087 g, 2.90 mL, 20.867 mmol, 1.10 eq) in acetonitrile (190 mL) in an oven-dried brown jar protected from light was placed in an ice water bath for 30 minutes upon which solid AgNO₃ (3.344 g, 19.684 mmol, 1.05 eq) was added all at once. After stirring (500 rpm) for 2 hours the now golden yellow heterogeneous mixture was diluted with hexanes (100 mL), stirred vigorously (1000 rpm) for 2 minutes, removed from the cold bath, suction filtered cold over a pad of celite, concentrated to approximately 20 mL, diluted with hexanes (50 mL), concentrated, this process was repeated three times more to remove residual acetonitrile, the now golden yellow heterogenous mixture was suspended in hexanes (50 mL), suction filtered over a pad of celite, and concentrated to afford the monocarbodiimide as a clear pale yellow oil (2.628 g, 15.082 mmol, 81%). NMR indicated pure product.

¹H NMR (500 MHz, Chloroform-d) δ 7.38-7.26 (m, 6H), 4.34 (s, 2H), 3.48 (hept, J=6.5 Hz, 1H), 1.09 (d, J=6.4 Hz, 6H). ¹³C NMR (126 MHz, Chloroform-d) δ 138.71, 128.55, 127.71, 127.47, 50.73, 49.04, 24.48.

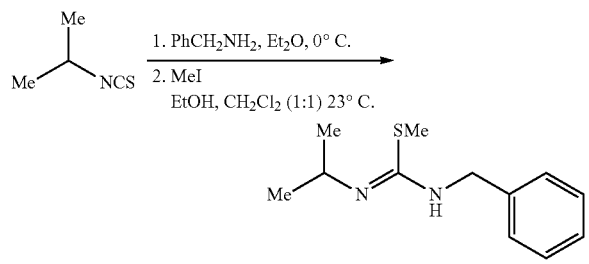

To a stirring (500 rpm) solution of the isothiocyanate (1.896 g, 2.00 mL, 18.737 mmol, 1.00 eq) in Et₂O (100 mL) was added benzylamine (2.008 g, 2.05 mL, 18.737 mmol, 1.00 eq) neat via syringe in a slow dropwise manner. After 12 hours the clear pale yellow solution was concentrated to afford the thiourea as an off-white solid (3.904 g, 18.737 mmol, 100%). NMR indicated pure product which was used in the subsequent reaction without further purification.

To a stirring (500 rpm) solution of the crude thiourea (3.904 g, 18.737 mmol, 1.00 eq) in CH₂Cl₂-EtOH (100 mL, 1:1) was added iodomethane (10.638 g, 4.70 mL, 74.948 mmol, 4.00 eq) neat via syringe in a quick dropwise manner. After 12 hours the clear pale yellow solution was neutralized with a saturated aqueous mixture of NaHCO₃ (100 mL), aqueous NaOH (15 mL, 1 N) was then added, the biphasic mixture was stirred vigorously (1000 rpm) for 2 minutes, poured into a separatory funnel, partitioned, organics were washed with a saturated aqueous mixture of NaHCO₃ (3×50 mL), residual organics were extracted from the aqueous layer using CH₂Cl₂ (2×25 mL), combined, dried over solid Na₂SO₄, decanted, and concentrated to afford the crude methylisothiourea (4.165 g, 18.730 mmol, 100%). NMR indicated product exists as a mixture of isomers. The crude methylisothiourea was used in the subsequent reaction without further purification.

Characterization Data for the Thiourea:
¹H NMR (500 MHz, Chloroform-d) δ 7.36-7.25 (m, 5H), 6.23 (s, 1H), 5.82 (s, 1H), 4.60 (s, 2H), 4.17 (s, 1H), 1.15 (d, J=6.5 Hz, 6H). ¹³C NMR (126 MHz, Chloroform-d) δ 180.61, 136.99, 127.87, 127.57, 48.35, 46.22, 22.52.

Characterization Data for the Methylisothiourea:
¹H NMR (400 MHz, Chloroform-d) δ 7.39-7.33 (m, 3H), 7.30 (d, J=7.8 Hz, 2H), 7.22 (t, J=7.1 Hz, 1H), 4.52 (br s, 2H), 3.97 (br s, 1H), 2.38 (s, 3H), 1.18 (d, J=6.3 Hz, 6H). ¹³C NMR (101 MHz, Chloroform-d) δ 151.32, 141.04, 128.24, 127.39, 126.46, 52.22, 45.01, 23.49, 14.46.

To a stirring (300 rpm) solution of the dicyclohexylphosphine-borane complex (246.2 mg, 1.155 mmol, 1.00 eq) in anhydrous de-oxygenated THF (8 mL) in a nitrogen filled glovebox at 27° C. was added a solution of KHMDS (0.46 mL, 0.2310 mmol, 0.20 eq, non-titrated 0.5 M in toluene). After 2 minutes a solution of the monocarbodiimide (272.9 mg, 1.155 mmol, 1.00 eq) in anhydrous de-oxygenated THF (3.5 mL) was added in a quick dropwise fashion. After 48 hours the pale yellow heterogeneous mixture was concentrated, suspended in anhydrous de-oxygenated hexanes (5 mL), concentrated, this process was repeated three times more to remove residual THF, the mixture was then re-suspended in hexanes (10 mL), stirred vigorously (1000 rpm) for 5 minutes, filtered through a 0.45 μm submicron PTFE filter, rinsed with hexanes (3×3 mL), and concentrated to afford the phosphaguanidine-borane complex as a white solid.

The crude white solid was suspended in anhydrous de-oxygenated Et₂NH (15 mL) and placed in a mantle heated to 65° C. After stirring (500 rpm) for 5 days the white heterogeneous mixture was removed from the mantle, allowed to cool to 27° C., concentrated, suspended in anhydrous de-oxygenated hexanes (5 mL), concentrated, this process was repeated three times more to remove residual Et₂NH, the mixture was then re-suspended in hexanes (10 mL), stirred vigorously (1000 rpm) for 5 minutes, filtered through a 0.45 μm submicron PTFE filter, rinsed with hexanes (3×3 mL), and concentrated to afford the phosphaguanidine as a white solid (481.1 mg, 1.108 mmol, 96% two steps). NMR indicated product exists as an isomeric mixture which contains trace impurities.

¹H NMR (500 MHz, Benzene-d₆) δ 7.03 (d, J=7.4 Hz, 4H), 7.01-6.94 (m, 3H), 6.89 (t, J=7.4 Hz, 1H), 4.66 (d, J=7.6 Hz, 1H), 4.26 (s, 2H), 2.23 (s, 6H), 2.07-1.86 (m, 6H), 1.62 (dd, J=50.5, 10.6 Hz, 4H), 1.25 (d, J=73.2 Hz, 12H). ³¹P NMR (162 MHz, Benzene-d₆) δ -3.96. ¹³C NMR (126 MHz, Benzene-d₆) δ 158.90, 148.01, 139.97, 128.28, 128.21, 127.98, 127.93, 126.93, 122.12, 47.07, 33.65 (d, J=13.8 Hz), 30.83 (d, J=12.3 Hz), 29.53 (d, J=11.2 Hz), 27.17 (d, J=9.2 Hz), 27.11 (d, J=10.5 Hz), 26.45, 19.09.

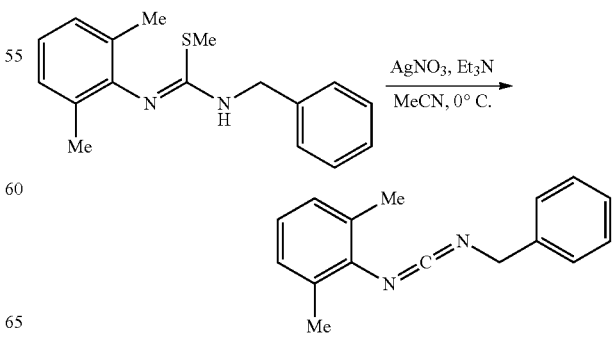

A solution of the thioguanidine (3.698 g, 13.002 mmol, 1.00 eq) and Et₃N (2.894 g, 4.00 mL, 28.604 mmol, 2.20 eq) in acetonitrile (130 mL) in an oven-dried brown jar protected from light was placed in an ice water bath for 30 minutes upon which solid AgNO₃ (4.528 g, 26.654 mmol, 2.05 eq) was added all at once. After stirring (500 rpm) for 2 hours hexanes (150 mL) was added to the canary yellow heterogeneous mixture, stirred vigorously (1000 rpm) for 2 minutes, suction filtered over a pad of celite, concentrated to approximately 10 mL, further diluted with hexanes (50 mL), concentrated to approximately 10 mL, this process was repeated three times more to remove residual acetonitrile, the now yellow heterogeneous mixture was diluted with hexanes (50 mL), suction filtered over a pad of celite, and concentrated to afford the monocarbodiimide as a clear pale yellow oil (1.781 g, 7.536 mmol, 58%). NMR indicated pure product.

¹H NMR (400 MHz, Chloroform-d) δ 7.39 (d, J=4.3 Hz, 4H), 7.35-7.29 (m, 1H), 7.00 (d, J=7.9 Hz, 2H), 6.93 (dd, J=8.5, 6.3 Hz, 1H), 4.55 (s, 2H), 2.26 (s, 6H). ¹³C NMR (101 MHz, Chloroform-d) δ 138.04, 136.34, 134.33, 132.32, 128.67, 128.07, 127.62, 127.50, 124.27, 50.57, 18.84.

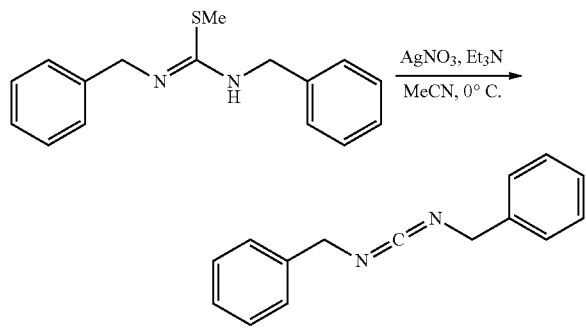

A solution of the isothiourea (2.263 g, 8.369 mmol, 1.00 eq) and Et₃N (0.932 g, 1.30 mL, 9.206 mmol, 1.10 eq) in acetonitrile (100 mL) in an oven-dried jar was placed in an ice water bath for 30 minutes upon which solid AgNO₃ (1.493 g, 8.787 mmol, 1.05 eq) was added all at once. After stirring (500 rpm) for 2 hours the now golden yellow heterogeneous mixture was diluted with hexanes (100 mL), stirred vigorously (1000 rpm) for 2 minutes, removed from the cold bath, suction filtered over a pad of celite, concentrated to approximately 20 mL, diluted with hexanes (50 mL), concentrated, this process was repeated three more times to remove residual acetonitrile, the now golden yellow heterogenous mixture was suspended in hexanes (50 mL), suction filtered over a pad of celite, and concentrated to afford the monocarbodiimide as a clear pale yellow oil (1.380 g, 6.208 mmol, 74%).

¹H NMR (500 MHz, Chloroform-d) δ 7.39-7.29 (m, 7H), 7.22 (ddq, J=7.3, 1.4, 0.8 Hz, 4H), 4.33 (s, 4H). ¹³C NMR (126 MHz, Chloroform-d) δ 141.30, 138.34, 128.62, 127.54, 127.50, 50.37. LCMS (ESI): calc'd C₁₄H₁₅N₂ [M+H]⁺ as 223.1; found 223.1.

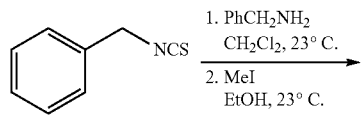

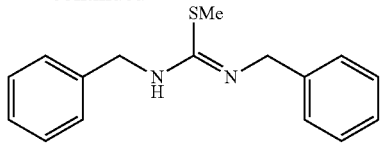

To a stirring solution of the crude dibenzylthiourea (2.275 g, 8.874 mmol, 1.00 eq) in EtOH (50 mL) was added iodomethane (5.038 g, 2.20 mL, 35.496 mmol, 4.00 eq). After 20 hours the clear pale yellow solution was neutralized with a saturated aqueous mixture of NaHCO₃ (100 mL), aqueous NaOH (15 mL, 1 N) was added followed by CH₂Cl₂ (50 mL), the biphasic mixture was stirred vigorously (1000 rpm) for 5 minutes, poured into a separatory funnel, partitioned, organics were washed with a saturated aqueous mixture of NaHCO₃ (3×50 mL), residual organics were extracted from the aqueous layer using CH₂Cl₂ (2×25 mL), combined, dried over solid Na₂SO₄, decanted, and concentrated to afford the methylisothiourea as a clear pale yellow oil (2.263 g, 8.378 mmol, 92%). NMR results indicated that the product formed with trace amounts of impurities. The isothiourea was used in the subsequent reaction without further purification.

Characterization of the Isothiourea:
¹H NMR (500 MHz, Chloroform-d) δ 7.35 (tdd, J=7.8, 6.3, 1.7 Hz, 8H), 7.32-7.23 (m, 2H), 4.59 (s, 4H), 4.53-4.21 (m, 1H), 2.42 (s, 3H). ¹³C NMR (126 MHz, Chloroform-d) δ 152.61, 140.20, 128.41, 127.60, 126.83, 52.81, 50.37, 14.40. LRMS (ESI): calc'd C₁₆H₁₈N₂S [M+H]⁺ as 271.1; found 271.1.

Characterization of the Thiourea:
¹H NMR (500 MHz, DMSO-d₆) δ 7.95 (s, 2H), 7.36-7.20 (m, 10H), 4.69 (s, 4H). ¹³C NMR (126 MHz, DMSO-d₆) δ 183.46, 139.71, 128.70, 127.68, 127.28, 47.57.

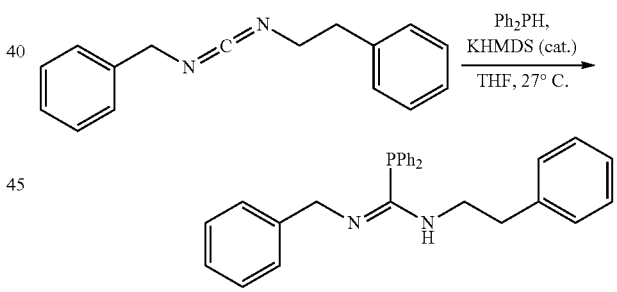

In a nitrogen filled glovebox, a vial was charged with a solution of diphenylphosphine (173.0 mg, 0.16 mL, 0.9276 mmol, 1.00 eq) in anhydrous de-oxygenated THF (3 mL) at 27° C. forming a clear colorless solution. A solution of KHMDS (0.37 mL, 0.1855 mmol, 0.20 eq, non-titrated 0.5 M in toluene) was added to the clear colorless solution. After stirring for 2 minutes a solution of the carbodiimide (219.2 mg, 0.9276 mmol, 1.00 eq) in THF (3 mL, rinse 3×1 mL) in a quick dropwise fashion. The now clear red-orange solution was allowed to stir (300 rpm) for 48 hours upon which it was diluted with anhydrous de-oxygenated hexanes (10 mL), concentrated, suspended in hexanes (5 mL), concentrated, this process was repeated three times more to remove residual THF, the orange mixture was re-suspended in hexanes (10 mL), stirred vigorously (1000 rpm) for 5 minutes, filtered through a 0.45 μm submicron PTFE filter, washed with hexanes (3×3 mL), and concentrated. The resultant opaque viscous pale yellow was suspended in hexanes (5 mL), filtered through a 0.20 μm submicron PTFE filter, rinsed with hexanes (3×3 mL), and concentrated to afford the monophosphaguanidine as a clear pale oil (303.2 mg, 0.7176 mmol, 77%, 95% pure with 5% diphenylphosphine). NMR indicated product exists as a mixture of isomers and tautomers and possesses 5% residual diphenylphosphine. NMR results indicated that the product exists as a complex mixture of isomers and tautomers and contains trace impurities. The minor isomers are denoted by an asterisk (*).

$^1$H NMR (500 MHz, Benzene-d$_6$) δ (7.51 (dq, J=7.6, 2.6 Hz, 1H)*), 7.46 (dt, J=7.7, 1.3 Hz, 2H), 7.40-7.23 (m, 4H), 7.18 (t, J=7.7 Hz, 2H), 7.14-6.87 (m, 10H), 6.83-6.77 (m, 2H), 4.99 (d, J=4.5 Hz, 2H), (4.46 (d, J=5.4 Hz, 2H)*), (4.23 (t, J=5.4 Hz, 1H)*), 4.05-3.97 (m, 1H), (4.05-3.97 (m, 2H)*), 3.58 (td, J=6.6, 5.3 Hz, 2H), (2.95 (t, J=7.2 Hz, 2H)*), 2.56 (t, J=6.7 Hz, 2H). $^{31}$P NMR (202 MHz, Benzene-d$_6$) δ (-14.96*), -16.40, (-16.95*), (-17.46*). $^{13}$C NMR* (126 MHz, Benzene-d$_6$) δ 156.40 (d, J=31.9 Hz) (155.65 (d, J=32.2 Hz)*), 142.64, 141.10, 140.22, 139.60, 134.52, 134.32, 134.11, 134.09 (d, J=20.0 Hz) (133.98 (d, J=19.3 Hz)*), 133.82, 133.72, 129.16, 128.94 (d, J=34.0 Hz), 128.68 (d, J=16.1 Hz), 128.30, 128.14, 128.00, 127.95, (126.59*) 125.97, 125.82 (125.55*), 55.15 (d, J=33.8 Hz) (53.54 (d, J=33.0 Hz)*), (45.73*) 42.96, (38.97*) 35.01.

Note:
Not all $^{13}$C NMR chemical shifts are labeled as major/minor due to complexity.

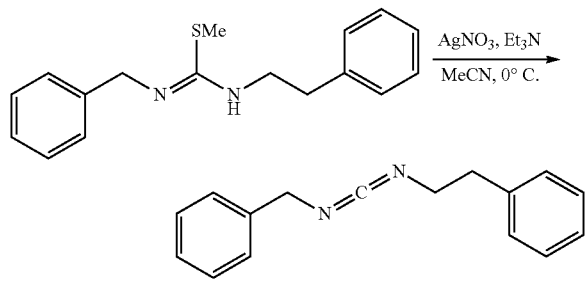

A solution of the isothiourea (2.424 g, 8.523 mmol, 1.00 eq) and Et$_3$N (0.950 g, 1.30 mL, 9.375 mmol, 1.10 eq) in acetonitrile (100 mL) in an oven-dried brown jar was placed in an ice water bath for 30 minutes upon which solid AgNO$_3$ (1.520 g, 8.949 mmol, 1.05 eq) was added all at once. After stirring (500 rpm) for 2 hours the now golden yellow heterogeneous mixture was diluted with hexanes (100 mL), stirred vigorously (1000 rpm) for 2 minutes, removed from the cold bath, suction filtered cold over a pad of celite, concentrated to approximately 20 mL, diluted with hexanes (50 mL), concentrated, this process was repeated three times more to remove residual acetonitrile, the now golden yellow heterogenous mixture was suspended in hexanes (50 mL), suction filtered over a pad of celite, and concentrated to afford the monocarbodiimide as a clear pale yellow oil (1.433 g, 6.064 mmol, 71%). NMR indicated pure product that contained trace hexanes and H$_2$O.

$^1$H NMR (500 MHz, Chloroform-d) δ 7.39-7.18 (m, 10H), 4.23 (d, J=3.4 Hz, 2H), 3.44 (tdd, J=7.2, 3.1, 1.3 Hz, 2H), 2.88-2.76 (m, 2H). $^{13}$C NMR (126 MHz, Chloroform-d) δ 140.87, 138.72, 128.87, 128.58, 128.53, 127.44, 126.54, 50.35, 47.70, 37.61. LCMS (ESI): calc'd C$_{16}$H$_{16}$N$_2$ [M+H]$^+$ as 237.1; found 237.1. LCMS (ESI): calc'd C$_{16}$H$_{16}$N$_2$ [M+Na]$^+$ as 271.1; found 271.1.

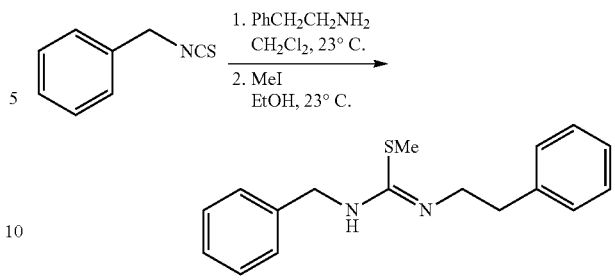

To a stirring (300 rpm) solution of phenethylamine (1.109 g, 1.15 mL, 9.155 mmol, 1.00 eq) in CH$_2$Cl$_2$ (50 mL) was added benzylisothiocyanate (1.366 g, 1.21 mL, 9.155 mmol, 1.00 eq) neat via syringe in a slow dropwise manner. After 12 hours the clear pale yellow solution was concentrated to afford the thiourea as an off-white solid (2.357 g, 8.719 mmol, 95%). The thiourea was used in the subsequent reaction without further purification.

To a stirring (300 rpm) heterogeneous mixture of the thiourea (2.357 g, 8.719 mmol, 1.00 eq) in EtOH—CH$_2$Cl$_2$ (60 mL, 1:1) was added iodomethane (4.950 g, 2.20 mL, 34.874 mmol, 4.00 eq). After 24 hours the now clear pale yellow solution was neutralized with a saturated aqueous mixture of NaHCO$_3$ (50 mL), aqueous NaOH (15 mL, 1 N) was then added, the biphasic mixture was stirred vigorously (1000 rpm) for 2 minutes, poured into a separatory funnel, partitioned, organics were washed with a saturated aqueous mixture of NaHCO$_3$ (3×50 mL), residual organics were extracted from the aqueous layer using CH$_2$Cl$_2$ (2×25 mL), combined, dried over solid Na$_2$SO$_4$, decanted, and concentrated to afford the methylisothiourea as a clear golden yellow oil (2.424 g, 8.523 mmol, 98%). NMR indicated product as a mixture of isomers with trace impurities. The crude material was used in the subsequent reaction without further purification.

Characterization of the Methylisothiourea:
$^1$H NMR (500 MHz, Chloroform-d) δ 7.46-7.31 (m, 6H), 7.31-7.23 (m, 4H), 4.55 (s, 2H), 4.29-4.03 (m, 1H), 3.64 (td, J=7.3, 2.9 Hz, 2H), 2.95 (td, J=7.2, 2.8 Hz, 2H), 2.33 (s, 3H). $^{13}$C NMR (126 MHz, Chloroform-d) δ 152.32, 140.90, 139.94, 128.98, 128.48, 128.40, 127.58, 126.73, 126.25, 49.45, 36.64, 22.61, 14.21. LCMS (ESI): calc'd C$_{17}$H$_{20}$N$_2$S [M+H]$^+$ as 285.1; found 285.1.

Characterization of the Thiourea:
$^1$H NMR (500 MHz, DMSO-d$_6$) δ 7.87 (s, 1H), 7.48 (s, 1H), 7.33-7.17 (m, 9H), 4.64 (s, 2H), 3.62 (s, 2H), 2.81 (t, J=7.4 Hz, 2H). $^{13}$C NMR (126 MHz, DMSO-d$_6$) δ 183.33, 139.77, 129.12, 128.78, 128.68, 127.69, 127.24, 126.55, 47.33, 45.58, 35.27. LCMS (ESI): calc'd C$_{16}$H$_{18}$N$_2$S [M+H]$^+$ as 271.1; found 271.1.

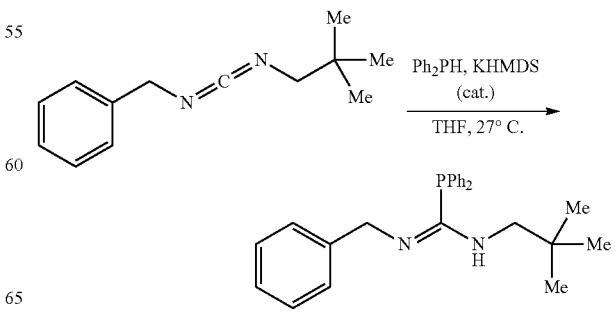

To a solution of diphenylphosphine (374.7 mg, 0.35 mL, 2.012 mmol, 1.00 eq) in anhydrous de-oxygenated THF (5 mL) at 27° C. in a nitrogen filled glovebox was added a solution of KHMDS (0.80 mL, 0.4024 mmol, 0.20 eq, non-titrated 0.5 M in toluene). After stirring (300 rpm) for 2 minutes a solution of the monocarbodiimide (407.1 mg, 2.012 mmol, 1.00 eq) in THF (5 mL, rinse 3×1.5 mL). The red-orange solution was stirred for 48 hours upon which it was diluted with anhydrous de-oxyenated hexanes (10 mL), the mixture was concentrated, suspended in hexanes (5 mL), concentrated, this process was repeated three times more to remove residual THF and toluene, the resultant mixture was suspended in hexanes (10 mL), stirred vigorously (1000 rpm) for 5 minutes, filtered through a 0.45 μm PTFE submicron filter, rinsed with hexanes (3×3 mL), concentrated, suspended in hexanes (5 mL), filtered through a 0.20 μm PTFE submicron filter, and concentrated to afford the phosphaguanidine as a clear viscous pale orange oil (666.9 mg, 1.717 mmol, 85%). NMR results indicated that the product exists as a complex mixture of isomers and tautomers and contains trace impurities. The isomers are denoted by an asterisk (*).

$^1$H NMR (400 MHz, Benzene-d$_6$) δ 7.48-7.45 (m, 2H), 7.45-7.34 (m, 3H), 7.17 (dd, J=8.2, 7.0 Hz, 2H), 7.09-7.03 (m, 2H), 7.03-6.89 (m, 6H), 5.01 (d, J=4.5 Hz, 2H) (4.41 (d, J=5.4 Hz, 2H)*), 4.27 (t, J=5.4 Hz, 1H) (3.99 (t, J=5.3 Hz, 1H)*), (3.50 (d, J=4.1 Hz, 2H)*) 3.31 (d, J=5.3 Hz), (1.03 (s, 9H)*) 0.62 (s, 9H). $^{31}$P NMR (162 MHz, Benzene-d$_6$) δ −15.23 (−17.76*). $^{13}$C NMR (101 MHz, Benzene-d$_6$) δ 156.40 (d, J=31.2 Hz) (154.90 (d, J=31.3 Hz)*), (142.69*) 140.41, (134.54*) 134.41, (134.28*) 134.17, (134.15*) 134.02, (134.17 (d, J=11.0 Hz)*) 133.97 (d, J=10.8 Hz), 129.16 (129.03*), (128.81 (d, J=4.7 Hz)*) 128.74 (d, J=4.7 Hz), (126.54*) 125.93, 63.33 (d, J=30.5 Hz) (55.23 (d, J=34.1 Hz)*), 52.74 (45.78*), (32.77*) 31.05, (27.77*) 27.02.

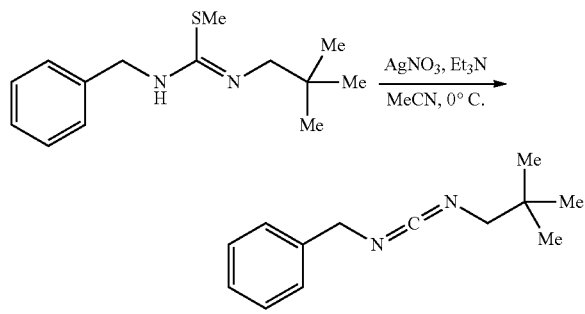

A solution of the isothiourea (2.290 g, 9.154 mmol, 1.00 eq) and Et$_3$N (1.053 g, 1.50 mL, 10.407 mmol, 1.14 eq) in acetonitrile (100 mL) in an oven-dried brown jar was placed in an ice water bath for 30 minutes upon which solid AgNO$_3$ (1.687 g, 9.934 mmol, 1.09 eq) was added all at once. After stirring (500 rpm) for 2 hours the now canary yellow heterogeneous mixture was diluted with hexanes (100 mL), the mixture was stirred vigorously (1000 rpm) for 2 minutes, suction filtered cold over a pad of celite, concentrated to approximately 10 mL, suspended in hexanes (50 mL), concentrated to approximately 10 mL, this process was repeated three times more to remove residual acetonitrile, the yellow heterogeneous mixture was filtered over a pad of celite, and concentrated to afford the monocarbodiimide as a clear pale oil (1.516 g, 7.494 mmol, 82%). NMR indicated pure product.

$^1$H NMR (400 MHz, Chloroform-d) δ 7.40-7.21 (m, 5H), 4.37 (s, 2H), 2.96 (s, 2H), 0.86 (s, 9H). $^{13}$C NMR (101 MHz, Chloroform-d) δ 140.00, 138.71, 128.58, 127.47, 127.39, 58.86, 50.51, 32.20, 26.96. MS-ESI: calc'd C$_{13}$H$_{18}$N$_2$ [M+H]$^+$ as 203.2; found 203.2.

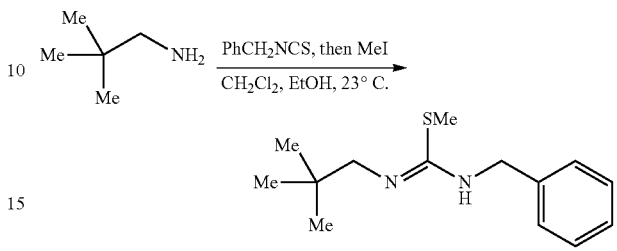

To a stirring (500 rpm) solution of benzylisothiocyanate (1.366 g, 1.21 mL, 9.155 mmol, 1.00 eq) in CH$_2$Cl$_2$ (50 mL) at 23° C. was added neopentylamine (0.798 g, 1.10 mL, 9.155 mmol, 1.00 eq) via syringe in a slow dropwise fashion. After 24 hours an aliquot was removed, concentrated, and NMR had shown product. EtOH (50 mL) was then added to the clear pale yellow solution upon which iodomethane (5.198 g, 2.30 mL, 36.620 mmol, 4.00 eq) was added via syringe in a quick dropwise manner. After stirring (500 rpm) for 24 hours the clear pale yellow solution was neutralized with a saturated aqueous mixture of NaHCO$_3$ (100 mL), aqueous NaOH (10 mL, 1 N) was added, the biphasic mixture was stirred vigorously (1000 rpm) for 5 minutes, poured into a separatory funnel, partitioned, organics were washed with a saturated aqueous mixture of NaHCO$_3$ (3×50 mL), residual organics were extracted from the aqueous layer using CH$_2$Cl$_2$ (2×25 mL), combined, dried over solid Na$_2$SO$_4$, decanted, and concentrated to afford the methylisothiourea as a clear pale yellow viscous oil (2.290 g, 9.154 mmol, 100%). NMR results indicated that the product exists as a mixture of isomers and tautomers and contains trace impurities. The isomers are denoted by an asterisk (*). The crude methylisothiourea was used in the subsequent reaction without further purification.

$^1$H NMR (500 MHz, Chloroform-d) δ 7.41-7.29 (m, 4H), 7.25 (d, J=8.0 Hz, 1H), 4.52 (s, 2H), 4.41-4.07 (m, 1H), 3.09 (s, 2H), 2.40 (s, 3H), 1.05-0.85 (m, 9H). $^{13}$C NMR (126 MHz, Chloroform-d) δ 152.47, 140.11, 128.35, 127.53, 126.77, 61.06, 54.14, 48.21, 32.18, 27.59, 14.32. LRMS (ESI): calc'd C$_{14}$H$_{22}$N$_2$S [M+H]$^+$ as 251.2; found 251.2.

Characterization of the Thiourea:

$^1$H NMR (500 MHz, Chloroform-d) δ 7.44-7.20 (m, 5H), 6.34 (d, J=146.5 Hz, 1H), 5.92 (s, 1H), 4.59 (s, 2H), 3.21 (s, 2H), 0.83 (s, 9H). $^{13}$C NMR (126 MHz, Chloroform-d) δ 182.09, 136.87, 128.97, 127.98, 127.47, 56.09 (48.36*), 31.69, 27.26. MS-ESI: calc'd C$_{13}$H$_{20}$N$_2$S [M+H]$^+$ as 237.1; found 237.1.

-continued

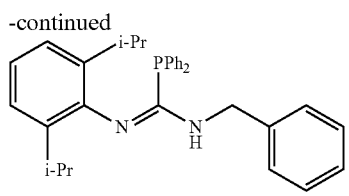

To a solution of diphenylphosphine (203.4 mg, 0.19 mL, 1.092 mmol, 1.00 eq) in anhydrous de-oxygenated THF (3 mL) at 27° C. in a nitrogen filled glovebox was added a solution of KHMDS (0.44 mL, 0.2184 mmol, 0.20 eq, non-titrated 0.5 M in toluene). After stirring (300 rpm) for 2 minutes a solution of the monocarbodiimide (319.4 mg, 1.092 mmol, 1.00 eq) in THF (2 mL, rinse 3×2 mL) was added in a quick dropwise fashion. After 48 hours the deep red-orange solution was diluted with hexanes (10 mL), concentrated, suspended in hexanes (5 mL), concentrated, this process was repeated three times more to remove residual THF, the orange heterogeneous mixture was suspended in hexanes (10 mL), stirred vigorously (1000 rpm) for 2 minutes, filtered through a 0.45 μm submicron PTFE filter, concentrated, suspended in hexanes (5 mL), filtered again through a 0.20 μm submicron PTFE filter, and concentrated to afford the phosphaguanidine as a clear pale yellow viscous oil (381.7 mg, 0.7656 mmol, 70%, 96% pure by $^1$H- and $^{31}$P-NMR with 4% diphenylphosphine).

$^1$H NMR (400 MHz, Benzene-$d_6$) δ 7.45-7.24 (m, 4H), 7.15-6.99 (m, 5H), 6.99-6.92 (m, 6H), 4.85 (s, 1H), 4.43 (s, 2H), 3.06 (hept, J=6.9 Hz, 2H), 1.18 (d, J=6.8 Hz, 6H), 1.08 (d, J=6.9 Hz, 6H). $^{13}$C NMR (101 MHz, Benzene-$d_6$) δ 156.20 (d, J=33.1 Hz), 145.93, 145.82, 139.75, 138.62, 134.33 (d, J=16.1 Hz), 134.00, 133.95 (d, J=20.3 Hz), 129.12, 128.73, 128.66, 128.17, 126.82, 123.18, 122.50, 46.08, 28.48, 28.45, 24.04, 21.66. $^{31}$P NMR (162 MHz, Benzene-$d_6$) δ −18.13.

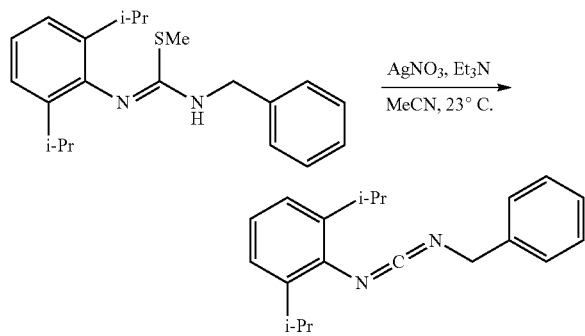

To a vigorously stirring (500 rpm) solution of the isothiourea (1.246 g, 3.660 mmol, 1.00 eq) and Et$_3$N (0.839 g, 1.20 mL, 8.295 mmol, 2.27 eq) in acetonitrile (65 mL) in an oven-dried brown jar at 23° C. was added solid AgNO$_3$ (1.345 g, 7.919 mmol, 2.16 eq) all at once. After 2 hours the now golden brown heterogeneous mixture was diluted with hexanes (100 mL), stirred vigorously (1000 rpm) for 2 minutes, suction filtered over a pad of celite, concentrated to approximately 10 mL, suspended in hexanes (50 mL), concentrated to approximately 10 mL, this process was repeated three times more to remove residual acetonitrile, the now brown heterogeneous mixture was diluted with hexanes (20 mL), suction filtered over a pad of celite, and concentrated to afford the monocarbodiimide as a clear pale yellow oil (0.8847 g, 3.025 mmol, 80%). NMR had shown pure product.

$^1$H NMR (400 MHz, Chloroform-d) δ 7.41-7.37 (m, 4H), 7.37-7.28 (m, 1H), 7.08 (d, J=2.2 Hz, 3H), 4.53 (d, J=1.9 Hz, 2H), 3.23 (pd, J=6.9, 2.4 Hz, 2H), 1.19 (dd, J=6.9, 2.6 Hz, 12H). $^{13}$C NMR (101 MHz, Chloroform-d) δ 142.18, 138.23, 133.82, 132.98, 128.69, 127.62, 127.52, 124.80, 123.07, 50.44, 28.89, 23.16. MS-ESI: calc'd C$_{20}$H$_{24}$N$_2$ [M+H]$^+$ 293.2; found 293.2.

To a stirring (500 rpm) solution of benzylisothiocyanate (1.366 g, 1.21 mL, 9.155 mmol, 1.00 eq) in CH$_2$Cl$_2$ (50 mL) at 23° C. was added 2,6-diisopropylaniline (1.623 g, 1.75 mL, 9.155 mmol, 1.00 eq) via syringe in a slow dropwise fashion. After 48 hours an aliquot was removed, concentrated, and NMR had shown approximately 40% conversion. The clear pale yellow solution was then concentrated, suspended in hexanes (20 mL), placed in a mantle heated to 70° C., after stirring vigorously (1000 rpm) for 15 minutes, the white heterogeneous mixture was allowed to gradually cool to 23° C., suction filtered, the white solid was washed collected, and dried in vacuo to afford the thiourea (1.195 g, 3.660 mmol, 40%). NMR indicated pure product.

To a solution of the thiourea (1.195 g, 3.660 mmol, 1.00 eq) in EtOH—CH$_2$Cl$_2$ (40 mL, 1:1) at 23° C. was added iodomethane (2.079 g, 1.00 mL, 14.648 mmol, 4.00 eq) via syringe in a quick dropwise manner. After stirring (500 rpm) for 24 hours the clear pale yellow solution was neutralized with a saturated aqueous mixture of NaHCO$_3$ (100 mL), aqueous NaOH (10 mL, 1 N) was added, the biphasic mixture was stirred vigorously (1000 rpm) for 5 minutes, poured into a separatory funnel, partitioned, organics were washed with a saturated aqueous mixture of NaHCO$_3$ (3×50 mL), residual organics were extracted from the aqueous layer using CH$_2$Cl$_2$ (2×25 mL), combined, dried over solid Na$_2$SO$_4$, decanted, and concentrated to afford the methylisothiourea as a clear pale yellow viscous oil (1.245 g, 3.660 mmol, 100%). NMR indicated product with trace impurities. The crude material was used in the subsequent reaction without further purification.

Characterization Data for the Methylisothiourea:

$^1$H NMR (400 MHz, Chloroform-d) δ 7.44-7.26 (m, 4H), 7.10 (d, J=1.5 Hz, 1H), 7.08 (s, 1H), 7.03 (d, J=6.5 Hz, 1H), 7.01 (d, J=6.5 Hz, 1H), 4.53 (s, 3H), 2.96 (hept, J=6.9 Hz, 2H), 2.43 (s, 3H), 1.20 (d, J=6.9 Hz, 6H), 1.13 (d, J=6.9 Hz, 6H). $^{13}$C NMR (101 MHz, Chloroform-d) δ 144.22, 139.42, 138.78, 128.57, 127.54, 127.42, 123.09, 123.02, 47.10, 28.13, 23.40, 23.35, 13.74. LRMS (ESI): calc'd C$_{21}$H$_{28}$N$_2$S [M+H]$^+$ as 341.2; found 341.2.

Characterization Data for the Thiourea:

$^1$H NMR (500 MHz, Chloroform-d) δ 8.42 (s, 1H), 7.33 (t, J=7.7 Hz, 1H), 7.26-7.17 (m, 6H), 5.54 (t, J=5.8 Hz, 1H), 4.82 (d, J=5.7 Hz, 2H), 3.20 (hept, J=6.8 Hz, 2H), 1.21 (d, J=6.9 Hz, 6H), 1.13 (d, J=6.9 Hz, 6H). $^{13}$C NMR (126 MHz, Chloroform-d) δ 181.44, 147.81, 137.57, 129.94, 129.79, 128.58, 127.64, 127.61, 124.49, 49.01, 28.56, 24.70, 23.07. LRMS (ESI): calc'd C$_{20}$H$_{26}$N$_2$S [M+H]$^+$ as 327.2; found 327.2.

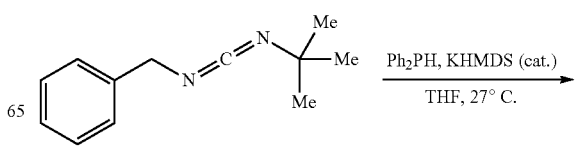

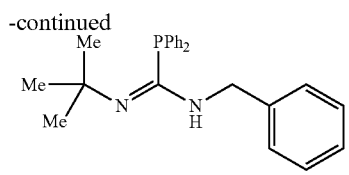

To a solution of diphenylphosphine (287.2 mg, 0.27 mL, 1.542 mmol, 1.00 eq) in anhydrous de-oxygenated THF (5 mL) at 27° C. in a nitrogen filled glovebox was added KHMDS (0.62 mL, 0.3084 mmol, 0.20 eq, non-titrated 0.5 M in toluene). After stirring (300 rpm) for 2 minutes a solution of the monocarbodiimide (290.4 mg, 1.542 mmol, 1.00 eq) in THF (5 mL) was added via syringe in a quick dropwise fashion causing the red-orange solution to change to a dark green-black solution. After stirring for 48 hours the now heterogenous mixture was concentrated, suspended in anhydrous de-oxygenated hexanes (5 mL), concentrated, this process was repeated three times more to remove residual THF and further triturate insoluble byproducts, the resultant green-black mixture was suspended in hexanes (5 mL), stirred vigorously (1000 rpm) for 2 minutes, filtered through a 0.45 µm submicron PTFE filter, rinsed with hexanes (3×3 mL), and concentrated to afford the phosphaguanidine as a clear pale golden yellow solution (0.566 g, 1.330 mmol, 86%, approximately 88% pure). NMR indicated that the product is approximately 88% pure which exists as a mixture of isomers and contains residual diphenylphosphine. The minor isomers are denoted by an asterisk (*).

$^1$H NMR (400 MHz, Benzene-d$_6$) δ 8.22 (dt, J=8.8, 1.2 Hz, 1H) (8.11 (dt, J=8.8, 1.2 Hz, 1H)*), 7.75 (dt, J=7.0, 1.2 Hz, 1H), 7.53 (d, J=8.3 Hz, 1H), 7.44 (ddt, J=9.1, 5.4, 2.1 Hz, 4H), 7.31-7.25 (m, 1H), 7.25-7.19 (m, 1H), 6.99 (tdt, J=4.6, 3.4, 2.3, 1.4 Hz, 6H), 5.42 (d, J=4.3 Hz, 2H), 3.93 (s, 1H) (3.64 (d, J=1.7 Hz, 1H)*), 1.27 (s, 9H). $^{13}$C NMR (101 MHz, Benzene-d$_6$) δ 155.26 (d, J=34.3 Hz), 138.28, 134.52 (d, J=13.7 Hz), 133.99 (d, J=19.7 Hz), 133.91 (d, J=16.8 Hz), 133.01 (d, J=19.0 Hz), 132.14, 129.09, 128.81 (d, J=6.9 Hz), 128.42, 128.17, 126.82, 125.45, 125.32, 125.09, 124.39, 53.85 (d, J=37.1 Hz), 51.93 (33.49 (d, J=17.6 Hz)*), 28.46. $^{31}$P NMR (162 MHz, Benzene-d$_6$) δ (−13.81*) −15.92.

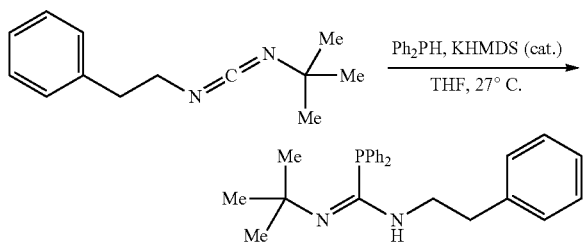

To a solution of diphenylphosphine (308.1 mg, 0.29 mL, 1.655 mmol, 1.00 eq) in anhydrous de-oxygenated THF (5 mL) at 27° C. in a nitrogen filled glovebox was added KHMDS (0.66 mL, 0.3310 mmol, 0.20 eq, non-titrated 0.5 M in toluene). After stirring (300 rpm) for 2 minutes a solution of the monocarbodiimide (334.8 mg, 1.655 mmol, 1.00 eq) in THF (5 mL) was added via syringe in a quick dropwise fashion. After stirring for 48 hours the red-orange solution was concentrated, suspended in hexanes (5 mL), concentrated, this suspension/concentration process was repeated three times more to remove residual THF and further triturate insoluble impurities, the resultant deep orange mixture was suspended in hexanes (10 mL), stirred vigorously (1000 rpm) for 2 minutes, filtered through a 0.45 µm PTFE filter, rinsed with hexanes (3×3 mL), concentrated, the resultant opaque golden yellow oil was suspended in hexanes (3 mL), filtered through a 0.20 µm PTFE filter, rinsed with hexanes (3×3 mL), and concentrated to afford the phosphaguanidine compound as a clear golden yellow oil (0.414 g, 1.066 mmol, 64%). NMR indicated that the product was pure.

$^1$H NMR (400 MHz, Benzene-d$_6$) δ 7.37 (tt, J=7.3, 2.1 Hz, 4H), 7.16-7.06 (m, 4H), 7.03-6.95 (m, 8H), 3.99 (td, J=7.1, 4.3 Hz, 2H), 3.75 (s, 1H), 2.92 (t, J=7.4 Hz, 2H), 1.27 (s, 9H). $^{13}$C NMR (101 MHz, Benzene-d$_6$) δ 154.29 (d, J=33.8 Hz), 141.28, 134.82 (d, J=14.3 Hz), 133.93 (d, J=19.6 Hz), 129.00 (d, J=15.1 Hz), 128.74, 128.67, 127.96, 125.50, 53.91 (d, J=35.7 Hz), 51.78, 38.98, 28.38. $^{31}$P NMR (162 MHz, Benzene-d$_6$) δ −16.17.

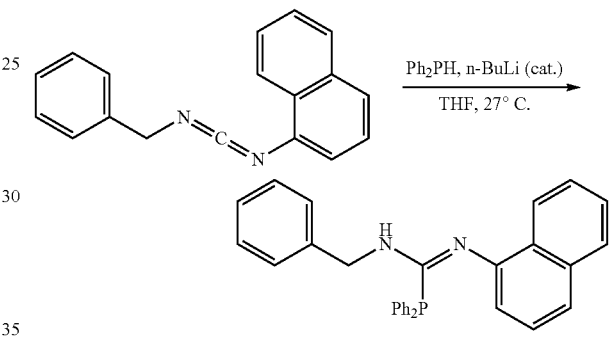

To a clear colorless solution of diphenylphosphine (0.329 g, 0.31 mL, 1.769 mmol, 1.00 eq) in anhydrous de-oxygenated THF (5 mL) in a nitrogen filled glovebox at 27° C. was added a solution of n-BuLi (74.0 uL, 0.1769 mmol, 0.10 eq, titrated 2.40 M in hexanes). The now red-orange solution was allowed to stir (300 rpm) for 1 minute upon which a solution of the monocarbodiimide (0.457 g, 1.769 mmol, 1.00 eq) in THF (5 mL) was added in a quick dropwise manner. After stirring (300 rpm) for 48 hours the now canary yellow solution was concentrated, suspended in anhydrous de-oxgyenated toluene (3 mL), concentrated, the resultant mixture was suspended in toluene (3 mL), concentrated, this process was repeated 2× more, the resultant mixture was suspended in toluene (3 mL), stirred vigorously (1000 rpm) for 2 minutes, then filtered through a 0.45 µm PTFE submicron filter, rinsed with toluene (3×3 mL), and concentrated to afford the phosphaguanidine as a red amorphous solid (0.700 g, 1.574 mmol, 89%). NMR results indicated that the product exists as a complex mixture of isomers/tautomers and contains trace impurities.

$^1$H NMR (400 MHz, Benzene-d$_6$) δ 8.16-8.10 (m, 1H), 7.60-7.55 (m, 1H), 7.34-7.19 (m, 8H), 7.12-7.08 (m, 5H), 7.01 (ddd, J=7.3, 2.0, 1.2 Hz, 1H), 6.87 (pq, J=2.5, 1.4 Hz, 6H), 4.89 (t, J=5.6 Hz, 1H), 4.52 (d, J=5.5 Hz, 2H). $^{31}$P NMR (162 MHz, Benzene-d$_6$) δ −14.09.

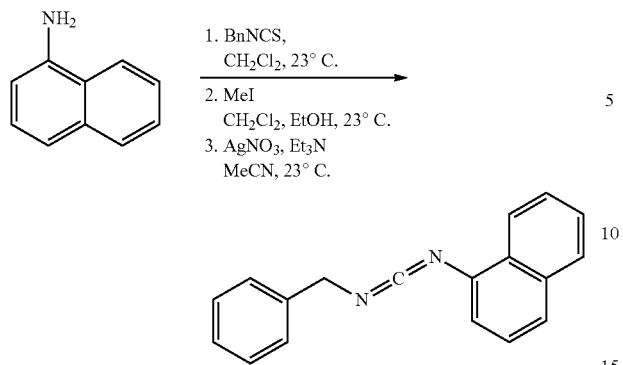

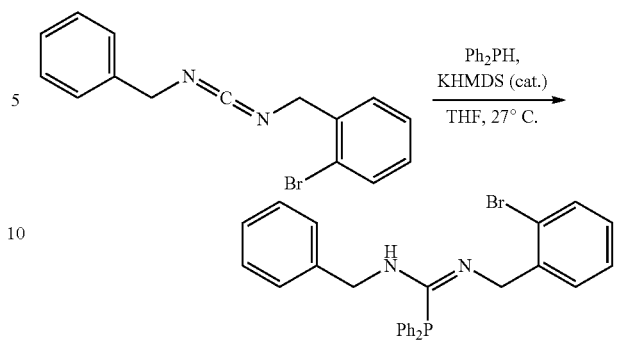

To a solution of 1-naphthylamine (1.619 g, 11.310 mmol, 1.00 eq) in CH$_2$Cl$_2$ (50 mL) at 23° C. was added benzylisothiocyanate (1.688 g, 1.50 mL, 11.310 mmol, 1.00 eq) neat via syringe. After stirring (300 rpm) for 24 hours an aliquot was removed, concentrated, and NMR had indicated approximately 50% conversion to the thiourea. After 48 hours the same result was observed. The clear pale purple solution was diluted with EtOH (50 mL), iodomethane (5.60 mL, 90.480 mmol, 8.00 eq) was then added. After stirring for 48 hours the clear pale purple solution was neutralized with a saturated aqueous mixture of NaHCO$_3$ (50 mL), then aqueous NaOH (10 mL, 1 N) was added, the biphasic mixture was stirred vigorously (1000 rpm) for 2 minutes, poured into a separatory funnel, partitioned, organics were washed with a saturated aqueous mixture of NaHCO$_3$ (2×50 mL), residual organics were extracted from the aqueous layer using CH$_2$Cl$_2$ (2×25 mL), combined, dried over solid Na$_2$SO$_4$, decanted, and concentrated to afford the crude isothiourea as a pale purple amorphous solid. NMR indicated product with minor impurities, N,N-dimethylnaphthylamine, and benzylisothiocyanate. The crude isothiourea was used in the subsequent reaction without further purification.

To a purple solution of the crude isothiourea and Et$_3$N (2.618 g, 3.50 mL, 24.882 mmol, 2.20 eq) in acetonitrile-CH$_2$Cl$_2$ (120 mL, 1:1) at 23° C. in an oven-dried brown jar was added solid AgNO$_3$ (3.842 g, 22.620 mmol, 2.00 eq) all at once. After stirring (500 rpm) for 48 hours the brown heterogeneous mixture was diluted with toluene (100 mL), stirred vigorously (1000 rpm) for 2 minutes, suction filtered over a pad of celite, concentrated to approximately 10 mL, toluene (25 mL) was added, the black mixture was concentrated to approximately 10 mL, this process was repeated two more times to remove residual acetonitrile, CH$_2$Cl$_2$, and to triturate residual silver and ammonium salts, the resultant black heterogeneous mixture was diluted with toluene (25 mL), suction filtered through a pad of celite, concentrated onto celite, and purified via silica gel chromatography using the ISCO; hexanes—50% CH$_2$Cl$_2$ in hexanes to afford the monocarbodiimide as a clear canary yellow oil (0.484 g, 1.874 mmol, 33% over three steps).

$^1$H NMR (500 MHz, Chloroform-d) δ 8.22 (dtt, J=7.1, 3.6, 0.8 Hz, 1H), 7.85-7.78 (m, 1H), 7.63 (dq, J=8.3, 1.3 Hz, 1H), 7.50 (ddd, J=6.9, 3.4, 1.7 Hz, 2H), 7.47-7.32 (m, 6H), 7.19 (ddd, J=7.4, 2.7, 1.2 Hz, 1H), 4.66 (d, J=1.4 Hz, 2H). $^{13}$C NMR (126 MHz, Chloroform-d) δ 136.69, 136.44, 134.32, 128.85, 128.72, 127.85, 127.76, 127.47, 126.40, 125.95, 125.76, 124.81, 123.48, 119.95, 50.59. HRMS (ESI): calc'd C$_{14}$H$_{18}$N$_2$ [M+H]$^+$ as 259.1230; found 259.0196.

To a solution of diphenylphosphine (0.564 g, 0.53 mL, 3.028 mmol, 1.00 eq) in anhydrous de-oxygenated THF (15 mL) in a nitrogen filled glovebox at 27° C. was added KHMDS (1.50 mL, 0.7570 mmol, 0.25 eq, non-titrated 0.5 M solution in toluene) in a quick dropwise manner. After stirring (300 rpm) for 2 minutes a solution of the monocarbodiimide (0.912 g, 3.028 mmol, 1.00 eq) in THF (5 mL) was added in a quick dropwise manner to the now clear red-orange solution. After stirring (500 rpm) for 48 hours the red-purple solution was concentrated, suspended in anhydrous de-oxygenated hexanes (5 mL), concentrated, this process was repeated three times more, the resultant dark red-purple solid was suspended in hexanes (10 mL), stirred vigorously (1000 rpm) for 2 minutes, gravity filtered using a PTFE fritted filter, concentrated, the resultant golden yellow viscous oil was suspended in hexanes (5 mL), filtered through a 0.20 μm submicron PTFE filter, rinsed with hexanes (3×2 mL), and concentrated to afford the phosphaguandine as a clear pale yellow viscous oil (0.908 g, 1.863 mmol, 62%). NMR indicated product which exists as a complicated mixture of isomers and rotomers.

$^1$H NMR (500 MHz, Benzene-d$_6$) δ 7.70 (ddt, J=7.6, 1.8, 1.0 Hz, 1H), 7.54-7.49 (m, 2H), 7.41-7.29 (m, 4H), 7.15 (dtd, J=7.7, 6.1, 1.7 Hz, 1H), 7.07-7.03 (m, 3H), 7.03-6.98 (m, 1H), 6.97-6.90 (m, 6H), 6.85-6.81 (m, 1H), 6.61 (td, J=7.7, 1.8 Hz, 1H), 5.08 (d, J=4.4 Hz, 1H), 5.01 (dd, J=6.3, 4.5 Hz, 1H), 4.94 (d, J=4.5 Hz, 1H), 4.45 (s, 2H). $^{13}$C NMR (126 MHz, Benzene-d$_6$) δ 157.46 (d, J=32.4 Hz), 142.32, 139.97, 134.16 (d, J=4.8 Hz), 134.00 (d, J=4.8 Hz), 132.30, 131.90, 131.21, 129.61, 128.85 (d, J=7.4 Hz), 128.49, 128.18 (d, J=3.0 Hz), 126.87, 126.68, 125.94, 55.16 (d, J=34.3 Hz), 45.96. $^{31}$P NMR (202 MHz, Benzene-d$_6$) δ −16.59.

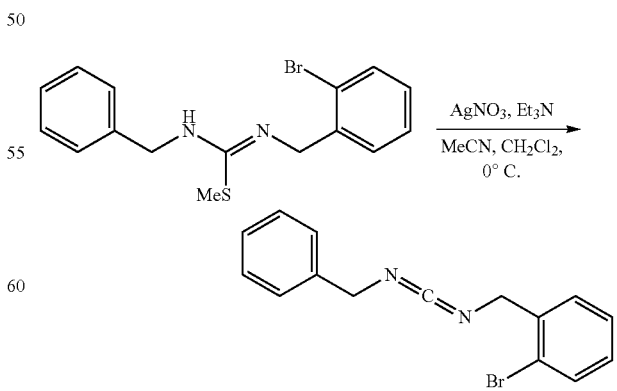

A solution of the isothiourea (5.253 g, 15.039 mmol, 1.00 eq) and Et$_3$N (1.674 g, 2.30 mL, 16.543 mmol, 1.10 eq) in acetonitrile-CH$_2$Cl$_2$ (150 mL, 1:1) in an oven-dried brown jar was placed in an ice water bath for 30 minutes upon which solid AgNO$_3$ (2.682 g, 15.791 mmol, 1.05 eq) was added all at once. After stirring (500 rpm) for 2 hours the now canary yellow heterogeneous mixture was diluted with hexanes (100 mL), stirred vigorously (1000 rpm) for 2 minutes, suction filtered cold through a pad of celite, concentrated to approximately 10 mL, diluted with hexanes (50 mL), concentrated to approximately 10 mL, this process was repeated three times more to remove residual acetonitrile, CH$_2$Cl$_2$, and to triturate remaining ammonium and silver salts, hexanes (25 mL) was added to the resultant heterogeneous mixture which was then suction filtered through a pad of celite, and concentrated to afford the monocarbodiimide as clear pale yellow viscous oil (3.157 g, 9.958 mmol, 67%, 95% pure by $^1$H-NMR). NMR indicated minor impurities (approximately 5%). The carbodiimide was used in the subsequent reaction without further purification.

$^1$H NMR (500 MHz, Chloroform-d) δ 7.54 (dd, J=7.9, 1.1 Hz, 1H), 7.35-7.25 (m, 6H), 7.25-7.22 (m, 2H), 7.17-7.12 (m, 1H), 4.44 (s, 2H), 4.37 (s, 2H). $^{13}$C NMR (126 MHz, Chloroform-d) δ 140.94, 138.21, 137.51, 132.69, 129.55, 129.07, 128.60, 127.68, 127.49, 127.43, 123.15, 50.51, 50.31. HRMS: calc'd C$_{15}$H$_{13}$N$_2$Br [M+H]$^+$ as 301.0335; found 301.0452.

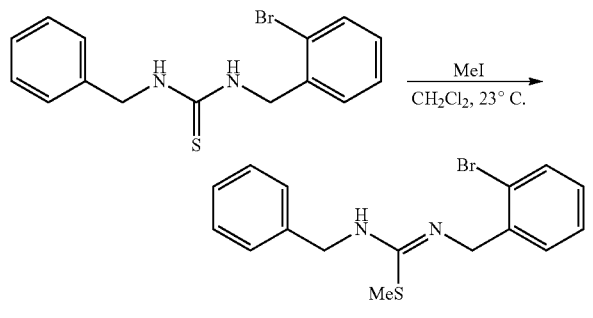

To a stirring (300 rpm) solution of the thiourea (5.158 g, 15.385 mmol, 1.00 eq) in CH$_2$Cl$_2$ (75 mL) was added iodomethane (8.735 g, 3.80 mL, 61.540 mmol, 4.00 eq). After 16 hours the clear golden yellow solution was neutralized with a saturated aqueous mixture of NaHCO$_3$ (50 mL), then aqueous NaOH (10 mL, 1 N) was added, the biphasic mixture was stirred vigorously (1000 rpm) for 2 minutes, then poured into a separatory funnel, partitioned, organics were washed with an aqueous saturated mixture of NaHCO$_3$ (2×50 mL), residual organics were extracted from the aqueous layer using CH$_2$Cl$_2$ (2×20 mL), combined, washed with brine (1×25 mL), dried over solid Na$_2$SO$_4$, decanted, and concentrated to afford the isothiourea as a viscous clear golden yellow oil (5.253 g, 15.039 mmol, 98%). NMR results indicated that the product existed as a mixture of isomers/tautomers and contains minor impurities. The crude isothiourea was used in the subsequent reaction without further purification.

$^1$H NMR (400 MHz, Chloroform-d) δ 7.54 (dd, J=7.9, 1.2 Hz, 1H), 7.53-7.32 (m, 5H), 7.27 (ddt, J=8.9, 4.3, 2.1 Hz, 2H), 7.15-7.08 (m, 1H), 4.61 (s, 2H), 4.60 (m, 1H), 4.58 (s, 2H), 2.42 (s, 3H). $^{13}$C NMR (126 MHz, Chloroform-d) δ 162.03, 152.53, 133.10, 132.65, 132.38, 132.35, 132.04, 129.85, 128.94, 128.62, 128.55, 128.49, 128.45, 127.67, 127.66, 127.62, 127.59, 127.33, 127.00, 53.36, 47.76, 14.43. HRMS (ESI): calc'd C$_{16}$H$_{17}$BrN$_2$S [M+H]$^+$ as 349.0999; found 349.0333. HRMS (ESI): calc'd C$_{16}$H$_{17}$BrN$_2$S [M+H]$^+$ as 351.0348; found 351.0312.

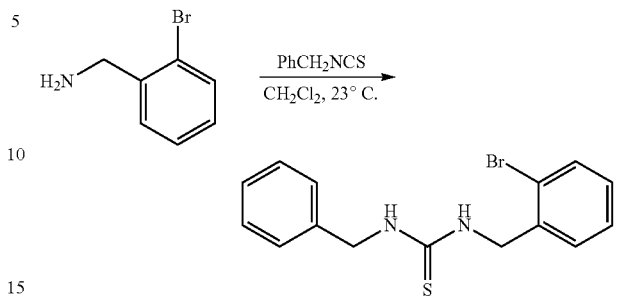

To a solution of 2-bromobenzylamine (3.000 g, 2.0 mL, 16.125 mmol, 1.00 eq) in CH$_2$Cl$_2$ (100 mL) was added benzylisothiocyanate (2.406 g, 2.20 mL, 16.125 mmol, 1.00 eq). After stirring (500 rpm) for 24 hours at 23° C. the clear golden yellow solution was concentrated in vacuo to afford the thiourea as an off-white solid (4.127 g, 12.667 mmol, 76%, approximately 80% pure). NMR indicated product which is approximately 80% pure containing residual starting isothiocyanate and 2-bromobenzylamine. The crude material was used in the subsequent reaction without further purification.

$^1$H NMR (500 MHz, Chloroform-d) δ 7.47 (dd, J=8.0, 1.2 Hz, 1H), 7.26 (qd, J=7.7, 6.8, 3.6 Hz, 4H), 7.19 (td, J=7.2, 1.5 Hz, 3H), 7.09 (td, J=7.7, 1.8 Hz, 1H), 6.70 (d, J=54.3 Hz, 2H), 4.71-4.60 (m, 2H), 4.51 (s, 2H). $^{13}$C NMR (126 MHz, Chloroform-d) δ 182.02, 136.85, 136.39, 132.76, 129.89, 129.30, 128.83, 127.82, 127.69, 127.54, 123.42, 48.39, 48.33.

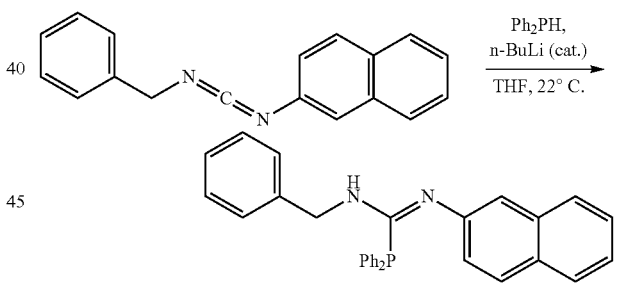

To a clear colorless solution of diphenylphosphine (0.756 g, 0.71 mL, 4.064 mmol, 1.00 eq) in anhydrous de-oxygenated THF (5 mL) in a nitrogen filled glovebox at 22° C. was added a solution of n-butyl lithium (n-BuLi) (85.0 µL, 0.2032 mmol, 0.05 eq, titrated 2.40 M in hexanes). The now red-orange solution was allowed to stir (300 rpm) for 1 minute upon which a solution of the monocarbodiimide (1.050 g, 4.064 mmol, 1.00 eq) in THF (15 mL) in a quick dropwise manner. After stirring (300 rpm) for 48 hours the now canary yellow solution was concentrated, suspended in anhydrous de-oxygenated toluene (3 mL), concentrated, the resultant mixture was suspended in toluene (3 mL), concentrated, this process was repeated 2× more, the resultant mixture was suspended in toluene (3 mL), stirred vigorously (1000 rpm) for 2 minutes, then filtered through a 0.45 µm PTFE submicron filter, rinsed with toluene (3×2 mL), and concentrated to afford the phosphaguanidine as an amorphous solid (1.682 g, 3.784 mmol, 93%). NMR results indicated that the product was pure.

$^1$H NMR (500 MHz, Benzene-d$_6$) δ 7.53 (dd, J=8.0, 1.2 Hz, 1H), 7.47 (t, J=7.6 Hz, 2H), 7.31 (dtd, J=7.5, 4.8, 2.5 Hz, 5H), 7.25-7.21 (m, 1H), 7.16 (ddd, J=8.1, 6.8, 1.3 Hz, 1H), 7.13-7.05 (m, 6H), 7.03-6.96 (m, 1H), 6.95-6.87 (m, 7H), 4.79 (t, J=5.5 Hz, 1H), 4.55 (d, J=5.4 Hz, 2H). $^{13}$C NMR (126 MHz, Benzene-d$_6$) δ 157.58 (d, J=37.3 Hz), 149.04 (d, J=12.4 Hz), 139.28, 134.48, 134.35 (d, J=3.9 Hz), 134.11 (d, J=20.4 Hz), 130.28, 129.16, 128.66 (d, J=7.5 Hz), 128.01, 127.59, 127.09, 126.96, 125.64, 124.36, 123.63, 118.55 (d, J=3.1 Hz), 46.11. $^{31}$P NMR (202 MHz, Benzene-d$_6$) δ −14.13.

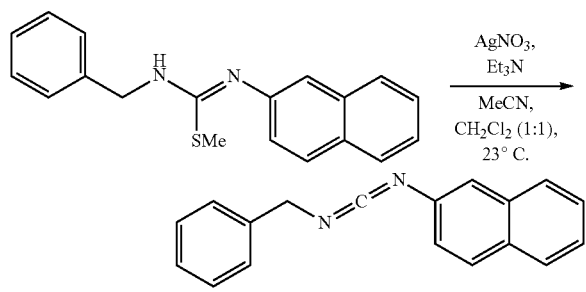

To a purple solution of the crude isothiourea (1.473 g, 4.807 mmol, 1.00 eq) and Et$_3$N (0.535 g, 0.74 mL, 5.288 mmol, 1.10 eq) in acetonitrile-CH$_2$Cl$_2$ (90 mL, 1:1) at 23° C. in an oven-dried brown jar was added solid AgNO$_3$ (0.857 g, 5.047 mmol, 2.00 eq) all at once. After stirring (500 rpm) for 1.5 hours the brown heterogeneous mixture was diluted with toluene (100 mL), stirred vigorously (1000 rpm) for 2 minutes, suction filtered over a pad of celite, concentrated to approximately 10 mL, toluene (25 mL) was added, the black mixture was concentrated to approximately 10 mL, this process was repeated two more times to remove residual acetonitrile, CH$_2$Cl$_2$, and to triturate residual silver and ammonium salts, the resultant black heterogeneous mixture was diluted with toluene (25 mL), suction filtered through a pad of celite, and concentrated to afford the monocarbodiimide as a tan red solid (1.084 g, 4.200 mmol, 87%). NMR had indicated product with trace impurities and toluene.

$^1$H NMR (500 MHz, Chloroform-d) δ 7.79-7.76 (m, 1H), 7.74 (dd, J=8.7, 0.7 Hz, 1H), 7.72-7.68 (m, 1H), 7.48-7.43 (m, 1H), 7.43-7.38 (m, 6H), 7.36-7.31 (m, 1H), 7.15 (dd, J=8.7, 2.2 Hz, 1H), 4.62 (d, J=0.5 Hz, 2H). $^{13}$C NMR (126 MHz, Chloroform-d) δ 137.87, 137.46, 137.38, 133.95, 131.03, 129.21, 128.85, 127.89, 127.68, 127.47, 127.14, 126.52, 125.20, 123.14, 120.66, 50.63. HRMS (ESI): calc'd C$_{18}$N$_{14}$N$_2$ [M+H]$^+$ as 259.1230; found 259.1222.

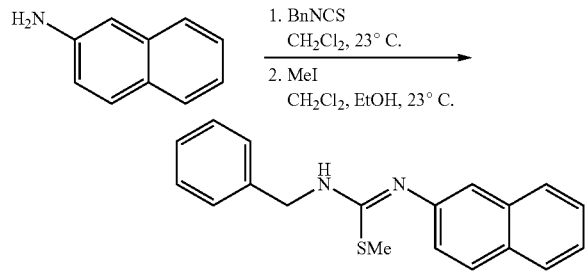

To a solution of 2-naphthylamine (1.104 g, 7.250 mmol, 1.00 eq) in CH$_2$Cl$_2$ (50 mL) at 23° C. was added benzylisothiocyanate (1.082 g, 0.96 mL, 7.250 mmol, 1.00 eq) neat via syringe. After stirring (300 rpm) for 24 hours the clear pale purple solution was concentrated, suspended in toluene (25 mL), heated to reflux, the now dark purple-black solution was allowed to gradually cool to 23° C., the resultant heterogeneous mixture was placed in the freezer (−20° C.) for 12 hrs, suction filtered cold, the resultant purple-black solid was washed with toluene (3×5 mL), collected, and dried in vacuo to afford the thiourea (1.544 g, 5.280 mmol, 73%).

To a dark heterogeneous mixture of the thiourea in CH$_2$Cl$_2$-EtOH (100 mL) at 23° C. was added iodomethane (2.998 g, 1.30 mL, 21.120 mmol, 4.00 eq). After stirring (500 rpm) for 20 hours the dark purple solution was neutralized with a saturated aqueous mixture of NaHCO$_3$ (100 mL), stirred vigorously (1000 rpm) for 2 minutes, poured into a separatory funnel, partitioned, organics were washed with a saturated aqueous mixture of NaHCO$_3$ (2×50 mL), residual organics were extracted from the aqueous layer using CH$_2$Cl$_2$ (2×20 mL), combined, dried over solid Na$_2$SO$_4$, decanted, and concentrated to afford the crude methyl thioguanidine as a black solid (1.473 g, 4.807 mmol, 91%). The crude, impure thioguanidine was used in the subsequent reaction without further purification.

$^1$H NMR (500 MHz, Chloroform-d) δ 7.79 (d, J=8.7 Hz, 2H), 7.75 (dd, J=8.2, 1.1 Hz, 1H), 7.46-7.29 (m, 7H), 7.18 (dd, J=8.6, 2.1 Hz, 1H), 4.82 (s, 1H), 4.59 (s, 2H), 2.31 (s, 3H). $^{13}$C NMR (126 MHz, Chloroform-d) δ 147.14, 138.43, 134.43, 130.20, 128.75, 127.78, 127.67, 127.59, 127.10, 125.94, 124.07, 123.37, 117.98, 47.38, 14.13. HRMS (ESI): calc'd C$_{19}$H$_{18}$N$_2$S [M+H]$^+$ as 307.1224; found 307.1201.

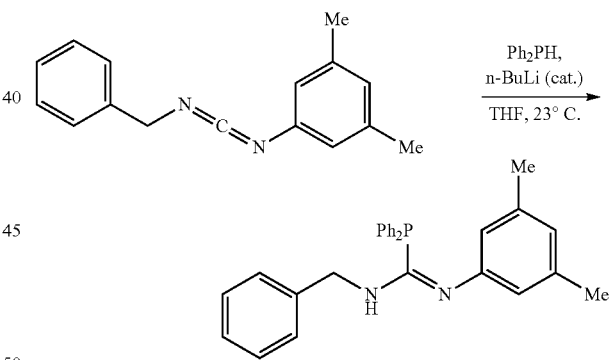

To a solution of diphenylphosphine (0.185 g, 0.17 mL, 0.9961 mmol, 1.00 eq) in anhydrous de-oxygenated THF (5 mL) in a nitrogen filled glovebox at 23° C. was added n-BuLi (20.0 uL, 0.0498 mmol, 0.05 eq, titrated 2.40 M solution in toluene). After stirring (300 rpm) for 2 minutes a solution of the monocarbodiimide (0.235 g, 0.9961 mmol, 1.00 eq) in THF (5 mL) was added in a quick dropwise manner. After stirring for 48 hours the red-purple solution was concentrated, suspended in anhydrous de-oxygenated hexanes (5 mL), concentrated, this process was repeated three times more, the resultant dark red-purple solid was suspended in hexanes-toluene (10 mL, 4:1), stirred vigorously (1000 rpm) for 2 minutes, gravity filtered using a PTFE fritted filter, and concentrated to afford the phosphaguanidine as a light brown solid (0.396 g, 0.9092 mmol, 91%, 97% pure). NMR indicated product in approximately 97% purity which exists as a mixture of tautomers and contains residual diphenylphosphine.

$^1$H NMR (500 MHz, Benzene-d$_6$) δ 7.36 (td, J=7.2, 2.9 Hz, 4H), 7.09-7.03 (m, 4H), 7.01-6.89 (m, 8H), 6.63 (s, 2H), 6.51 (s, 1H), 4.69 (d, J=5.6 Hz, 1H), 4.52 (d, J=5.4 Hz, 2H), 2.06 (s, 7H). $^{13}$C NMR (126 MHz, Benzene-d$_6$) δ 156.75 (d, J=37.2 Hz), 151.16 (d, J=12.1 Hz), 139.51, 137.23, 134.92 (d, J=15.3 Hz), 134.42, 134.12 (d, J=20.1 Hz), 128.98, 128.60, 128.54, 128.26, 126.84, 123.97, 120.87, 46.00, 21.08. $^{31}$P NMR (202 MHz, Benzene-d$_6$) δ −14.89.

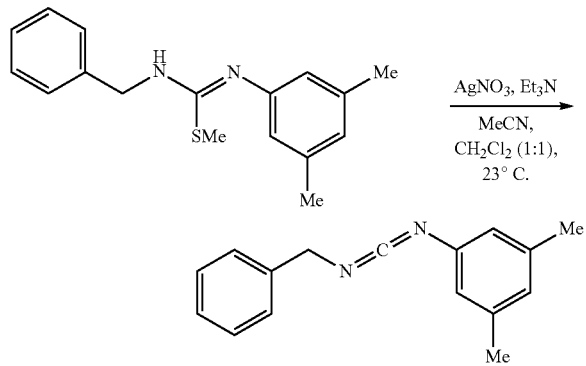

To a purple solution of the crude isothiourea (2.022 g, 7.109 mmol, 1.00 eq) and Et$_3$N (1.511 g, 2.10 mL, 14.929 mmol, 2.10 eq) in acetonitrile-CH$_2$Cl$_2$ (75 mL, 1:1) at 23° C. in an oven-dried brown jar was added solid AgNO$_3$ (2.415 g, 14.218 mmol, 2.00 eq) all at once. After stirring (500 rpm) for 2 hours the brown heterogeneous mixture was diluted with toluene (100 mL), stirred vigorously (1000 rpm) for 2 minutes, suction filtered over a pad of celite, concentrated to approximately 10 mL, toluene (25 mL) was added, the black mixture was concentrated to approximately 10 mL, this process was repeated two more times to remove residual acetonitrile, CH$_2$Cl$_2$, and to triturate residual silver and ammonium salts, the resultant black heterogeneous mixture was diluted with toluene (25 mL), suction filtered through a pad of celite, concentrated, re-suspended in toluene (20 mL), suction filtered again through a pad of celite, and concentrated to afford the monocarbodiimide as a dark red viscous oil (1.576 g, 6.669 mmol, 94%). NMR results indicated that the product was present with trace impurites. The carbodiimide was used in the subsequent reaction without further purification.

$^1$H NMR (500 MHz, Chloroform-d) δ 7.40-7.38 (m, 4H), 7.33 (ddddd, J=9.1, 5.4, 3.3, 2.8, 0.6 Hz, 1H), 6.75 (tp, J=1.5, 0.7 Hz, 1H), 6.62 (dp, J=1.9, 0.6 Hz, 2H), 4.59-4.55 (m, 2H), 2.26 (q, J=0.7 Hz, 6H). $^{13}$C NMR (126 MHz, Chloroform-d) δ 139.61, 138.99, 138.01, 137.82, 128.78, 127.77, 127.47, 126.68, 121.36, 50.56, 21.11. HRMS (ESI): calc'd C$_{16}$H$_{16}$N$_2$ [M+H]$^+$ as 237.1386; found 237.1384.

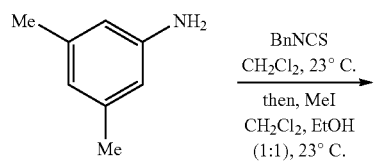

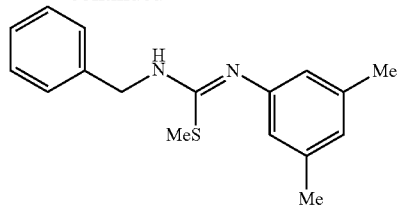

To a solution of the aniline (1.000 g, 1.02 mL, 8.252 mmol, 1.00 eq) in CH$_2$Cl$_2$ (25 mL) was added neat benzylisothiocyanate (1.231 g, 1.10 mL, 8.252 mmol, 1.00 eq) via syringe. After stirring (300 rpm) for 24 hours an aliquot was removed and NMR had indicated complete conversion to the thiourea. To the clear colorless reaction solution was added EtOH (25 mL) following which iodomethane (2.343 g, 1.00 mL, 16.504 mmol, 2.00 eq) was added. After stirring for 24 hours the clear pale yellow solution was neutralized with a saturated aqueous mixture of NaHCO$_3$ (50 mL), aqueous NaOH (15 mL, 1 N) was then added, the biphasic mixture was stirred vigorously (1000 rpm) for 2 minutes, poured into a separatory funnel, partitioned, organics were washed with a saturated aqueous mixture of NaHCO$_3$ (3×25 mL), residual organics were extracted with CH$_2$Cl$_2$ (1×20 mL), dried over solid Na$_2$SO$_4$, decanted, and concentrated to afford the crude methylisothiourea as a clear golden yellow viscous oil (2.022 g, 7.109 mmol, 86%). NMR indicated product exists as a complex mixture of isomers and tautomers and contains impurities. The crude isothiourea was used in the subsequent reaction without further purification.

Characterization of the Thiourea:

$^1$H NMR (500 MHz, Chloroform-d) δ 8.13 (s, 1H), 7.35-7.23 (m, 5H), 6.89 (s, 1H), 6.81 (d, J=1.6 Hz, 2H), 6.33 (t, J=5.5 Hz, 1H), 4.87 (d, J=5.5 Hz, 2H), 2.28 (s, 6H). $^{13}$C NMR (126 MHz, Chloroform-d) δ 180.79, 140.08, 137.42, 135.77, 129.07, 128.72, 127.66, 127.57, 122.87, 49.34, 21.23.

Characterization of the Methylisothiourea:

$^1$H NMR (400 MHz, Chloroform-d) δ 7.44-7.20 (m, 5H), 6.65 (s, 1H), 6.53 (s, 2H), 4.74 (s, 1H), 4.50 (s, 2H), 2.31-2.27 (br s, 3H), 2.26-2.25 (br s, 6H).

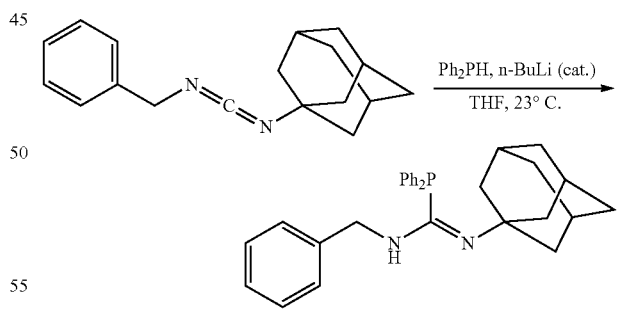

To a solution of diphenylphosphine (0.115 g, 0.10 mL, 0.6156 mmol, 1.00 eq) in anhydrous de-oxygenated THF (1 mL) in a nitrogen filled glovebox at 23° C. was added n-BuLi (13.0 uL, 0.0308 mmol, 0.05 eq, titrated 2.40 M solution in toluene). After stirring (300 rpm) for 2 minutes a solution of the monocarbodiimide (0.164 g, 0.6156 mmol, 1.00 eq) in THF (5 mL) was added in a quick dropwise manner over 1 minute to the now clear red-orange solution. After stirring for 48 hours the pale yellow solution was concentrated, suspended in anhydrous de-oxygenated hexanes (5 mL), concentrated, this process was repeated three times more, the resultant dark yellow solid was suspended in hexanes (10 mL), stirred vigorously (1000 rpm) for 2 minutes, filtered through a 0.45 μm submicron PTFE filter, and concentrated to afford the phosphaguandine as a clear pale yellow viscous oil (0.266 g, 0.5881 mmol, 95%). NMR results indicated that there a pure product existed predominantly as a single isomer with trace minor isomers as well as hexanes.

Characterization of Major Isomer:

$^1$H NMR (500 MHz, Benzene-$d_6$) δ 7.45 (dddd, J=10.3, 5.6, 2.6, 1.4 Hz, 6H), 7.20-7.15 (m, 2H), 7.06-6.96 (m, 7H), 5.01 (d, J=4.8 Hz, 2H), 3.84 (s, 1H), 2.10 (d, J=2.9 Hz, 6H), 1.87 (p, J=3.0 Hz, 3H), 1.56-1.44 (m, 6H). $^{13}$C NMR (126 MHz, Benzene-$d_6$) δ 154.83 (d, J=34.0 Hz), 142.81, 134.63 (d, J=14.2 Hz), 134.04 (d, J=19.8 Hz), 129.05, 128.80 (d, J=6.7 Hz), 127.95, 127.38, 125.84, 55.68 (d, J=36.4 Hz), 52.71, 41.64, 36.54, 29.66. $^{31}$P NMR (202 MHz, Benzene-$d_6$) δ −15.75.

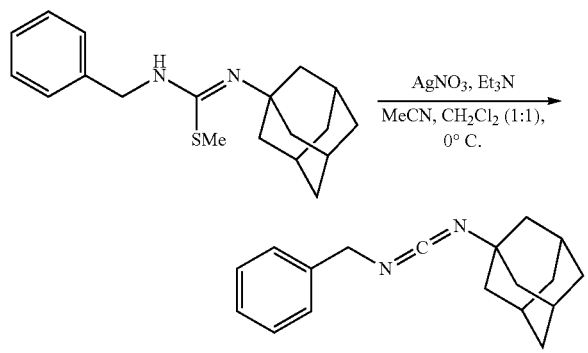

A clear pale yellow solution of the crude isothiourea (1.330 g, 4.229 mmol, 1.00 eq) and Et$_3$N (0.471 g, 0.65 mL, 4.652 mmol, 1.10 eq) in acetonitrile-CH$_2$Cl$_2$ (50 mL, 1:1) in an oven-dried brown jar was placed in an ice water bath for 30 minutes upon which solid AgNO$_3$ (0.754 g, 4.440 mmol, 1.05 eq) was added all at once. After stirring (500 rpm) for 2 hours the canary yellow heterogeneous mixture was diluted with hexanes (100 mL), stirred vigorously (1000 rpm) for 2 minutes, suction filtered over a pad of celite, concentrated to approximately 10 mL, hexanes (25 mL) was added, the golden brown mixture was concentrated to approximately 10 mL, this process was repeated two more times to remove residual acetonitrile, CH$_2$Cl$_2$, and to triturate residual silver and ammonium salts, the resultant brown heterogeneous mixture was diluted with hexanes (25 mL), suction filtered through a pad of celite, concentrated, re-suspended in hexanes (10 mL), filtered through a 0.45 μm submicron PTFE filter, and concentrated to afford the monocarbodiimide as a clear pale yellow oil (1.051 g, 3.945 mmol, 93%). NMR indicated product with trace impurities.

$^1$H NMR (500 MHz, Chloroform-d) δ 7.40-7.21 (m, 5H), 4.34 (s, 2H), 2.13-1.94 (m, 6H), 1.72-1.52 (m, 9H). $^{13}$C NMR (126 MHz, Chloroform-d) δ 140.95, 138.73, 128.52, 127.84, 127.42, 55.44, 50.92, 44.60, 35.93, 29.77. HRMS (ESI): calc'd C$_{18}$H$_{22}$N$_2$ [M+H]$^+$ as 267.1856; found 267.1865.

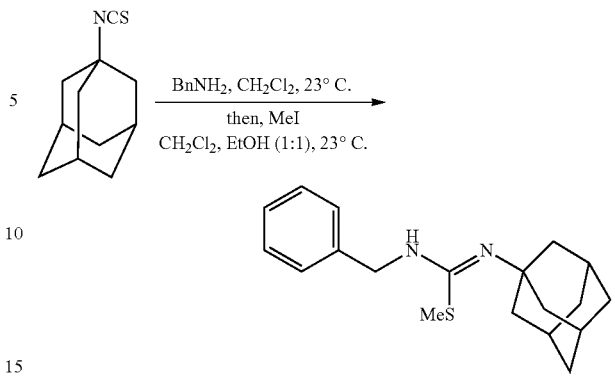

To a solution of adamantylisothiocyanate (1.000 g, 5.173 mmol, 1.00 eq) in CH$_2$Cl$_2$ (25 mL) was added neat benzylamine (0.554 g, 0.57 mL, 5.173 mmol, 1.00 eq) via syringe. After stirring for 24 hours an aliquot was removed, concentrated, and NMR had indicated complete conversion to the thiourea. To the clear colorless reaction solution was added EtOH (25 mL) following which iodomethane (1.469 g, 0.65 mL, 10.346 mmol, 2.00 eq) was added. After stirring for 24 hours a saturated aqueous mixture of NaHCO$_3$ (50 mL) was added to the now pale yellow solution, following which aqueous NaOH (15 mL, 1 N) was added, the biphasic mixture was stirred vigorously (1000 rpm) for 2 minutes, poured into a separatory funnel, partitioned, organics were washed with a saturated aqueous mixture of NaHCO$_3$ (3×50 mL), organics were back extracted from the aqueous layer using CH$_2$Cl$_2$ (2×20 mL), combined, washed with brine (1×20 mL), dried over solid Na$_2$SO$_4$, decanted, and concentrated to afford the crude methylisothiourea as a clear viscous pale yellow oil (1.051 g, 3.342 mmol, 65%). NMR indicated product exists as tautomers and contains other minor impurities. The crude methylisothiourea was used in the subsequent reaction without further purification.

Characterization of the Thiourea:

$^1$H NMR (500 MHz, Chloroform-d) δ 7.42-7.24 (m, 5H), 5.96 (t, J=5.3 Hz, 1H), 5.94-5.84 (m, 1H), 4.77 (d, J=5.3 Hz, 2H), 2.15-2.05 (m, 5H), 1.97 (dd, J=7.1, 2.9 Hz, 8H), 1.71-1.57 (m, 9H). $^{13}$C NMR (126 MHz, Chloroform-d) δ 181.08, 137.37, 128.88, 127.75, 127.44, 54.10, 49.61, 42.31, 35.97, 29.34. HRMS (ESI): calc'd C$_{18}$H$_{24}$N$_2$S [M+H]$^+$ as 301.1733; found 301.1815.

Characterization of the Crude Methylisothiourea:

$^1$H NMR (400 MHz, Chloroform-d) δ 7.41-7.15 (m, 5H), 4.61 (s, 2H), 3.89 (s, 1H), 2.35 (s, 3H), 2.09 (d, J=6.6 Hz, 6H), 1.99 (d, J=3.0 Hz, 3H), 1.67 (q, J=5.2, 4.0 Hz, 6H). $^{13}$C NMR (101 MHz, Chloroform-d) δ 147.93, 142.37, 128.03, 127.06, 125.86, 54.84, 53.15, 41.92, 36.65, 29.70, 15.53. HRMS (ESI): calc'd C$_{19}$H$_{26}$N$_2$S [M+H]$^+$ as 315.1890; found 315.1974.

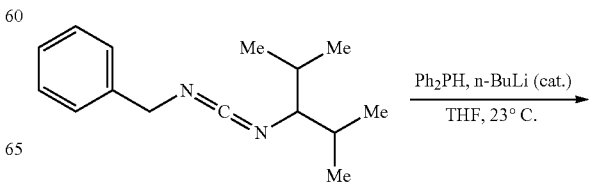

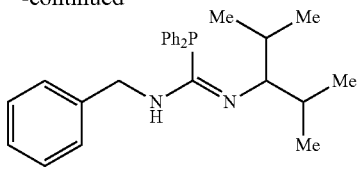

To a clear colorless solution of diphenylphosphine (86.1 mg, 80.0 uL, 0.4623 mmol, 1.00 eq) in anhydrous de-oxygenated THF (1 mL) in a nitrogen filled glovebox at 23° C. was added n-BuLi (30.0 uL, 0.0694 mmol, 0.15 eq, titrated 2.40 M solution in toluene). After stirring (300 rpm) for 2 minutes a solution of the monocarbodiimide (107.0 mg, 0.4623 mmol, 1.00 eq) in THF (5 mL) was added in a quick dropwise manner over 1 minute to the now red-orange solution. After stirring for 48 hours the red-orange solution was concentrated, suspended in anhydrous de-oxygenated hexanes (5 mL), concentrated, this process was repeated three times more, the resultant dark red-orange solid was suspended in hexanes (10 mL), stirred vigorously (1000 rpm) for 2 minutes, filtered through a 0.45 μm submicron PTFE filter, rinsed with hexanes (3×3 mL), and concentrated to afford the phosphaguandine as a clear pale yellow viscous oil (168.0 mg, 0.4033 mmol, 87%). NMR indicated pure product which exists as a mixture of isomers. The asterisk (*) denotes the minor isomers.

$^1$H NMR (500 MHz, Benzene-d$_6$) δ 7.50-7.43 (m, 6H), 7.18 (t, J=7.7 Hz, 2H), 7.08-6.95 (m, 7H), 5.00 (d, J=4.7 Hz, 2H) (3.76 (d, J=9.5 Hz, 2H)*), (4.40 (t, J=5.6 Hz, 1H)*) 4.35 (d, J=5.4 Hz, 1H), 4.29 (dt, J=9.6, 6.2 Hz, 1H) (3.90 (dt, J=9.3, 5.7 Hz, 1H), (2.07-1.97 (m, 2H)*) 1.48 (hept, J=6.7 Hz, 2H), (0.95 (d, J=6.7 Hz, 6H)*) 0.87 (d, J=6.7 Hz, 6H), (0.91 (d, J=6.8 Hz, 6H)*) 0.66 (d, J=6.8 Hz, 6H). $^{13}$C NMR (126 MHz, Benzene-d$_6$) δ 156.57 (d, J=31.6 Hz) (154.26 (d, J=33.3 Hz)*), 142.89 (140.46*), (135.19 (d, J=15.3 Hz)*) 134.16 (d, J=11.5 Hz), 134.19 (d, J=19.3 Hz) (133.82 (d, J=19.8 Hz)*), 129.14 (128.83*), 128.79 (d, J=7.4 Hz) (128.63 (d, J=6.7 Hz)*), 128.17 (127.98*), (126.49*) 125.86, (71.42 (d, J=30.2 Hz)*) 55.10 (d, J=34.2 Hz), 59.06 (45.97*), (31.03*) 30.31, (20.57*) 20.40, (18.49*) (18.47*) 17.34.

$^{31}$P NMR (202 MHz, Benzene-d$_6$) δ −13.03, (−14.96*), (−25.43*).

tautomers and isomers. To the clear pale yellow reaction solution was added EtOH (25 mL) following which iodomethane (1.232 g, 0.54 mL, 8.680 mmol, 2.00 eq) was added in a quick dropwise manner. After stirring for 24 hours a saturated aqueous mixture of NaHCO$_3$ (50 mL) was added, following which aqueous NaOH (15 mL) was added, the biphasic mixture was stirred vigorously (1000 rpm) for 2 minutes, poured into a separatory funnel, partitioned, organics were washed with a saturated aqueous mixture (3×50 mL), organics were back extracted from the aqueous layer using CH$_2$Cl$_2$ (2×20 mL), combined, washed with brine (1×20 mL), dried over solid Na$_2$SO$_4$, decanted, and concentrated to afford the crude methylisothiourea as a clear viscous pale yellow oil (1.157 g). NMR indicated product exists as a complex mixture of isomers and tautomers along with other minor impurities. The crude methylisothiourea was used in the subsequent reaction without further purification.

A solution of the crude isothiourea (0.941 g, 3.379 mmol, 1.00 eq) and Et$_3$N (0.376 g, 0.52 mL, 3.717 mmol, 1.10 eq) in acetonitrile-CH$_2$Cl$_2$ (40 mL, 1:1) was placed in an ice water bath for 30 minutes upon which solid AgNO$_3$ (0.603 g, 3.548 mmol, 1.05 eq) was added all at once. After stirring (500 rpm) for 2 hours the now canary yellow heterogeneous mixture was diluted with hexanes (100 mL), stirred vigorously (1000 rpm) for 2 minutes, removed from the ice water bath, suction filtered cold through a pad of celite, concentrated to approximately 10 mL, diluted with hexanes (25 mL), concentrated to approximately 10 mL, this process was repeated three times more to remove residual CH$_2$Cl$_2$, acetonitrile, and triturate ammonium and silver salts, the resultant pale brown heterogeneous mixture was diluted with hexanes (25 mL), suction filtered through a pad of celite, and concentrated to afford the monocarbodiimide as a clear colorless oil (0.583 g, 2.353 mmol, 58% three steps). NMR indicated product with trace impurities. The mono-carbodiimide was used in the subsequent reaction without further purification.

$^1$H NMR (500 MHz, Chloroform-d) δ 7.37-7.24 (m, 5H), 4.37 (d, J=1.3 Hz, 2H), 2.77 (td, J=6.2, 1.4 Hz, 1H), 1.75 (dqd, J=13.2, 6.6, 1.4 Hz, 2H), 0.87 (dd, J=6.8, 1.4 Hz, 6H), 0.84 (dd, J=6.6, 1.4 Hz, 6H). $^{13}$C NMR (126 MHz, Chloroform-d) δ 139.55, 138.80, 128.56, 127.56, 127.34, 70.74, 50.69, 30.26, 20.25, 17.72. HRMS (ESI): calc'd C$_{15}$H$_{22}$N$_2$ [M+H]$^+$ as 231.1856; found 231.1856.

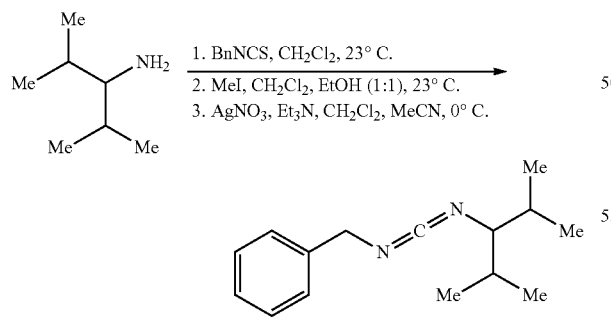

To a solution of the amine (0.500 g, 0.63 mL, 4.340 mmol, 1.00 eq) in CH$_2$Cl$_2$ (25 mL) was added neat benzylisothiocyanate (0.647 g, 0.58 mL, 4.340 mmol, 1.00 eq) via syringe in a quick dropwise manner. After stirring (300 rpm) for 24 hours an aliquot was removed from the clear pale yellow solution, concentrated, and NMR had indicated complete conversion to the thiourea which exists as a mixture of

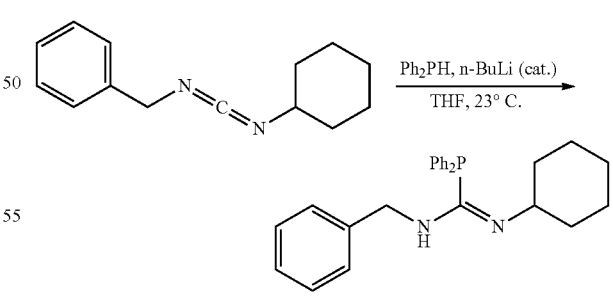

To a clear colorless solution of diphenylphosphine (0.174 g, 0.16 mL, 0.9332 mmol, 1.00 eq) in anhydrous de-oxygenated THF (5 mL) in a nitrogen filled glovebox at 23° C. was added n-BuLi (20.0 uL, 0.0467 mmol, 0.05 eq, titrated 2.40 M solution in toluene) causing the initial solution to change to a clear red-orange solution. After stirring (300 rpm) for 2 minutes a solution of the monocarbodiimide (0.200 g, 0.9332 mmol, 1.00 eq) in THF (5 mL)

was added in a quick dropwise manner. After stirring for 48 hours the pale golden yellow solution was concentrated, suspended in anhydrous de-oxygenated hexanes (5 mL), concentrated, this process was repeated three times more, the resultant golden yellow solid mixture was suspended in hexanes (10 mL), stirred vigorously (1000 rpm) for 2 minutes, filtered through a 0.45 um submicron PTFE filter, rinsed with hexanes (3×3 mL), and concentrated to afford the phosphaguandine as a clear pale yellow viscous oil (0.355 g, 0.8864 mmol, 95%). NMR indicated pure product as a mixture of isomers. The asterisk (*) denotes the minor isomers.

$^1$H NMR (500 MHz, Benzene-d$_6$) δ 7.46-7.36 (m, 5H), 7.16 (t, J=7.7 Hz, 2H), 7.07-6.88 (m, 8H), 5.04 (d, J=4.6 Hz, 2H) (4.47 (d, J=5.3 Hz, 1H)*), 4.25-4.16 (m, 1H) (4.16-4.07 (m, 1H)*), (4.26-4.17 (m, 1H)*) 3.96 (d, J=7.1 Hz, 1H), 1.92-1.78 (m, 2H), 1.74-1.63 (m, 2H), (1.45 (dd, J=11.1, 4.7 Hz, 1H)*) 1.34-1.20 (m, 2H), 1.15 (dtt, J=13.1, 9.8, 3.3 Hz, 2H), 1.01-0.86 (m, 2H). $^{13}$C NMR (126 MHz, Benzene-d$_6$) δ 155.40 (d, J=31.5 Hz) (153.09 (d, J=32.3 Hz)*), 142.74, (140.28)*, (134.91 (d, J=14.3 Hz)*) 134.28 (d, J=13.3 Hz), 134.03 (d, J=20.0 Hz) (133.91 (d, J=20.0 Hz)*), 129.10 (129.00*), 128.79 (d, J=6.7 Hz) (128.69 (d, J=6.7 Hz)*), 128.17 (128.07*), 127.93 (127.51*), (126.56*) 125.90, (59.90 (d, J=33.1 Hz)*) 55.28 (d, J=34.8 Hz), (49.05*) 45.92, 35.37 (32.38*), (26.01*) 25.74, (24.79*) 24.16. $^{31}$P NMR (202 MHz, Benzene-d$_6$) δ (−14.96*), −16.83, (−18.56*).

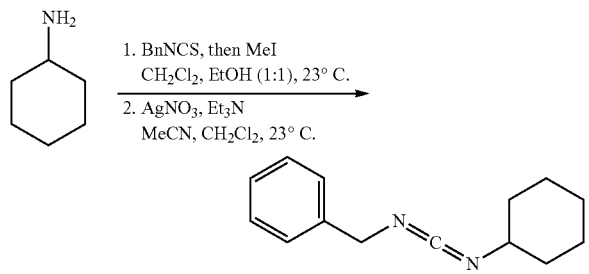

To a solution of benzylisothiocyanate (2.250 g, 2.00 mL, 15.079 mmol, 1.00 eq) in CH$_2$Cl$_2$ (50 mL) was added neat cyclohexylamine (1.495 g, 1.70 mL, 15.079 mmol, 1.00 eq) via syringe. After stirring (300 rpm) for 24 hours at 23° C. EtOH (50 mL) was added following which iodomethane (3.211 g, 1.40 mL, 22.620 mmol, 2.00 eq) was added. After stirring for 24 hours at 23° C. the clear pale yellow solution was neutralized with a saturated aqueous mixture of NaHCO$_3$ (50 mL), following which aqueous NaOH (15 mL, 1 N) was added, the biphasic mixture was stirred vigorously (1000 rpm) for 2 minutes, poured into a separatory funnel, partitioned, organics were washed with a saturated aqueous mixture of NaHCO$_3$ (3×25 mL), residual organics were extracted from the aqueous layer using CH$_2$Cl$_2$ (2×20 mL), combined, dried over solid Na$_2$SO$_4$, decanted, and concentrated to afford the crude methylisothiourea as a clear golden yellow oil (3.740 g, 14.252 mmol, 95%). NMR indicated pure product which exists as a complex mixture of isomers. The crude material was used in the subsequent reaction without purification.

To a clear golden yellow solution of the crude isothiourea (3.740 g, 14.252 mmol, 1.00 eq) and Et$_3$N (1.586 g, 2.20 mL, 15.677 mmol, 1.10 eq) in acetonitrile-CH$_2$Cl$_2$ (150 mL, 1:1) in an oven-dried brown jar at 23° C. was added solid AgNO$_3$ (2.542 g, 14.965 mmol, 1.05 eq) was added all at once. After stirring (500 rpm) for 2 hours the canary yellow heterogeneous mixture was removed diluted with hexanes (100 mL), stirred vigorously (1000 rpm) for 2 minutes, suction filtered over a pad of celite, rinsed with hexanes (3×25 mL), concentrated to approximately 10 mL, hexanes (25 mL) was added, the dark yellow was concentrated to approximately 10 mL, this process was repeated two more times to remove residual acetonitrile, CH$_2$Cl$_2$, and to triturate residual silver and ammonium salts, the resultant dark yellow-brown heterogeneous mixture was diluted with hexanes (25 mL), suction filtered through a pad of celite, rinsed with hexanes (3×25 mL), and concentrated to afford the monocarbodiimide as a clear pale yellow oil (2.510 g, 11.712 mmol, 82%). NMR indicated pure product.

Characterization of the Thiourea:
$^1$H NMR (500 MHz, Chloroform-d) δ 7.39-7.27 (m, 5H), 6.16 (s, 1H), 5.79 (s, 1H), 4.61 (s, 2H), 3.84 (s, 1H), 1.94 (dq, J=12.6, 4.0 Hz, 2H), 1.64 (dt, J=13.8, 3.9 Hz, 2H), 1.56 (dq, J=12.2, 4.0 Hz, 1H), 1.37-1.27 (m, 2H), 1.14 (tt, J=15.3, 7.6 Hz, 3H). $^{13}$C NMR (126 MHz, Chloroform-d) δ 180.54, 136.88, 128.92, 127.92, 127.54, 52.96, 48.38, 32.69, 25.31, 24.51.

Characterization of the Methylisothiourea:
$^1$H NMR (500 MHz, Chloroform-d) δ 7.34 (dt, J=14.8, 7.6 Hz, 4H), 7.23 (t, J=7.3 Hz, 1H), 4.49 (d, J=79.8 Hz, 2H), 4.04 (s, 1H), 3.64 (m, 1H), 2.38 (s, 3H), 2.09-1.80 (m, 2H), 1.72 (dt, J=13.4, 4.1 Hz, 2H), 1.62 (dt, J=13.0, 4.0 Hz, 1H), 1.37 (q, J=12.5 Hz, 2H), 1.20 (q, J=12.2 Hz, 3H). $^{13}$C NMR (126 MHz, Chloroform-d) δ 150.83, 141.74, 128.23, 127.35, 126.42, 54.16, 50.70, 34.61, 25.81, 24.92, 14.44. HRMS (ESI): calc'd C$_{15}$H$_{22}$N$_2$S [M+H]$^+$ 263.1577; found 263.1655.

Characterization of the Monocarbodiimide:
$^1$H NMR (500 MHz, Chloroform-d) δ 7.38-7.24 (m, 6H), 4.35 (s, 2H), 3.15 (dp, J=8.3, 3.8 Hz, 1H), 1.72 (ddt, J=56.9, 13.0, 4.0 Hz, 6H), 1.55-1.48 (m, 1H), 1.31-1.09 (m, 6H). $^{13}$C NMR (126 MHz, Chloroform-d) δ 140.72, 138.70, 128.55, 127.68, 127.43, 55.68, 50.72, 34.68, 25.37, 24.48. HRMS (ESI): calc'd C$_{14}$H$_{18}$N$_2$ [M+H]$^+$ as 215.1543; found 215.1536.

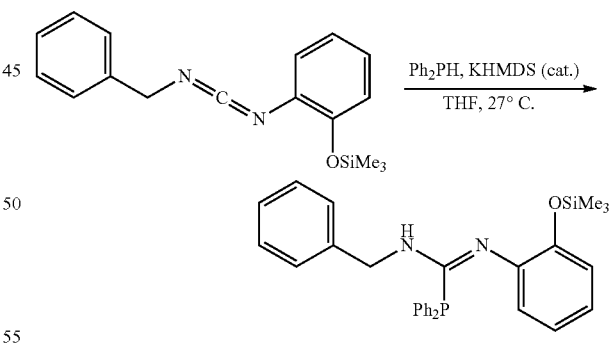

To a solution of diphenylphosphine (0.314 g, 0.29 mL, 1.687 mmol, 1.00 eq) in anhydrous de-oxygenated THF (10 mL) in a nitrogen filled glovebox at 27° C. was added a solution of KHMDS (0.67 mL, 0.3373 mmol, 0.20 eq, non-titrated 0.5 M in toluene). After stirring (500 rpm) for 2 minutes a solution of the monocarbodiimide (0.500 g, 1.687 mmol, 1.00 eq) in THF (5 mL) was added in a quick dropwise fashion. After stirring for 48 hours the red-orange solution was diluted with hexanes (10 mL), concentrated, suspended in hexanes (5 mL), concentrated, this process was repeated three times more, the resultant yellow-orange mixture was suspended in hexanes (10 mL), stirred vigorously (1000 rpm) for 2 minutes, filtered through a 0.45 μm submicron PTFE filter, and concentrated to afford the phosphaguanidine as a clear golden yellow viscous oil (0.606 g, 1.256 mmol, 74%). NMR indicated product exists as a mixture of isomers and contains residual diphenylphosphine. The product for this reaction exists as a mixture of isomers. The asterisk (*) denotes the minor isomers and/or tautomer.

$^1$H NMR (500 MHz, Benzene-d$_6$) δ (7.53-7.43 (m, 4H)*) 7.42-7.36 (m, 4H), 7.18-7.03 (m, 4H), 7.03-6.92 (m, 6H), 6.92-6.88 (m, 1H), 6.85 (dd, J=7.9, 1.5 Hz, 1H), 6.80-6.76 (m, 1H), 6.73-6.69 (m, 1H) (6.62 (td, J=7.5, 1.5 Hz, 1H)*), (6.55 (d, J=8.0 Hz, 1H)*), (5.16 (d, J=4.9 Hz, 1H)*), 4.57 (dd, J=4.9, 2.9 Hz, 2H), 4.71 (t, J=5.4 Hz, 1H) (4.47-4.44 (m, 1H)*), (0.37 (d, J=0.5 Hz, 3H)*) 0.28 (s, 9H) (0.24 (s, 3H)*) (0.22 (s, 3H)*). $^{31}$P NMR (202 MHz, Benzene-d$_6$) δ (-4.72*), (-9.03*), -12.68, (-14.62*), (-14.96*), (-16.95*), (-22.41*).

A solution of the crude isothiourea (1.620 g, 4.705 mmol, 1.00 eq) and Et$_3$N (1.047 g, 1.50 mL, 10.351 mmol, 2.20 eq) in CH$_2$Cl$_2$-acetonitrile (50 mL, 1:1) in an oven-dried brown jar was placed in an ice bath for 30 minutes upon which solid AgNO$_3$ (1.600 g, 9.410 mmol, 2.00 eq) was added all at once. The resultant canary golden yellow heterogeneous mixture was stirred vigorously (1000 rpm) for 2 hrs, then diluted with hexanes (50 mL), stirred vigorously for 2 minutes, suction filtered cold over celite, the filtrate was concentrated to approximately 10 mL, hexanes (50 mL) was added, the mixture was concentrated to approximately 10 mL, this process was repeated three times more to triturate ammonium and silver salts, the mixture was diluted with hexanes (25 mL), suction filtered over a pad of celite, and concentrated to afford the monocarbodiimide as a clear pale yellow oil (1.102 g, 3.717 mmol, 79%). NMR indicated pure product.

$^1$H NMR (500 MHz, Chloroform-d) δ 7.64-7.55 (m, 4H), 7.54-7.46 (m, 1H), 7.25-7.19 (m, 2H), 7.12-6.98 (m, 3H), 4.79 (s, 2H), 0.53 (s, 9H). $^{13}$C NMR (126 MHz, Chloroform-d) δ 150.30, 138.03, 136.84, 130.35, 128.60, 127.49, 127.47, 127.33, 125.51, 125.37, 121.73, 119.35, 77.25, 50.54, 0.30. HRMS: calc'd C$_{17}$H$_{20}$N$_2$OSi [M−SiMe$_3$+2H]$^+$ as 225.1023; found 225.0977.

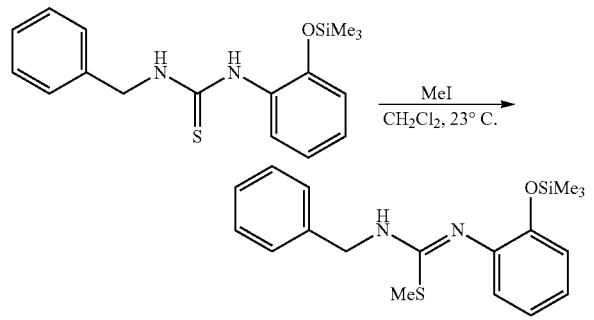

organics were washed with an aqueous saturated mixture of NaHCO$_3$ (2×50 mL), residual organics were extracted from the aqueous layer using CH$_2$Cl$_2$ (2×20 mL), combined, washed with brine (1×25 mL), dried over solid Na$_2$SO$_4$, decanted, and concentrated to afford the isothiourea as a viscous clear golden yellow oil (1.620 g, 4.705 mmol, 100%). NMR indicated product exists as a mixture of isomers/tautomers and contains minor impurities. The crude isothiourea was used in the subsequent reaction without further purification.

$^1$H NMR (500 MHz, Chloroform-d) δ 7.43-7.23 (m, 6H), 6.97-6.80 (m, 3H), 4.73 (s, 1H), 4.62-4.48 (m, 2H), 2.36 (s, 3H), 0.26 (s, 9H). $^{13}$C NMR (126 MHz, Chloroform-d) δ 146.65, 142.93, 138.69, 128.62, 127.61, 127.40, 123.65, 123.42, 122.11, 120.99, 120.81, 116.55, 108.80, 47.18, 14.05, 0.41. HRMS (ESI): calc'd C$_{18}$H$_{24}$N$_2$OSSi [M+H]$^+$ as 345.1412; found 345.1447.

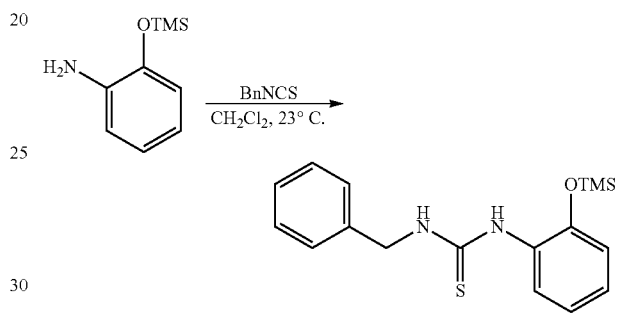

To a red-brown solution of the aniline (5.004 g, 27.599 mmol, 1.00 eq) in CH$_2$Cl$_2$ (125 mL) under nitrogen was added a benzylisothiocyanate (4.118 g, 3.70 mL, 27.599 mmol, 1.00 eq). After stirring (300 rpm) at 23° C. for 48 hours the clear golden yellow solution was concentrated to approximately 10 mL, hexanes (50 mL) was added, the now slight heterogeneous mixture was concentrated to approximately 10 mL, this process was repeated three times more to remove residual CH$_2$Cl$_2$, the resultant suspension in hexanes was diluted with hexanes (20 mL), placed in the freezer (−20° C.) for 4 hrs, removed, suction filtered cold, the resultant solid was washed with cold hexanes (3×25 mL), and dried in vacuo to afford the thiourea as an off-white solid (7.877 g, 23.832 mmol, 86%). NMR indicated pure product.

$^1$H NMR (500 MHz, Chloroform-d) δ 7.79 (s, 1H), 7.31 (d, J=4.6 Hz, 4H), 7.29-7.23 (m, 3H), 7.13 (td, J=7.8, 1.7 Hz, 1H), 6.96 (td, J=7.7, 1.4 Hz, 1H), 6.90 (dd, J=8.1, 1.4 Hz, 1H), 6.42 (s, 1H), 4.86 (d, J=5.5 Hz, 2H), 0.26 (s, 9H). $^{13}$C NMR (126 MHz, Chloroform-d) δ 180.73, 149.05, 137.35, 128.71, 127.97, 127.77, 127.73, 127.67, 125.83, 122.45, 121.14, 49.54.

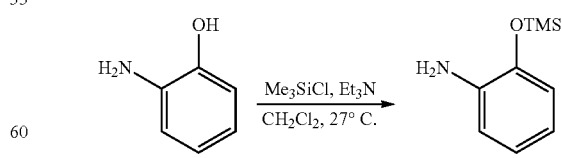

To a stirring (300 rpm) solution of the thiourea (1.555 g, 4.705 mmol, 1.00 eq) in CH$_2$Cl$_2$ (50 mL) was added iodomethane (2.671 g, 1.20 mL, 18.819 mmol, 4.00 eq). After 16 hours the clear golden yellow solution was neutralized with a saturated aqueous mixture of NaHCO$_3$ (50 mL), then aqueous NaOH (10 mL, 1 N) was added, the biphasic mixture was stirred vigorously (1000 rpm) for 2 minutes, then poured into a separatory funnel, partitioned, To an off-white heterogeneous mixture of 2-aminophenol (2.982 g, 27.326 mmol, 1.00 eq) in anhydrous de-oxygenated CH$_2$Cl$_2$ (90 mL) at 27° C. in a nitrogen filled glovebox was added Et$_3$N (5.530 g, 7.60 mL, 54.651 mmol, 2.00 eq) followed by the addition of Me$_3$SiCl (3.266 g, 3.80 mL, 30.059 mmol, 1.10 eq) in a slow dropwise fashion. After stirring (500 rpm) for 24 hours the pale golden yellow solution was removed from the glovebox, neutralized with a saturated aqueous mixture of NaHCO₃ (50 mL), stirred vigorously (1000 rpm) for 2 minutes, poured into a separatory funnel, partitioned, organics were washed with a saturated aqueous mixture of NaHCO₃ (2×50 mL), residual organics were extracted from the aqueous layer using CH₂Cl₂ (2×20 mL), combined, dried over solid Na₂SO₄, decanted, and concentrated to afford the siloxyaniline as a clear golden yellow oil (4.952 g, 27.320 mmol, 100%). NMR indicated pure product and the crude siloxyaniline was used in the subsequent reaction without further purification.

¹H NMR (500 MHz, Chloroform-d) δ 6.85-6.71 (m, 3H), 6.71-6.59 (m, 1H), 3.71 (s, 2H), 0.32 (s, 9H). ¹³C NMR (126 MHz, Chloroform-d) δ 142.75, 138.15, 121.94, 118.50, 118.40, 115.65, 0.43. HRMS (ESI): calc'd C₉O₁₅NOSi [M+H]⁺ as 182.0956; found 182.1015.

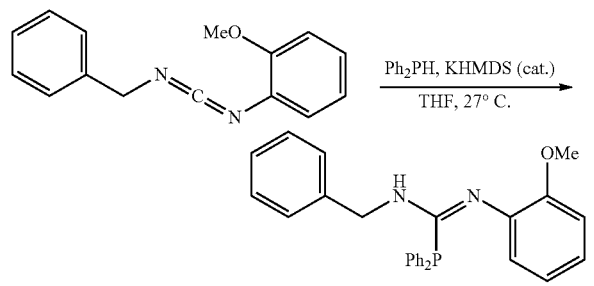

To a solution of diphenylphosphine (0.467 g, 0.43 mL, 2.510 mmol, 1.00 eq) in anhydrous de-oxygenated THF (15 mL) in a nitrogen filled glovebox at 27° C. was added KHMDS (1.30 mL, 0.6275 mmol, 0.25 eq, non-titrated 0.5 M solution in toluene). After stirring (300 rpm) for 2 minutes a solution of the monocarbodiimide (0.598 g, 2.510 mmol, 1.00 eq) in THF (5 mL) was added in a quick dropwise manner. After stirring for 48 hours the red-purple solution was concentrated, suspended in anhydrous de-oxygenated hexanes (5 mL), concentrated, this process was repeated three times more, the resultant dark red-purple solid was suspended in hexanes (10 mL), stirred vigorously (1000 rpm) for 2 minutes, gravity filtered using a PTFE fritted filter, concentrated, the resultant golden yellow viscous oil was suspended in hexanes (5 mL), filtered through a 0.20 μm submicron PTFE filter, rinsed with hexanes (3×2 mL), and concentrated to afford the phosphaguandine as a white amorphous solid (0.188 g, 0.4429 mmol, 18%). NMR had indicated pure product which exists as a mixture of isomers and contains residual hexanes. The product for this reaction exists as a mixture of isomers. The asterisk (*) denotes the minor isomers.

¹H NMR (500 MHz, Benzene-d₆) δ (9.55 (dd, J=8.1, 1.6 Hz, 1H)*) 7.48-7.44 (m, 1H), 7.44-7.34 (m, 6H), 7.17-7.08 (m, 3H), 7.05 (tdd, J=7.5, 1.8, 1.0 Hz, 1H), 7.03-6.90 (m, 8H), 6.85 ((ddd, J=8.0, 7.4, 1.7 Hz, 1H)*) 6.78-6.72 (m, 1H), 6.56 (dd, J=8.0, 1.4 Hz, 1H) (6.36 (dd, J=8.1, 1.4 Hz, 1H)*), (5.10 (d, J=4.7 Hz, 2H)*) 4.55 (d, J=5.5 Hz, 2H), 4.71 (dd, J=5.7 Hz, 1H), 3.33 (s, 3H) (2.89 (s, 2H)*). ³¹P NMR (202 MHz, Benzene-d₆) δ −12.55 (−13.25*).

¹³C NMR (126 MHz, Benzene-d₆) δ 158.06 (d, J=36.2 Hz) (154.78 (d, J=35.3 Hz)*), 151.33 (147.61*), 141.89 (140.84*), (140.74*) 139.63, (134.84 (d, J=15.3 Hz)*) 134.43 (d, J=20.0 Hz), 133.92 (d, J=20.0 Hz) (133.42 (d, J=13.3 Hz)*), (131.26*) 129.13, (128.90*) 128.85, 128.47 (d, J=6.7 Hz), 128.15 (128.10*), 126.75 (126.11*), (123.60*) 122.99, (121.24*) 121.10, 120.34 (118.70*), 111.25 (109.18*), 56.14 (d, J=35.2 Hz) (46.02*), 54.55 (54.50*).

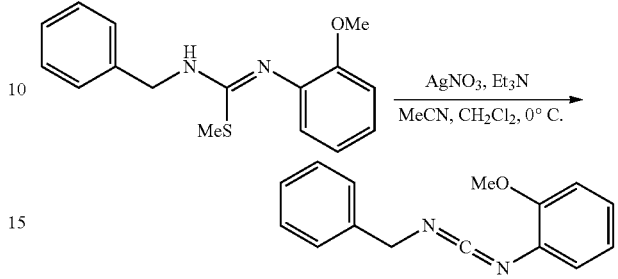

A solution of the isothiourea (4.505 g, 15.730 mmol, 1.00 eq) and Et₃N (3.502 g, 4.80 mL, 34.606 mmol, 2.20 eq) in acetonitrile-CH₂Cl₂ (180 mL, 1:1) in an oven-dried brown jar was placed in an ice water bath for 30 minutes upon which solid AgNO₃ (5.343 g, 31.460 mmol, 2.00 eq) was added all at once. After stirring (500 rpm) for 2 hours the now canary yellow heterogeneous mixture was diluted with hexanes (100 mL), stirred vigorously (1000 rpm) for 2 minutes, suction filtered cold through a pad of celite, concentrated to approximately 10 mL, diluted with hexanes (50 mL), concentrated to approximately 10 mL, this process was repeated three times more to remove residual acetonitrile and CH₂Cl₂ and to triturate remaining ammonium and silver salts, hexanes (25 mL) was added to the resultant heterogeneous mixture which was then suction filtered through a pad of celite, and concentrated to afford the monocarbodiimide as clear pale brown oil (2.330 g, 9.778 mmol, 62%). NMR had shown pure product.

¹H NMR (500 MHz, Chloroform-d) δ 7.43-7.35 (m, 4H), 7.34-7.28 (m, 1H), 7.09 (ddddd, J=8.3, 7.6, 2.6, 1.6, 0.8 Hz, 1H), 7.01 (ddt, J=7.4, 3.8, 1.8 Hz, 1H), 6.90-6.83 (m, 2H), 4.59 (d, J=2.0 Hz, 2H), 3.77 (d, J=1.1 Hz, 3H). ¹³C NMR (126 MHz, Chloroform-d) δ 154.05, 138.19, 128.59, 128.40, 127.48, 127.39, 125.60, 124.76, 120.91, 111.01, 77.35, 77.10, 76.85, 55.77, 50.65. HRMS (ESI): calc'd C₁₅H₁₄N₂O [M+H]⁺ as 239.1179; found 239.1165. HRMS (ESI): calc'd C₁₅H₁₄N₂O [2M+H]⁺ as 477.2285; found 477.2279.

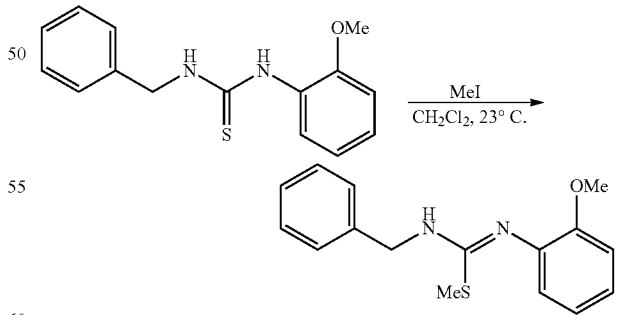

To a stirring (300 rpm) solution of the thiourea (4.294 g, 15.766 mmol, 1.00 eq) in CH₂Cl₂ (75 mL) was added iodomethane (8.952 g, 4.00 mL, 63.065 mmol, 4.00 eq). After 16 hours the clear golden yellow solution was neutralized with a saturated aqueous mixture of NaHCO₃ (50 mL), then aqueous NaOH (10 mL, 1 N) was added, the biphasic mixture was stirred vigorously (1000 rpm) for 2 minutes, then poured into a separatory funnel, partitioned, organics were washed with an aqueous saturated mixture of NaHCO₃ (2×50 mL), residual organics were extracted from the aqueous layer using CH₂Cl₂ (2×20 mL), combined, washed with brine (1×25 mL), dried over solid Na₂SO₄, decanted, and concentrated to afford the crude isothiourea as a viscous clear golden yellow oil (4.505 g, 15.730 mmol, 99%). NMR indicated pure product which contains residual CH₂Cl₂. The crude isothiourea was used in the subsequent reaction without further purification.

¹H NMR (500 MHz, Chloroform-d) δ 7.43-7.36 (m, 4H), 7.33-7.29 (m, 1H), 7.07-7.03 (m, 1H), 7.01 (s, 1H), 6.94 (td, J=7.5, 1.4 Hz, 1H), 6.91 (dd, J=8.1, 1.3 Hz, 1H), 4.88 (s, 1H), 4.62 (s, 2H), 3.84 (s, 3H), 2.33 (s, 3H). ¹³C NMR (126 MHz, Chloroform-d) δ 153.95, 151.13, 138.92, 138.13, 128.65, 127.72, 127.40, 123.60, 123.04, 121.11, 111.67, 55.79, 47.69, 14.15. HRMS (ESI): calc'd C₁₆H₁₈N₂OS [M+H]⁺ as 287.1213; found 287.1212.

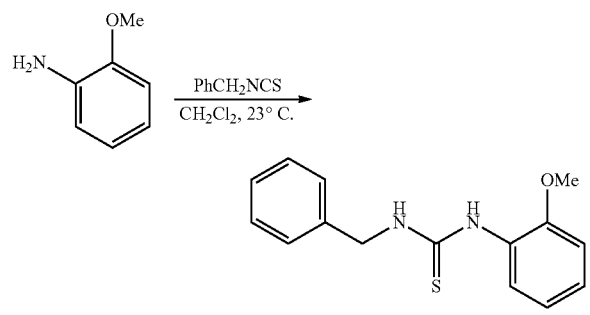

To a stirring (500 rpm) solution of 2-methoxyaniline (2.000 g, 1.83 mL 16.240 mmol, 1.00 eq) in CH₂Cl₂ (100 mL) at 23° C. was added benzylisothiocyanate (2.423 g, 2.15 mL, 16.240 mmol, 1.00 eq) neat via syringe in a quick dropwise manner. After stirring for 24 hours the pale yellow solution was concentrated to afford the thiourea as an off-white solid (4.294 g, 15.766 mmol, 97%). NMR indicated pure product which was used in the subsequent reaction without purification.

¹H NMR (500 MHz, Chloroform-d) δ 7.60 (s, 1H), 7.36-7.26 (m, 6H), 7.21 (td, J=7.9, 1.6 Hz, 1H), 6.95-6.91 (m, 2H), 6.34 (s, 1H), 4.88 (d, J=5.4 Hz, 2H), 3.81 (s, 3H). ¹³C NMR (126 MHz, Chloroform-d) δ 180.93, 152.61, 137.31, 128.73, 127.83, 127.70, 127.66, 125.10, 125.05, 121.07, 112.02, 55.61, 49.50. HRMS (ESI): calc'd C₁₅H₁₆N₂OS [M+H]⁺ as 273.1017; found 273.1055.

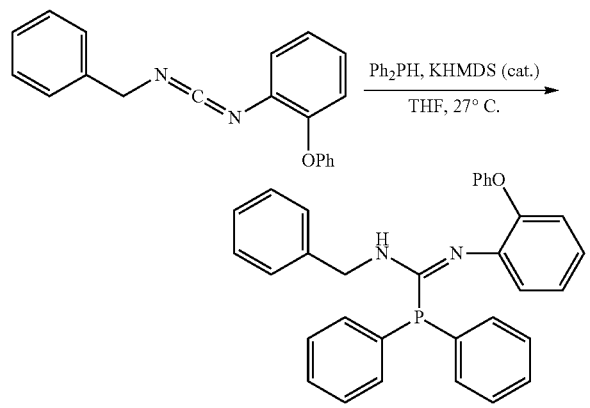

To a solution of diphenylphosphine (0.377 g, 0.34 mL, 2.028 mmol, 1.00 eq) in anhydrous de-oxygenated THF (15 mL) in a nitrogen filled glovebox at 27° C. was added KHMDS (1.10 mL, 0.5069 mmol, 0.25 eq, non-titrated 0.5 M solution in toluene). After stirring (300 rpm) for 2 minutes a solution of the monocarbodiimide (0.609 g, 2.028 mmol, 1.00 eq) in THF (5 mL) was added in a quick dropwise manner. After stirring for 48 hours the red-purple solution was concentrated, suspended in anhydrous de-oxygenated hexanes (5 mL), concentrated, this process was repeated three times more, the resultant dark red-purple solid was suspended in hexanes (10 mL), stirred vigorously (1000 rpm) for 2 minutes, gravity filtered using a PTFE fritted filter, concentrated, the resultant golden yellow viscous oil was suspended in hexanes (5 mL), filtered through a 0.20 μm submicron PTFE filter, rinsed with hexanes (3×2 mL), and concentrated to afford the phosphaguandine as a dark purple oil (0.855 g, 1.582 mmol, 78%, 90% pure by ¹H-NMR and ³¹P-NMR). NMR had shown product exists as a complicated mixture of isomers and rotomers with residual diphenylphosphine, hexanes, and toluene remaining.

To confirm isolation of the product and its existence as a complex mixture it was subjected to metallation with ZrBn₄ and indeed upon metallation the isomeric/rotomer mixture converts to one specific material. See NMRs as well as Camelio EXP-16-BH3874 for further details and evidence.

The product for this reaction existed as a mixture of tautomers and rotomers. Only the major signals are listed.

¹H NMR (400 MHz, Benzene-d₆) δ 7.33 (dtt, J=8.1, 5.7, 3.2 Hz, 4H), 7.19-7.02 (m, 4H), 7.02-6.84 (m, 13H), 6.83-6.70 (m, 3H), 4.64 (t, J=5.3 Hz, 1H), 4.25 (d, J=5.2 Hz, 2H). ³¹P NMR (162 MHz, Benzene-d₆) δ −13.18.

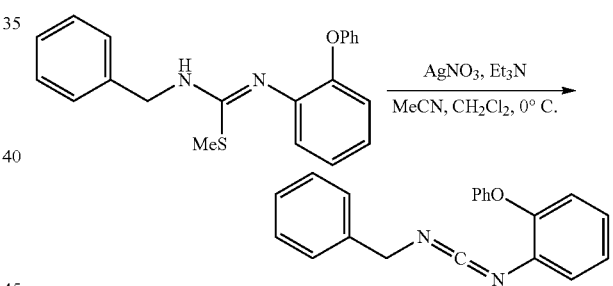

A solution of the isothiourea (3.590 g, 10.302 mmol, 1.00 eq) and Et₃N (2.293 g, 3.20 mL, 22.665 mmol, 2.20 eq) in acetonitrile-CH₂Cl₂ (120 mL, 1:1) in an oven-dried brown jar was placed in an ice water bath for 30 minutes upon which solid AgNO₃ (3.500 g, 20.604 mmol, 2.00 eq) was added all at once. After stirring (500 rpm) for 2 hours the now canary yellow heterogeneous mixture was diluted with toluene (100 mL), stirred vigorously (1000 rpm) for 2 minutes, suction filtered cold through a pad of celite, concentrated to approximately 10 mL, diluted with toluene (50 mL), concentrated to approximately 10 mL, this process was repeated three times more to remove residual acetonitrile and CH₂Cl₂ and to triturate remaining ammonium and silver salts, toluene (25 mL) was added to the resultant heterogeneous mixture which was then suction filtered through a pad of celite, and concentrated to afford the monocarbodiimide as clear dark brown oil (3.010 g, 10.022 mmol, 97%). NMR had shown product with trace impurities.

¹H NMR (500 MHz, Chloroform-d) δ 7.37-7.21 (m, 6H), 7.14-7.05 (m, 5H), 6.98-6.95 (m, 2H), 6.93-6.90 (m, 1H), 4.38 (s, 2H). ¹³C NMR (126 MHz, Chloroform-d) δ 157.23, 150.94, 137.68, 136.77, 131.86, 129.80, 128.52, 127.46, 127.28, 125.65, 125.48, 124.41, 123.19, 119.83, 117.86, 50.19. HRMS: calc'd $C_{20}H_{16}N_2O$ [M−H]⁻ as 299.1169; found 299.1069.

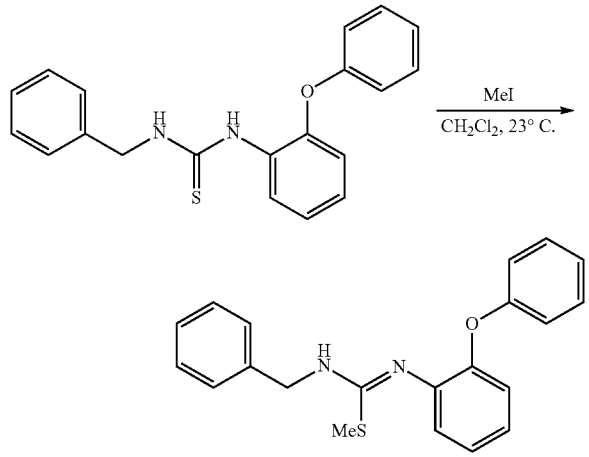

To a stirring (300 rpm) solution of the thiourea (3.590 g, 10.735 mmol, 1.00 eq) in $CH_2Cl_2$ (75 mL) was added iodomethane (6.095 g, 2.70 mL, 42.941 mmol, 4.00 eq). After 16 hours the clear golden yellow solution was neutralized with a saturated aqueous mixture of $NaHCO_3$ (50 mL), then aqueous NaOH (10 mL, 1 N) was added, the biphasic mixture was stirred vigorously (1000 rpm) for 2 minutes, then poured into a separatory funnel, partitioned, organics were washed with an aqueous saturated mixture of $NaHCO_3$ (2×50 mL), residual organics were extracted from the aqueous layer using $CH_2Cl_2$ (2×20 mL), combined, washed with brine (1×25 mL), dried over solid $Na_2SO_4$, decanted, and concentrated to afford the isothiourea as a viscous clear golden yellow oil (3.590 g, 10.302 mmol, 96%). NMR indicated pure product which contains residual $CH_2Cl_2$. The crude isothiourea was used in the subsequent reaction without further purification.

¹H NMR (500 MHz, Chloroform-d) δ 7.36-7.26 (m, 7H), 7.18-7.14 (m, 1H), 7.12-7.10 (m, 1H), 7.08-7.02 (m, 2H), 7.00-6.97 (m, 2H), 4.72 (s, 1H), 4.36 (s, 2H), 2.19 (s, 3H). ¹³C NMR (126 MHz, Chloroform-d) δ 158.12, 154.21, 147.08, 141.40, 138.53, 129.32, 128.64, 127.80, 127.45, 124.93, 124.26, 123.74, 121.93, 121.57, 117.01, 47.24, 14.10. HRMS (ESI): calc'd $C_{21}H_{20}N_2OS$ [M+H]⁺ as 349.1369; found 349.1386.

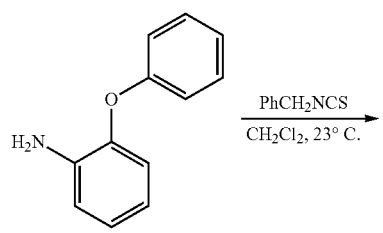

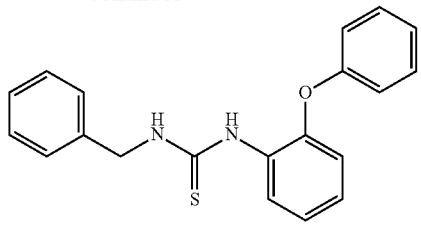

To a stirring (500 rpm) solution of 2-phenoxyaniline (2.000 g, 10.798 mmol, 1.00 eq) in $CH_2Cl_2$ (100 mL) at 23° C. was added benzylisothiocyanate (1.611 g, 1.43 mL, 10.798 mmol, 1.00 eq) neat via syringe in a quick dropwise manner. After stirring for 24 hours, the pale yellow solution was concentrated to afford the thiourea as an off-white solid (3.590 g, 10.735 mmol, 99%). NMR indicated product which contains trace impurities and residual $CH_2Cl_2$ was used in the subsequent reaction without purification.

¹H NMR (500 MHz, Chloroform-d) δ 7.84 (s, 1H), 7.58-7.40 (m, 1H), 7.36-7.23 (m, 6H), 7.20-7.07 (m, 3H), 6.91 (dt, J=8.5, 1.7 Hz, 3H), 6.51 (s, 1H), 4.86-4.77 (m, 2H).

¹³C NMR (126 MHz, Chloroform-d) δ 180.95, 155.95, 137.17, 129.96, 128.78, 127.88, 127.83, 127.74, 127.72, 127.50, 126.21, 124.12, 123.98, 119.29, 118.87, 49.38. HRMS (ESI): calc'd $C_{20}H_{18}N_2OS$ [M+H]⁺ as 335.1213; found 335.1233.

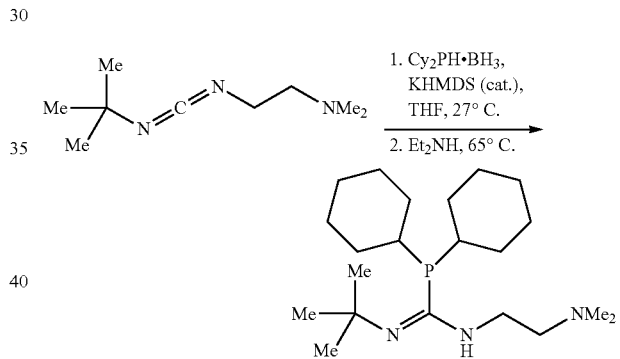

To a solution of dicyclohexylphosphine-borane complex (169.5 mg, 0.7953 mmol, 1.00 eq) in THF (5.0 mL) in a nitrogen filled glovebox was added KHMDS (0.32 mL, 0.1591 mmol, 0.20 eq, non-titrated 0.5 M in toluene). After 2 minutes a solution of the amino-carbodiimide (135.0 mg, 0.7953 mmol, 1.00 eq) in THF (3.0 mL) was added in a quick dropwise manner. The clear pale yellow solution was stirred (300 rpm) for 36 hours upon which it was concentrated, suspended in hexanes (3 mL), concentrated, this was repeated three times more to remove residual THF, re-suspended in hexanes (5 mL), stirred vigorously (1000 rpm) for 2 minutes, filtered through a 0.45 μm PTFE submicron filter, and concentrated. The crude phosphaguanidine-borane complex was suspended in $Et_2NH$ (10 mL) and placed in a mantle heated to 65° C. After stirring vigorously (1000 rpm) for 72 hours the slight white opaque mixture was concentrated, suspended in hexanes (3 mL), concentrated, this was repeated three times more to remove residual $Et_2NH$ and $Et_2NH$—$BH_3$, re-suspended in hexanes (5 mL), stirred vigorously (1000 rpm), filtered through a 0.45 μm PTFE submicron filter, rinsed with hexanes (3×3 mL), and concentrated to afford the aminophosphaguanidine (225.9 mg, 0.6146 mmol, 77%). NMR indicated product which exists as a mixture of isomers and tautomers. The product for this reaction exists as a mixture of tautomers and isomers. The asterisk (*) denotes the minor tautomer and isomer.

$^1$H NMR (400 MHz, Benzene-d$_6$) δ 4.13 (dddd, J=8.7, 6.0, 4.6, 1.3 Hz, 2H), 3.84 (br s, 1H), 2.73-2.60 (m, 2H), 2.27-2.24 (m, 2H), 2.25 (s, 6H), 1.81 (dd, J=30.4, 13.2 Hz, 6H), 1.71-1.47 (m, 10H), 1.41 (s, 9H), 1.21-1.08 (m, 4H). $^{13}$C NMR (101 MHz, Benzene-d$_6$) δ 155.61 (d, J=39.8 Hz), 62.14, 51.41, 51.05, 45.95, 34.38 (d, J=17.8 Hz), 31.10 (d, J=18.2 Hz), 29.89 (d, J=9.2 Hz), 28.72, 27.04 (d, J=7.9 Hz), 26.86 (d, J=12.0 Hz), 26.31. $^{31}$P NMR (162 MHz, Benzene-d$_6$) δ (0.83*), (−4.81*), (−8.60*), −19.65, (−28.12*).

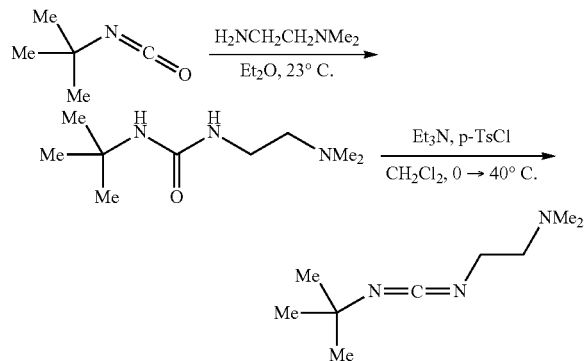

Reference for Reaction Sequence:
Sheehan, J. C.; Cruickshank, P. A.; and Boshart, G. L. "A convenient synthesis of water-soluble carbodiimides." *The Journal of Organic Chemistry* 1961, 26, 2525-2528.

To a solution of tert-butyl isocyanate (5.000 g, 5.80 mL, 50.439 mmol, 1.00 eq) in Et$_2$O (125 mL) was added N,N-dimethylaminoethylamine (4.446 g, 5.50 mL, 50.439 mmol, 1.00 eq) neat via syringe. After stirring (500 rpm) for 4 hours the clear colorless solution was concentrated in vacuo to afford the dimethylamino urea as a white solid. NMR indicated pure product which was used the next reaction without further purification.

A solution of the urea (9.446 g, 50.439 mmol, 1.00 eq) and Et$_3$N (25.520 g, 35.2 mL, 252.20 mmol, 5.00 eq) in anhydrous CH$_2$Cl$_2$ (150 mL) under nitrogen was placed in an ice water bath for 30 minutes upon which solid p-TsCl (14.424 g, 75.659 mmol, 1.50 eq) was added in three separate portions over 10 mins. After the complete addition the pale yellow heterogeneous mixture was removed from the ice bath, stirred (400 rpm) for 30 minutes at 23° C. and then placed in a mantle heated to 45° C. After 3 hours, the orange-brown heterogeneous mixture was removed from the mantle, allowed to cool to 23° C., neutralized with a saturated aqueous mixture of Na$_2$CO$_3$ (75 mL), poured into a separatory funnel, partitioned, organics were washed with an aqueous saturated mixture of Na$_2$CO$_3$ (2×25 mL), residual organics were back extracted from the aqueous using CH$_2$Cl$_2$ (2×20 mL), washed with brine (1×50 mL), dried over solid Na$_2$SO$_4$, decanted, concentrated, and the mixture was fractionally distilled under high-vacuum to afford the carbodiimide as a clear colorless oil (4.007 g, 21.408 mmol). A 42% yield was obtained for the two step reaction. The product had a boiling point of 46° C. at 0.1 mmHg. NMR results indicated that the product was pure.

NMR Chemical Shifts for the Carbodiimide:
$^1$H NMR (500 MHz, Benzene-d$_6$) δ 3.00 (t, J=6.1 Hz, 2H), 2.19 (t, J=6.1 Hz, 2H), 1.95 (s, 6H), 1.19 (s, 9H). $^{13}$C NMR (126 MHz, Benzene-d$_6$) δ 139.66, 59.93, 54.10, 44.76, 44.30, 30.88.

NMR Chemical Shifts for the Urea:
$^1$H NMR (500 MHz, Chloroform-d) δ 5.21 (s, 1H), 5.05 (s, 1H), 3.16 (q, J=5.4 Hz, 2H), 2.36 (dd, J=6.1, 5.3 Hz, 2H), 2.19 (s, 6H), 1.29 (s, 9H). $^{13}$C NMR (126 MHz, Chloroform-d) δ 158.49, 59.54, 49.89, 45.21, 38.09, 29.49. HRMS (ESI) calc'd 188.2 for C$_9$H$_{22}$N$_3$O [M+H]$^+$; found 188.2.

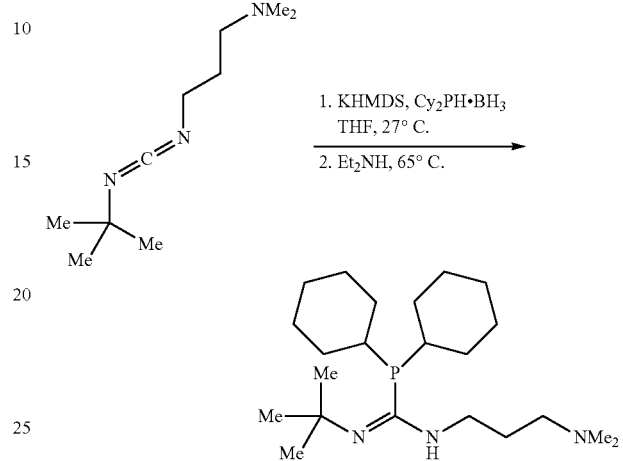

To a solution of di-cyclohexylphosphine-borane (92.3 mg, 0.4331 mmol, 1.00 eq) in THF (3.0 mL) in a nitrogen filled glovebox was added KHMDS (0.17 mL, 0.0866 mmol, 0.20 eq, non-titrated 0.5 M in toluene). After 2 minutes a solution of the amino-carbodiimide (79.4 mg, 0.4331 mmol, 1.00 eq) in THF (1.0 mL) was added. The clear pale yellow solution was stirred (300 rpm) for 36 hours upon which upon which it was concentrated, suspended in hexanes (5 mL), concentrated, this was repeated three times more to remove residual THF, re-suspended in hexanes (5 mL), stirred vigorously (1000 rpm) for 2 minutes, filtered through a 0.45 µm PTFE submicron filter, and concentrated. The viscous off-white foam was dissolved in Et$_2$NH (10 mL) and placed in a mantle heated to 65° C. After stirring (300 rpm) for 72 hours the slight opaque mixture was removed from the mantle, allowed to gradually cool to 27° C., concentrated, suspended in hexanes (5 mL), concentrated, this was repeated three times more to remove residual Et$_2$NH and Et$_2$NH—BH$_3$, re-suspended in hexanes (10 mL), stirred vigorously (1000 rpm) for 2 minutes, filtered through a 0.45 µm PTFE submicron filter, and concentrated to afford the aminophosphaguanidine (112.7 mg, 0.2953 mmol, 68%). NMR results indicated that product exists as a mixture of isomers and hydrogen bonding tautomers. The product for this reaction exists as a mixture of tautomers. The asterisk (*) denotes the minor tautomer.

$^1$H NMR (500 MHz, Benzene-d$_6$) δ 3.97 (td, J=6.8, 4.6 Hz, 2H), 3.81 (br s, 1H), 2.51-2.42 (m, 2H), 2.15 (s, 6H), 2.17-2.14 (m, 2H), 1.92 (p, J=6.9 Hz, 2H), 1.87-1.73 (m, 4H), 1.70-1.49 (m, 6H), 1.41 (s, 9H), 1.34-1.23 (m, 4H), 1.20-1.02 (m, 6H). $^{13}$C NMR (126 MHz, Benzene-d$_6$) δ 155.01 (d, J=40.0 Hz), 58.19, 51.35, 50.32 (d, J=38.0 Hz), 45.48, 34.40 (d, J=17.5 Hz), 31.14 (d, J=14.4 Hz), 31.05, 29.89 (d, J=9.3 Hz), 28.77, 27.04 (d, J=7.6 Hz), 26.85 (d, J=11.6 Hz), 26.32. $^{31}$P NMR (202 MHz, Benzene-d$_6$) δ (1.22*), (−6.01*), (−8.72*), −19.90, (−21.80*).

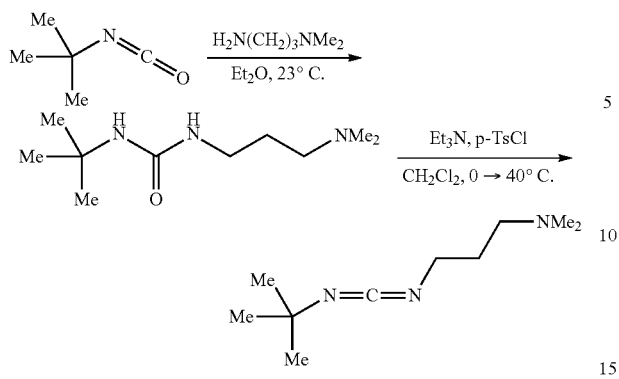

To a solution of tert-butyl isocyanate (5.000 g, 5.80 mL, 50.439 mmol, 1.00 eq) in Et$_2$O (125 mL) was added N,N-dimethylaminopropylamine (5.154 g, 6.40 mL, 50.439 mmol, 1.00 eq) neat via syringe. After stirring (500 rpm) for 4 hours the clear colorless solution was concentrated in vacuo to afford the dimethylamino urea as a white solid. NMR indicated pure product which was used in the next reaction without further purification.

A solution of the urea (10.150 g, 50.439 mmol, 1.00 eq) and Et$_3$N (25.520 g, 35.2 mL, 252.20 mmol, 5.00 eq) in anhydrous CH$_2$Cl$_2$ (150 mL) under nitrogen was placed in an ice water bath for 30 minutes upon which solid p-TsCl (14.424 g, 75.659 mmol, 1.50 eq) was added in 3 separate portions over 10 mins. After the complete addition the pale yellow heterogeneous mixture was removed from the ice bath, stirred (400 rpm) for 30 minutes at 23° C. and then placed in a mantle heated to 45° C. After 3 hours the orange-brown heterogeneous mixture was removed from the mantle, allowed to cool to 23° C., neutralized with a saturated aqueous mixture of Na$_2$CO$_3$ (75 mL), poured into a separatory funnel, partitioned, organics were washed with an aqueous saturated mixture of Na$_2$CO$_3$ (2×25 mL), residual organics were back extracted from the aqueous using CH$_2$Cl$_2$ (2×20 mL), washed with brine (1×50 mL), dried over solid Na$_2$SO$_4$, decanted, concentrated, and the crude orange oil was purified via fractional distillation under high-vacuum to afford the aminocarbodiimide as a clear colorless oil (6.893 g, 37.605 mmol). The raction produced a 75% yield and the product had a boiling point of 59° C. at 0.1 mmHg. NMR indicated that the product was pure.

NMR Chemical Shifts for the Carbodiimide:

$^1$H NMR (400 MHz, Benzene-d$_6$) δ 3.12 (td, J=6.8, 1.3 Hz, 2H), 2.14 (t, J=6.9 Hz, 2H), 1.98 (s, 6H), 1.54 (pd, J=6.8, 1.2 Hz, 2H), 1.14 (s, 9H). $^{13}$C NMR (101 MHz, Benzene-d$_6$) δ 139.64, 56.49, 54.22, 45.10, 44.47, 31.11, 29.62.

NMR Chemical Shifts for the Urea:

$^1$H NMR (500 MHz, Chloroform-d) δ 5.23 (s, 1H), 5.07 (s, 1H), 3.13 (q, J=6.2 Hz, 2H), 2.28 (t, J=6.7 Hz, 2H), 2.16 (s, 5H), 1.57 (p, J=6.6 Hz, 2H), 1.28 (s, 8H). $^{13}$C NMR (126 MHz, Chloroform-d) δ 158.45, 57.28, 49.88, 45.35, 39.18, 29.50, 27.66. HRMS (ESI) calc'd C$_{10}$H$_{23}$N$_3$O [M+H]$^+$ as 202.1875; found 202.1965.

Synthesis of MCI-53

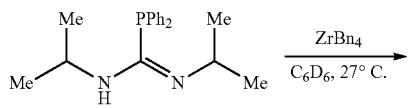

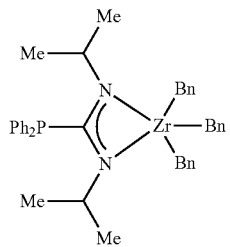

To a stirring (300 rpm) solution of the monophosphoryl guanidine (7.3 mg, 0.0234 mmol, 1.00 eq) in C$_6$D$_6$ (0.5 mL) in a nitrogen filled glovebox was added a solution of ZrBn$_4$ (10.6 mg, 0.0234 mmol, 1.00 eq) in C$_6$D$_6$ (0.5 mL) via syringe in a dropwise fashion. After 6 hours NMR had shown full conversion to product. The solvent is removed in vacuo to afford a golden brown solid (15.8 mg, 0.0234 mmol, 100%).

$^1$H NMR (500 MHz, Benzene-d$_6$) δ 7.42-7.37 (m, 4H), 7.19-7.14 (m, 6H), 7.10-7.05 (m, 5H), 7.04-6.99 (m, 3H), 6.97 (dtd, J=6.8, 1.3, 0.7 Hz, 7H), 4.09 (pd, J=6.6, 4.9 Hz, 2H), 2.45 (s, 6H), 0.86 (d, J=6.5 Hz, 12H). $^{13}$C NMR (126 MHz, Benzene-d$_6$) δ 179.56 (d, J=63.2 Hz), 143.43, 132.83 (d, J=16.4 Hz), 132.05 (d, J=18.6 Hz), 129.29, 128.91, 128.82 (d, J=6.2 Hz), 128.60, 128.15, 127.93, 127.89, 76.92, 50.92 (d, J=15.5 Hz), 23.83. $^{31}$P NMR (202 MHz, Benzene-d$_6$) δ −16.16.

Synthesis of MCI-1

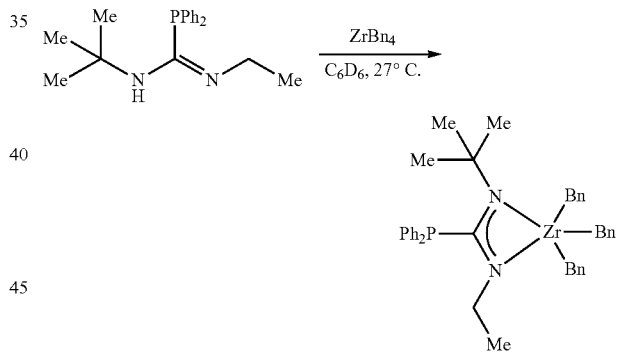

To a solution of the monophosphoryl guanidine (27.0 mg, 0.0864 mmol, 1.00 eq) in C$_6$D$_6$ (0.5 mL) was added a solution of ZrBn$_4$ (39.4 mg, 0.0864 mmol, 1.00 eq) in C$_6$D$_6$ (0.5 mL) in a nitrogen filled glovebox at 27° C. After stirring (300 rpm) for 6 hours an aliquot was removed and NMR had shown full conversion. The solution was concentrated to afford the mono-[2,1] catalyst as a golden brown viscous oil (58.4 mg, 0.0864 mmol, 100%).

$^1$H NMR (500 MHz, Benzene-d$_6$) δ 7.34 (tq, J=6.8, 0.8 Hz, 4H), 7.18-7.14 (m, 7H), 7.11-7.06 (m, 11H), 7.05-7.00 (m, 3H), 6.91 (ddt, J=8.6, 7.3, 1.2 Hz, 4H), 3.10 (q, J=6.9 Hz, 2H), 2.58 (s, 6H), 1.27 (d, J=1.0 Hz, 9H), 0.10 (t, J=7.0 Hz, 3H). $^{31}$P NMR (202 MHz, Benzene-d$_6$) δ −12.08. $^{13}$C NMR (126 MHz, Benzene-d$_6$) δ 178.70 (d, J=70.9 Hz), 143.67, 132.53 (d, J=19.2 Hz), 131.35 (d, J=17.3 Hz), 129.10, 128.81 (d, J=5.3 Hz), 128.36, 128.15, 122.36, 77.27, 54.95, 44.85, 31.91 (d, J=13.3 Hz), 14.67.

Synthesis of MCI-2

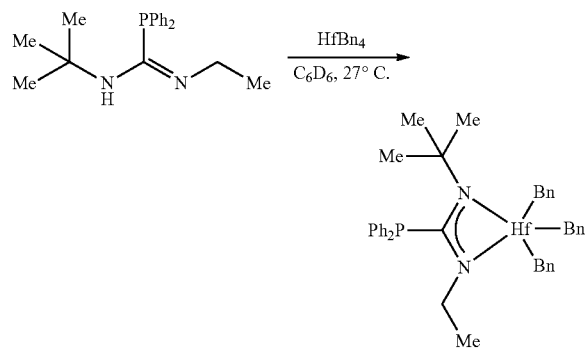

To a stirring (300 rpm) solution of the monophosphoryl guanidine (20.0 mg, 0.0640 mmol, 1.00 eq) in $C_6D_6$ (0.5 mL) in a nitrogen filled glovebox was added a solution of $HfBn_4$ (34.8 mg, 0.0640 mmol, 1.00 eq) in $C_6D_6$ (0.5 mL). After 6 hours NMR of an aliquot had shown full conversion to the product. The golden canary yellow solution was filtered through a 0.45 μm submicron filter and concentrated to afford the catalyst MCI-2 as a golden yellow viscous foam (48.2 mg, 0.0633 mmol, 99%).

$^1$H NMR (500 MHz, Benzene-$d_6$) δ 7.23-7.17 (m, 10H), 7.17-7.13 (m, 6H), 7.07 (dddt, J=8.0, 6.6, 2.0, 1.0 Hz, 4H), 7.04-6.99 (m, 2H), 6.90 (tt, J=7.2, 1.4 Hz, 3H), 3.09 (q, J=7.0 Hz, 2H), 2.36 (s, 6H), 1.27 (d, J=1.0 Hz, 9H), −0.01 (t, J=6.9 Hz, 3H). $^{13}$C NMR (126 MHz, Benzene-$d_6$) δ 179.49 (d, J=72.5 Hz), 143.91, 132.05 (d, J=19.1 Hz), 131.44 (d, J=18.1 Hz), 128.83 (d, J=5.5 Hz), 128.64, 128.40, 127.93, 122.26, 87.12, 54.67 (d, J=3.8 Hz), 44.25, 31.79, 14.26. $^{31}$P NMR (202 MHz, Benzene-$d_6$) δ −11.52.

Synthesis of MCI-54

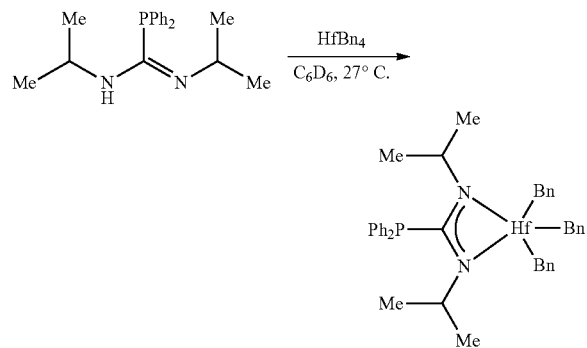

MCI-54: To a stirring (250 rpm) solution of the phosphoryl guanidine (14.9 mg, 0.0477 mmol, 1.00 eq) in $C_6D_6$ (0.5 mL) in a nitrogen filled glovebox at 27° C. was added a solution of $HfBn_4$ (25.9 mg, 0.0477 mmol, 1.00 eq) in $C_6D_6$ (0.5 mL). After stirring (300 rpm) for 6 hours an aliquot was removed and NMR had shown product with full conversion of SM. The golden brown solution was filtered through a 0.45 μm submicron filter, the original vial and filter were rinsed with toluene (3×1.0 mL), and concentrated to afford the catalyst MCI-54 as a golden brown viscous oil (36.0 mg, 0.0472 mmol, 99%).

$^1$H NMR (400 MHz, Benzene-$d_6$) δ 7.25 (ddt, J=8.7, 5.8, 1.5 Hz, 4H), 7.22-7.17 (m, 5H), 7.11-7.08 (m, 4H), 7.07-6.94 (m, 6H), 6.91 (td, J=7.2, 1.3 Hz, 3H), 4.11 (pd, J=6.5, 4.7 Hz, 2H), 2.31 (s, 6H), 0.78 (d, J=6.5 Hz, 12H). $^{13}$C NMR (126 MHz, Benzene-$d_6$) δ 179.06 (d, J=63.8 Hz), 143.74, 132.23 (d, J=18.3 Hz), 128.91, 128.81 (d, J=5.8 Hz), 128.71, 128.67, 128.15, 125.28, 122.36, 87.35, 50.33 (d, J=15.3 Hz), 23.86. $^{31}$P NMR (162 MHz, Benzene-$d_6$) δ −16.15.

Synthesis of MCI-50

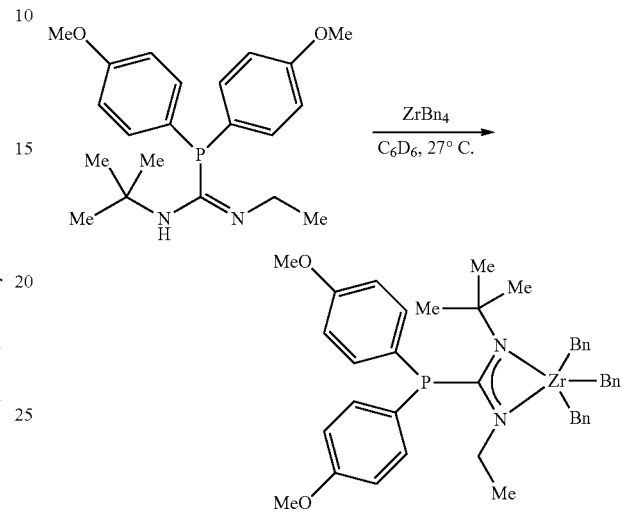

To a stirring (300 rpm) solution of the phosphoryl guanidine (35.3 mg, 0.0948 mmol, 1.00 eq) in $C_6D_6$ (0.5 mL) at 27° C. in a nitrogen filled glovebox was added a solution of $ZrBn_4$ (43.2 mg, 0.0948 mmol, 1.00 eq) in $C_6D_6$ (0.5 mL). After 2 hours the golden brown solution was filtered through a 0.45 μm submicron filter, rinsed with toluene (3×1.0 mL), and concentrated to afford the catalyst MCI-50 as a golden brown viscous foam (69.1 mg, 0.0940 mmol, 99%).

$^1$H NMR (500 MHz, Benzene-$d_6$) δ 7.34-7.28 (m, 4H), 7.19-7.14 (m, 8H), 7.11-7.09 (m, 2H), 6.92 (qt, J=7.2, 1.3 Hz, 4H), 6.79 (dt, J=8.7, 2.1 Hz, 4H), 6.34 (dd, J=8.1, 1.4 Hz, 1H), 3.26 (m, 8H), 2.61 (s, 6H), 1.33 (d, J=0.9 Hz, 9H), 0.24 (t, J=7.0 Hz, 3H). $^{31}$P NMR (202 MHz, Benzene-$d_6$) δ −12.38. $^{13}$C NMR (126 MHz, Benzene-$d_6$) δ 179.95 (d, J=73.5 Hz), 160.32, 143.80, 133.16 (d, J=19.1 Hz), 129.07, 128.96 (d, J=12.7 Hz), 123.41 (d, J=16.2 Hz), 122.30, 114.70 (d, J=6.6 Hz), 77.06, 55.00 (d, J=3.8 Hz), 54.43, 44.59, 31.98 (d, J=13.4 Hz), 15.08.

Synthesis of MCI-51

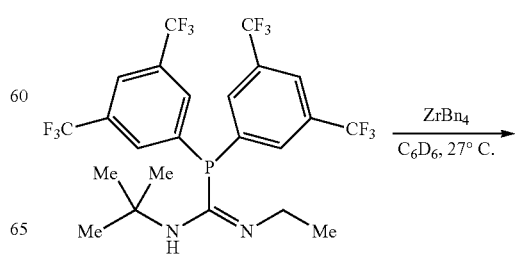

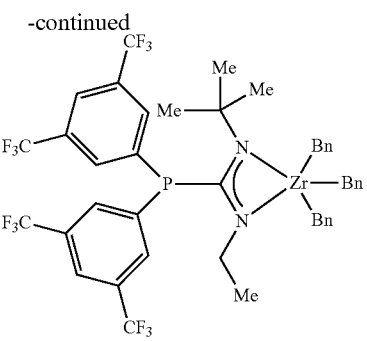

To a stirring (300 rpm) solution of the phosphoryl guanidine (60.1 mg, 0.1028 mmol, 1.00 eq) in C$_6$D$_6$ (0.5 mL) at 27° C. in a nitrogen filled glovebox was added a solution of ZrBn$_4$ (46.9 mg, 0.1028 mmol, 1.00 eq) in C$_6$D$_6$ (0.5 mL). After 2 hours the dark golden brown solution was concentrated, suspended in hexanes (1.5 mL), concentrated, this was repeated twice more, suspended in hexanes (3.0 mL), filtered through a 0.45 μm submicron filter, rinsed with hexanes (3×1.0 mL), and concentrated to afford the catalyst MCI-51 as a golden brown solid (83.4 mg, 0.0881 mmol, 86%).

$^1$H NMR (500 MHz, Benzene-d$_6$) δ 7.81-7.77 (m, 4H), 7.62-7.59 (m, 2H), 7.18-7.13 (m, 4H), 7.04-6.99 (m, 2H), 6.96 (dt, J=8.3, 1.6 Hz, 6H), 6.94-6.90 (m, 1H), 6.36-6.33 (m, 2H), 2.71 (q, J=6.9 Hz, 2H), 2.47 (s, 6H), 1.12 (s, 9H), −0.03 (t, J=7.0 Hz, 3H). $^{19}$F NMR (470 MHz, Benzene-d$_6$) δ −62.83. $^{31}$P NMR (202 MHz, Benzene-d$_6$) δ −15.41. $^{13}$C NMR (126 MHz, Benzene-d$_6$) δ 170.67 (d, J=69.7 Hz), 142.04, 139.04, 135.19 (d, J=27.7 Hz), 133.32-131.64 (m), 130.54, 130.15 (d, J=17.6 Hz), 129.41, 124.09, 123.22, 76.72, 54.87 (d, J=4.7 Hz), 44.70, 31.88, 14.79. Synthesis of MCI-52

To a stirring (300 rpm) solution of the phosphoryl guanidine (51.2 mg, 0.1389 mmol, 1.00 eq) in C$_6$D$_6$ (0.5 mL) in a nitrogen filled glovebox at 27° C. was added a solution of ZrBn$_4$ (63.3 mg, 0.1389 mmol, 1.00 eq) in C$_6$D$_6$ (0.5 mL). The golden yellow solution was placed in a mantle heated to 50° C. for 48 hours upon which the now black solution was filtered through a 0.45 μm submicron filter, the reaction vessel was rinsed with toluene (3×1.0 mL), and concentrated to afford the catalyst MCI-52 (100.9 mg, 0.1375 mmol, 99%).

$^1$H NMR (400 MHz, Benzene-d$_6$) δ 7.61-7.55 (m, 4H), 7.13-7.08 (m, 5H), 7.08-6.92 (m, 4H), 6.93-6.84 (m, 12H), 3.29 (s, 5H), 2.31 (s, 6H), 0.72 (s, 18H). $^{31}$P NMR (162 MHz, Benzene-d$_6$) δ −17.35. $^{13}$C NMR (101 MHz, Benzene-d$_6$) δ 176.73 (d, J=67.1 Hz), 144.17, 134.20 (d, J=22.0 Hz), 133.74 (d, J=13.0 Hz), 129.42, 129.17, 128.95, 128.89 (d, J=2.5 Hz), 122.68, 77.54, 60.22 (d, J=13.7 Hz), 33.76, 27.65.

Synthesis of MCI-3

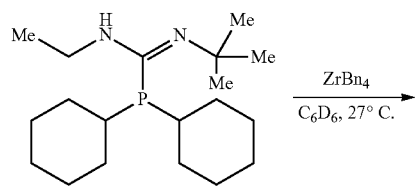

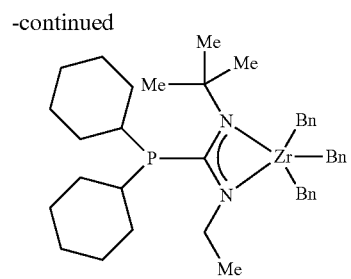

To a solution of the phosphoryl guanidine (54.9 mg, 0.1692 mmol, 1.00 eq) in C$_6$D$_6$ (0.5 mL) in a nitrogen filled glovebox at 27° C. was added a solution of ZrBn$_4$ (77.1 mg, 0.1692 mmol, 1.00 eq) in C$_6$D$_6$ (0.5 mL). After stirring (200 rpm) for 6 hours an aliquot was removed and NMR had shown full conversion of SM and ZrBn$_4$ to the product. The golden brown solution was filtered through a 0.45 μm submicron filter, rinsed with toluene (3×1.0 mL), and fully concentrated to afford the mono-[2,1] catalyst MCI-3 as a golden yellow powder (105.1 mg, 0.1525 mmol, 90%).

$^1$H NMR (500 MHz, Benzene-d$_6$) δ 7.18-7.13 (m, 4H), 7.11-7.05 (m, 6H), 6.92-6.86 (m, 5H), 3.31 (q, J=7.0 Hz, 2H), 2.58 (s, 6H), 1.95-1.50 (m, 12H), 1.27 (s, 9H), 1.22-0.99 (m, 10H), 0.81 (t, J=7.0 Hz, 3H). $^{31}$P NMR (202 MHz, Benzene-d$_6$) δ 4.56. $^{13}$C NMR (126 MHz, Benzene-d$_6$) δ 181.70 (d, J=74.4 Hz), 143.94, 128.91, 128.14, 122.12, 76.87, 54.79, 43.36, 36.37 (d, J=19.0 Hz), 33.32 (d, J=26.7 Hz), 32.38 (d, J=13.3 Hz), 30.92 (d, J=7.3 Hz), 27.10 (d, J=7.0 Hz), 26.80 (d, J=14.4 Hz), 25.92, 16.36.

All solvents and reagents were obtained from commercial sources and used as received unless otherwise noted. Anhydrous toluene, hexanes, tetrahydrofuran, and diethyl ether were purified via passage through activated alumina and, in some cases, Q-5 reactant. Solvents used for experiments performed in a nitrogen-filled glovebox were further dried by storage over activated 3 Å molecular sieves. Glassware for moisture-sensitive reactions was dried in an oven overnight prior to use. NMR spectra were recorded on Varian 400-MR and VNMRS-500 spectrometers. LC-MS analyses were performed using a Waters e2695 Separations Module coupled with a Waters 2424 ELS detector, a Waters 2998 PDA detector, and a Waters 3100 ESI mass detector. LC-MS separations were performed on an XBridge C18 3.5 μm 2.1×50 mm column using a 5:95 to 100:0 acetonitrile to water gradient with 0.1% formic acid as the ionizing agent. HRMS analyses were performed using an Agilent 1290 Infinity LC with a Zorbax Eclipse Plus C18 1.8 μm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data were determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening was performed in a high throughput parallel polymerization reactor (PPR) system. The PPR system was comprised of an array of 48 single cell (6×8 matrix) reactors in an inert atmosphere glovebox. Each cell was equipped with a glass insert with an internal working liquid volume of approximately 5 mL. Each cell had independent controls for pressure and was continuously stirred at 800 rpm. Catalyst solutions, unless otherwise noted, were prepared in toluene. All liquids (i.e. solvent, 1-octene, and catalyst solutions) were added via robotic syringes. Gaseous reagents (i.e. ethylene, $H_2$) were added via a gas injection port. Prior to each run, the reactors were heated to 80° C., purged with ethylene, and vented.

A portion of Isopar-E was added, the reactors were heated to the run temperature, and then pressured to the appropriate psig with ethylene. Toluene solutions of reagents were then added in the following order: (1) 1-octene with 500 nmol of scavenger MMAO-3A; (2) activator (cocatalyst-1, cocatalyst-2, etc); and (3) catalyst. Cocatalyst-1 is a solution activator which is N-methyl-N,N-bisoctadecylammonium tetrafluoroborate.

Each liquid addition was chased with a small amount of Isopar-E so that after the final addition, a total reaction volume of 5 mL reached. Upon addition of the catalyst, the PPR software began monitoring the pressure of each cell. The pressure (within approximately 2-6 psig) was maintained by the supplemental addition of ethylene gas by opening the valve at the set point minus 1 psi and closing it when the pressure reached 2 psi higher. All drops in pressure were cumulatively recorded as "Uptake" or "Conversion" of the ethylene for the duration of the run or until the uptake or conversion requested value was reached, whichever occurred first. Each reaction was then quenched by addition of 10% carbon monoxide in argon for 4 minutes at 40-50 psi higher than the reactor pressure. The shorter the "Quench Time", the more active the catalyst. In order to prevent the formation of too much polymer in any given cell, the reaction was quenched upon reaching a predetermined uptake level (50 psig for 120° C. runs, 75 psig for 150° C. runs). After all the reactors were quenched they were allowed to cool to 70° C. They were then vented, purged for 5 minutes with nitrogen to remove carbon monoxide, and the tubes removed. The polymer samples were then dried in a centrifugal evaporator at 70° C. for 12 hours, weighed to determine polymer yield and submitted for IR (1-octene incorporation) and GPC (molecular weight) analysis.

SymRAD HT-GPC Analysis

The molecular weight data was determined by analysis on a hybrid Symyx/Dow built Robot-Assisted Dilution High-Temperature Gel Permeation Chromatographer (Sym-RAD-GPC). The polymer samples were dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was then diluted to 1 mg/mL immediately before the injection of a 250 µL aliquot of the sample. The GPC was equipped with two Polymer Labs PLgel 10 µm MIXED-B columns (300×10 mm) at a flow rate of 2.0 mL/minute at 160° C. Sample detection was performed using a PolyChar IR4 detector in concentration mode. A conventional calibration of narrow polystyrene (PS) standards was utilized with apparent units adjusted to homo-polyethylene (PE) using known Mark-Houwink coefficients for PS and PE in TCB at this temperature.

1-Octene Incorporation IR Analysis

The running of samples for the HT-GPC analysis preceded the IR analysis. A 48-well HT silicon wafer was utilized for deposition and analysis of 1-octene incorporation of samples. For the process, all additional heat that the samples were subject to was 160° C. with duration less than or equal to 210 minutes; samples had to be re-heated to remove magnetic GPC stir bars as well as shaken with glass-rod stir bars on a J-KEM Scientific heated robotic shaker. Samples then were deposited while being heated using a Tecan MiniPrep 75 deposition station, and the 1,2,4-trichlorobenzene was evaporated off the deposited wells of the wafer at 160° C. under nitrogen purge. The analysis of 1-octene was performed on the HT silicon wafer using a NEXUS 670 E.S.P. FT-IR.

Batch Reactor Polymerization Procedure

The batch reactor polymerizations were conducted in a 2 L or 4 L Parr™ batch reactors. The reactor is heated by an electrical heating mantle, and is cooled by an internal serpentine cooling coil containing cooling water. Both the reactor and the heating/cooling system were controlled and monitored by a Camile™ TG process computer. The bottom of the reactor is fitted with a dump valve, which empties the reactor contents into a stainless steel dump pot, which is prefilled with a catalyst kill solution (typically 5 mL of a Irgafos/Irganox/toluene mixture). The dump pot was vented to a 30 gallon blow-down tank, with both the pot and the tank purged with nitrogen. All solvents used for polymerization or catalyst makeup were run through solvent purification columns to remove any impurities that may affect polymerization. The 1-octene and IsoparE were passed through 2 columns, the first containing A2 alumina, the second containing Q5 reactant. The ethylene was passed through 2 columns, the first containing A204 alumina and 4 Å mol sieves, the second containing Q5 reactant. The $N_2$, used for transfers, was passed through a single column containing A204 alumna, 4 Å mol sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when at reaction temperature to maintain reaction pressure set point. Ethylene addition amounts are monitored by a micro-motion flow meter.

The catalyst and activators were mixed with the appropriate amount of purified toluene to achieve a molarity solution. The catalyst and activators were handled in an inert glove box, drawn into a syringe and pressure transferred into the catalyst shot tank. This was followed by 3 rinses of toluene, 5 mL each. Immediately after catalyst addition the run timer begins. If ethylene was used, it was then added by the Camile to maintain reaction pressure set point in the reactor. These polymerizations were run for 10 min., then the agitator was stopped and the bottom dump valve opened to empty reactor contents to the dump pot. The dump pot contents were poured into trays placed in a lab hood where the solvent was evaporated off overnight. The trays containing the remaining polymer are then transferred to a vacuum oven, where they are heated up to 140° C. under vacuum to remove any remaining solvent. After the trays cool to ambient temperature, the polymers were weighed for yield/efficiencies, and submitted for polymer testing.

As described in the preceding paragraphs the catalysts in the following tables were individually reacted using the polymerization conditions in a single reactor system. Reaction conditions and the properties of the resulting polymers are reported in Tables 1, 2, 3, 4, and 5

TABLE 1

Batch Polymerization Data

| Catalyst name | μmol | Temp (° C.) | Octene (g) | Exotherm (° C.) | Ethylene (g) initial | Ethylene (g) added | Yield (g) | Efficiency (gpoly/gmetal) | Tm (° C.) | Mw | Mw/Mn | Octene mol % |
|---|---|---|---|---|---|---|---|---|---|---|---|---|
| MCI-1 | 2 | 120 | 300 | 3.2 | 46.1 | 3.3 | 12.6 | 138,122 | 92.209, 114.543 | 705,433 | 4.242 | 5.5 |
| | 2.75 | 150 | 300 | 0.8 | 43.1 | 2.9 | 4.7 | 18,735 | 89.240, 117.366 | 374,342 | 6.518 | 5 |
| MCI-2 | 1 | 120 | 300 | 2.1 | 46.1 | 2.5 | 5.0 | 28,013 | 83.632, 114.970, 124.500 | 464,563 | 3.734 | 4.6 |
| | 3 | 150 | 300 | 0.7 | 43.1 | 2.1 | 4.9 | 9,151 | 80.468, 11.992 | 332,384 | 22.565 | 6.2 |
| MCI-53 | 1 | 120 | 300 | 2.4 | 46.1 | 5.3 | 8.1 | 88,792 | 88.513, 125.175 | 422,450 | 4.006 | 6.7 |
| | 2.75 | 150 | 300 | 0.4 | 43.1 | 2.4 | 4.9 | 19,532 | 83.881, 126.502 | 204,704 | 24.946 | 5.6 |
| MCI-3 | 0.7 | 120 | 300 | 2.4 | 46.1 | 2.5 | 9.7 | 151,902 | 91.634, 129.898 | 507,130 | 3.18 | 1.6 |
| | 2.75 | 150 | 300 | 2.4 | 43.1 | 6.3 | 3.6 | 14,350 | 87.254, 119.867 | 352,178 | 11.10 | 4.4 |

* Cocatalyst-1 was 1.2 eq
** MMAO-3A was 10 μmoles
*** Reaction time was 10 minutes

TABLE 2

PPR Polymerization Data

| Catalyst Name | μmol | Co-catalyst name | μmol | Corrected Yield (mg) | Mn | Mw | Mw/Mn (PDI) | Octene mol % | Quench time (s) |
|---|---|---|---|---|---|---|---|---|---|
| MCI-50 | 0.05 | 11 | 0.075 | 0.067 | 59,160 | 376,637 | 6.37 | 3.9 | 229.2 |
| | 0.1 | 1 | 0.15 | 0.087 | 81,553 | 500,230 | 6.13 | 4.5 | 55.1 |
| | 0.2 | 1 | 0.3 | 0.127 | 68,894 | 380,168 | 5.52 | 5.8 | 51.3 |
| | 0.1 | 1 | 0.15 | 0.098 | 81,991 | 409,102 | 4.99 | 4.8 | 73.6 |
| | 0.05 | 1 | 0.075 | 0.067 | 61,502 | 383,202 | 6.23 | 4.0 | 189.9 |
| | 0.2 | 1 | 0.3 | 0.116 | 74,902 | 404,076 | 5.39 | 5.4 | 35.8 |
| | 0.1 | 1 | 0.15 | 0.052 | 15,920 | 211,257 | 13.27 | 3.8 | 1800.71 |
| | 0.1 | 1 | 0.15 | 0.056 | 15,461 | 194,396 | 12.57 | 3.7 | 1800.72 |
| | 0.15 | 1 | 0.225 | 0.074 | 16,399 | 199,499 | 12.17 | 4.1 | 1800.3 |
| | 0.15 | 1 | 0.225 | 0.073 | 20,206 | 205,662 | 10.18 | 3.9 | 1800.72 |
| | 0.3 | 1 | 0.45 | 0.095 | 16,207 | 183,477 | 11.32 | 4.2 | 1801.5 |
| | 0.3 | 1 | 0.45 | 0.093 | 19,405 | 191,162 | 9.85 | 4.3 | 660.1 |
| MCI-51 | 0.1 | 1 | 0.15 | 0.06 | 7,028 | 394,995 | 56.2 | 4.1 | 1127.4 |
| | 0.1 | 1 | 0.15 | 0.058 | 8,661 | 401,979 | 46.41 | 4.0 | 969.01 |
| | 0.2 | 1 | 0.3 | 0.065 | 8,153 | 363,780 | 44.62 | 3.9 | 270.4 |
| | 0.2 | 1 | 0.3 | 0.068 | 8,190 | 333,859 | 40.76 | 4.2 | 334.5 |
| | 0.15 | 1 | 0.225 | 0.03 | 3,960 | 156,288 | 39.47 | 3.9 | 1801.42 |
| | 0.15 | 1 | 0.225 | 0.033 | 3,983 | 184,970 | 46.44 | 3.8 | 1800.7 |
| | 0.3 | 1 | 0.45 | 0.03 | 4,212 | 103,493 | 24.57 | 3.7 | 1800.63 |
| | 0.3 | 1 | 0.45 | 0.029 | 4,064 | 108,732 | 26.75 | 3.8 | 1800.5 |
| MCI-52 | 0.1 | 1 | 0.15 | 0.075 | 68,293 | 430,761 | 6.31 | 4.6 | 313 |
| | 0.1 | 1 | 0.15 | 0.071 | 42,869 | 395,634 | 9.23 | 4.5 | 338.9 |
| | 0.2 | 1 | 0.3 | 0.086 | 80,747 | 324,383 | 4.02 | 4.5 | 183 |
| | 0.2 | 1 | 0.3 | 0.087 | 71,263 | 324,997 | 4.56 | 4.3 | 178.31 |
| | 0.15 | 1 | 0.225 | 0.052 | 10,676 | 223,671 | 20.95 | 3.2 | 1800.21 |
| | 0.15 | 1 | 0.225 | 0.064 | 8,412 | 215,847 | 25.66 | 3.4 | 1800.82 |
| | 0.3 | 1 | 0.45 | 0.094 | 8,190 | 195,256 | 23.84 | 3.2 | 1518.93 |
| | 0.3 | 1 | 0.45 | 0.096 | 12,924 | 203,578 | 15.75 | 3.1 | 1499.02 |
| MCI-54 | 0.1 | 1 | 0.15 | 0.088 | 64,467 | 242,616 | 3.76 | 5.2 | 140 |
| | 0.1 | 1 | 0.15 | 0.08 | 72,596 | 232,395 | 3.2 | 5.0 | 137.6 |
| | 0.2 | 1 | 0.3 | 0.101 | 70,687 | 223,462 | 3.16 | 5.5 | 74.8 |
| | 0.2 | 1 | 0.3 | 0.098 | 60,422 | 220,234 | 3.64 | 5.2 | 85.9 |

TABLE 3

PPR Polymerization Data

| Catalyst Name | μmol | Co-catalyst name | μmol | Corrected Yield (mg) | Mn | Mw | Mw/Mn (PDI) | Octene mol % | Quench time (s) |
|---|---|---|---|---|---|---|---|---|---|
| MCI-55 | 0.1 | 1 | 0.15 | 0.022 | 5,267 | 245,898 | 46.69 | 9.6 | 1800.42 |
| | 0.1 | 1 | 0.15 | 0.022 | 4,779 | 180,933 | 37.86 | 11 | 1801 |
| | 0.1 | 1 | 0.15 | 0.1 | 8,112 | 296,703 | 36.58 | 9.3 | 245.4 |

TABLE 3-continued

PPR Polymerization Data

| Catalyst Name | µmol | Co-catalyst name | µmol | Corrected Yield (mg) | Mn | Mw | Mw/Mn (PDI) | Octene mol % | Quench time (s) |
|---|---|---|---|---|---|---|---|---|---|
|  | 0.1 | 1 | 0.15 | 0.093 | 5,357 | 202,287 | 37.76 | 11.5 | 260 |
|  | 0.2 | 1 | 0.3 | 0.071 | 7,121 | 346,345 | 48.64 | 8.2 | 1242.71 |
|  | 0.2 | 1 | 0.3 | 0.073 | 5,232 | 225,864 | 43.17 | 11.3 | 1614.61 |
|  | 0.15 | 1 | 0.225 | 0.107 | 4,413 | 136,443 | 30.92 | 8.3 | 1368.61 |
|  | 0.15 | 1 | 0.225 | 0.112 | 3,965 | 105,455 | 26.6 | 9.8 | 1121 |
|  | 0.3 | 1 | 0.45 | 0.045 | 5,085 | 150,546 | 29.61 | 7.3 | 1800.2 |
|  | 0.3 | 1 | 0.45 | 0.0459 | 4,344 | 172,727 | 39.76 | 7.5 | 1800.33 |
| MCI-56 | 0.1 | 1 | 0.15 | 0.021 | 4,772 | 212,817 | 44.6 | 11 | 1800.63 |
|  | 0.1 | 1 | 0.15 | 0.081 | 6,620 | 305,107 | 46.09 | 9.7 | 388.2 |
|  | 0.1 | 1 | 0.15 | 0.088 | 4,267 | 160,341 | 37.72 | 13.5 | 321.5 |
|  | 0.2 | 1 | 0.3 | 0.074 | 6,276 | 330,488 | 50.26 | 8.5 | 1702.92 |
|  | 0.2 | 1 | 0.3 | 0.068 | 7,376 | 341,350 | 46.28 | 8.2 | 1800.4 |
|  | 0.15 | 1 | 0.225 | 0.098 | 3,636 | 110,636 | 30.43 | 10.4 | 1800.81 |
|  | 0.15 | 1 | 0.225 | 0.106 | 3,734 | 120,916 | 32.38 | 9.6 | 1347.83 |
|  | 0.3 | 1 | 0.0.45 | 0.038 | 4,301 | 149,686 | 34.8 | 7.7 | 1800.2 |
| MCI-57 | 0.1 | 1 | 0.15 | 0.031 | 5,530 | 284,632 | 51.47 | 9.2 | 1801.52 |
|  | 0.1 | 1 | 0.15 | 0.03 | 5,485 | 299,557 | 54.61 | 9.9 | 1801.8 |
|  | 0.1 | 1 | 0.15 | 0.097 | 5,524 | 230,762 | 41.77 | 10.9 | 211.2 |
|  | 0.1 | 1 | 0.15 | 0.95 | 6,269 | 226,131 | 36.07 | 10.6 | 226.3 |
|  | 0.2 | 1 | 0.3 | 0.75 | 7,354 | 335,063 | 45.56 | 8.8 | 862.91 |
|  | 0.2 | 1 | 0.3 | 0.81 | 6,663 | 291,787 | 43.79 | 9.2 | 771.4 |
|  | 0.15 | 1 | 0.225 | 0.023 | 4,411 | 140,039 | 31.75 | 7.9 | 1801.1 |
|  | 0.15 | 1 | 0.225 | 0.114 | 3,878 | 121,766 | 31.4 | 9.4 | 1800.31 |
|  | 0.15 | 1 | 0.225 | 0.113 | 4,424 | 136,861 | 30.94 | 8.7 | 1800.62 |
|  | 0.3 | 1 | 0.45 | 0.043 | 4,989 | 192,468 | 38.58 | 7.2 | 1800.41 |
|  | 0.3 | 1 | 0.45 | 0.049 | 4,557 | 130,366 | 28.61 | 7.9 | 1801.23 |

TABLE 4

BATCH REACTOR POLYMERIZATION DATA

| Catalyst | 120° C. | | | | | 150° C. | | | | |
|---|---|---|---|---|---|---|---|---|---|---|
|  | Efficiency | Mw | Mw/Mn | Octene Mol % | Tm (° C.) | Efficiency | Mw | Mw/Mn | Octene Mol % | Tm (° C.) |
| MCI-1 | 138,100 | 705,400 | 4.2 | 5.5 | 92.2 | 18,700 | 374,300 | 6.5 | 5.0 | 89.2 |
| MCI-2 | 28,000 | 464,600 | 3.7 | 4.6 | 83.6 | 9,151 | 332,400 | 22.6 | 6.2 | 80.5 |
| MCI-3 | 15,190 | 507,100 | 3.2 | 1.6 | 130 | 14,400 | 352,200 | 11.1 | 4.4 | 87.3 |
| MCI-4 | 132,900 | 383,100 | 3.5 | 8.2 | 71 | 88,200 | 185,700 | 16.1 | 5.9 | 78 |
| MCI-5 | 241,200 | 622,800 | 4.3 | 5.7 | 85 | 64,100 | 272,100 | 6.6 | 4.8 | 91 |
| MCI-6 | 121,800 | 1,202,500 | 7.2 | 6.9 | 71 | 35,100 | 474,800 | 11 | 5.8 | 68 |
| MCI-11 | 82,000 | 1,540,000 | 8.0 | 3.8 | 96 | 52,000 | 438,000 | 7.7 | 6.3 | 97 |
| MCI-12 | 228,000 | 130,000 | 11.2 | 3.5 | 99 | 117,000 | 497,000 | 5.7 | 3.9 | 97 |
| MCI-13 | 63,000 | 1,940,000 | 13.0 | 3.5 | 116 | 56,000 | 441,000 | 10.3 | 2.3 | 122 |
| MCI-14 | 344,000 | 1,111,000 | 12.7 | 3.3 | 97 | 176,000 | 488,000 | 6.1 | 2.9 | 96 |
| MCI-15 | 87,000 | 579,000 | 8.1 | 3.0 | 99 | 45,000 | 290,000 | 5.0 | 3.4 | 99 |
| MCI-16 | 159,000 | 387,000 | 6.9 | 2.1 | 114 | 61,000 | 190,000 | 7.3 | 3.6 | 114 |
| MCI-17 | 143,000 | 1,260,000 | 22.3 | 3.9 | 97 | 102,000 | 350,000 | 6.9 | 3.1 | 106 |
| MCI-18 | 333,000 | 380,000 | 9.0 | 2.9 | 114 | 146,200 | 230,000 | 7.0 | 3.4 | 113 |
| MCI-19 | 263,000 | 660,000 | 12.2 | 4.0 | 95 | 75,000 | 241,000 | 13.1 | 3.8 | 115 |
| MCI-20 | 76,000 | 973,000 | 4.8 | 4.3 | 94 | 80,000 | 281,000 | 3.5 | 4.1 | 92 |
| MCI-21 | 76,000 | 1,141,000 | 5.6 | 3.8 | 97 | 27,000 | 468,000 | 7.3 | 3.8 | 113 |
| MCI-22 | 219,000 | 557,000 | 6.5 | 2.8 | 114 | 82,000 | 313,000 | 7.1 | 3.0 | 115 |
| MCI-23 | 88,000 | 335,000 | 10.2 | 3.1 | 117 | 33,000 | 130,000 | 15.4 | 3.3 | 121 |
| MCI-24 | 56,000 | 476,000 | 5.9 | 3.9 | 95 | 22,000 | 147,000 | 9.9 | 4.2 | 96 |
| MCI-25 | 129,000 | 788,000 | 9.6 | 3.6 | 113 | 42,000 | 425,300 | 8.6 | 2.8 | 113 |
| MCI-26 | 165,000 | 426,300 | 9.2 | 2.3 | 117 | 68,000 | 240,400 | 6.2 | 2.2 | 119 |
| MCI-27 | 45,000 | 472,900 | 5.5 | 4.4 | 94 | 22,000 | 242,100 | 6.2 | 4.5 | 94 |
| MCI-28 | 165,000 | 233,100 | 5.8 | 4.9 | 96 | 37,000 | 144,800 | 7.3 | 3.9 | 118 |
| MCI-29 | 48,000 | 1,007,100 | 6.5 | 2.1 | 124 | 55,000 | 491,300 | 6.3 | 1.3 | 125 |
| MCI-30 | 167,000 | 915,100 | 9.5 | 2.7 | 121 | 148,000 | 537,200 | 11.2 | 2.1 | 122 |
| MCI-31 | 405,600 | 1,205,400 | 9.7 | 5.8 | 93 | 228,000 | 449,100 | 20.8 | 6.7 | 97 |
| MCI-32 | 89,600 | 892,000 | 4.8 | 5.2 | 90 | 52,300 | 475,000 | 6.3 | 5.2 | 118 |
| MCI-33 | 74,000 | 744,400 | 8.7 | 2.6 | 121 | 34,500 | 401,000 | 8.1 | 1.7 | 121 |
| MCI-34 | 142,500 | 432,600 | 13.3 | 2.4 | 119 | 65,800 | 336,100 | 11.8 | 2.3 | 120 |
| MCI-35 | 100,800 | 1,348,400 | 6.1 | 6.2 | 82 | 34,500 | 299,100 | 14.9 | 6.3 | 85 |
| MCI-36 | 248,500 | 1,076,400 | 8.3 | 4.7 | 91 | 92,600 | 407,700 | 12.5 | 4.0 | 117 |

TABLE 5

PPR Polymerization Data

| Catalyst | Pressure Uptake (PSI) | Mn | Mw (g/mol) | Mw/Mn | T (° C.) | Yield (mg) | Quench Time | Octene mol % |
|---|---|---|---|---|---|---|---|---|
| MCI-4 | 51.4 | 32,458 | 126,024 | 3.9 | 120 | 173 | 53.8 | 5.4 |
|  | 76.5 | 7,555 | 33,859 | 4.5 | 150 | 165 | 46.4 | 6.0 |
| MCI-5 | 50.1 | 37,491 | 161,775 | 4.3 | 120 | 157 | 28.1 | 5.5 |
|  | 75.2 | 18,872 | 105,643 | 5.6 | 150 | 107 | 92.2 | 4.6 |
| MCI-6 | 50.2 | 126,269 | 747,377 | 5.9 | 120 | 149 | 89.6 | 5.7 |
|  | 75.5 | 29,837 | 370,800 | 12.4 | 150 | 122 | 126.4 | 4.9 |
| MCI-7 | 47.0 | 68,578 | 656,613 | 9.6 | 120 | 66 | 1800.6 | 4.6 |
|  | 15.7 | 5,034 | 82,914 | 16.5 | 150 | 24 | 1801.3 | 4.6 |
| MCI-46 | 4.9 | — |  |  | 120 | 1 | 1800.5 | — |
| MCI-47 | 5.6 | — |  |  | 120 | — | 1800.7 | — |
| MCI-48 | 29.5 | 12,789 | 1,052,811 | 82.3 | 120 | 30 | 1800.7 | 3.6 |
| MCI-49 | 4.3 | — |  |  | 120 | 1 | 1800.0 | — |
| MCI-8 | 50.4 | 46,691 | 716,191 | 15.3 | 120 | 77 | 222.6 | 11.1 |
|  | 60.4 | 12,321 | 265,051 | 21.5 | 150 | 72 | 1800.0 | 7.6 |
| MCI-9 | 38.3 | 19,688 | 520,721 | 26.5 | 120 | 43 | 1800.5 | 18.1 |
|  | 15.3 | N/A | N/A | N/A | 150 | 1919 | 1800.7 | N/A |
| MCI-43 | 13.6 | 9,084 | 493,571 | 54.3 | 120 | 20 | 1800.2 | 6.6 |
| MCI-10 | 50.2 | 6,734 | 261,170 | 38.8 | 120 | 81 | 509.7 | 6.2 |
| MCI-44 | 22.6 | 7,649 | 444,322 | 58.1 | 120 | 32 | 1800.0 | 12.0 |
| MCI-45 | 24.4 | 7,862 | 331,899 | 42.2 | 120 | 38 | 1801.5 | 8.1 |

The catalysts produce polyolefins with high molecular weight (greater than 300,000 g/mol) at temperatures of 120° C. or greater except for MCI-12 and MCI-28 which produced polyolefins with lower than desirable high molecular weight (less than 300,000 g/mol). In particular, MCI-1, MCI-2, MCI-3, MCI-6, MCI-11, MCI-12, MCI-13, MCI-14, MCI-17, MCI-21, MCI-22, MCI-25, MCI-29, MCI-30, MCI-31, MCI-32, MCI-33, MCI-34, and MCI-36 produce polyolefins with high molecular weight at 150° C. or greater. These types of catalysts are low incorporating catalysts as the polyolefins produced contain between 1.3 to 8.2 mole percent octene. Catalysts bearing a N-benzyl substituent produce polyolefins with higher efficiency. In particular, MCI-14, MCI-18, and MCI-31 possess the highest activity and produce polyolefins with high efficiency (greater than 300,000 g polymer/g metal) at temperatures of 120° C. or greater.

Unless otherwise indicated, the disclosure of any ranges in the specification and claims are to be understood as including the range itself and also anything subsumed therein, as well as endpoints.

It will be apparent to those skilled in the art that modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

The invention claimed is:

1. A polymerization catalyst system comprising the phosphaguanidine complex according to formula I:

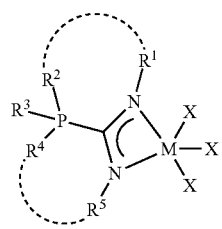

I where

R$^1$ and R$^5$ are independently selected from hydride, aliphatic, heteroaliphatic, aromatic, and heteroaromatic moieties;

R$^2$ and R$^4$ are independently selected from aliphatic moieties, heteroaliphatic moieties, aromatic moieties, and heteroaromatic moieties;

R$^3$ is a lone pair of electrons;

M is selected from titanium, zirconium, and hafnium;

each X is selected from aliphatic moieties, aromatic moieties, NR$^N_2$ moieties and halogen atoms, wherein R$^N$ is selected from alkyl, aryl, or heteroaryl moieties; and each dotted line optionally defines a bridging connection.

2. The polymerization catalyst system according to claim 1, wherein the polymerization catalyst system comprises a chain transfer agent.

3. The polymerization catalyst system according to claim 1, wherein the chain transfer agent in the polymerization catalyst system is diethyl zinc.

4. The polymerization catalyst system according to claim 1, wherein:

each X is selected from methyl, trimethylsilylmethylene, benzyl, chloro, and NMe$_2$;

R$^2$ and R$^4$ include the same or different moieties chosen from unsubstituted phenyl, substituted phenyl, substituted cyclohexyl groups, or unsubstituted cyclohexyl groups;

R$^3$ is a lone pair of electrons; and

R$^1$ and R$^5$ are independently selected from hydride, alkyl, methyl, ethyl, iso-propyl, cyclohexyl tert-butyl, adamantyl, neopentyl, phenethyl, benzyl, phenyl, and substituted phenyl moieties.

5. The polymerization catalyst system according to claim 1, wherein the phosphaguanidine complex comprises the structure of formula II:

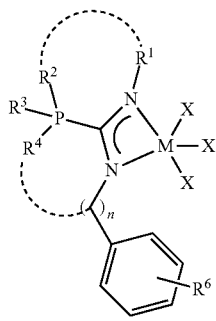

II

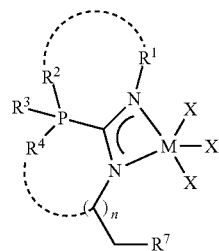

III wherein
- each X independently is selected from alkyl moieties, trimethylsilylmethylene, benzyl, chloro, and —NMe$_2$;
- R$^2$ and R$^4$ is selected from phenyl, substituted phenyl, heteroaromatic groups, alkyl groups, and heteroalkyl groups;
- R$^3$ is a lone pair of electrons;
- R$^1$ and R$^6$ include the same or different moieties selected from hydride, alkyl, methyl, ethyl, iso-propyl, cyclohexyl tert-butyl, adamantyl, neopentyl, phenethyl, benzyl, substituted and non-substituted phenyl moieties, or substituted and non-substituted heteroaromatic groups; and
- n is 0, 1, or 2.

6. The polymerization catalyst system according to claim 1, wherein the phosphaguanidine complex comprises the structure of formula III:

wherein
- each X independently is selected from methyl, trimethylsilylmethylene, benzyl, chloro, and —NMe$_2$;
- R$^2$ and R$^4$ are independently selected from phenyl, substituted phenyl, cyclohexyl and substituted cyclohexyl;
- R$^3$ is a lone pair of electrons;
- R$^1$ and R$^7$ are independently selected from hydride, methyl, ethyl, iso-propyl, cyclohexyl tert-butyl, adamantyl, neopentyl, phenethyl, benzyl, and substituted phenyl moieties, and non-substituted phenyl moieties; and
- n is 0, 1, or 2.

7. The polymerization catalyst system according to claim 1, wherein polymerization catalyst system further comprises a co-catalyst.

* * * * *